(12) United States Patent
Koch

(10) Patent No.: US 9,141,285 B2
(45) Date of Patent: Sep. 22, 2015

(54) DEVICE, METHOD, AND GRAPHICAL USER INTERFACE FOR MANIPULATING SOFT KEYBOARDS

(75) Inventor: Jonathan Koch, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 13/076,395

(22) Filed: Mar. 30, 2011

(65) Prior Publication Data

US 2012/0113026 A1    May 10, 2012

Related U.S. Application Data

(60) Provisional application No. 61/410,862, filed on Nov. 5, 2010.

(51) Int. Cl.
*G06F 3/041* (2006.01)
*G06F 3/0488* (2013.01)

(52) U.S. Cl.
CPC .................................. *G06F 3/04886* (2013.01)

(58) Field of Classification Search
CPC ................. G06F 3/04886; G06F 2203/04803; G06F 3/017; G06F 3/0488; G06F 1/3203; G06F 2203/04808; G06F 3/0236; G06F 3/04883
USPC ......................... 345/156, 167, 168, 173–183; 178/18.01, 18.03, 19.01, 20.01
See application file for complete search history.

(56) References Cited

U.S. PATENT DOCUMENTS

| | | |
|---|---|---|
| 2,794,861 A | 6/1957 | Heine |
| 4,081,631 A | 3/1978 | Feder |
| 4,107,784 A | 8/1978 | Van Bemmelen |
| 4,202,041 A | 5/1980 | Kaplow et al. |
| 4,204,089 A | 5/1980 | Key et al. |
| 4,313,108 A | 1/1982 | Yoshida |
| 4,332,464 A | 6/1982 | Bartulis et al. |
| 4,334,219 A | 6/1982 | Paulus et al. |
| 4,353,056 A | 10/1982 | Tsikos |
| 4,433,377 A | 2/1984 | Eustis et al. |

(Continued)

FOREIGN PATENT DOCUMENTS

| | | |
|---|---|---|
| EP | 1 536 316 A1 | 6/2005 |
| EP | 1 703 363 A2 | 9/2006 |

(Continued)

OTHER PUBLICATIONS

International Search Report and Written Opinion dated May 23, 2011, received in International Application No. PCT/US2011/029957, which corresponds to U.S. Appl. No. 12/752,003, 11 pages.

(Continued)

*Primary Examiner* — Kumar Patel
*Assistant Examiner* — Insa Sadio
(74) *Attorney, Agent, or Firm* — Morrison & Foerster LLP

(57) ABSTRACT

A method includes, at an electronic device with a display and a touch-sensitive surface: concurrently displaying a first text entry area and an unsplit keyboard on the display; detecting a gesture on the touch-sensitive surface; and, in response to detecting the gesture on the touch-sensitive surface, replacing the unsplit keyboard with an integrated input area. The integrated input area includes a left portion with a left side of a split keyboard, a right portion with a right side of the split keyboard, and a center portion in between the left portion and the right portion.

20 Claims, 93 Drawing Sheets

(56) References Cited

U.S. PATENT DOCUMENTS

| | | | |
|---|---|---|---|
| 4,455,452 A | 6/1984 | Schuyler |
| 4,459,581 A | 7/1984 | Wilson et al. |
| 4,485,439 A | 11/1984 | Rothstein |
| 4,504,133 A | 3/1985 | Nakai et al. |
| 4,513,379 A | 4/1985 | Wilson et al. |
| 4,586,158 A | 4/1986 | Brandle |
| 4,598,363 A | 7/1986 | Clark et al. |
| 4,642,790 A | 2/1987 | Minshull et al. |
| 4,658,425 A | 4/1987 | Julstrom |
| 4,680,429 A | 7/1987 | Murdock et al. |
| 4,698,625 A | 10/1987 | McCaskill et al. |
| 4,746,770 A | 5/1988 | McAvinney |
| 4,755,811 A | 7/1988 | Slavin et al. |
| 4,790,028 A | 12/1988 | Ramage |
| 4,803,463 A | 2/1989 | Sado |
| 4,812,831 A | 3/1989 | Laier |
| 5,347,295 A | 9/1994 | Agulnick et al. |
| 4,555,775 B1 | 12/1985 | Pike |
| 5,729,219 A | 3/1998 | Armstrong et al. |
| 5,905,497 A | 5/1999 | Vaughan et al. |
| 6,037,937 A | 3/2000 | Beaton et al. |
| 6,154,758 A | 11/2000 | Chiang |
| 6,307,549 B1 | 10/2001 | King et al. |
| 6,486,895 B1 | 11/2002 | Robertson et al. |
| 6,657,560 B1 | 12/2003 | Jung |
| 6,842,182 B2 | 1/2005 | Ungar et al. |
| 6,924,822 B2 | 8/2005 | Card et al. |
| 6,944,818 B2 | 9/2005 | Newman et al. |
| 6,947,062 B2 | 9/2005 | Cuijpers et al. |
| 6,995,746 B2 | 2/2006 | Aymeric |
| 7,088,342 B2 | 8/2006 | Rekimoto et al. |
| 7,176,888 B2 | 2/2007 | Marvit et al. |
| 7,185,274 B1 | 2/2007 | Rubin et al. |
| 7,190,349 B2 | 3/2007 | Kim et al. |
| 7,299,424 B2 | 11/2007 | Jarrett et al. |
| 7,383,517 B2 | 6/2008 | Baudisch et al. |
| 7,434,177 B1 | 10/2008 | Ording et al. |
| 7,437,683 B1 | 10/2008 | Beezer et al. |
| 7,477,231 B2 | 1/2009 | Asai |
| 7,602,378 B2 | 10/2009 | Kocienda et al. |
| 7,614,008 B2 | 11/2009 | Ording |
| 7,634,263 B2 | 12/2009 | Louch et al. |
| 7,768,501 B1 | 8/2010 | Maddalozzo, Jr. et al. |
| 8,033,744 B2 | 10/2011 | Baker |
| 8,289,162 B2 | 10/2012 | Mooring et al. |
| 8,347,232 B1 | 1/2013 | Prud'Hommeaux et al. |
| 8,358,321 B1 | 1/2013 | Weidner |
| 8,365,059 B2 | 1/2013 | Walsh et al. |
| 8,368,658 B2 | 2/2013 | Brisebois et al. |
| 8,405,630 B1 | 3/2013 | Bi et al. |
| 8,448,083 B1 | 5/2013 | Migos et al. |
| 8,520,025 B2 | 8/2013 | Patterson et al. |
| 8,842,082 B2 | 9/2014 | Migos et al. |
| 8,850,350 B2 | 9/2014 | Bi et al. |
| 2002/0015064 A1 | 2/2002 | Robotham et al. |
| 2002/0028018 A1 | 3/2002 | Hawkins et al. |
| 2002/0105504 A1 | 8/2002 | Toepke et al. |
| 2002/0118175 A1* | 8/2002 | Liebenow et al. ............ 345/168 |
| 2003/0001899 A1 | 1/2003 | Partanen et al. |
| 2003/0184528 A1 | 10/2003 | Kawasaki et al. |
| 2003/0210272 A1 | 11/2003 | D'Souza |
| 2004/0021691 A1 | 2/2004 | Dostie et al. |
| 2004/0068409 A1 | 4/2004 | Tanaka et al. |
| 2004/0080487 A1 | 4/2004 | Griffin et al. |
| 2004/0100479 A1 | 5/2004 | Nakano et al. |
| 2004/0119750 A1 | 6/2004 | Harrison |
| 2004/0140984 A1 | 7/2004 | Hinckley et al. |
| 2004/0183834 A1 | 9/2004 | Chermesino |
| 2004/0201576 A1 | 10/2004 | Shimada et al. |
| 2004/0230912 A1 | 11/2004 | Clow et al. |
| 2005/0154798 A1 | 7/2005 | Nurmi |
| 2005/0225538 A1 | 10/2005 | Verhaegh |
| 2005/0248525 A1 | 11/2005 | Asai |
| 2006/0007178 A1 | 1/2006 | Davis |
| 2006/0033724 A1 | 2/2006 | Chaudhri et al. |
| 2006/0038796 A1 | 2/2006 | Hinckley et al. |
| 2006/0048072 A1 | 3/2006 | Jarrett et al. |
| 2006/0055685 A1 | 3/2006 | Rimas-Ribikauskas et al. |
| 2006/0061542 A1 | 3/2006 | Stokie |
| 2006/0080621 A1 | 4/2006 | Park |
| 2006/0085757 A1 | 4/2006 | Andre et al. |
| 2006/0150087 A1 | 7/2006 | Cronenberger et al. |
| 2006/0152389 A1 | 7/2006 | Kajikawa |
| 2006/0164399 A1 | 7/2006 | Cheston et al. |
| 2006/0181518 A1 | 8/2006 | Shen et al. |
| 2006/0197750 A1 | 9/2006 | Kerr et al. |
| 2006/0242607 A1 | 10/2006 | Hudson |
| 2006/0265648 A1 | 11/2006 | Rainisto et al. |
| 2007/0060228 A1 | 3/2007 | Akasaka et al. |
| 2007/0091070 A1 | 4/2007 | Larsen et al. |
| 2007/0097085 A1 | 5/2007 | Iwatsuki |
| 2007/0171210 A1 | 7/2007 | Chaudhri et al. |
| 2007/0273662 A1 | 11/2007 | Lian et al. |
| 2007/0277126 A1 | 11/2007 | Park et al. |
| 2008/0036743 A1 | 2/2008 | Westerman et al. |
| 2008/0042978 A1 | 2/2008 | Perez-Noguera |
| 2008/0082920 A1 | 4/2008 | Eom |
| 2008/0115078 A1 | 5/2008 | Girgaonkar |
| 2008/0134101 A1 | 6/2008 | Newman |
| 2008/0141126 A1 | 6/2008 | Johnson et al. |
| 2008/0158024 A1 | 7/2008 | Steiner et al. |
| 2008/0165141 A1 | 7/2008 | Christie |
| 2008/0165144 A1 | 7/2008 | Forstall et al. |
| 2008/0180408 A1 | 7/2008 | Forstall et al. |
| 2008/0259057 A1 | 10/2008 | Brons |
| 2008/0297377 A1 | 12/2008 | Wang et al. .................. 341/22 |
| 2009/0052778 A1 | 2/2009 | Edgecomb et al. |
| 2009/0058815 A1 | 3/2009 | Jeon et al. |
| 2009/0058820 A1 | 3/2009 | Hinckley |
| 2009/0058823 A1 | 3/2009 | Kocienda |
| 2009/0064047 A1 | 3/2009 | Shim et al. |
| 2009/0091541 A1 | 4/2009 | Chen |
| 2009/0122018 A1 | 5/2009 | Vymenets et al. |
| 2009/0132957 A1 | 5/2009 | Reddy |
| 2009/0140986 A1 | 6/2009 | Karkkainen et al. |
| 2009/0153288 A1 | 6/2009 | Hope et al. |
| 2009/0167706 A1* | 7/2009 | Tan et al. .................. 345/173 |
| 2009/0174669 A1 | 7/2009 | Shkolnikov |
| 2009/0174679 A1 | 7/2009 | Westerman |
| 2009/0189858 A1 | 7/2009 | Lev et al. |
| 2009/0195959 A1 | 8/2009 | Ladouceur et al. |
| 2009/0213081 A1 | 8/2009 | Case, Jr. |
| 2009/0225035 A1 | 9/2009 | Baik |
| 2009/0225041 A1 | 9/2009 | Kida et al. |
| 2009/0228842 A1 | 9/2009 | Westerman et al. |
| 2009/0231281 A1* | 9/2009 | Whytock et al. .............. 345/168 |
| 2009/0235281 A1 | 9/2009 | Lu et al. |
| 2009/0237359 A1 | 9/2009 | Kim et al. |
| 2009/0237361 A1 | 9/2009 | Mosby et al. |
| 2009/0241054 A1 | 9/2009 | Hendricks |
| 2009/0243898 A1 | 10/2009 | Iorfida et al. |
| 2009/0244020 A1 | 10/2009 | Sjolin |
| 2009/0247233 A1 | 10/2009 | Kim |
| 2009/0251422 A1 | 10/2009 | Wu et al. |
| 2009/0256817 A1 | 10/2009 | Perlin et al. |
| 2009/0258677 A1 | 10/2009 | Ellis et al. |
| 2009/0265627 A1 | 10/2009 | Kim et al. |
| 2009/0267906 A1 | 10/2009 | Schroderus |
| 2009/0273566 A1* | 11/2009 | Lu et al. .................. 345/169 |
| 2009/0303200 A1 | 12/2009 | Grad |
| 2009/0309768 A1 | 12/2009 | Pihlaja |
| 2010/0004029 A1 | 1/2010 | Kim |
| 2010/0020033 A1 | 1/2010 | Nwosu |
| 2010/0020034 A1 | 1/2010 | Kim |
| 2010/0058212 A1 | 3/2010 | Belitz et al. |
| 2010/0064261 A1 | 3/2010 | Andrews et al. |
| 2010/0070613 A1 | 3/2010 | Chen et al. |
| 2010/0088641 A1 | 4/2010 | Choi |
| 2010/0103124 A1 | 4/2010 | Kruzeniski et al. |
| 2010/0105408 A1 | 4/2010 | Palmer et al. |
| 2010/0107050 A1 | 4/2010 | Wang et al. |
| 2010/0110017 A1 | 5/2010 | Lee |
| 2010/0141590 A1 | 6/2010 | Markiewicz et al. |
| 2010/0146459 A1 | 6/2010 | Repka |

(56) References Cited

U.S. PATENT DOCUMENTS

| | | |
|---|---|---|
| 2010/0153313 A1 | 6/2010 | Baldwin et al. |
| 2010/0156793 A1 | 6/2010 | Ozias et al. |
| 2010/0164959 A1 | 7/2010 | Brown et al. |
| 2010/0185949 A1 | 7/2010 | Jaeger |
| 2010/0194692 A1 | 8/2010 | Orr et al. |
| 2010/0214237 A1 | 8/2010 | Echeverri et al. |
| 2010/0231612 A1 | 9/2010 | Chaudhri et al. |
| 2010/0235726 A1 | 9/2010 | Ording et al. |
| 2010/0235794 A1 | 9/2010 | Ording |
| 2010/0238125 A1 | 9/2010 | Ronkainen |
| 2010/0238139 A1 | 9/2010 | Goertz et al. |
| 2010/0241985 A1 | 9/2010 | Kim et al. |
| 2010/0259484 A1 | 10/2010 | Jo |
| 2010/0259493 A1 | 10/2010 | Chang et al. |
| 2010/0259561 A1 | 10/2010 | Forutanpour et al. |
| 2010/0259562 A1 | 10/2010 | Miyazawa et al. |
| 2010/0277414 A1 | 11/2010 | Tartz et al. |
| 2010/0283743 A1 | 11/2010 | Coddington |
| 2010/0289756 A1 | 11/2010 | Anzures et al. |
| 2010/0293498 A1 | 11/2010 | Maxfield |
| 2010/0295781 A1 | 11/2010 | Alameh et al. |
| 2010/0299597 A1 | 11/2010 | Shin et al. |
| 2010/0302155 A1 | 12/2010 | Sands et al. |
| 2010/0315359 A1 | 12/2010 | Seong et al. |
| 2011/0006996 A1 | 1/2011 | Smith et al. |
| 2011/0007009 A1 | 1/2011 | Ishihara et al. |
| 2011/0009169 A1 | 1/2011 | Kim |
| 2011/0029918 A1 | 2/2011 | Yoo et al. |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0074699 A1 | 3/2011 | Marr et al. |
| 2011/0078560 A1 | 3/2011 | Weeldreyer et al. |
| 2011/0078614 A1 | 3/2011 | Lee et al. |
| 2011/0106439 A1 | 5/2011 | Huang et al. |
| 2011/0179387 A1 | 7/2011 | Shaffer et al. |
| 2011/0187647 A1 | 8/2011 | Woloszynski et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0221684 A1 | 9/2011 | Rydenhag |
| 2011/0231796 A1 | 9/2011 | Vigil |
| 2011/0242138 A1 | 10/2011 | Tribble |
| 2011/0258537 A1 | 10/2011 | Rives et al. |
| 2011/0263298 A1 | 10/2011 | Park |
| 2011/0302532 A1 | 12/2011 | Missig |
| 2012/0046947 A1 | 2/2012 | Fleizach |
| 2012/0096345 A1 | 4/2012 | Ho et al. |
| 2012/0110431 A1 | 5/2012 | Rosenfeld et al. |
| 2012/0112024 A1 | 5/2012 | Götzl |
| 2012/0112025 A1 | 5/2012 | Smeenk |
| 2012/0112026 A1 | 5/2012 | Crawford |
| 2012/0113007 A1 | 5/2012 | Koch et al. |
| 2012/0113023 A1 | 5/2012 | Koch et al. |
| 2012/0113024 A1 | 5/2012 | Koch et al. |
| 2012/0113025 A1 | 5/2012 | Koch et al. |
| 2012/0113026 A1 | 5/2012 | Koch |
| 2012/0113126 A1 | 5/2012 | Koch et al. |
| 2012/0117501 A1 | 5/2012 | Koch et al. |
| 2012/0117505 A1 | 5/2012 | Koch et al. |
| 2012/0117506 A1 | 5/2012 | Koch et al. |
| 2012/0120016 A1 | 5/2012 | Mittal et al. |
| 2012/0127206 A1 | 5/2012 | Thompson et al. |
| 2012/0139844 A1 | 6/2012 | Ramstein et al. |
| 2012/0162078 A1 | 6/2012 | Ferren et al. |
| 2012/0188174 A1 | 7/2012 | Migos et al. |
| 2012/0192093 A1 | 7/2012 | Migos et al. |
| 2012/0206363 A1 | 8/2012 | Kyprianou et al. |
| 2012/0206370 A1 | 8/2012 | Ivanovic |
| 2012/0324381 A1 | 12/2012 | Cohen et al. |
| 2013/0016129 A1 | 1/2013 | Gossweiler, III et al. |
| 2013/0057475 A1 | 3/2013 | Duggan et al. |
| 2013/0067382 A1 | 3/2013 | Townsend et al. |
| 2013/0167013 A1 | 6/2013 | Poliak |
| 2013/0222244 A1 | 8/2013 | Mak et al. |
| 2013/0234949 A1 | 9/2013 | Chornenky |
| 2013/0265225 A1 | 10/2013 | Nasiri et al. |
| 2013/0286435 A1 | 10/2013 | Anezaki et al. |
| 2014/0040835 A1 | 2/2014 | Hildreth et al. |
| 2014/0223381 A1 | 8/2014 | Huang et al. |

FOREIGN PATENT DOCUMENTS

| | | | |
|---|---|---|---|
| EP | 1791051 A1 | 5/2007 | |
| EP | 2 105 823 A1 | 9/2009 | |
| EP | 2 109 031 A2 | 10/2009 | |
| EP | 2 133 778 A2 | 12/2009 | |
| EP | 2 341 414 A1 | 7/2011 | |
| GB | 2 402 105 A | 12/2004 | |
| JP | 2002-508559 A | 3/2002 | |
| JP | 2005 244301 | 9/2005 | |
| JP | 2005-526303 A | 9/2005 | |
| JP | 2005-531861 A | 10/2005 | |
| JP | 2006-139397 A | 6/2006 | |
| JP | 2007 279638 | 10/2007 | |
| JP | 2009-527041 A | 7/2009 | |
| KR | 10-2005-0016691 A | 2/2005 | |
| KR | 10-2009-0101741 A | 9/2009 | |
| KR | 10-0975168 B1 | 8/2010 | |
| WO | 99/31571 A1 | 6/1999 | |
| WO | 00/68771 A1 | 11/2000 | |
| WO | WO 00/74240 A1 | 12/2000 | |
| WO | WO 02/15211 A1 | 2/2002 | |
| WO | 03/036795 A1 | 5/2003 | |
| WO | WO 03/062978 A2 | 7/2003 | ............ G06F 3/033 |
| WO | WO 2004/006080 A2 | 1/2004 | |
| WO | WO 2005/033856 A2 | 4/2005 | |
| WO | WO 2005/076477 A1 | 8/2005 | |
| WO | WO 2007/014064 A2 | 2/2007 | |
| WO | 2007/093984 A2 | 8/2007 | |
| WO | WO 2007/089766 A2 | 8/2007 | |
| WO | WO 2009/049331 A2 | 4/2009 | |
| WO | 2009/084147 A1 | 7/2009 | |
| WO | WO 2010/018579 A2 | 2/2010 | |
| WO | WO 2010/089740 A1 | 8/2010 | |
| WO | 2010/117374 A1 | 10/2010 | |
| WO | WO 2011/123099 A1 | 10/2011 | |
| WO | WO 2012/083499 A1 | 6/2012 | |

OTHER PUBLICATIONS

European Search Report and Written Opinion dated May 4, 2012, received in Dutch Patent Application No. 2007721, which corresponds to U.S. Appl. No. 13/076,389, 16 pages (Koch).

International Search Report and Written Opinion dated May 7, 2012, received in International Application No. PCT/US2011/059085, which corresponds to U.S. Appl. No. 13/076,389, 17 pages (Koch).

European Search Report and Written Opinion dated May 4, 2012, received in Dutch Patent Application No. 2007723, which corresponds to U.S. Appl. No. 13/076,389, 10 pages (Koch).

International Search Report and Written Opinion dated May 7, 2012, received in International Application No. PCT/US2011/059088, which corresponds to U.S. Appl. No. 13/076,392, 12 pages (Koch).

Invitation to Pay Additional Fees dated May 23, 2012, received in International Patent Application No. PCT/US2011/059092, which corresponds to U.S. Appl. No. 13/076,395, 9 pages (Koch).

International Search Report and Written Opinion dated Jul. 30, 2012, received in International Patent Application No. PCT/US2011/059092, which corresponds to U.S. Appl. No. 13/076,395, 25 pages (Koch).

International Search Report and Written Opinion dated May 7, 2012, received in International Application No. PCT/US2011/059101, which corresponds to U.S. Appl. No. 13/076,393, 12 pages (Koch).

International Search Report and Written opinion dated May 7, 2012, received in International Application No. PCT/US2011/059106, which corresponds to U.S. Appl. No. 13/076,391, 13 pages (Koch).

European Search Report and Written Opinion dated May 4, 2012, received in Dutch Patent Application No. 2007722, which corresponds to U.S. Appl. No. 13/243,599, 10 pages (Koch).

International Search Report and Written Opinion dated May 7, 2012, received in International Application No. PCT/US2011/059204, which correponds to U.S. Appl. No. 13/243,599, 10 pages (Koch).

(56) References Cited

OTHER PUBLICATIONS

Office Action dated Oct. 3, 2012, received in U.S. Appl. No. 13/076,389, 11 pages.
Blind Type, "Touch typing the way it should be," 2010, 2 pages.
Concept Phones, "Apple Tablet," Concept Phones.com, Dec. 16, 2009, http://www.concept-phones.com/?s=apple+tablet, 21 pages.
G.P. Imports, "Keyboard Upgrade," G.P. Imports, Inc., ipdated May 20, 2010, 8 pages.
Gizmodo, "How Will We Type on the Apple Tablet?", Gizmodo.com, Jan. 12, 2010, http://gizmodo.com/5446652/how-will-we-type-on-the-apple-tablet, 5 pages.
Robbin, S., "Concept: iPad Split Keyboard," Jan. 27, 2010, http://srobbin.com/blog/concept-ipad-split-keyboard/, 3 pages.
Surur, "Microsoft patents cool multi-touch virtual keyboard," wmpoweruser.com, Sep. 25, 2009, http://wmpoweruser.com/microsoft-patents-cool-multi-touch-virtual-keyboard/.
Tidwell, J., "Magnetism," from Designing Interfaces, Copyright © 2006 O'Reilly Media Inc., pp. 279-280.
Toshiba, "Libretto® W100," Jun. 2010, 9 pages.
Dutch Search Report dated May 23, 2012, received in Dutch Patent Application No. 2007725, which corresponds to U.S. Appl. No. 13/076,395, 12 pages (Koch).
Dutch Search Report dated May 14, 2012, received in Dutch Patent Application No. 2007719, which corresponds to U.S. Appl. No. 13/076,393, 10 pages (Koch).
Dutch Search Report dated May 14, 2012, received in Dutch Patent Application No. 2007718, which corresponds to U.S. Appl. No. 13/076,391,10 pages (Koch).
Ajidev, "iAnnotate," ajidev.com. 2010, www.ajidev.com/iannotate, 2 pages.
Ajidev, "Welcome to iAnnotate v 1.3!" Ajidev.com, 2010, www.ajidev.com, 37 pages.
Chen et al., "Navigation Techniques for Dual-Display E-Book Readers," CHI 2008 Proceedings, Apr. 2008, Florence, Italy, 10 pages.
Find eBook Readers, "PDF on the iPad-iAnnotate Review-Annotations!" Find eBook Readers Blog, May 2010, http://findebookreaders.com/blog/2010/05/pdf-on-the-ipad-iannotate-review-annotations/, 9 pages.
Goodiware, "GoodReader User Manual; Viewing PDF Files," goodiware.com, 2010. http://www.goodreader.net/gr-man-view-pdf.htm#annots, 11 pages.
Lee et al., "smartNote for iPad User Guide," mysmartnote.net, Version 1.4, 2010. http://mysmartnet.net, 17 pages.
Mobipocket, "Mobipocket Reader Desktop 6.2," Mobipocket.com, 2010, http://www.mobipocket.com/en/downloadsoft/productdetailsreader.asp, 3 pages.
Readdle Inc., "PDF Expert for iPad User's Guide," Readdle Inc., 2010, 15 pages.
Vimeo, "Smart Design magazine UX concept," vimeo.com. 2010, http://vimeo.com/10813230, 2 pages.
Willems et al., "Pen gestures in online map and photograph annotation tasks," Oct. 2006, 6 pages.
International Search Report and Written Opinion dated Feb. 11, 2013, received in International Application No. PCT/US2011/059092, which corresponds to U.S. Appl. No. 13/076,395, 35 pages (Koch).
Office Action dated Feb. 22, 2013, received in U.S. Appl. No. 12/752,003, 39 pages (Tribble).
Office Action dated Nov. 2, 2012, received in U.S. Appl. No. 13/076,392, 9 pages (Koch).
Office Action dated Dec. 14, 2012, received in U.S. Appl. No. 13/076,397, 20 pages (Koch).
Office Action dated Feb. 12, 2013, received in U.S. Appl. No. 13/076,399, 28 pages (Koch).
Office Action dated Dec. 17, 2012, received in U.S. Appl. No. 13/076,401, 16 pages (Koch).
Office Action dated Nov. 9, 2012, received in U.S. Appl. No. 13/077,754, 9 pages (Migos).
Office Action dated Nov. 2, 2012, received in U.S. Appl. No. 13/076,393, 8 pages (Koch).
Office Action dated Jan. 17, 2013, received in U.S. Appl. No. 13/243,599, 17 pages (Koch).
International Preliminary Report on Patentability dated May 16, 2013, received in International Application No. PCT/US2011/059085, which corresponds to U.S. Appl. No. 13/076,389, 10 pages (Koch).
International Preliminary Report on Patentability dated May 16, 2013, received in International Application No. PCT/US2011/059088, which corresponds to U.S. Appl. No. 13/076,392, 10 pages (Koch).
International Preliminary Report on Patentability dated May 16, 2013, received in International Patent Application No. PCT/US2011/059092, which corresponds to U.S. Appl. No. 13/076,395, 12 pages (Koch).
International Preliminary Report on Patentability dated May 16, 2013, received in International Application No. PCT/US2011/059101, which corresponds to U.S. Application No. PCT/US2011/059101, 10 pages (Koch).
International Preliminary Report on Patentability dated May 1, 2013, received in International Patent No. PCT/US2011/059106, which corresponds to U.S. Appl. No. 13/076,391, 10 pages (Koch).
International Preliminary Report on Patentability dated May 16, 2013, received in International Application No. PCT/US2011/059204, which corresponds to U.S. Appl. No. 13/243,599, 8 pages (Koch).
Notice of Allowance dated May 2, 2013, received in U.S. Appl. No. 13/070,389, 9 pages (Koch).
Notice of Allowance dated May 28, 2013, received in U.S. Appl. No. 13/076,389, 10 pages (Koch).
Office Action dated Jun. 13, 2013, received in U.S. Appl. No. 13/076,411, 15 pages (Migos).
Office Action dated Feb. 7, 2013, received in U.S. Appl. No. 13/076,391, 20 pages (Koch).
Guimbretlère, F., "Paper Augmented Digital Documents," UIST '03, Nov. 2003, Vancouver, BC, Canada, 10 pages.
International Preliminary Report on Patentability dated Jul. 4, 2013, received in International Patent Application No. PCT/US2011/059092, which corresponds to U.S. Appl. No. 13/076,395, 16 pages (Koch).
International Search Report and Written Opinion dated Jul. 24, 2013, received in International Application No. PCT/US2013/037423, which corresponds to U.S. Appl. No. 13/797,979, 11 pages (Koch).
Notice of Allowanced dated Aug. 6, 2013, received in U.S. Appl. No. 13/076,392, 14 pages (Koch).
Notice of Allowance dated Jul. 18, 2013, received in U.S. Appl. No. 13/076,401, 10 pages (Koch).
Office Action dated Jul. 15, 2013, received in U.S. Appl. No. 13/077,754, 17 pages (Migos).
Office Action received for Australian Patent Application No. 2011323269, issued on Aug. 5, 2013, 3 pages.
Office Action received for European Patent Application No. 11784558.6, mailed on Jun. 23, 2014, 5 pages.
Office Action received for Japanese Patent Application No. 2013-537812, mailed on Mar. 7, 2014, 7 pages (4 pages of English Translation and 3 pages of Official Copy).
Office Action received for Korean Patent Application No. 10-2013-7014110, mailed on Mar. 26, 2014, 7 pages (3 pages of English Translation and 4 pages of Official Copy).
Office Action received for Korean Patent Application No. 10-2012-7030352, mailed on Dec. 9, 2013, 7 pages (3 pages of English Translation and 4 pages of Official Copy).
Final Office Action received for U.S. Appl. No. 12/752,003, mailed on Jun. 11, 2013, 40 pages.
Non-Final Office Action received for U.S. Appl. No. 12/752,003, mailed on Sep. 19, 2013, 49 pages.
Non-Final Office Action received for U.S. Appl. No. 13/076,391, mailed on Nov. 7, 2013, 12 pages.
Notice of Allowance received for U.S. Appl. No. 131076,393, mailed on Oct. 3, 2013, 13 pages.
Notice of Allowance received for U.S. Appl. No. 13/076,397, mailed on Sep. 16, 2013, 10 pages.
Notice of Allowance received for U.S. Appl. No. 13/076,399, mailed on Oct. 10, 2013, 7 pages.

(56) References Cited

OTHER PUBLICATIONS

Non-Final Office Action received for U.S. Appl. No. 13/076,407, mailed on Dec. 5, 2013, 16 pages.
Final Office Action received in U.S. Appl. No. 13/076,411, mailed on Nov. 15, 2013, 11 pages.
Non-Final Office Action received for U.S. Appl. No. 13/076,414, mailed on Aug. 21, 2013, 8 pages.
Notice of Allowance received for U.S. Appl. No. 13/243,599, mailed on Aug. 6, 2013, 10 pages.
*Apple Inc.* vs. *Samsung Electronics Co. Ltd.* et al., Judgment in Interlocutory proceeding, Case No. 396957/KG ZA 11-730, civil law sector, Aug. 24, 2011, pp. 1-65.
*Apple Inc.* vs. *Samsung Electronics Co. Ltd.*, et al., Samsung's Motion To Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd.*, et al., Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Office Action received for Korean Patent Application No. 10-2012-7020604, mailed on Oct. 11, 2013, 4 pages (1 page of English Translation and 3 pages of Official copy).
Office Action received for Korean Patent Application No. 10-2012-7030352, mailed on Oct. 24, 2014, 3 pages (Official Copy only). (See Communication under 37 CFR § 1.98(a) (3)).
Office Action received for Korean Patent Application No. 10-2012-7030352, mailed on Feb. 23, 2015, 4 pages (Official Copy only). (See Communication under 37 CFR § 1.98(a) (3)).
Notice of Allowance received for Korean Patent Application No. 10-2013-7014110, mailed on Jan. 28, 2015, 2 pages (Official Copy only). (See Communication under 37 CFR § 1.98(a) (3)).
Office Action received for Korean Patent Application No. 10-2013-7013933, mailed on Mar. 26, 2014, 6 pages (3 pages of English Translation and 3 pages of Official Copy).
Notice of Allowance received for Korean Patent Application No. 10-2013-7013933, mailed on Feb. 26, 2015, 2 pages (Official Copy only). (See Communication under 37 CFR § 1.98(a) (3)).
Office Action received for European Patent Application No. 10700014.3, mailed on Aug. 29, 2013, 6 pages.
Office Action received for European Patent Application No. 11784560.2, mailed on Jun. 23, 2014, 5 pages.
Office Action received for European Patent Application No. 11784562.8, mailed on Feb. 21, 2014, 5 pages.
Notice of Allowance received for U.S. Appl. No. 12/788,283, mailed on May 9, 2013, 13 pages.
Notice of Allowance received for U.S. Appl. No. 12/788,283, mailed on Sep. 16, 2013, 16 pages.
Office Action received for U.S. Appl. No. 12/788,283, mailed on May 11, 2012, 12 pages.
Office Action received for U.S. Appl. No. 12/788,283, mailed on Oct. 12, 2012, 14 pages.
Non-Final Office Action received for U.S. Appl. No. 12/794,625, mailed on Oct. 26, 2012, 7 pages.
Non-Final Office Action received for U.S. Appl. No. 13/076,391, mailed on Jul. 16, 2014, 11 pages.
Notice of Allowance received for U.S. Appl. No. 13/076,391, mailed on Jan. 29, 2015, 10 pages.
Wilson, Andrew D., "TouchLight: An Imaging Touch Screen and Display for Gesture-Based Interaction", ACM, Oct. 13-15, 2004, 8 pages.
Wang et al., "Detecting and Leveraging Finger Orientation for Interaction with Direct-Touch Surfaces", ACM, Oct. 4-7, 2009, pp. 23-32.
Notice of Allowance received for U.S. Appl. No. 13/076,397, mailed on Nov. 26, 2013, 11 pages.
Notice of Allowance received for U.S. Appl. No. 13/076,407, mailed on May 20, 2014, 9 pages.
Final Office Action received for U.S. Appl. No. 13/076,414, mailed on Feb. 19, 2014, 10 pages.
Non Final Office Action received for U.S. Appl. No. 13/077,711, mailed on Apr. 25, 2014, 15 pages.
Notice of Allowance received for U.S. Appl. No. 13/077,711, mailed on Nov. 28, 2014, 7 pages.
Final Office Action received for U.S. Appl. No. 13/077,754, mailed on Jan. 14, 2015, 16 pages.
Non Final Office Action received for U.S. Appl. No. 13/077,754, mailed on Mar. 21, 2014, 13 pages.
Non Final Office Action received for U.S. Appl. No. 13/797,979, mailed on Jan. 16, 2015, 26 pages.
Non-Final Office Action received for U.S. Appl. No. 14/083,349, mailed on May 27, 2014, 18 pages.
Notice of Allowance received for U.S. Appl. No. 14/083,349, mailed on Jan. 23, 2015, 9 pages.
Office Action received for Chinese Patent Application No. 201080001777.x, mailed on Jan. 28, 2013, 12 pages (English Translation only).
Office Action received for Chinese Patent Application No. 201080001777.x, mailed on Nov. 13, 2013, 9 pages (4 pages of English Translation and 5 pages of Official Copy).
Office Action received for Australian Patent Application No. 2011323269, issued on Sep. 3, 2014, 3 pages.
Office Action received for Australian Patent Application No. 2011323301, issued on Nov. 12, 2014, 3 pages.
Office Action received for Australian Patent Application No. 2011323375, mailed on Nov. 12, 2014, 4 pages.
XDA-Developers, "FingerKeyboard2.1", available at <http://forum.xda-developers.com/showthread.php?t=487677>, retrieved on Apr. 16, 2013, 7 pages.
Office Action received for Japanese Patent Application No. 2013-524269, mailed on Jul. 7, 2014, 5 pages (3 pages of English Translation and 2 pages of Official Copy)
Notice of Allowance received for Japanese Patent Application No. 2013-524269, mailed on Jan. 26, 2015, 3 pages (Official Copy only). (See Communication under 37 CFR § 1.98(a) (3)).
Notice of Allowance received for Japanese Patent Application No. 2013-537812, mailed on Dec. 5, 2014, 3 pages (Official Copy only). (See Communication under 37 CFR § 1.98(a) (3)).
Notice of Allowance received for Japanese Patent Application No. 2013-537813, mailed on Sep. 29, 2014, 3 pages (Official Copy only). (See Communication under 37 CFR § 1.98(a) (3)).
Office Action received for Japanese Patent Application No. 2013-537813, mailed on Apr. 4, 2014, 6 pages (4 pages of English Translation and 2 pages of Office Copy).
Office Action received for Japanese Patent Application No. 2013-537813, mailed on Aug. 8, 2014, 4 pages (2 pages of English Translation and 2 pages of Official copy).

(56) References Cited

OTHER PUBLICATIONS

Crackberry.com, "Quick Way to Hide Keyboard?", available at <http://forums.crackberry.com/f86/quick-way-hide-keyboard-103108/>, Nov. 26, 2008, 6 pages.

Grossman et al., "The Bubble Cursor: Enhancing Target Acquisition by Dynamic Resizing of the Cursor's Activation Area", PAPERS: Smart Interaction Techniques 1, Apr. 2-7, 2005, pp. 281-290.

Hertzum et al., "Input Techniques that Dynamically Change their Cursor Activation Area: A Comparison of Bubble and Cell Cursors", International Journal of Human-Computer Studies, vol. 65, No. 10, 2007, 38 pages.

HTC Corporation, "DROID ERIS User Guide", available at <http://member.america.htc.com/download/Web_materials/Manual/DOID_ERIS_Verizon/DROID_ERIS_Verizon_English_UM_11_5.pdf>, 2009, 238 pages.

International Search Report and Written Opinion received for PCT Patent Application No. PCT/US2010/020263, mailed on Dec. 8, 2010, 11 pages.

International Preliminary Report on Patentability received for PCT Patent Application No. PCT/US2011/029957, mailed on Oct. 11, 2012, 8 pages.

International Preliminary Report on Patentability received for PCT Patent Application No. PCT/US2013/037423, issued on Dec. 31, 2014, 7 pages.

Final Office Action received for U.S. Appl. No. 12/752,003, mailed on Sep. 26, 2014, 40 pages.

Non Final Office Action received for U.S. Appl. No. 12/752,003, mailed on Mar. 7, 2014, 64 pages.

Notice of Allowance received for U.S. Appl. No. 13/077,711, mailed on Mar. 23, 2015, 8 pages.

Notice of Allowance received for Australian Patent Application No. 2011323269, mailed on Apr. 16, 2015, 3 pages.

Gutwin et al., "Improving Interpretation of Remote Gestures with Telepointer Traces", In Proceedings of the 2002 ACM Conference on Computer Supported Cooperative Work, 2002, pp. 49-57.

Ren et at "The Adaptive Hybrid Cursor: A Pressure-Based Target Selection Technique for Pen-Based User interfaces", Interact'07 Proceedings of the 11th IFIP TC 13 international conference on Human-computer interaction, Sep. 10, 2007, 14 pages.

Wu et al., "Gesture Registration, Relaxation, And Reuse For Multi-Point Direct-Touch Surfaces", In First IEEE International Workshop on Horizontal Interactive Human-Computer Systems, Jan. 5, 2006, 8 pages.

* cited by examiner

5000CC  Notes

5110

Any dietary restrictions? (Select all that apply)

5112-A  ☒ Vegetarian
☐ Vegan
☐ Kosher
☐ Halal
☐ No peanuts
☐ No milk and milk products
☐ Other (please specify) [        ]

5016-C

| Q W E R T | 5116-A | Y U I O P |
| A S D F G | ☒ Vegetari | G H J K L |
| ⇧ Z X C V | ☐ Vegan | B N M ⌫ |
| 123  space | ☐ Kosher | space  return |
| | ☐ Halal | |

Figure 5CC

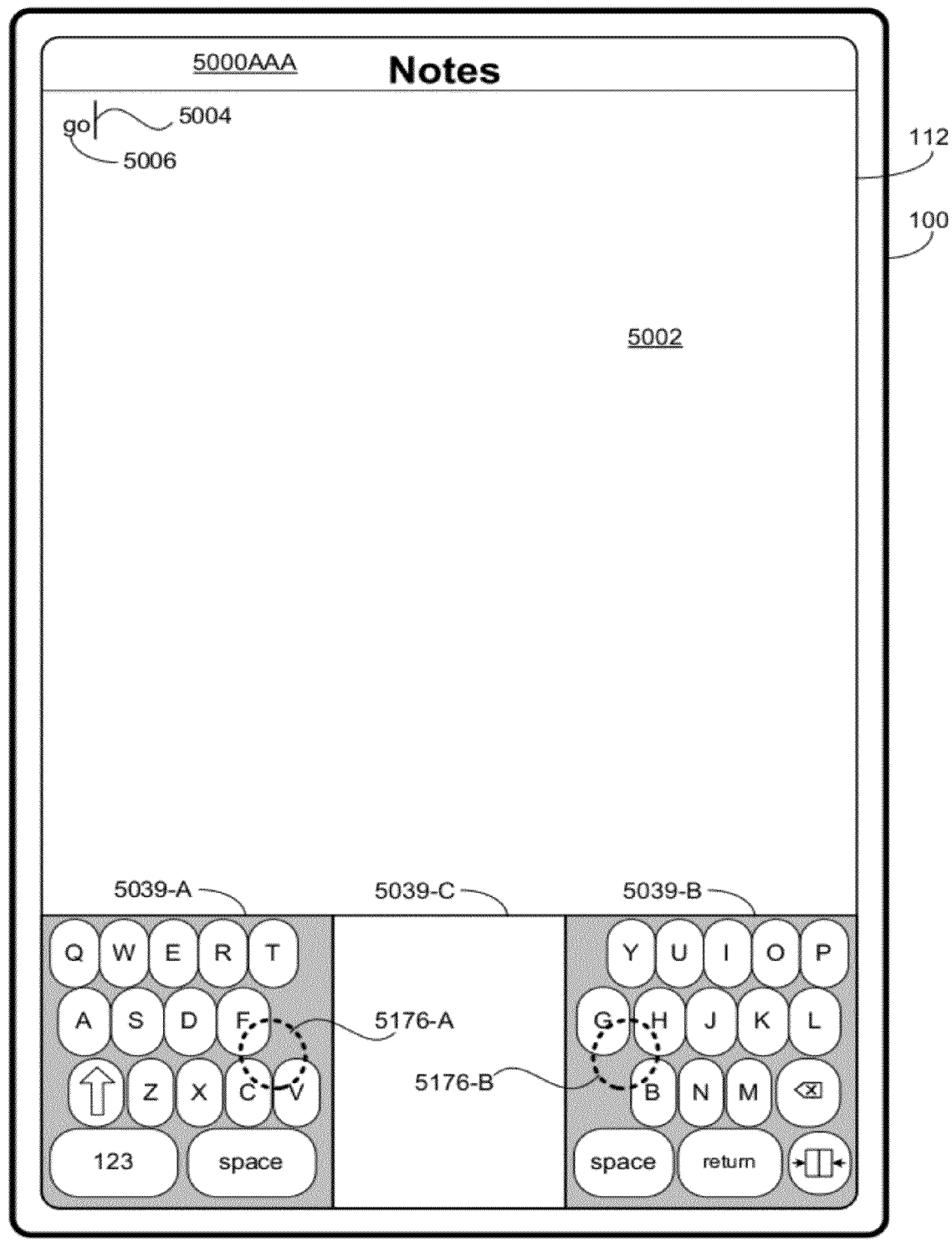
Figure 5AAA

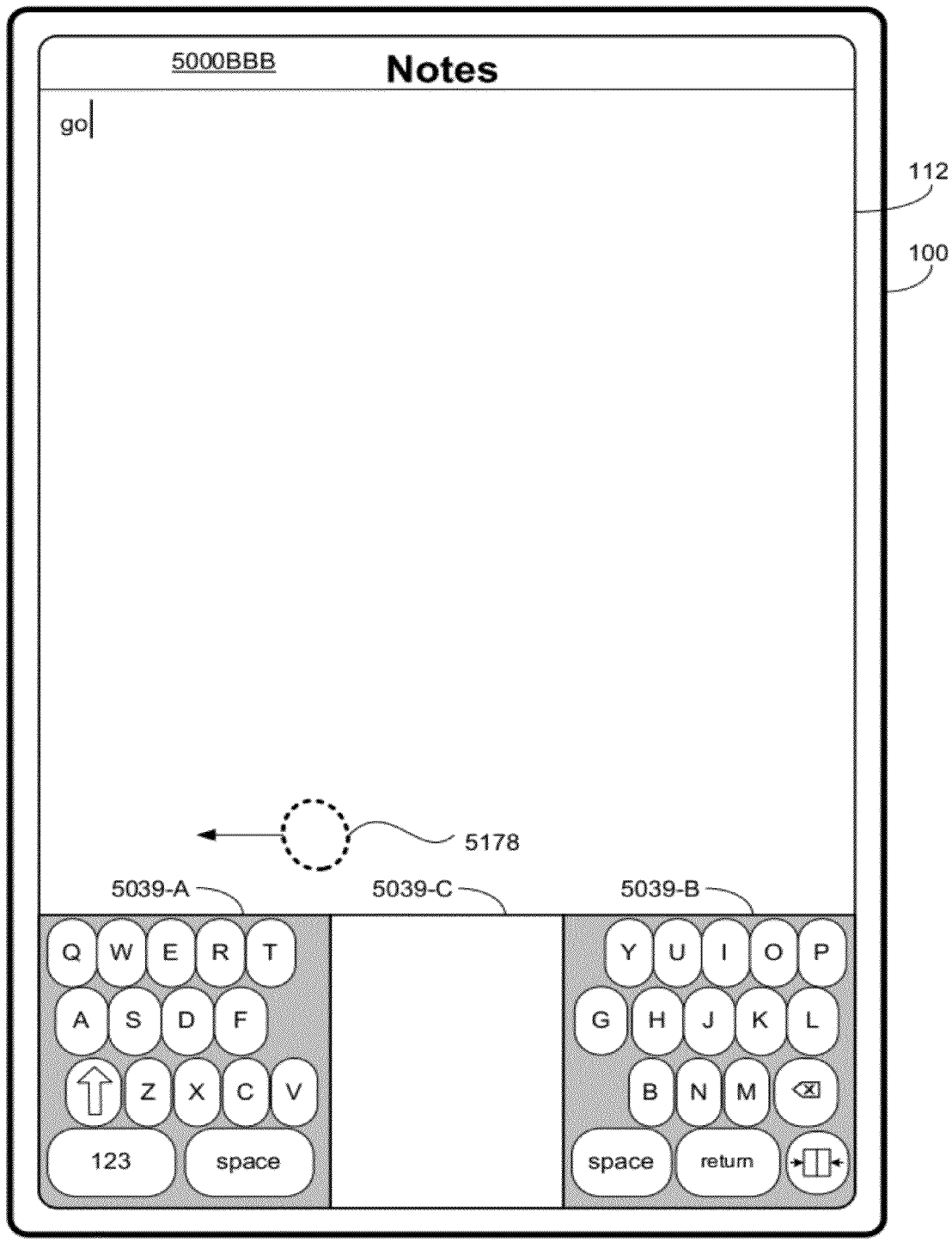
Figure 5BBB

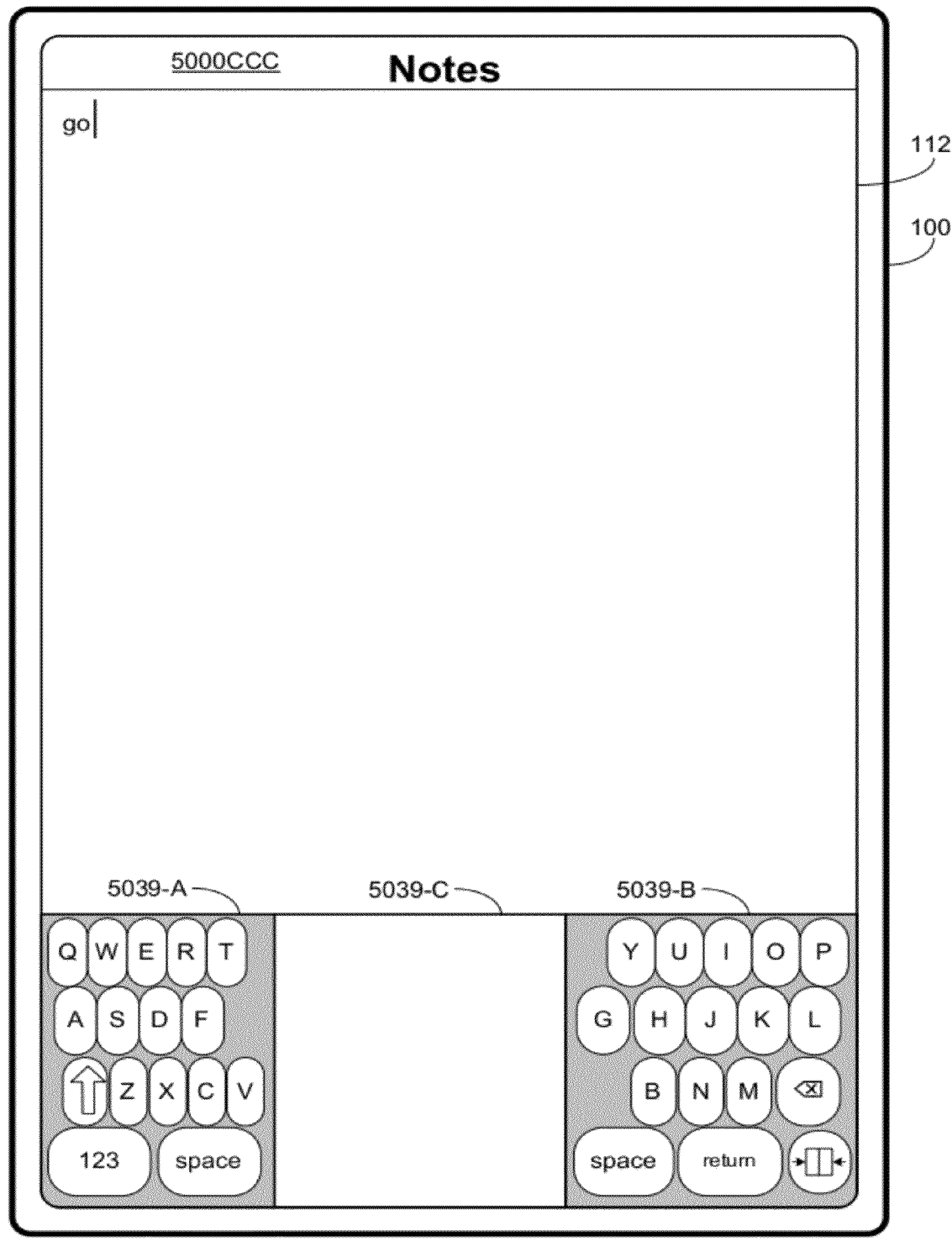
Figure 5CCC

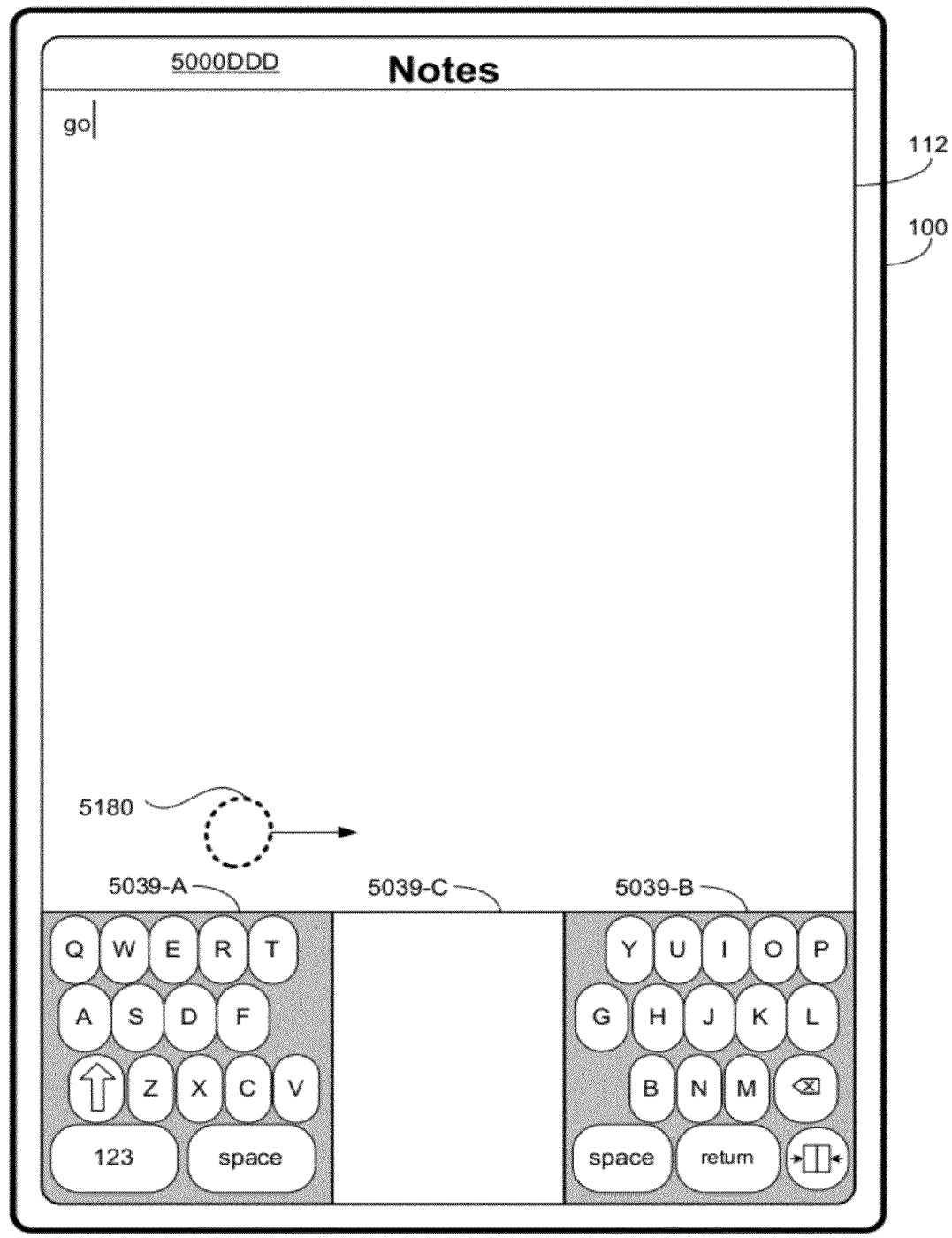
Figure 5DDD

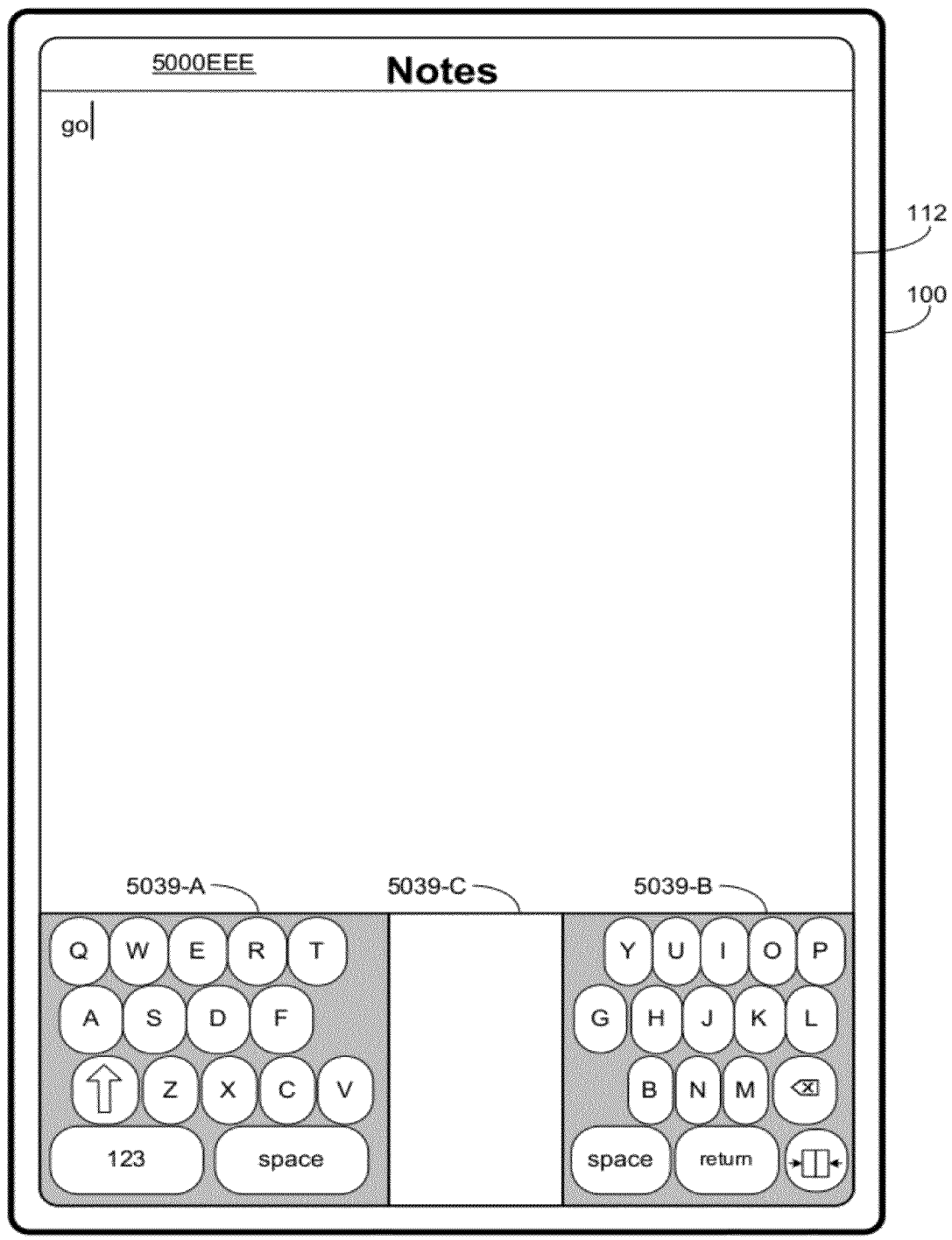
Figure 5EEE

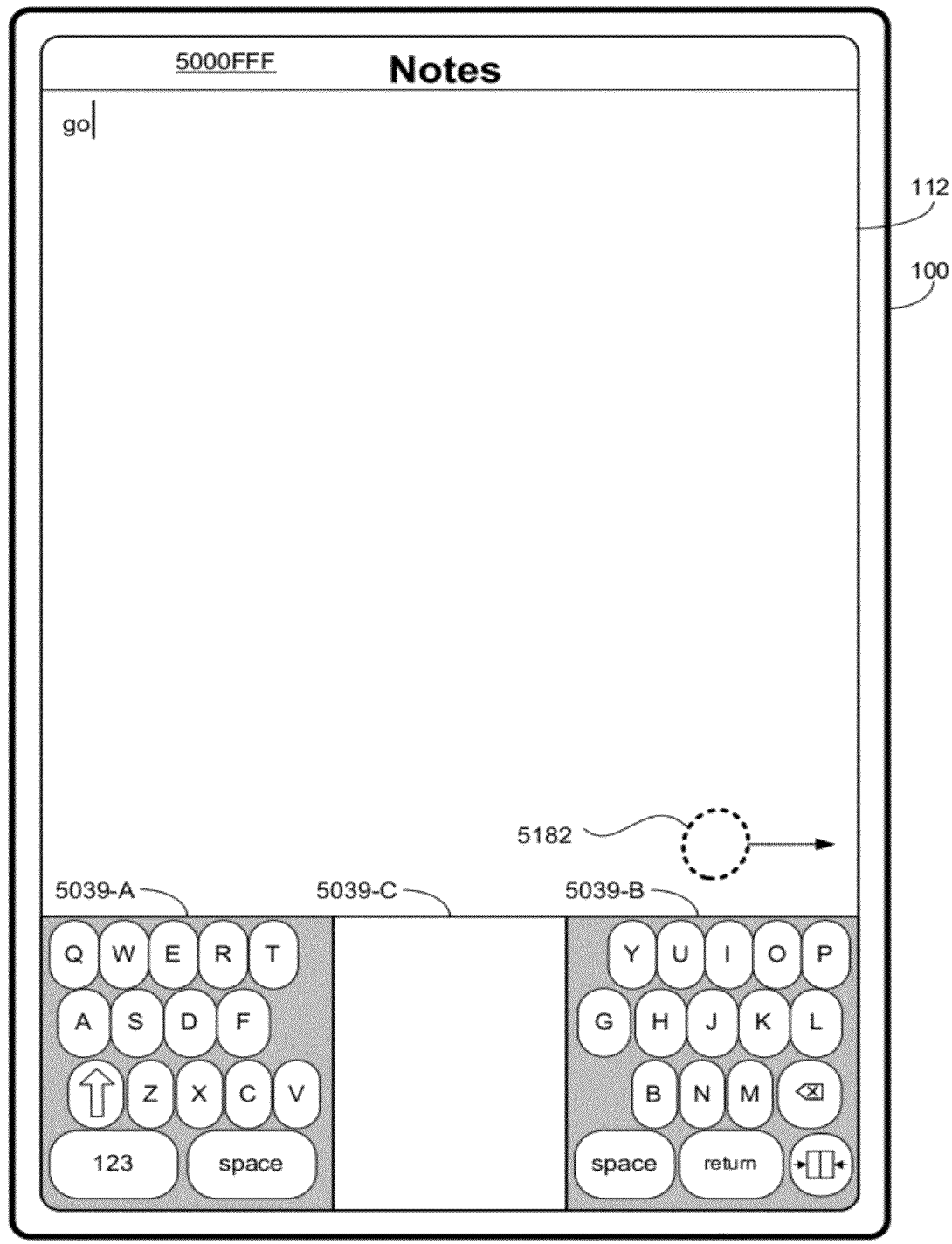
Figure 5FFF

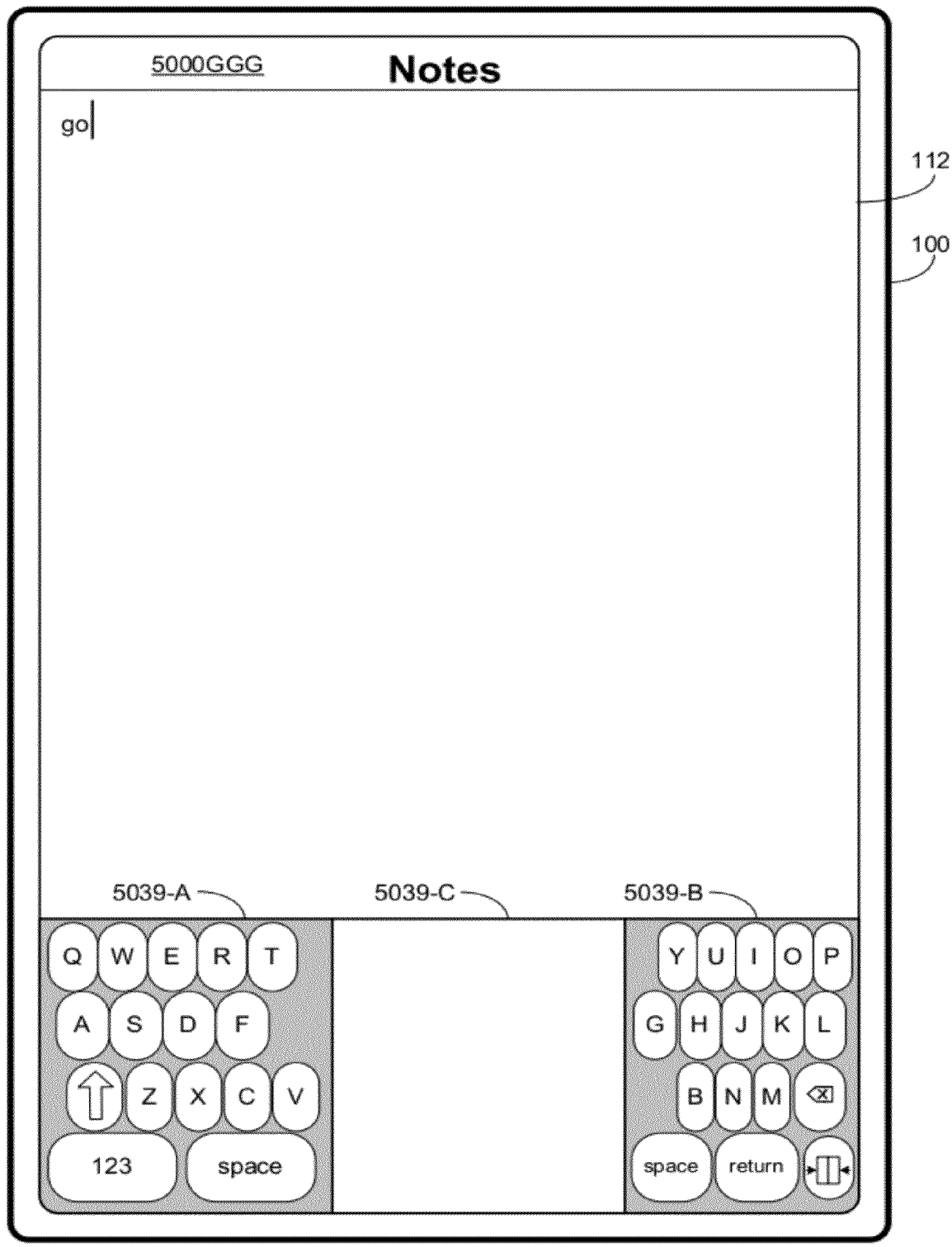
Figure 5GGG

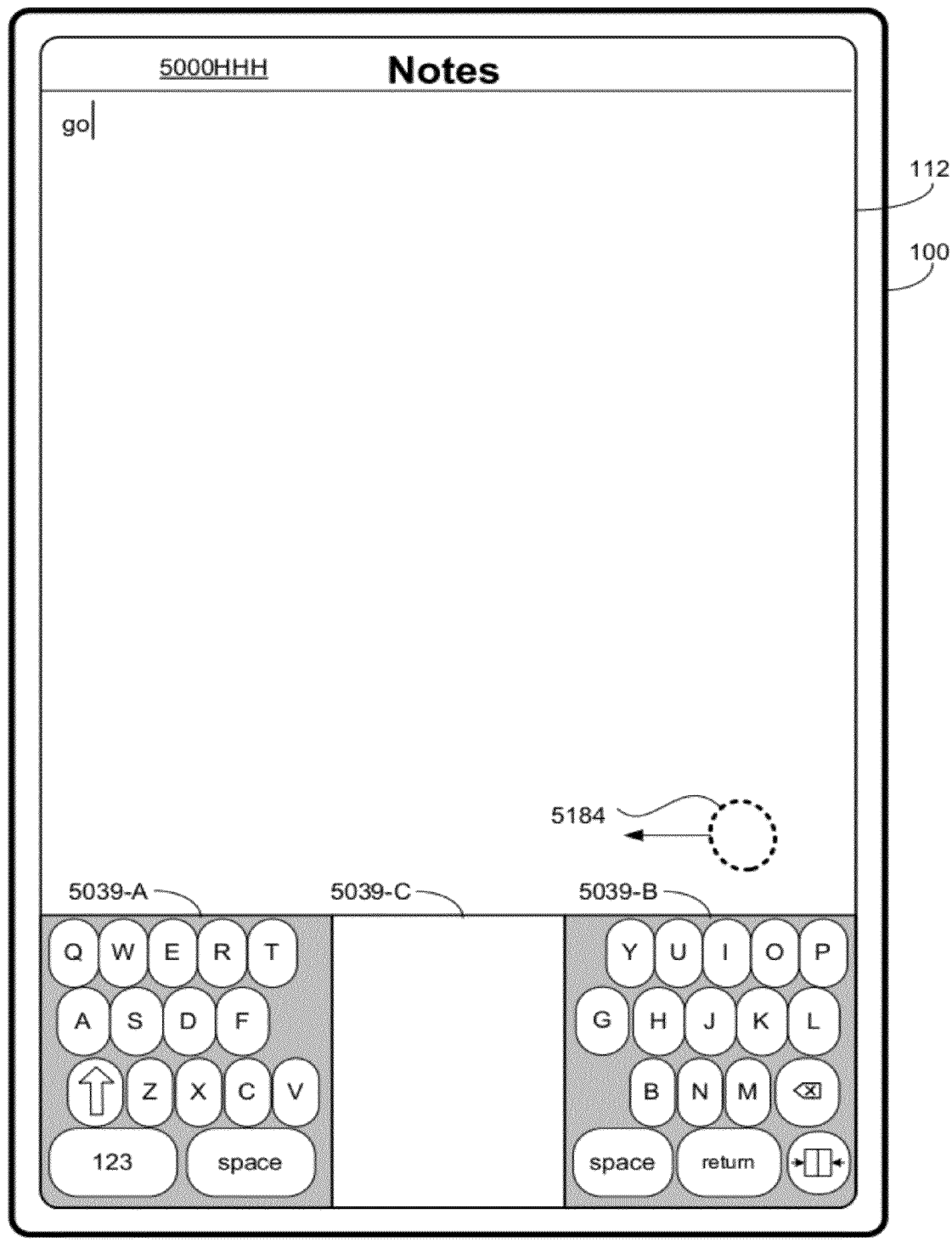
Figure 5HHH

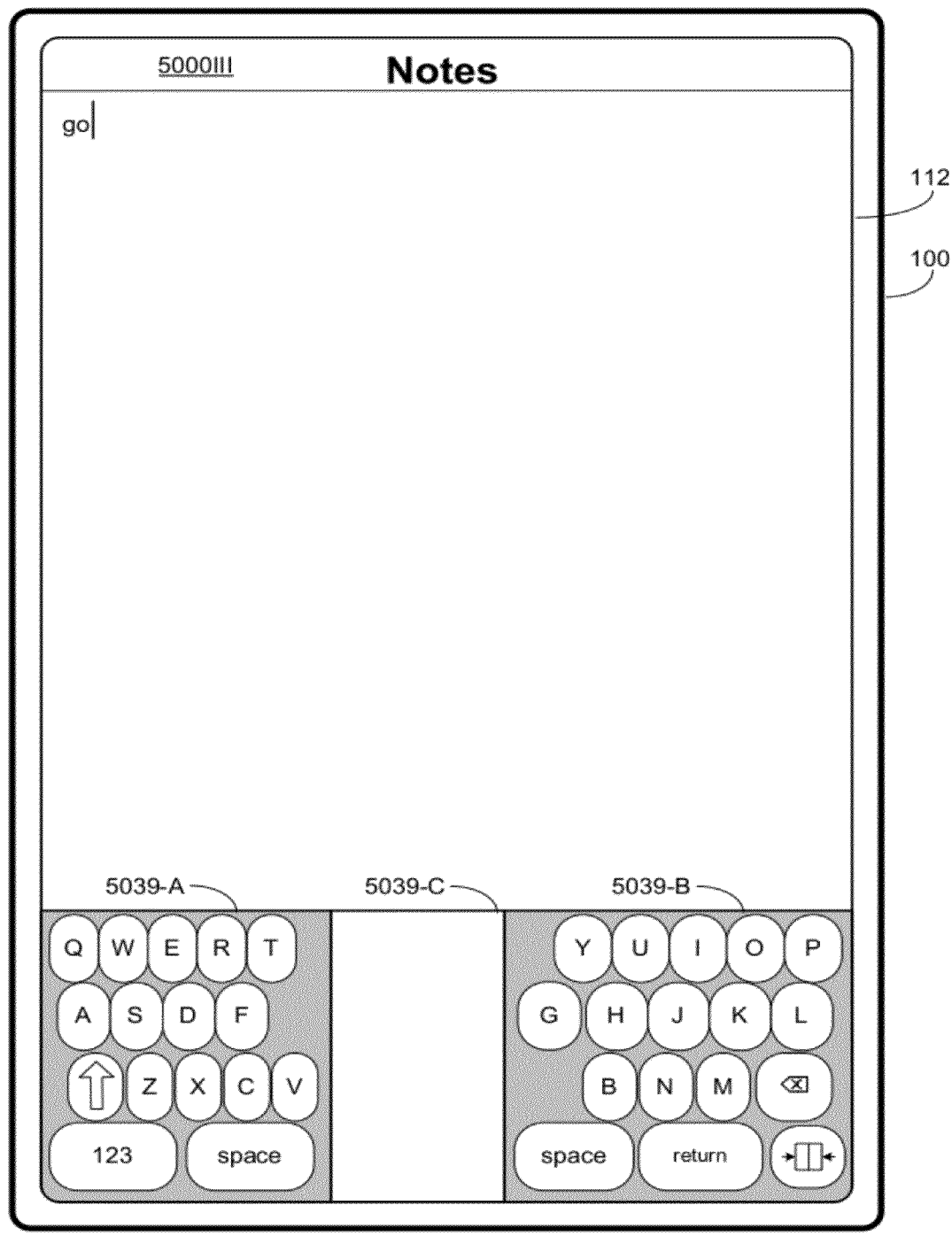
Figure 5III

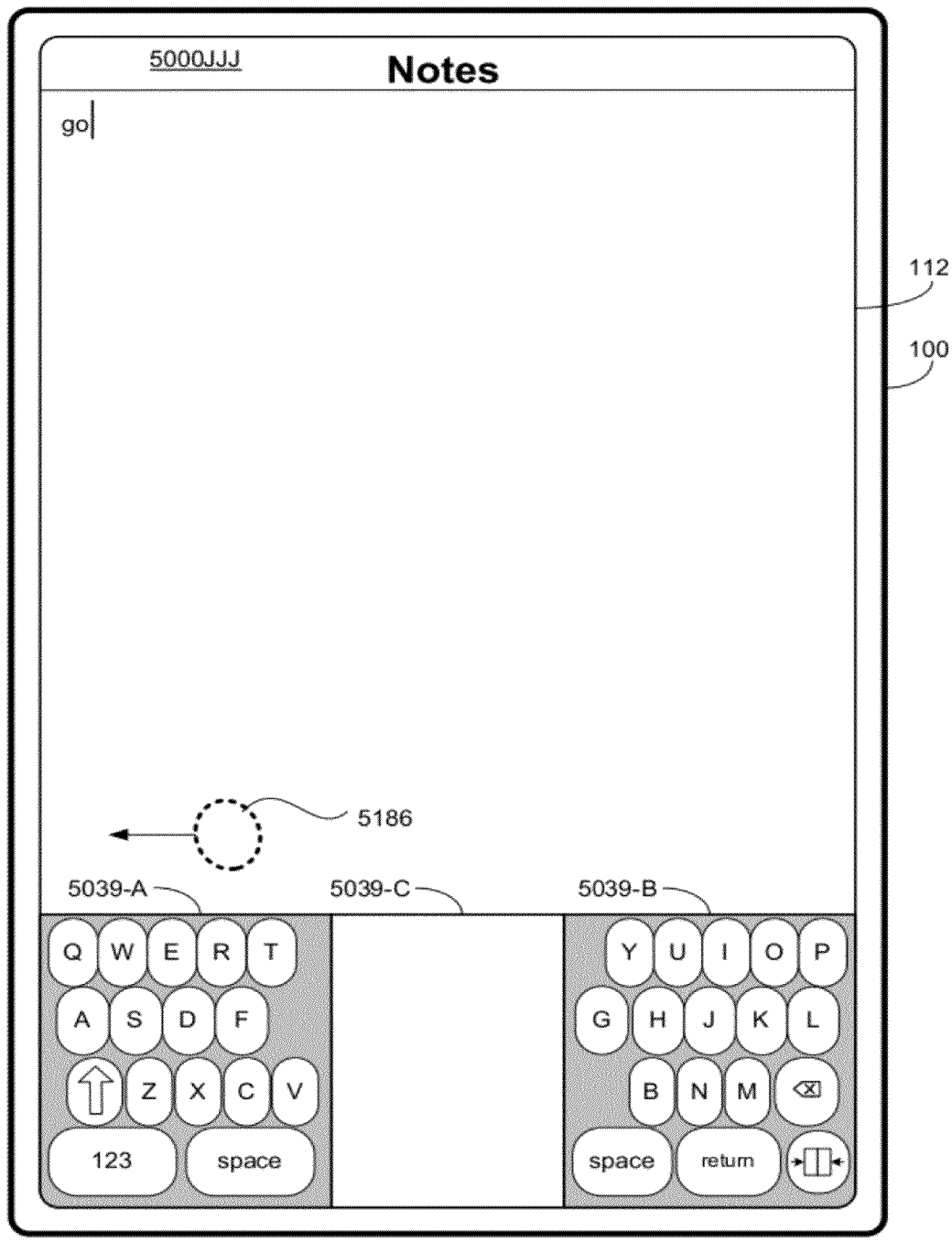
Figure 5JJJ

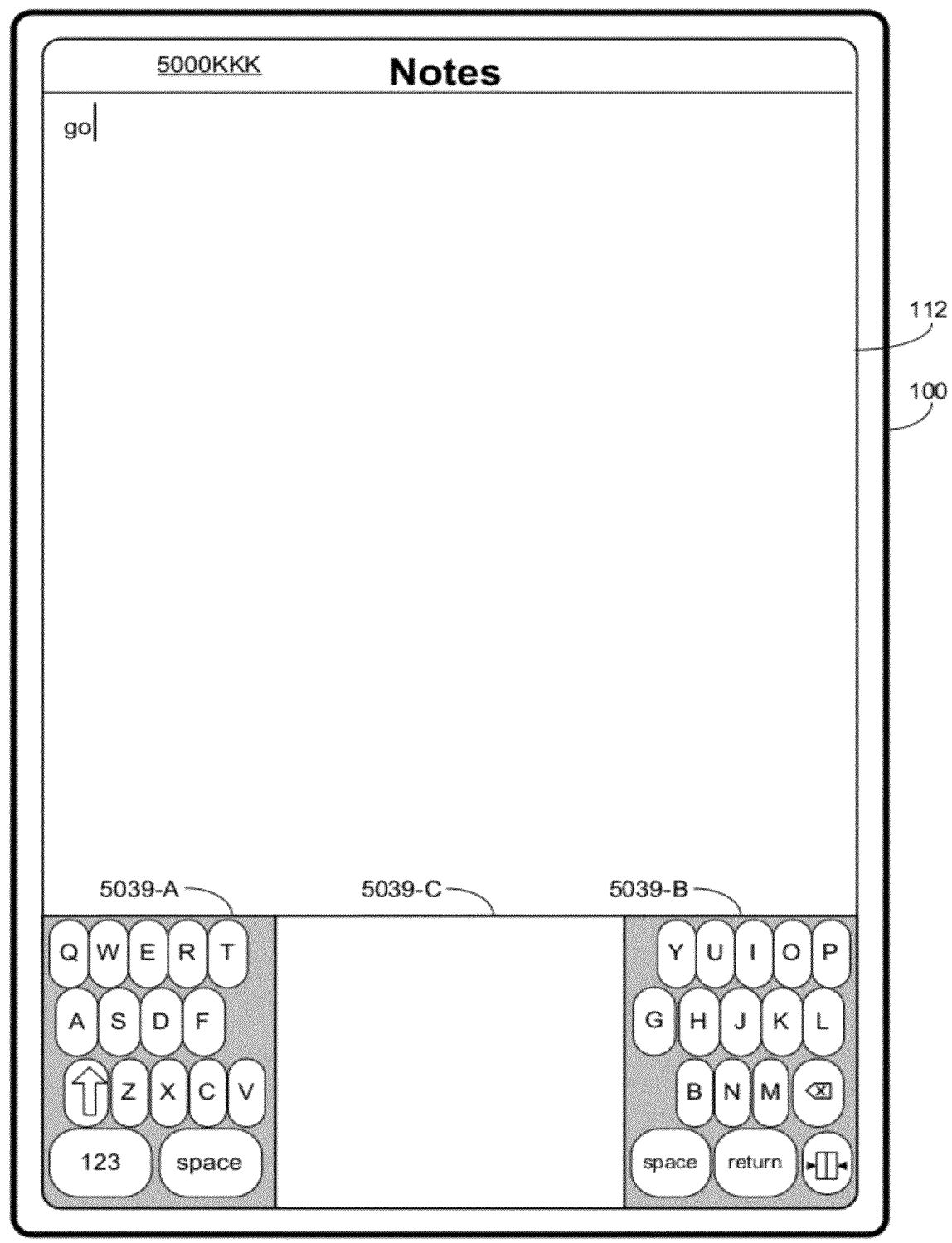
Figure 5KKK

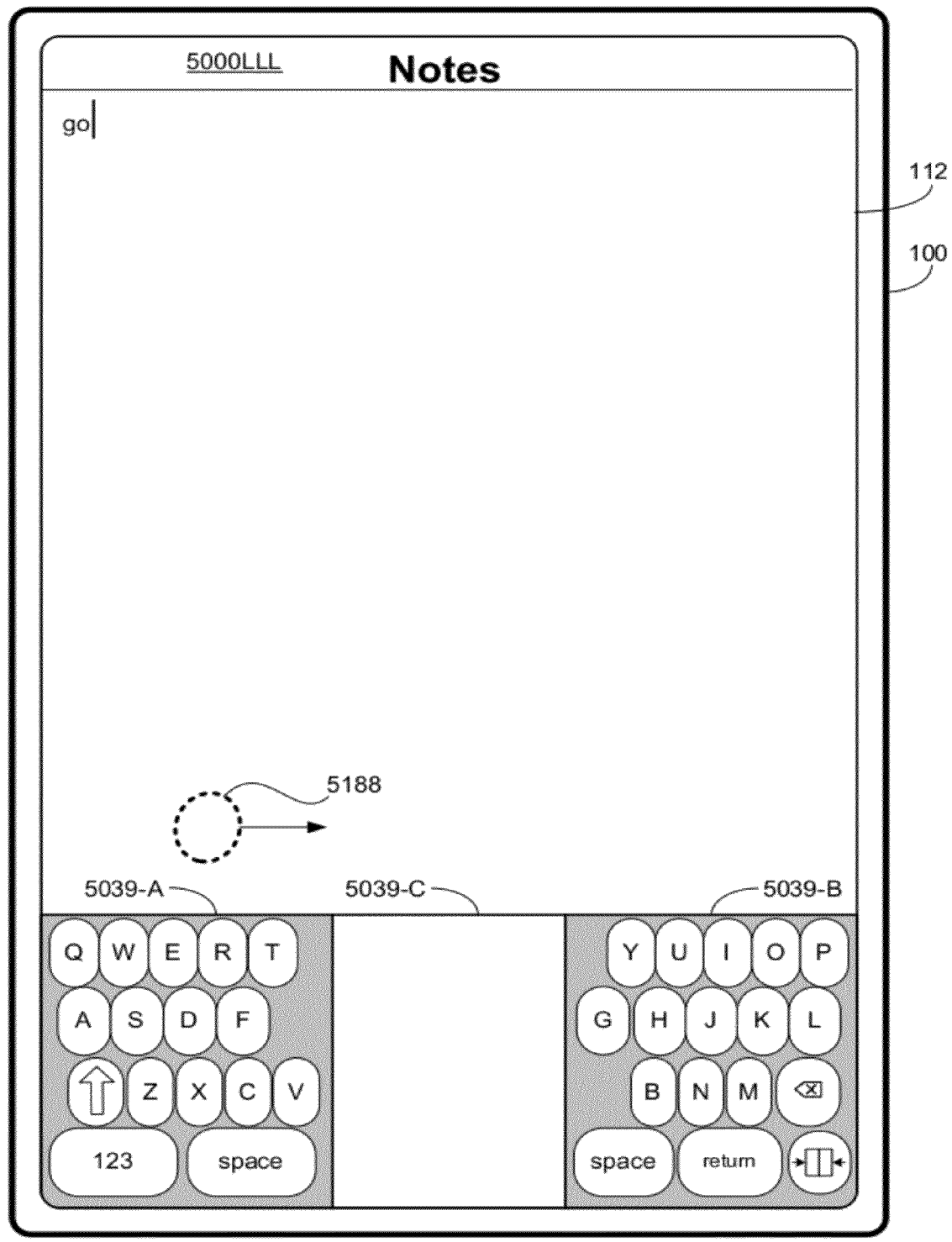
Figure 5LLL

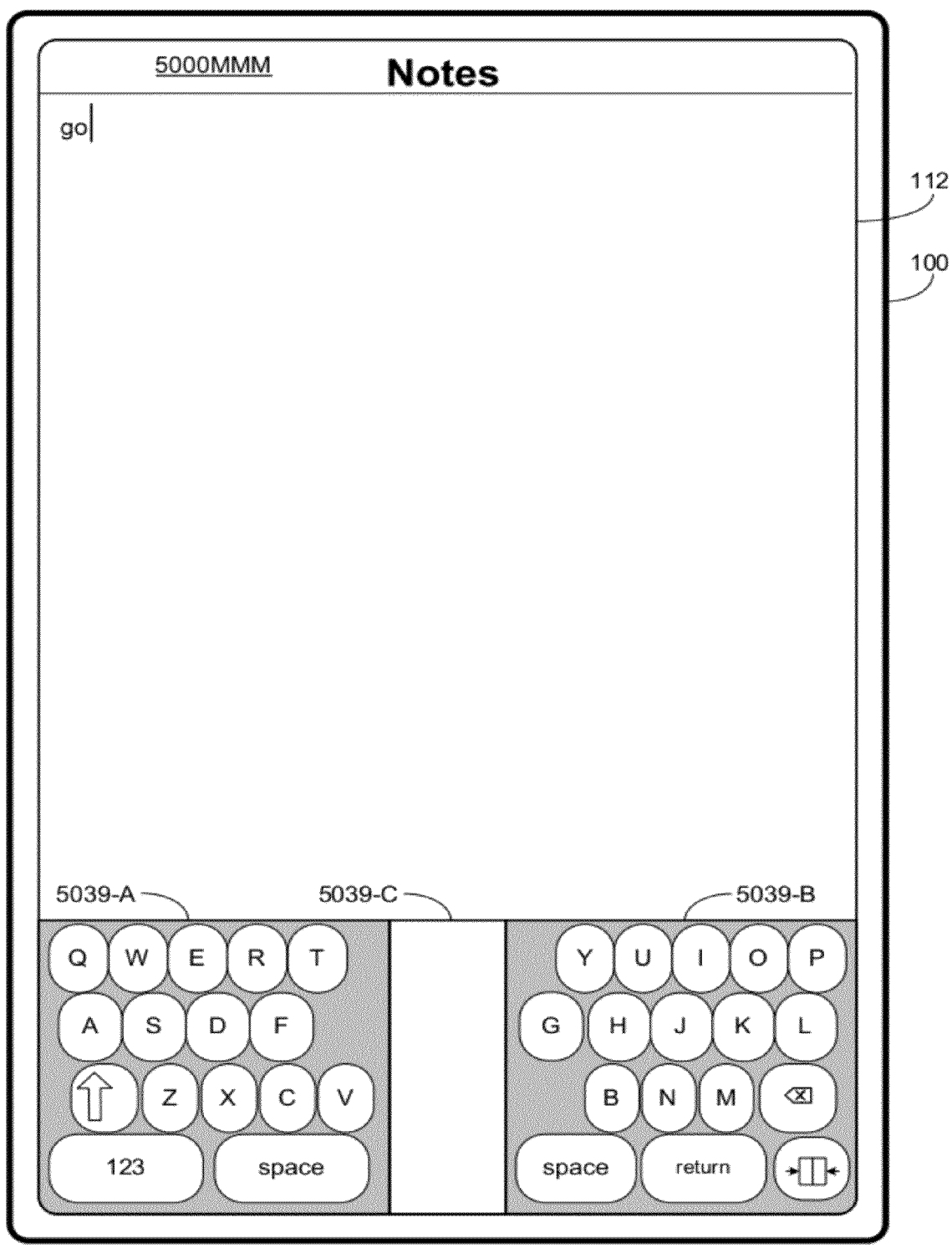
Figure 5MMM

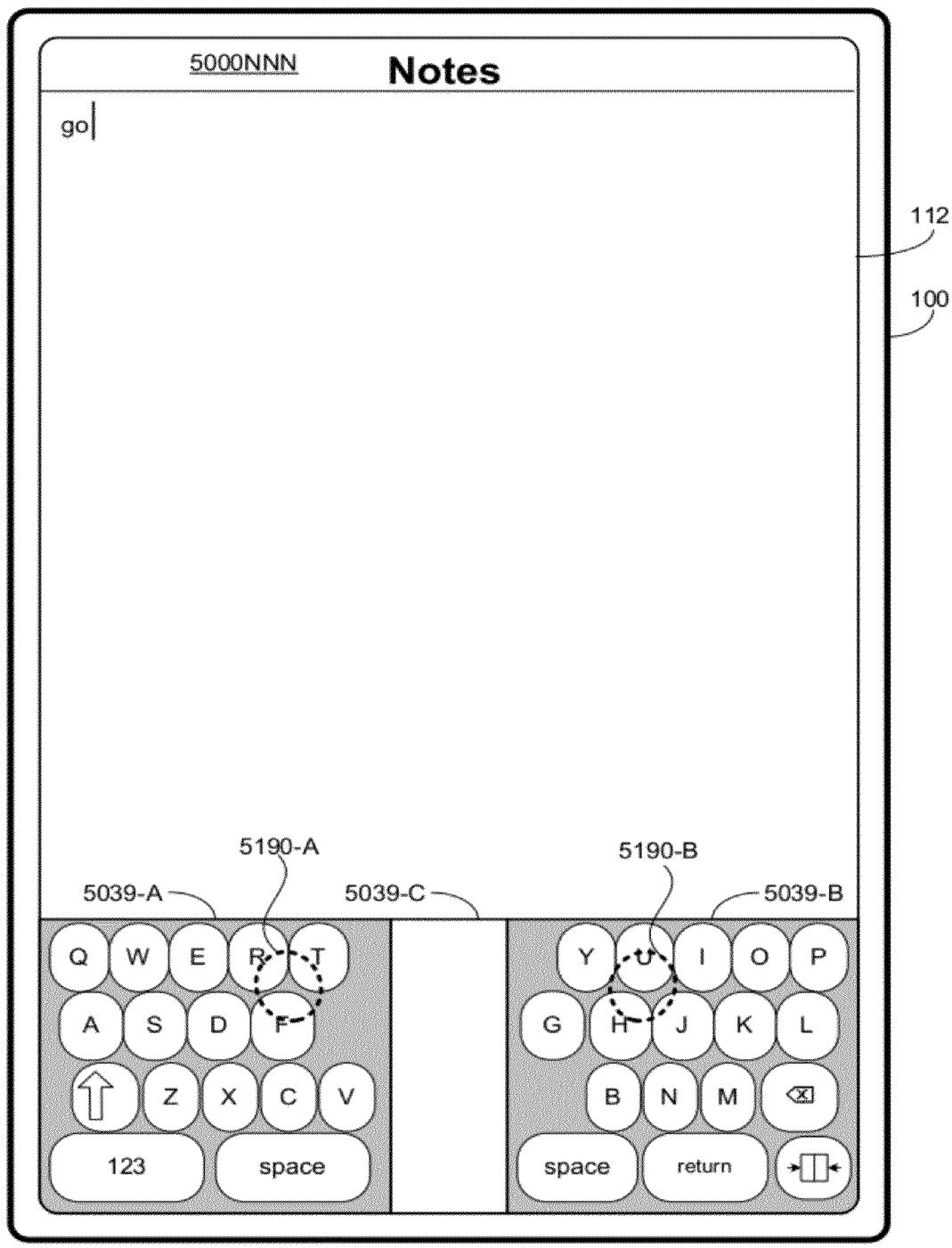
Figure 5NNN

1300 ⤴

```
┌─────────────────────────────────────────────────────────────────────────┐
│ The second input includes a horizontal movement of a left thumb away from a │ 1318
│   left vertical side of the display; and in response to detecting the horizontal │
│   movement of the left thumb away from the left vertical side of the display, │
│         increase the size of the left side of the split keyboard        │
└─────────────────────────────────────────────────────────────────────────┘
```

```
┌─────────────────────────────────────────────────────────────────────────┐
│ The second input includes a horizontal movement of the first thumb towards a │ 1320
│   vertical side of the display closest to the first thumb; and in response to │
│  detecting the horizontal movement of the first thumb towards the vertical side │
│  of the display closest to the first thumb, reduce the size of the left side and the │
│                    right side of the split keyboard                     │
└─────────────────────────────────────────────────────────────────────────┘
```

```
┌─────────────────────────────────────────────────────────────────────────┐
│ The second input includes a horizontal movement of the first thumb away from │ 1322
│     a vertical side of the display closest to the first thumb; and in response to │
│   detecting the horizontal movement of the first thumb away from the vertical │
│  side of the display closest to the first thumb, increasing the size of the left side │
│                   and the right side of the split keyboard              │
└─────────────────────────────────────────────────────────────────────────┘
```

Figure 13B

DEVICE, METHOD, AND GRAPHICAL USER INTERFACE FOR MANIPULATING SOFT KEYBOARDS

RELATED APPLICATIONS

This application claims priority to U.S. Provisional Application Ser. No. 61/410,862, filed Nov. 5, 2010, entitled "Device, Method, and Graphical User Interface for Manipulating Soft Keyboard," which is incorporated herein by reference in its entirety.

This application is also related to the following: (1) U.S. application Ser. No. 13/076,389, filed Mar. 30, 2011, entitled "Device, Method, and Graphical User Interface for Manipulating Soft Keyboards," (2) U.S. application Ser. No. 13/076,392, filed Mar. 30, 2011, entitled "Device, Method, and Graphical User Interface for Manipulating Soft Keyboards," (3) U.S. application Ser. No. 13/076,397, filed Mar. 30, 2011, entitled "Device, Method, and Graphical User Interface for Manipulating Soft Keyboards," (4) U.S. application Ser. No. 13/076,399, filed Mar. 30, 2011, entitled "Device, Method, and Graphical User Interface for Manipulating Soft Keyboards," (5) U.S. application Ser. No. 13/076,401, filed Mar. 30, 2011, entitled "Device, Method, and Graphical User Interface for Manipulating Soft Keyboards," (6) U.S. application Ser. No. 13/076,393, filed Mar. 30, 2011, entitled "Device, Method, and Graphical User Interface for Manipulating Soft Keyboards," and (7) U.S. application Ser. No. 13/076,391, filed Mar. 30, 2011, entitled "Device, Method, and Graphical User Interface for Manipulating Soft Keyboards," which are incorporated herein by reference in their entirety.

TECHNICAL FIELD

This relates generally to electronic devices with touch-sensitive surfaces, including but not limited to electronic devices with touch-sensitive surfaces that control a soft keyboard on a display.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary user interface objects include soft keyboards. Exemplary manipulations include selecting a soft keyboard, adjusting the position and/or size of the soft keyboard, and activating keys in the soft keyboard. A user may need to perform such manipulations on soft keyboards in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. For example, two-thumb typing on an unsplit soft keyboard on a tablet-sized portable device while a user is holding the device is tedious and creates a significant cognitive burden on the user. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating soft keyboards. Such methods and interfaces may complement or replace conventional methods for manipulating soft keyboards. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: concurrently displaying a first text entry area and an unsplit keyboard on the display; detecting a gesture on the touch-sensitive surface; and, in response to detecting the gesture on the touch-sensitive surface, replacing the unsplit keyboard with an integrated input area. The integrated input area includes: a left portion with a left side of a split keyboard; a right portion with a right side of the split keyboard; and a center portion in between the left portion and the right portion.

In accordance with some embodiments, a method is performed at an electronic device with a display and a touch-sensitive surface. The method includes: displaying a first keyboard on the display, the first keyboard comprising a first plurality of keys; detecting a key activation gesture at a first time at a location on the touch-sensitive surface that corresponds to a location of a first key in the first keyboard; in response to detecting the key activation gesture at the first time, activating the first key; detecting one or more contacts on the touch-sensitive surface at a second time after the first time, the one or more contacts corresponding to a keyboard selection gesture; and, in response to detecting the one or more contacts that correspond to the keyboard selection gesture at the second time after the first time: replacing the first keyboard with a second keyboard when the second time exceeds a predefined period of time after the first time; and maintaining display of the first keyboard when the second time is less than the predefined period of time after the first time.

In accordance with some embodiments, a method is performed at an electronic device with a display and a touch-sensitive surface. The method includes: concurrently displaying a first text entry area and an integrated input area on the display, the integrated input area including: a left portion with a left side of a split keyboard; a right portion with a right side of the split keyboard; and a center portion in between the left portion and the right portion; detecting a first contact on the touch-sensitive surface at a location that corresponds to the center portion of the integrated input area; detecting movement of the first contact along the touch-sensitive surface; in response to detecting movement of the first contact along the touch-sensitive surface, moving the integrated input area in accordance with the movement of the first contact when the movement of the first contact exceeds a first movement threshold; detecting a second contact, distinct from the first contact, on the touch-sensitive surface at a location that corresponds to the split keyboard; detecting movement of the second contact along the touch-sensitive surface; and, in response to detecting movement of the second contact along the touch-sensitive surface, moving the integrated input area in accordance with the movement of the second contact when the movement of the second contact exceeds a second movement threshold, the second movement threshold being greater than the first movement threshold.

In accordance with some embodiments, a method is performed at an electronic device with a display and a touch-sensitive surface. The method includes: concurrently displaying on the display an application content area with a first size, and an input area with a keyboard, the input area being adjacent to and separate from the application content area with the first size, the input area being at a bottom of the display; detecting a gesture on the touch-sensitive surface; in response to detecting the gesture on the touch-sensitive surface: moving the input area away from the bottom of the display over the application content area; and increasing the application content area to a second size larger than the first size.

In accordance with some embodiments, a method is performed at an electronic device with a display and a touch-sensitive surface. The method includes: concurrently displaying a text entry area, a left side of a split keyboard, and a right side of a split keyboard, the left side of the split keyboard including a plurality of rows of keys and the right side of the split keyboard including a corresponding plurality of rows of keys; detecting a gesture at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

In accordance with some embodiments, a method is performed at an electronic device with a display and a touch-sensitive surface. The method includes: concurrently displaying a first text entry area and an integrated input area, the integrated input area including: a left portion with a left side of a split keyboard; a right portion with a right side of the split keyboard; and a center portion with a second text entry area, the center portion in between the left portion and the right portion; detecting a gesture at a location on the touch-sensitive surface that corresponds to a location of a character key in the split keyboard; and, in response to detecting the gesture at the location on the touch-sensitive surface that corresponds to the location of the character key in the split keyboard, inputting and concurrently displaying the corresponding character in the first text entry area and the second text entry area on the display.

In accordance with some embodiments, a method is performed at an electronic device with a display and a touch-sensitive surface. The method includes: concurrently displaying on the display an application content area that includes one or more text entry areas, and an input area with a keyboard that is displayed over the application content area; detecting a drag gesture on the touch-sensitive surface at a location that corresponds to the input area on the display; in response to detecting the drag gesture, moving the input area on the display in accordance with the drag gesture; detecting a flick gesture on the touch-sensitive surface at a location that corresponds to the input area on the display; and, in response to detecting the flick gesture, moving the input area on the display with inertia in accordance with the flick gesture such that the input area comes to rest at a location adjacent to and just below a text entry area in the application content area.

In accordance with some embodiments, a method is performed at an electronic device with a display and a touch-sensitive surface. The method includes: concurrently displaying on the display a first text entry area, and an integrated input area, the integrated input area including: a left portion with a left side of a split keyboard; a right portion with a right side of the split keyboard; and a center portion in between the left portion and the right portion; detecting a first input on the touch-sensitive surface; in response to detecting the first input, entering a reconfiguration mode for the integrated input area; and, while in the reconfiguration mode for the integrated input area: detecting a second input by a first thumb and/or a second thumb; in response to detecting the second input, adjusting the size of at least one of the left side and the right side of the split keyboard in the integrated input area; detecting a third input; and, in response to detecting the third input, exiting the reconfiguration mode for the integrated input area.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying a first text entry area and an unsplit keyboard on the display; detecting a gesture on the touch-sensitive surface; and, in response to detecting the gesture on the touch-sensitive surface, replacing the unsplit keyboard with an integrated input area, the integrated input area including: a left portion with a left side of a split keyboard; a right portion with a right side of the split keyboard; and a center portion in between the left portion and the right portion.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a first keyboard on the display, the first keyboard comprising a first plurality of keys; detecting a key activation gesture at a first time at a location on the touch-sensitive surface that corresponds to a location of a first key in the first keyboard; in response to detecting the key activation gesture at the first time, activating the first key; detecting one or more contacts on the touch-sensitive surface at a second time after the first time, the one or more contacts corresponding to a keyboard selection gesture; and, in response to detecting the one or more contacts that correspond to the keyboard selection gesture at the second time after the first time: replacing the first keyboard with a second keyboard when the second time exceeds a predefined period of time after the first time; and maintaining display of the first keyboard when the second time is less than the predefined period of time after the first time.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying a first text entry area and an integrated input area on the display, the integrated input area including: a left portion with a left side of a split keyboard; a right portion with a right side of the split keyboard; and a center portion in between the left portion and the right portion; detecting a first contact on the touch-sensitive surface at a location that corresponds to the center portion of the integrated input area; detecting movement of the first contact along the touch-sensitive surface; in response to detecting movement of the first contact along the touch-sensitive surface, moving the integrated input area in accordance with the movement of the first contact when the movement of the first contact exceeds a first movement threshold; detecting a second contact, distinct from the first contact, on the touch-sensitive surface at a location that corresponds to the split keyboard; detecting movement of the second contact along the touch-sensitive surface; and, in response to detecting movement of the second contact along the touch-sensitive surface, moving the integrated input area in accordance with the movement of the second contact when the movement of the second contact exceeds a second movement threshold, the second movement threshold being greater than the first movement threshold.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying on the display an application content area with a first size, and an input area with a keyboard, the input area being adjacent to and separate from the application content area with the first size, the input area being at a bottom of the display; detecting a gesture on the touch-sensitive surface; in response to detecting the gesture on the touch-sensitive surface: moving the input area away from the bottom of the display over the application content area; and increasing the application content area to a second size larger than the first size.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying a text entry area, a left side of a split keyboard, and a right side of a split keyboard, the left side of the split keyboard including a plurality of rows of keys and the right side of the split keyboard including a corresponding plurality of rows of keys; detecting a gesture at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying a first text entry area and an integrated input area, the integrated input area including: a left portion with a left side of a split keyboard; a right portion with a right side of the split keyboard; and a center portion with a second text entry area, the center portion in between the left portion and the right portion; detecting a gesture at a location on the touch-sensitive surface that corresponds to a location of a character key in the split keyboard; and, in response to detecting the gesture at the location on the touch-sensitive surface that corresponds to the location of the character key in the split keyboard, inputting and concurrently displaying the corresponding character in the first text entry area and the second text entry area on the display.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying on the display an application content area that includes one or more text entry areas, and an input area with a keyboard that is displayed over the application content area; detecting a drag gesture on the touch-sensitive surface at a location that corresponds to the input area on the display; in response to detecting the drag gesture, moving the input area on the display in accordance with the drag gesture; detecting a flick gesture on the touch-sensitive surface at a location that corresponds to the input area on the display; and, in response to detecting the flick gesture, moving the input area on the display with inertia in accordance with the flick gesture such that the input area comes to rest at a location adjacent to and just below a text entry area in the application content area.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying on the display a first text entry area, and an integrated input area, the integrated input area including: a left portion with a left side of a split keyboard; a right portion with a right side of the split keyboard; and a center portion in between the left portion and the right portion; detecting a first input on the touch-sensitive surface; in response to detecting the first input, entering a reconfiguration mode for the integrated input area; and, while in the reconfiguration mode for the integrated input area: detecting a second input by a first thumb and/or a second thumb; in response to detecting the second input, adjusting the size of at least one of the left side and the right side of the split keyboard in the integrated input area; detecting a third input; and, in response to detecting the third input, exiting the reconfiguration mode for the integrated input area.

In accordance with some embodiments, a graphical user interface on an electronic device with a display, a touch-sensitive surface, a memory, and one or more processors to execute one or more programs stored in the memory includes concurrently displayed: a first text entry area and an unsplit keyboard; wherein: in response to detection of a gesture on the touch-sensitive surface, the unsplit keyboard is replaced with an integrated input area, the integrated input area including: a left portion with a left side of a split keyboard; a right portion with a right side of the split keyboard; and a center portion in between the left portion and the right portion.

In accordance with some embodiments, a graphical user interface on an electronic device with a display, a touch-sensitive surface, a memory, and one or more processors to execute one or more programs stored in the memory includes a first keyboard, the first keyboard comprising a first plurality of keys; wherein: a key activation gesture is detected at a first time at a location on the touch-sensitive surface that corresponds to a location of a first key in the first keyboard; in response to detecting the key activation gesture at the first time, the first key is activated; one or more contacts are detected on the touch-sensitive surface at a second time after the first time, the one or more contacts corresponding to a keyboard selection gesture; and, in response to detecting the one or more contacts that correspond to the keyboard selection gesture at the second time after the first time: the first keyboard is replaced with a second keyboard when the second time exceeds a predefined period of time after the first time; and display of the first keyboard is maintained when the second time is less than the predefined period of time after the first time.

In accordance with some embodiments, a graphical user interface on an electronic device with a display, a touch-sensitive surface, a memory, and one or more processors to execute one or more programs stored in the memory includes concurrently displayed: a first text entry area and an integrated input area, the integrated input area including: a left portion with a left side of a split keyboard; a right portion with a right side of the split keyboard; and a center portion in between the left portion and the right portion; wherein: a first contact is detected on the touch-sensitive surface at a location that corresponds to the center portion of the integrated input area; movement of the first contact is detected along the touch-sensitive surface; in response to detecting movement of the first contact along the touch-sensitive surface, the integrated input area is moved in accordance with the movement of the first contact when the movement of the first contact exceeds a first movement threshold; a second contact, distinct from the first contact, is detected on the touch-sensitive surface at a location that corresponds to the split keyboard; movement of the second contact is detected along the touch-sensitive surface; and, in response to detecting movement of the second contact along the touch-sensitive surface, the integrated input area is moved in accordance with the movement of the second contact when the movement of the second contact exceeds a second movement threshold, the second movement threshold being greater than the first movement threshold.

In accordance with some embodiments, a graphical user interface on an electronic device with a display, a touch-sensitive surface, a memory, and one or more processors to execute one or more programs stored in the memory includes concurrently displayed: an application content area with a first size, and an input area with a keyboard, the input area being adjacent to and separate from the application content area with the first size, the input area being at a bottom of the display; wherein: a gesture is detected on the touch-sensitive surface; in response to detecting the gesture on the touch-sensitive surface: the input area is moved away from the bottom of the display over the application content area; and the application content area is increased to a second size larger than the first size.

In accordance with some embodiments, a graphical user interface on an electronic device with a display, a touch-sensitive surface, a memory, and one or more processors to execute one or more programs stored in the memory includes concurrently displayed: a text entry area, a left side of a split keyboard, and a right side of a split keyboard, the left side of the split keyboard including a plurality of rows of keys and the right side of the split keyboard including a corresponding plurality of rows of keys; wherein: a gesture is detected at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, in response to detecting the gesture at the location on the touch-sensitive surface that corresponds to the predefined area adjacent to and to the right of the rightmost key in the respective row of the left side of the split keyboard, a character that corresponds to a leftmost key in a corresponding respective row of the right side of the split keyboard is entered in the text entry area.

In accordance with some embodiments, a graphical user interface on an electronic device with a display, a touch-sensitive surface, a memory, and one or more processors to execute one or more programs stored in the memory includes concurrently displayed: a first text entry area, and an integrated input area, the integrated input area including: a left portion with a left side of a split keyboard; a right portion with a right side of the split keyboard; and a center portion with a second text entry area, the center portion in between the left portion and the right portion; wherein: a gesture is detected at a location on the touch-sensitive surface that corresponds to a location of a character key in the split keyboard; and, in response to detecting the gesture at the location on the touch-sensitive surface that corresponds to the location of the character key in the split keyboard, the corresponding character is inputted and concurrently displayed in the first text entry area and the second text entry area on the display.

In accordance with some embodiments, a graphical user interface on an electronic device with a display, a touch-sensitive surface, a memory, and one or more processors to execute one or more programs stored in the memory includes concurrently displayed: an application content area that includes one or more text entry areas, and an input area with a keyboard that is displayed over the application content area; wherein: a drag gesture is detected on the touch-sensitive surface at a location that corresponds to the input area on the display; in response to detecting the drag gesture, the input area is moved on the display in accordance with the drag gesture; a flick gesture is detected on the touch-sensitive surface at a location that corresponds to the input area on the display; and, in response to detecting the flick gesture, the input area is moved on the display with inertia in accordance with the flick gesture such that the input area comes to rest at a location adjacent to and just below a text entry area in the application content area.

In accordance with some embodiments, a graphical user interface on an electronic device with a display, a touch-sensitive surface, a memory, and one or more processors to execute one or more programs stored in the memory includes concurrently displayed: a first text entry area, and an integrated input area, the integrated input area including: a left portion with a left side of a split keyboard; a right portion with a right side of the split keyboard; and a center portion in between the left portion and the right portion; wherein: a first input is detected on the touch-sensitive surface; in response to detecting the first input, a reconfiguration mode for the integrated input area is entered; and, while in the reconfiguration mode for the integrated input area: a second input by a first thumb and/or a second thumb is detected; in response to detecting the second input, the size of at least one of the left side and the right side of the split keyboard in the integrated input area is adjusted; a third input is detected; and, in response to detecting the third input, the reconfiguration mode for the integrated input area is exited.

In accordance with some embodiments, a non-transitory computer readable storage medium has stored therein instructions which when executed by an electronic device with a display and a touch-sensitive surface, cause the device to: concurrently display a first text entry area and an unsplit keyboard on the display; detect a gesture on the touch-sensitive surface; and, in response to detecting the gesture on the touch-sensitive surface, replace the unsplit keyboard with an integrated input area, the integrated input area including: a left portion with a left side of a split keyboard; a right portion with a right side of the split keyboard; and a center portion in between the left portion and the right portion.

In accordance with some embodiments, a non-transitory computer readable storage medium has stored therein instructions which when executed by an electronic device with a display and a touch-sensitive surface, cause the device to: display a first keyboard on the display, the first keyboard comprising a first plurality of keys; detect a key activation gesture at a first time at a location on the touch-sensitive surface that corresponds to a location of a first key in the first keyboard; in response to detecting the key activation gesture at the first time, activate the first key; detect one or more contacts on the touch-sensitive surface at a second time after the first time, the one or more contacts corresponding to a keyboard selection gesture; and, in response to detecting the one or more contacts that correspond to the keyboard selection gesture at the second time after the first time: replace the first keyboard with a second keyboard when the second time exceeds a predefined period of time after the first time; and maintain display of the first keyboard when the second time is less than the predefined period of time after the first time.

In accordance with some embodiments, a non-transitory computer readable storage medium has stored therein instructions which when executed by an electronic device with a display and a touch-sensitive surface, cause the device to: concurrently display a first text entry area and an integrated input area on the display, the integrated input area including: a left portion with a left side of a split keyboard; a right portion with a right side of the split keyboard; and a center portion in between the left portion and the right portion; detect a first contact on the touch-sensitive surface at a location that corresponds to the center portion of the integrated input area; detect movement of the first contact along the touch-sensitive surface; in response to detecting movement of the first contact along the touch-sensitive surface, move the integrated input area in accordance with the movement of the first contact when the movement of the first contact exceeds a first movement threshold; detect a second contact, distinct from the first contact, on the touch-sensitive surface at a location that corresponds to the split keyboard; detect movement of the second contact along the touch-sensitive surface; and, in response to detecting movement of the second contact along the touch-sensitive surface, move the integrated input area in accordance with the movement of the second contact when the movement of the second contact exceeds a second movement threshold, the second movement threshold being greater than the first movement threshold.

In accordance with some embodiments, a non-transitory computer readable storage medium has stored therein instructions which when executed by an electronic device with a display and a touch-sensitive surface, cause the device to: concurrently display on the display an application content area with a first size, and an input area with a keyboard, the input area being adjacent to and separate from the application content area with the first size, the input area being at a bottom of the display; detect a gesture on the touch-sensitive surface; in response to detecting the gesture on the touch-sensitive surface: move the input area away from the bottom of the display over the application content area; and increase the application content area to a second size larger than the first size.

In accordance with some embodiments, a non-transitory computer readable storage medium has stored therein instructions which when executed by an electronic device with a display and a touch-sensitive surface, cause the device to: concurrently display a text entry area, a left side of a split keyboard, and a right side of a split keyboard, the left side of the split keyboard including a plurality of rows of keys and the right side of the split keyboard including a corresponding plurality of rows of keys; detect a gesture at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, in response to detecting the gesture at the location on the touch-sensitive surface that corresponds to the predefined area adjacent to and to the right of the rightmost key in the respective row of the left side of the split keyboard, enter in the text entry area a character that corresponds to a leftmost key in a corresponding respective row of the right side of the split keyboard.

In accordance with some embodiments, a non-transitory computer readable storage medium has stored therein instructions which when executed by an electronic device with a display and a touch-sensitive surface, cause the device to: concurrently display a first text entry area and an integrated input area, the integrated input area including: a left portion with a left side of a split keyboard; a right portion with a right side of the split keyboard; and a center portion with a second text entry area, the center portion in between the left portion and the right portion; detect a gesture at a location on the touch-sensitive surface that corresponds to a location of a character key in the split keyboard; and, in response to detecting the gesture at the location on the touch-sensitive surface that corresponds to the location of the character key in the split keyboard, input and concurrently display the corresponding character in the first text entry area and the second text entry area on the display.

In accordance with some embodiments, a non-transitory computer readable storage medium has stored therein instructions which when executed by an electronic device with a display and a touch-sensitive surface, cause the device to: concurrently display on the display an application content area that includes one or more text entry areas, and an input area with a keyboard that is displayed over the application content area; detect a drag gesture on the touch-sensitive surface at a location that corresponds to the input area on the display; in response to detecting the drag gesture, move the input area on the display in accordance with the drag gesture; detect a flick gesture on the touch-sensitive surface at a location that corresponds to the input area on the display; and, in response to detecting the flick gesture, move the input area on the display with inertia in accordance with the flick gesture such that the input area comes to rest at a location adjacent to and just below a text entry area in the application content area.

In accordance with some embodiments, a non-transitory computer readable storage medium has stored therein instructions which when executed by an electronic device with a display and a touch-sensitive surface, cause the device to: concurrently display on the display a first text entry area, and an integrated input area, the integrated input area including: a left portion with a left side of a split keyboard; a right portion with a right side of the split keyboard; and a center portion in between the left portion and the right portion; detect a first input on the touch-sensitive surface; in response to detecting the first input, enter a reconfiguration mode for the integrated input area; and, while in the reconfiguration mode for the integrated input area: detect a second input by a first thumb and/or a second thumb; in response to detecting the second input, adjust the size of at least one of the left side and the right side of the split keyboard in the integrated input area; detect a third input; and, in response to detecting the third input, exit the reconfiguration mode for the integrated input area.

In accordance with some embodiments, an electronic device includes: a display; a touch-sensitive surface; means for concurrently displaying a first text entry area and an unsplit keyboard on the display; means for detecting a gesture on the touch-sensitive surface; and, means for, in response to detecting the gesture on the touch-sensitive surface, replacing the unsplit keyboard with an integrated input area, the integrated input area including: a left portion with a left side of a split keyboard; a right portion with a right side of the split keyboard; and a center portion in between the left portion and the right portion.

In accordance with some embodiments, an electronic device includes: a display; a touch-sensitive surface; means for displaying a first keyboard on the display, the first keyboard comprising a first plurality of keys; means for detecting a key activation gesture at a first time at a location on the touch-sensitive surface that corresponds to a location of a first key in the first keyboard; means for, in response to detecting the key activation gesture at the first time, activating the first key; means for detecting one or more contacts on the touch-sensitive surface at a second time after the first time, the one or more contacts corresponding to a keyboard selection gesture; and, in response to detecting the one or more contacts that correspond to the keyboard selection gesture at the second time after the first time: means for replacing the first keyboard with a second keyboard when the second time exceeds a predefined period of time after the first time; and means for maintaining display of the first keyboard when the second time is less than the predefined period of time after the first time.

In accordance with some embodiments, an electronic device includes: a display; a touch-sensitive surface; means for concurrently displaying a first text entry area and an integrated input area on the display, the integrated input area including: a left portion with a left side of a split keyboard; a right portion with a right side of the split keyboard; and a center portion in between the left portion and the right portion; means for detecting a first contact on the touch-sensitive surface at a location that corresponds to the center portion of the integrated input area; means for detecting movement of the first contact along the touch-sensitive surface; means for, in response to detecting movement of the first contact along the touch-sensitive surface, moving the integrated input area in accordance with the movement of the first contact when the movement of the first contact exceeds a first movement threshold; means for detecting a second contact, distinct from the first contact, on the touch-sensitive surface at a location that corresponds to the split keyboard; means for detecting movement of the second contact along the touch-sensitive surface; and, means for, in response to detecting movement of the second contact along the touch-sensitive surface, moving the integrated input area in accordance with the movement of the second contact when the movement of the second contact exceeds a second movement threshold, the second movement threshold being greater than the first movement threshold.

In accordance with some embodiments, an electronic device includes: a display; a touch-sensitive surface; means for concurrently displaying on the display an application content area with a first size, and an input area with a keyboard, the input area being adjacent to and separate from the application content area with the first size, the input area being at a bottom of the display; means for detecting a gesture on the touch-sensitive surface; in response to detecting the gesture on the touch-sensitive surface: means for moving the input area away from the bottom of the display over the application content area; and means for increasing the application content area to a second size larger than the first size.

In accordance with some embodiments, an electronic device includes: a display; a touch-sensitive surface; means for concurrently displaying a text entry area, a left side of a split keyboard, and a right side of a split keyboard, the left side of the split keyboard including a plurality of rows of keys and the right side of the split keyboard including a corresponding plurality of rows of keys; means for detecting a gesture at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, means for, in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

In accordance with some embodiments, an electronic device includes: a display; a touch-sensitive surface; means for concurrently displaying a first text entry area and an integrated input area, the integrated input area including: a left portion with a left side of a split keyboard; a right portion with a right side of the split keyboard; and a center portion with a second text entry area, the center portion in between the left portion and the right portion; means for detecting a gesture at a location on the touch-sensitive surface that corresponds to a location of a character key in the split keyboard; and, means for in response to detecting the gesture at the location on the touch-sensitive surface that corresponds to the location of the character key in the split keyboard, inputting and concurrently displaying the corresponding character in the first text entry area and the second text entry area on the display.

In accordance with some embodiments, an electronic device includes: a display; a touch-sensitive surface; means for concurrently displaying on the display an application content area that includes one or more text entry areas, and an input area with a keyboard that is displayed over the application content area; means for detecting a drag gesture on the touch-sensitive surface at a location that corresponds to the input area on the display; means for, in response to detecting the drag gesture, moving the input area on the display in accordance with the drag gesture; means for detecting a flick gesture on the touch-sensitive surface at a location that corresponds to the input area on the display; and, means for, in response to detecting the flick gesture, moving the input area on the display with inertia in accordance with the flick gesture such that the input area comes to rest at a location adjacent to and just below a text entry area in the application content area.

In accordance with some embodiments, an electronic device includes: a display; a touch-sensitive surface; means for concurrently displaying on the display a first text entry area, and an integrated input area, the integrated input area including: a left portion with a left side of a split keyboard; a right portion with a right side of the split keyboard; and a center portion in between the left portion and the right portion; means for detecting a first input on the touch-sensitive surface; means for in response to detecting the first input, entering a reconfiguration mode for the integrated input area; and, while in the reconfiguration mode for the integrated input area: means for detecting a second input by a first thumb and/or a second thumb; means for, in response to detecting the second input, adjusting the size of at least one of the left side and the right side of the split keyboard in the integrated input area; means for detecting a third input; and, means for, in response to detecting the third input, exiting the reconfiguration mode for the integrated input area.

In accordance with some embodiments, an information processing apparatus for use in an electronic device with a display and a touch-sensitive surface includes: means for concurrently displaying a first text entry area and an unsplit keyboard on the display; means for detecting a gesture on the touch-sensitive surface; and, means for, in response to detecting the gesture on the touch-sensitive surface, replacing the unsplit keyboard with an integrated input area, the integrated input area including: a left portion with a left side of a split keyboard; a right portion with a right side of the split keyboard; and a center portion in between the left portion and the right portion.

In accordance with some embodiments, an information processing apparatus for use in an electronic device with a display and a touch-sensitive surface includes: means for displaying a first keyboard on the display, the first keyboard comprising a first plurality of keys; means for detecting a key activation gesture at a first time at a location on the touch-sensitive surface that corresponds to a location of a first key in the first keyboard; means for in response to detecting the key activation gesture at the first time, activating the first key; means for detecting one or more contacts on the touch-sensitive surface at a second time after the first time, the one or more contacts corresponding to a keyboard selection gesture; and, in response to detecting the one or more contacts that correspond to the keyboard selection gesture at the second time after the first time: means for replacing the first keyboard with a second keyboard when the second time exceeds a predefined period of time after the first time; and means for maintaining display of the first keyboard when the second time is less than the predefined period of time after the first time.

In accordance with some embodiments, an information processing apparatus for use in an electronic device with a display and a touch-sensitive surface includes: means for concurrently displaying a first text entry area and an integrated input area on the display, the integrated input area including: a left portion with a left side of a split keyboard; a right portion with a right side of the split keyboard; and a center portion in between the left portion and the right portion; means for detecting a first contact on the touch-sensitive surface at a location that corresponds to the center portion of the integrated input area; means for detecting movement of the first contact along the touch-sensitive surface; means for, in response to detecting movement of the first contact along the touch-sensitive surface, moving the integrated input area in accordance with the movement of the first contact when the movement of the first contact exceeds a first movement threshold; means for detecting a second contact, distinct from the first contact, on the touch-sensitive surface at a location that corresponds to the split keyboard; means for detecting movement of the second contact along the touch-sensitive surface; and, means for, in response to detecting movement of the second contact along the touch-sensitive surface, moving the integrated input area in accordance with the movement of the second contact when the movement of the second contact exceeds a second movement threshold, the second movement threshold being greater than the first movement threshold.

In accordance with some embodiments, an information processing apparatus for use in an electronic device with a display and a touch-sensitive surface includes: means for concurrently displaying on the display an application content area with a first size, and an input area with a keyboard, the input area being adjacent to and separate from the application content area with the first size, the input area being at a bottom of the display; means for detecting a gesture on the touch-sensitive surface; in response to detecting the gesture on the touch-sensitive surface: means for moving the input area away from the bottom of the display over the application content area; and means for increasing the application content area to a second size larger than the first size.

In accordance with some embodiments, an information processing apparatus for use in an electronic device with a display and a touch-sensitive surface includes: means for concurrently displaying a text entry area, a left side of a split keyboard, and a right side of a split keyboard, the left side of the split keyboard including a plurality of rows of keys and the right side of the split keyboard including a corresponding plurality of rows of keys; means for detecting a gesture at a location on the touch-sensitive surface that corresponds to a predefined area adjacent to and to the right of a rightmost key in a respective row of the left side of the split keyboard, wherein the rightmost key in the respective row of the left side of the split keyboard is unique to the left side of the split keyboard; and, means for in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

In accordance with some embodiments, an information processing apparatus for use in an electronic device with a display and a touch-sensitive surface includes: means for concurrently displaying a first text entry area and an integrated input area, the integrated input area including: a left portion with a left side of a split keyboard; a right portion with a right side of the split keyboard; and a center portion with a second text entry area, the center portion in between the left portion and the right portion; means for detecting a gesture at a location on the touch-sensitive surface that corresponds to a location of a character key in the split keyboard; and, means for in response to detecting the gesture at the location on the touch-sensitive surface that corresponds to the location of the character key in the split keyboard, inputting and concurrently displaying the corresponding character in the first text entry area and the second text entry area on the display.

In accordance with some embodiments, an information processing apparatus for use in an electronic device with a display and a touch-sensitive surface includes: means for concurrently displaying on the display an application content area that includes one or more text entry areas, and an input area with a keyboard that is displayed over the application content area; means for detecting a drag gesture on the touch-sensitive surface at a location that corresponds to the input area on the display; means for, in response to detecting the drag gesture, moving the input area on the display in accordance with the drag gesture; means for detecting a flick gesture on the touch-sensitive surface at a location that corresponds to the input area on the display; and, means for, in response to detecting the flick gesture, moving the input area on the display with inertia in accordance with the flick gesture such that the input area comes to rest at a location adjacent to and just below a text entry area in the application content area.

In accordance with some embodiments, an information processing apparatus for use in an electronic device with a display and a touch-sensitive surface includes: means for concurrently displaying on the display a first text entry area, and an integrated input area, the integrated input area including: a left portion with a left side of a split keyboard; a right portion with a right side of the split keyboard; and a center portion in between the left portion and the right portion; means for detecting a first input on the touch-sensitive surface; means for, in response to detecting the first input, entering a reconfiguration mode for the integrated input area; and, while in the reconfiguration mode for the integrated input area: means for detecting a second input by a first thumb and/or a second thumb; means for, in response to detecting the second input, adjusting the size of at least one of the left side and the right side of the split keyboard in the integrated input area; means for detecting a third input; and, means for, in response to detecting the third input, exiting the reconfiguration mode for the integrated input area.

In accordance with some embodiments, an electronic device includes a display unit configured to concurrently display a first text entry area and an unsplit keyboard, a touch-sensitive surface unit configured to receive user gestures, and a processing unit coupled to the display unit and the touch-sensitive surface unit. The processing unit is configured to detect a gesture on the touch-sensitive surface unit; and, in response to detecting the gesture on the touch-sensitive surface unit, replace the unsplit keyboard with an integrated input area. The integrated input area includes a left portion with a left side of a split keyboard, a right portion with a right side of the split keyboard, and a center portion in between the left portion and the right portion.

In accordance with some embodiments, an electronic device includes a display unit configured to display a first keyboard, the first keyboard including a first plurality of keys; a touch-sensitive surface unit configured to receive user gestures; and a processing unit coupled to the display unit and the touch-sensitive surface unit. The processing unit is configured to detect a key activation gesture at a first time at a location on the touch-sensitive surface unit that corresponds to a location of a first key in the first keyboard; in response to detecting the key activation gesture at the first time, activate the first key; detect one or more contacts on the touch-sensitive surface unit at a second time after the first time, the one or more contacts corresponding to a keyboard selection gesture; and in response to detecting the one or more contacts that correspond to the keyboard selection gesture at the second time after the first time: replace the first keyboard with a second keyboard on the display unit when the second time exceeds a predefined period of time after the first time; and maintain display of the first keyboard on the display unit when the second time is less than the predefined period of time after the first time.

In accordance with some embodiments, an electronic device includes a display unit configured to concurrently display a first text entry area and an integrated input area, the integrated input area including a left portion with a left side of a split keyboard, a right portion with a right side of the split keyboard, and a center portion in between the left portion and the right portion; a touch-sensitive surface unit configured to receive user contacts and movements of the user contacts; and a processing unit coupled to the display unit and the touch-sensitive surface unit. The processing unit is configured to detect a first contact on the touch-sensitive surface unit at a location that corresponds to the center portion of the integrated input area; detect movement of the first contact along the touch-sensitive surface unit; in response to detecting the movement of the first contact along the touch-sensitive surface unit, move the integrated input area on the display unit in accordance with the movement of the first contact when the movement of the first contact exceeds a first movement threshold; detect a second contact, distinct from the first contact, on the touch-sensitive surface unit at a location that corresponds to the split keyboard; detect movement of the second contact along the touch-sensitive surface unit; and, in response to detecting the movement of the second contact along the touch-sensitive surface unit, move the integrated input area on the display unit in accordance with the movement of the second contact when the movement of the second contact exceeds a second movement threshold, the second movement threshold being greater than the first movement threshold.

In accordance with some embodiments, an electronic device includes a display unit configured to concurrently display an application content area with a first size, and an input area with a keyboard, the input area being adjacent to and separate from the application content area with the first size, the input area being at a bottom of the display unit; a touch-sensitive surface unit configured to receive user gestures; and a processing unit coupled to the display unit and the touch-sensitive surface unit. The processing unit is configured to detect a gesture on the touch-sensitive surface unit; and, in response to detecting the gesture on the touch-sensitive surface unit: move the input area away from the bottom of the display unit over the application content area, and increase a size of the application content area to a second size larger than the first size.

In accordance with some embodiments, an electronic device includes a display unit configured to concurrently display a text entry area, a left side of a split keyboard, and a right side of a split keyboard, the left side of the split keyboard including a plurality of rows of keys and the right side of the split keyboard including a corresponding plurality of rows of keys; a touch-sensitive surface unit configured to receive user gestures; and a processing unit coupled to the display unit and the touch-sensitive surface unit. The processing unit is configured to detect a gesture at a location on the touch-sensitive surface unit that corresponds to a predefined area adjacent to and to the right of a rightmost key in a respective row of the left side of the split keyboard; and, in response to detecting the gesture at the location on the touch-sensitive surface unit that corresponds to the predefined area adjacent to and to the right of the rightmost key in the respective row of the left side of the split keyboard, enter in the text entry area a character that corresponds to a leftmost key in a corresponding respective row of the right side of the split keyboard.

In accordance with some embodiments, an electronic device includes a display unit configured to concurrently display a first text entry area and an integrated input area, the integrated input area including a left portion with a left side of a split keyboard, a right portion with a right side of the split keyboard, and a center portion with a second text entry area, the center portion in between the left portion and the right portion; a touch-sensitive surface unit configured to receive user gestures; and a processing unit coupled to the display unit and the touch-sensitive surface unit. The processing unit is configured to: detect a gesture at a location on the touch-sensitive surface unit that corresponds to a location of a character key in the split keyboard; and, in response to detecting the gesture at the location on the touch-sensitive surface unit that corresponds to the location of the character key in the split keyboard, input and enable concurrent display of the corresponding character in the first text entry area and the second text entry area on the display unit.

In accordance with some embodiments, an electronic device includes a display unit configured to concurrently display an application content area that includes one or more text entry areas, and an input area with a keyboard that is displayed over the application content area; a touch-sensitive surface unit configured to receive user gestures; and a processing unit coupled to the display unit and the touch-sensitive surface unit. The processing unit is configured to: detect a drag gesture on the touch-sensitive surface unit at a location that corresponds to the input area on the display unit; in response to detecting the drag gesture, move the input area on the display unit in accordance with the drag gesture; detect a flick gesture on the touch-sensitive surface unit at a location that corresponds to the input area on the display unit; and, in response to detecting the flick gesture, move the input area on the display unit with inertia in accordance with the flick gesture such that the input area comes to rest at a location adjacent to and just below a text entry area in the application content area.

In accordance with some embodiments, an electronic device includes a display unit configured to concurrently display a first text entry area, and an integrated input area, the integrated input area including: a left portion with a left side of a split keyboard, a right portion with a right side of the split keyboard, and a center portion in between the left portion and the right portion; a touch-sensitive surface unit configured to receive user inputs; a processing unit coupled to the display unit and the touch-sensitive surface unit. The processing unit is configured to: detect a first input on the touch-sensitive surface unit; in response to detecting the first input, enter a reconfiguration mode for the integrated input area; while in the reconfiguration mode for the integrated input area: detect a second input by a first thumb and/or a second thumb; in response to detecting the second input, adjust the size of at least one of the left side and the right side of the split keyboard in the integrated input area; and detect a third input; and, in response to detecting the third input, exit the reconfiguration mode for the integrated input area.

Thus, electronic devices with displays and touch-sensitive surfaces are provided with faster, more efficient methods and interfaces for manipulating soft keyboards, thereby increasing the effectiveness, efficiency, and user satisfaction with such devices. Such methods and interfaces may complement or replace conventional methods for manipulating soft keyboards.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 13A-13B are flow diagrams illustrating a method of reconfiguring an integrated input area in accordance with some embodiments.

DESCRIPTION OF EMBODIMENTS

Figure 1A:
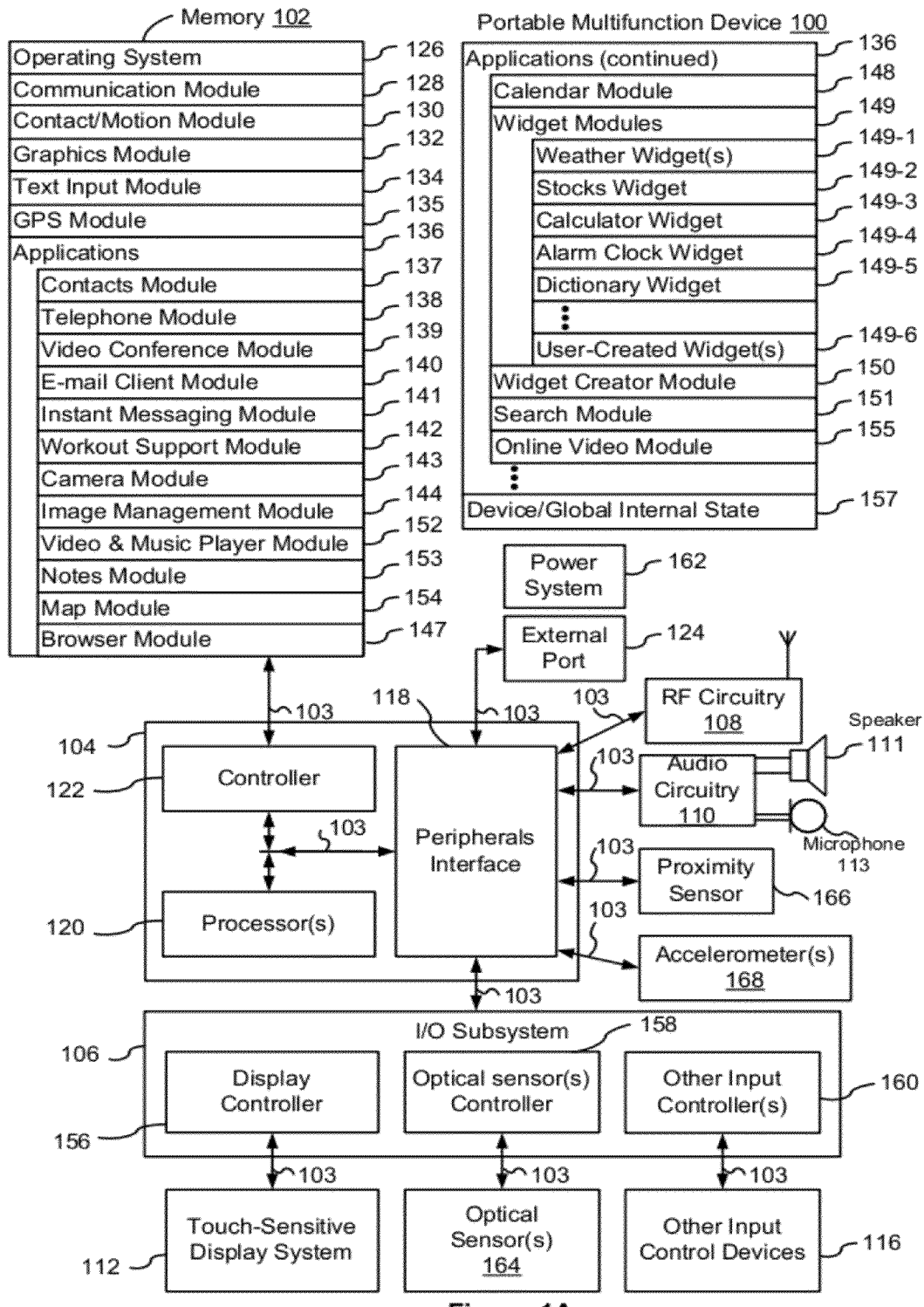
FIG. 1A is a block diagram illustrating a portable multifunction device with a touch-sensitive display in accordance with some embodiments.

Many electronic devices have graphical user interfaces with soft keyboards for character entry. On a relatively large portable device, such as a tablet computer, typing on an unsplit soft keyboard may be fine in certain situations, such as when the computer is resting on a solid surface, but problematic in other situations. For example, unsplit keyboards are not convenient for typing when both hands are holding onto the device. Split soft keyboards may be better in these situations. But the use of split keyboards for two-thumb typing when both hands are holding onto the device raises new issues that have not been recognized and/or properly addressed, such as:

Easily converting between an unsplit keyboard and an integrated input area that includes a split keyboard;

Preventing accidentally changing soft keyboards while typing (e.g., from an unsplit keyboard to an integrated input area with a split keyboard, or vice versa);

Moving an integrated input area when desired, but preventing accidental movement of the integrated input area when a user contact moves during typing with the split keyboard;

Moving an input area and adjusting the size of an application content area to display more of the application;

More efficiently entering characters during two-thumb typing with a split soft keyboard;

Using the center portion of an integrated input area to make character entry faster and more efficient during two-thumb typing;

Moving an input area that includes a keyboard over an application content area so that the input area is just below a text entry area in the application; and Easily customizing a split keyboard in an integrated input area to the size of the user's thumbs.

The embodiments described below address these issues and related issues.

Below, FIGS. 1A-1B, 2, 3, and 14-21 provide a description of exemplary devices. FIGS. 4A-4B and 5A-5NNN illustrate exemplary user interfaces for manipulating soft keyboards. FIGS. 6A-6B, 7A-7B, 8A-8B, 9, 10A-10B, 11A-11D, 12A-12B, 13A-13B are flow diagrams illustrating methods of manipulating soft keyboards. The user interfaces in FIGS. 5A-5NNN are used to illustrate the processes in FIGS. 6A-6B, 7A-7B, 8A-8B, 9, 10A-10B, 11A-11D, 12A-12B, 13A-13B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
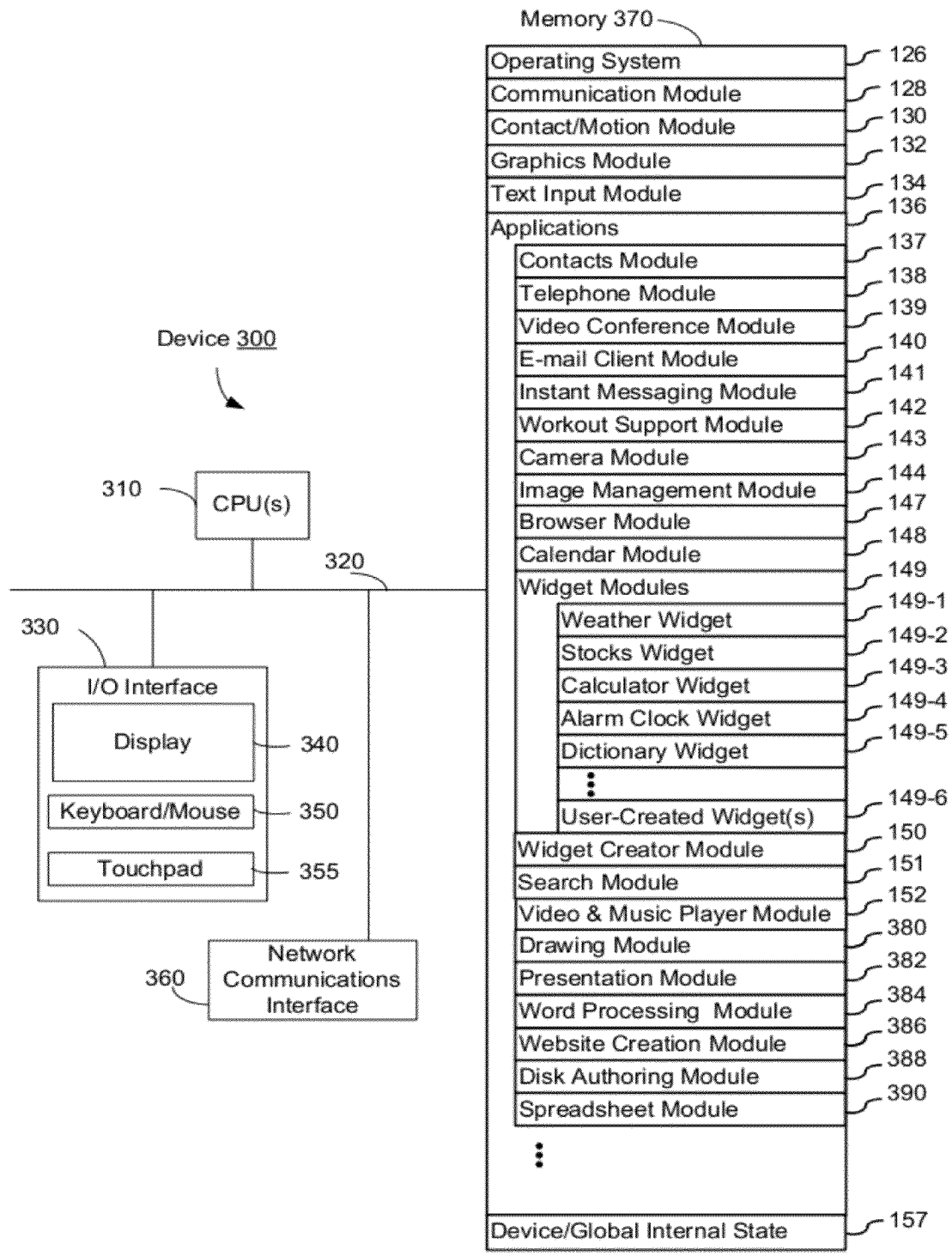
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
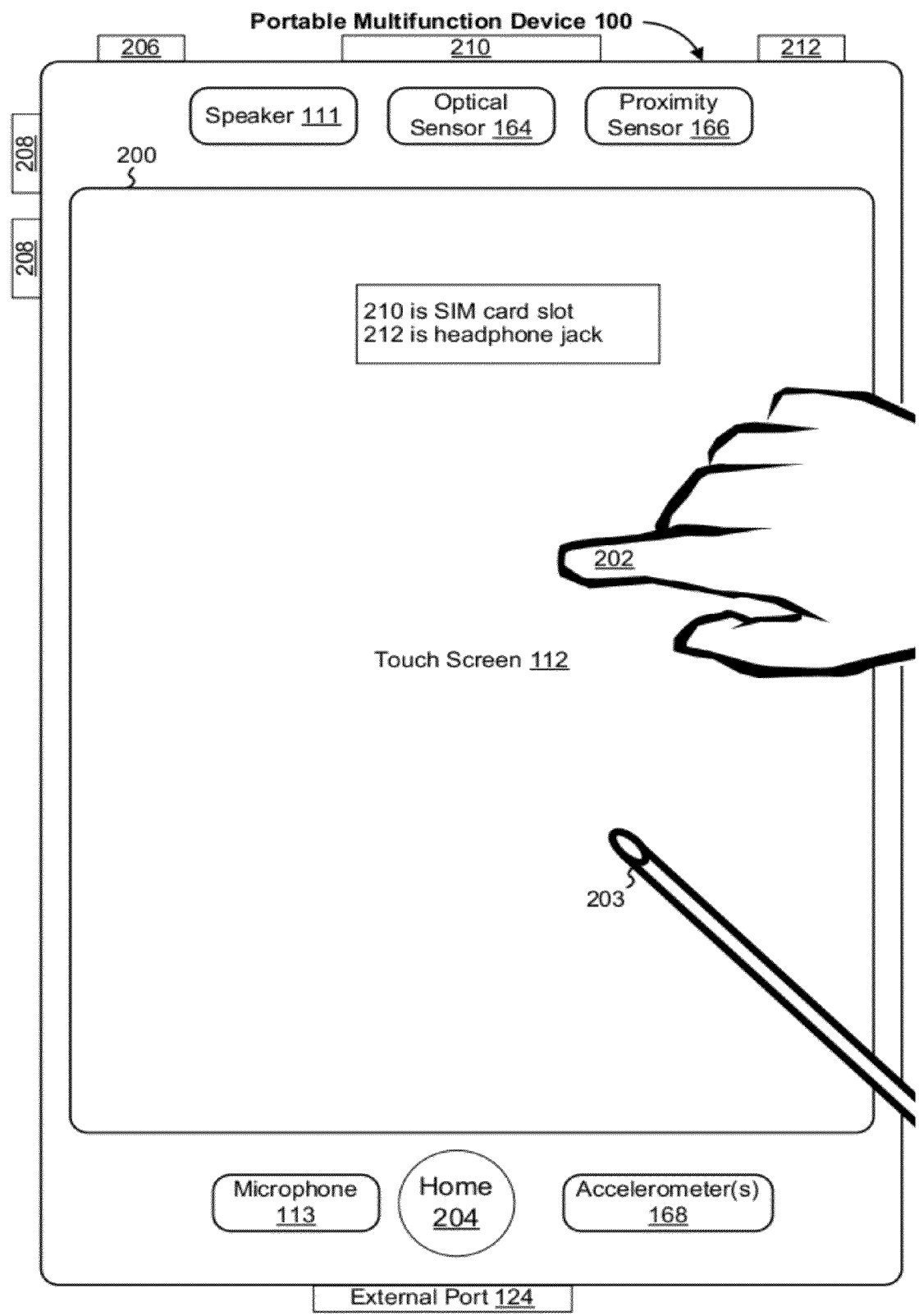
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
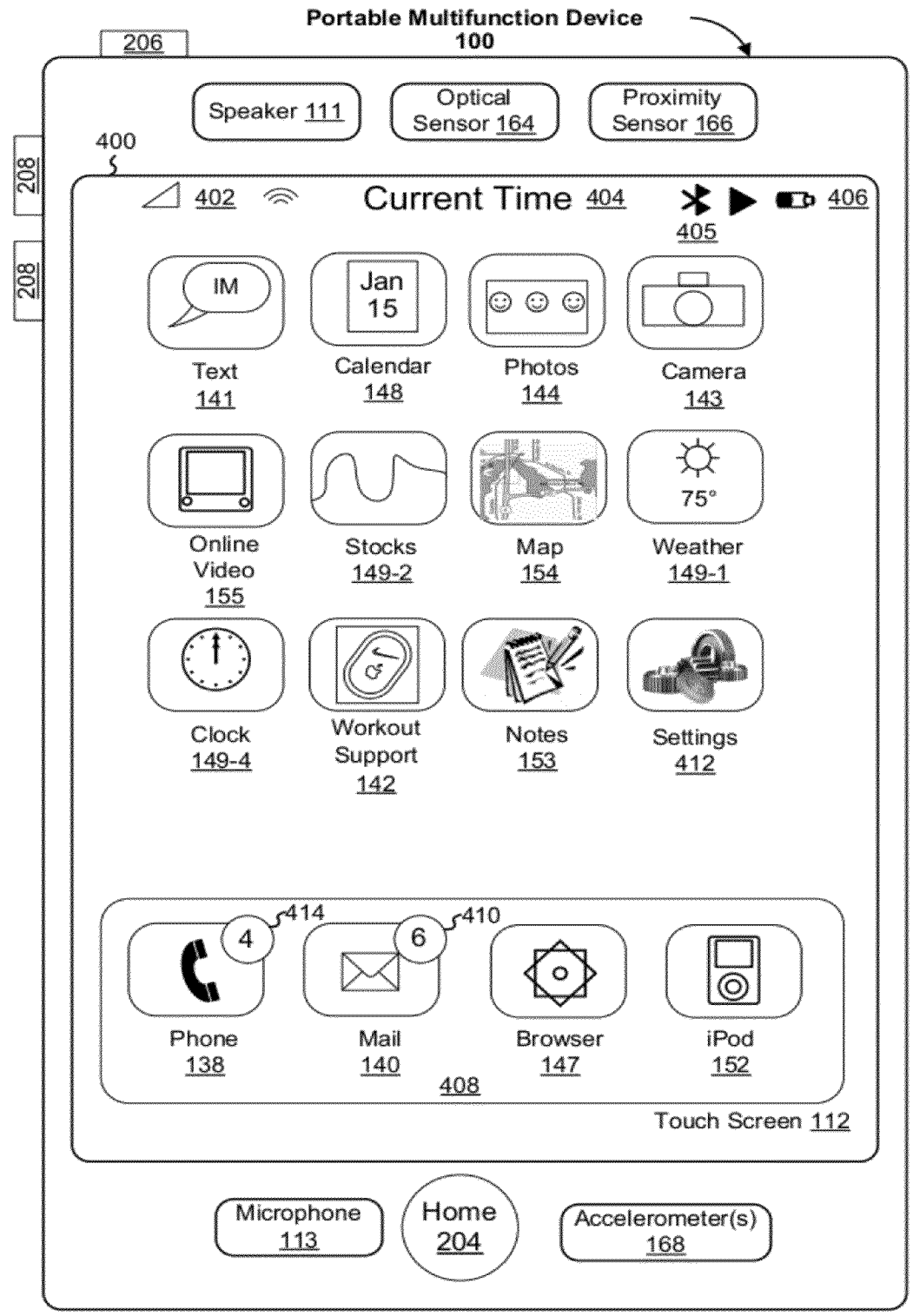
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Phone 138, which may include an indicator 414 of the number of missed calls or voicemail messages;
   E-mail client 140, which may include an indicator 410 of the number of unread e-mails;
   Browser 147; and
   Video and music player 152, also referred to as iPod (trademark of Apple Inc.) module 152; and
Icons for other applications, such as:
   IM 141;
   Image management 144;
   Camera 143;
   Weather 149-1;
   Stocks 149-2;
   Workout support 142;
   Calendar 148;
   Alarm clock 149-4;
   Map 154;
   Notes 153;
   Settings 412, which provides access to settings for device 100 and its various applications 136; and
   Online video module 155, also referred to as YouTube (trademark of Google Inc.) module 155.

Figure 4B:
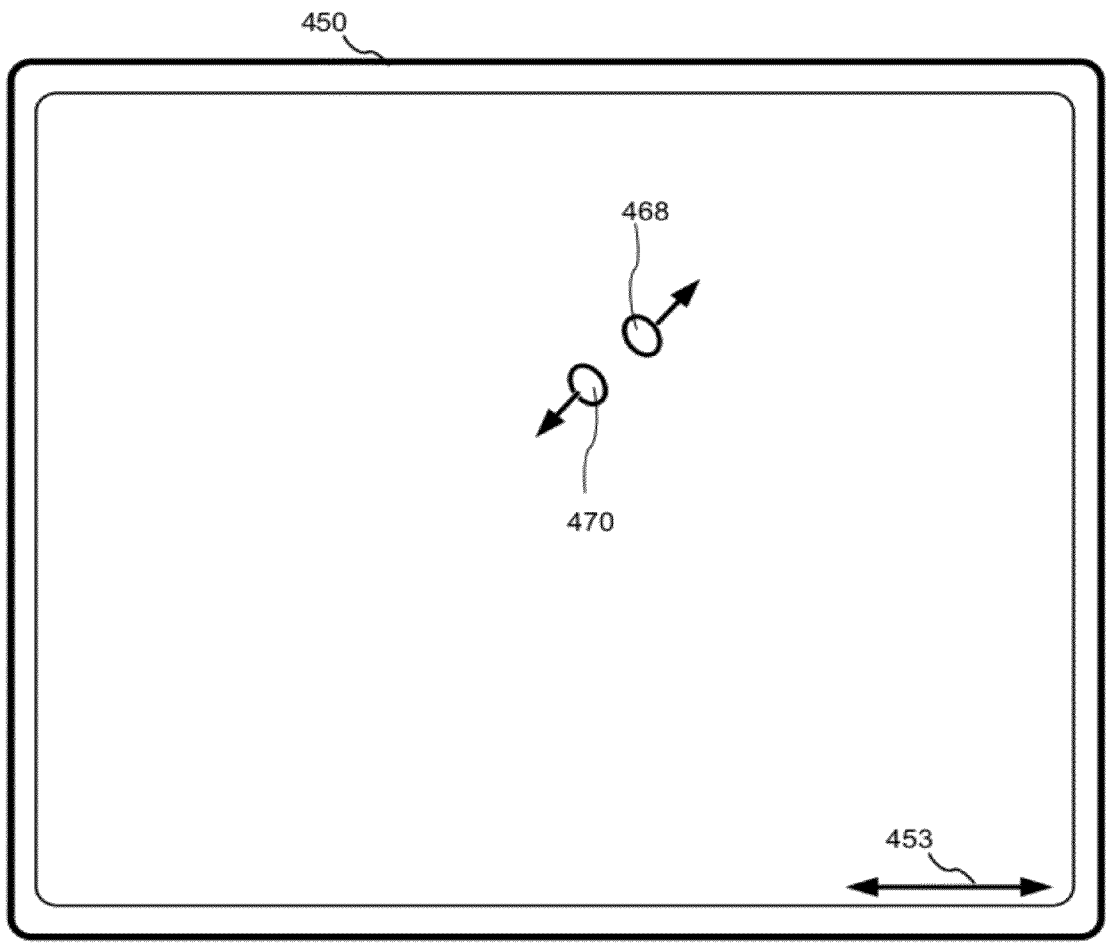
FIG. 4B illustrates an exemplary user interface for a multifunction device with a touch-sensitive surface that is separate from the display in accordance with some embodiments.
Figure 4B:
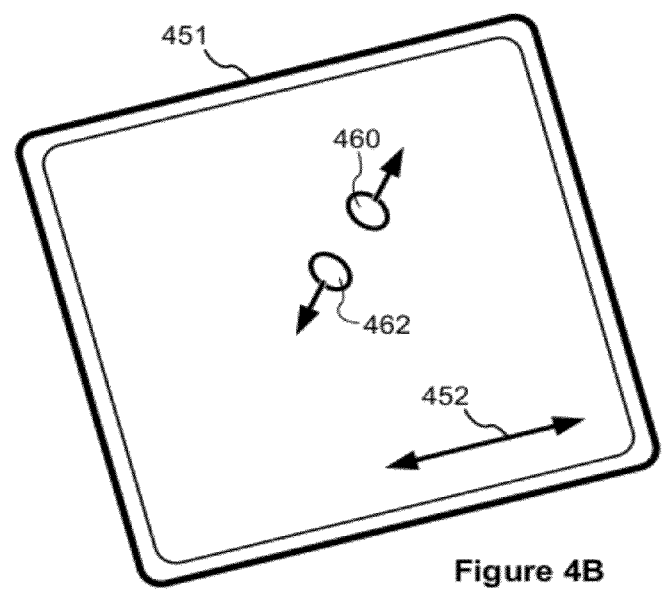

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

Figure 5A:
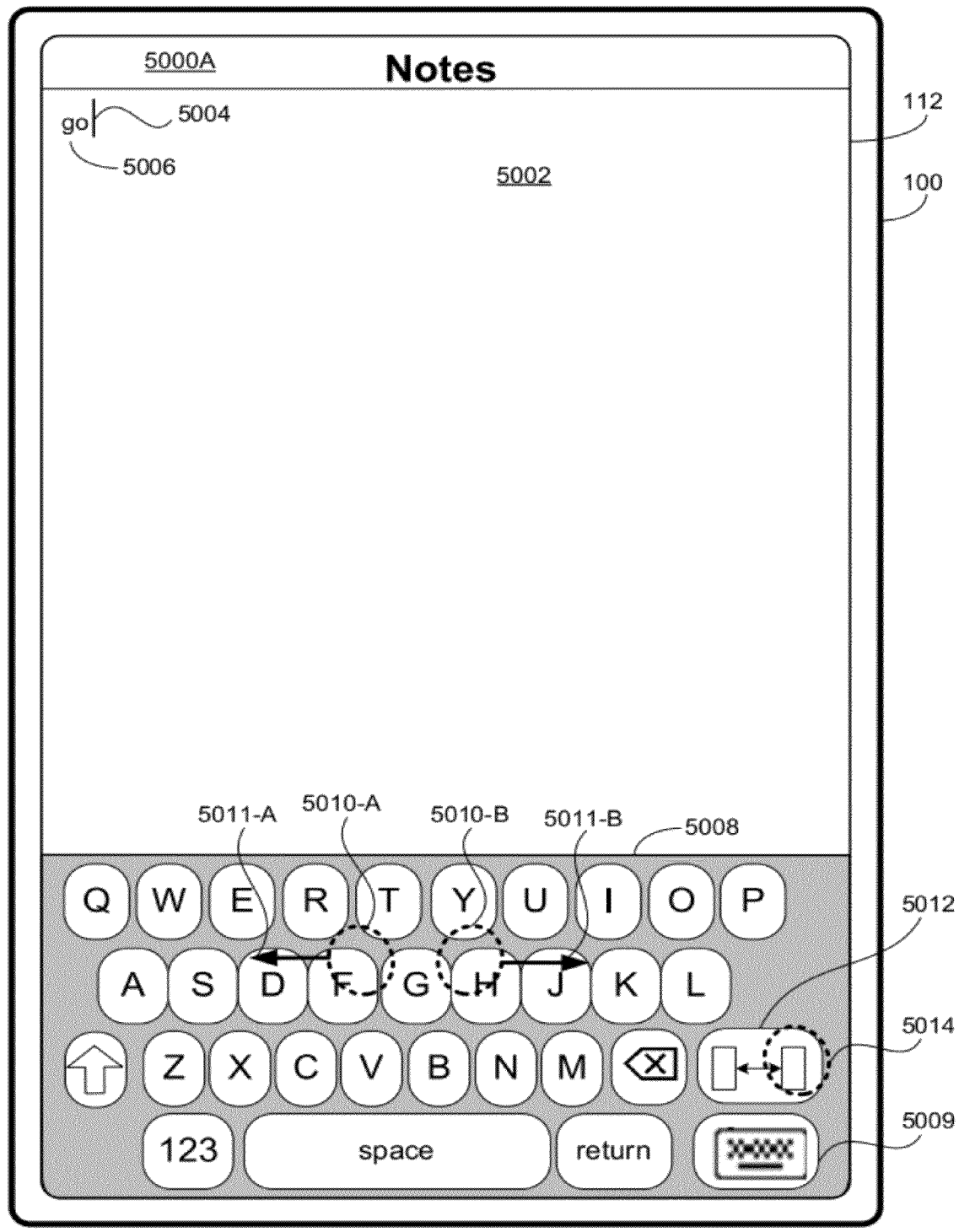
FIGS. 5A-5NNN illustrate exemplary user interfaces for manipulating soft keyboards in accordance with some embodiments.
Figure 5B:
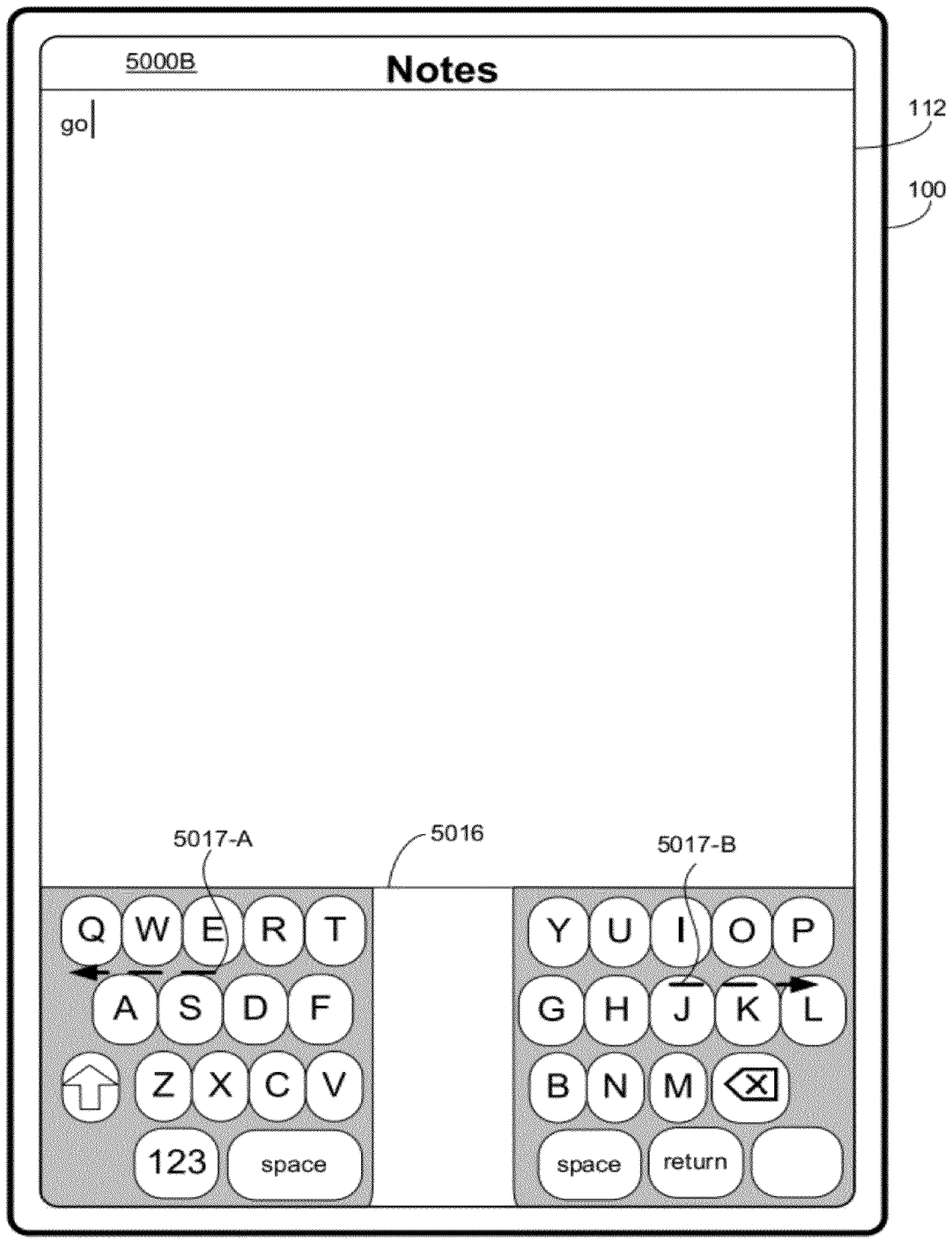
Figure 5C:
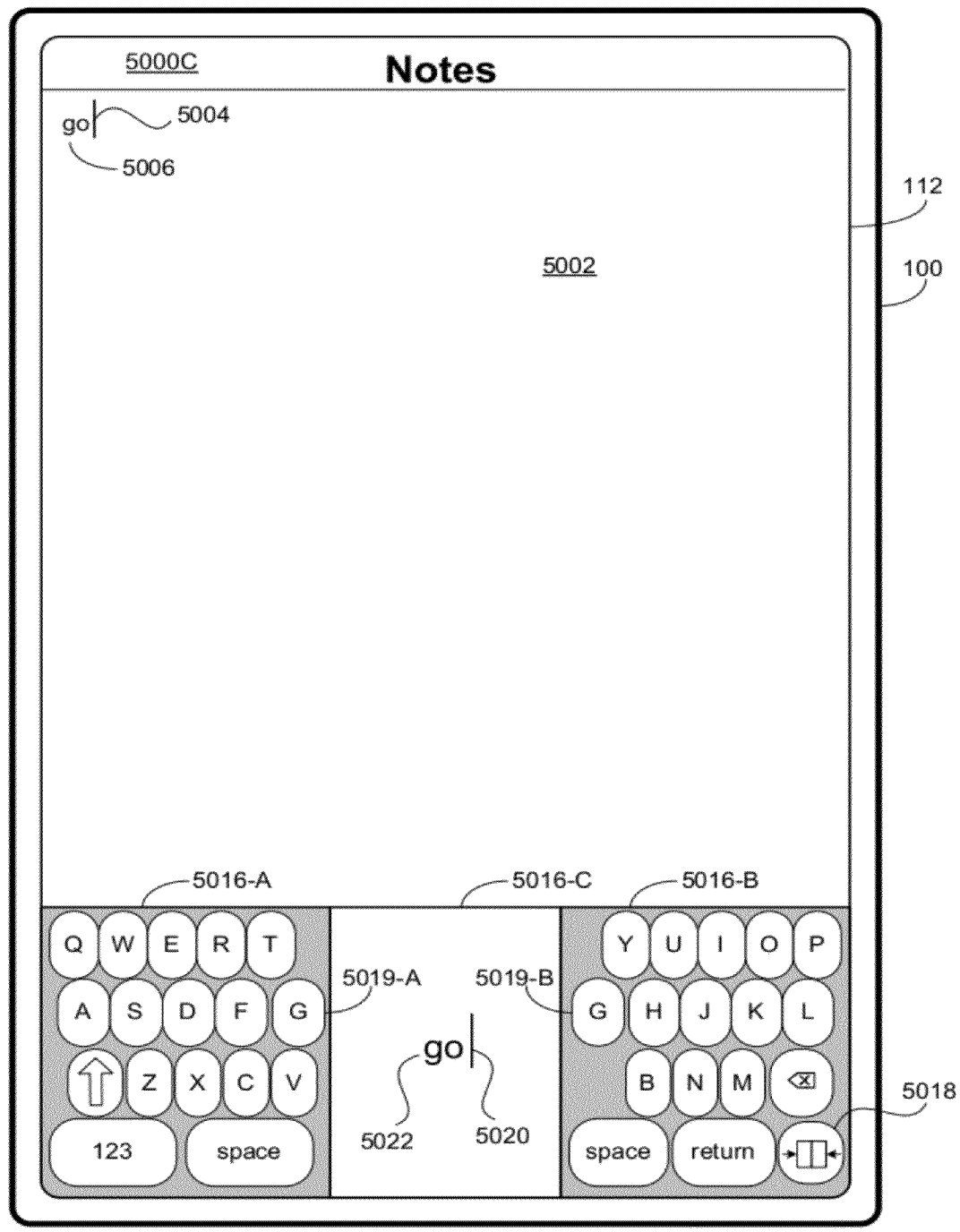
Figure 5D:
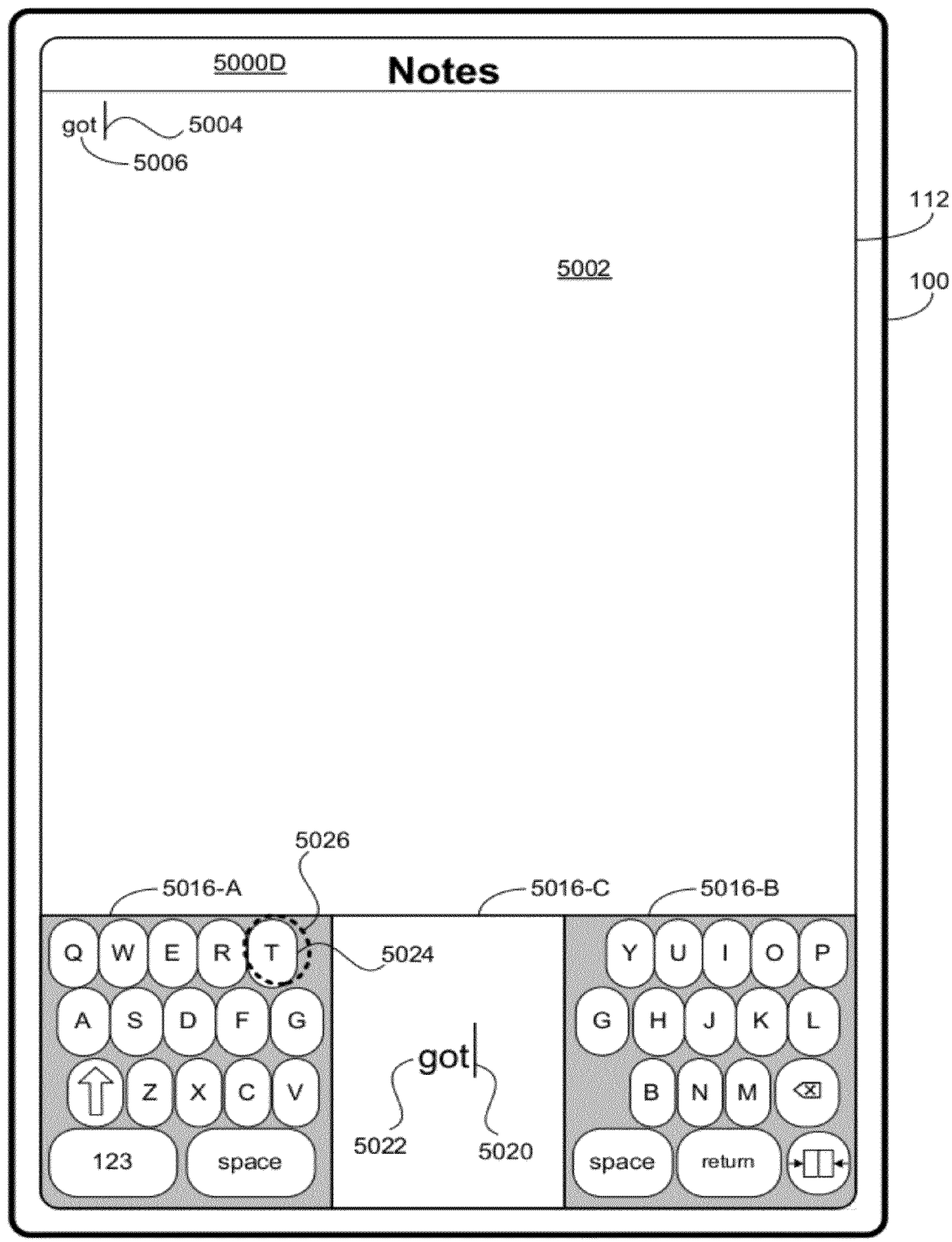
Figure 5E:
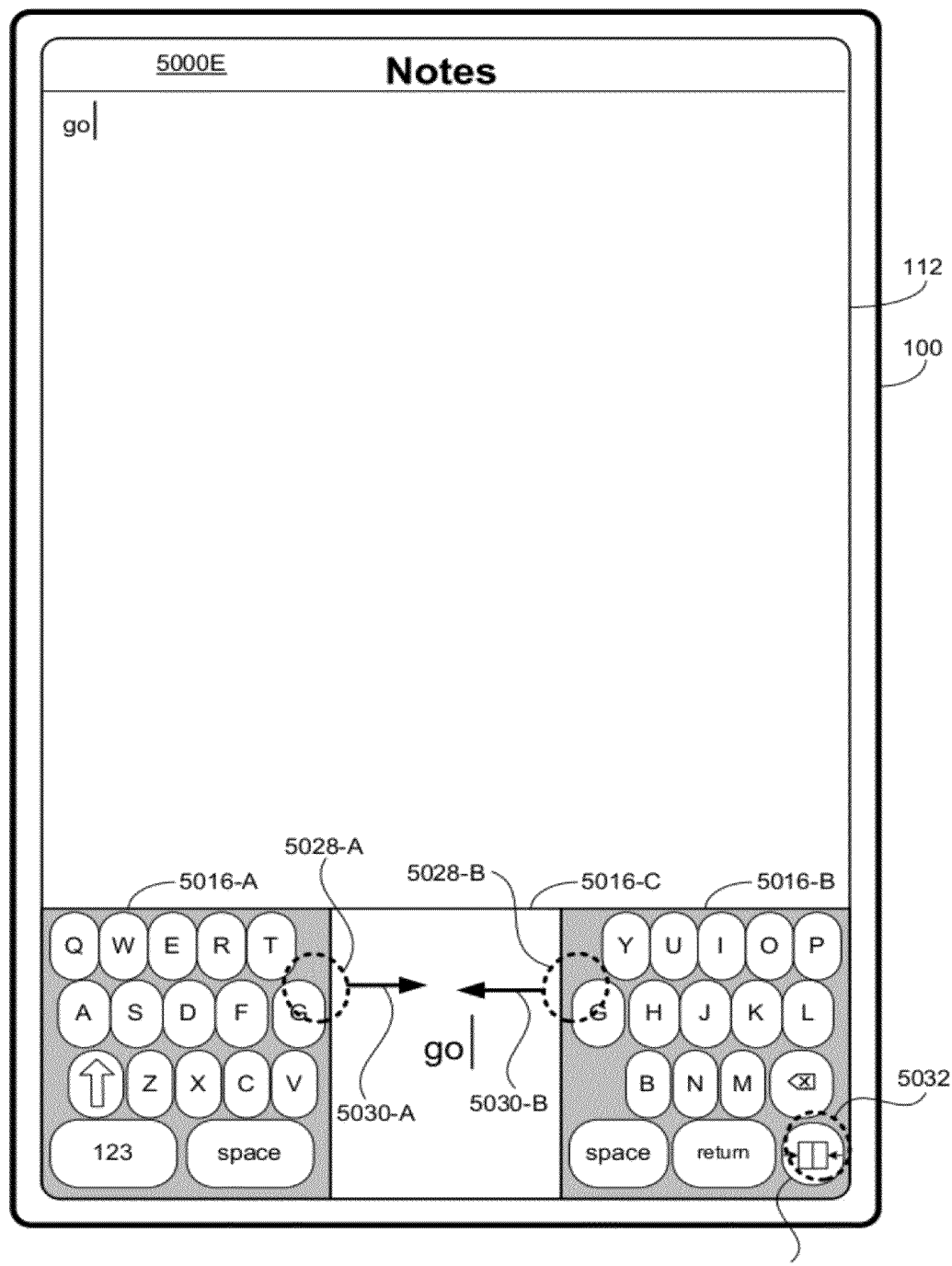
Figure 5F:
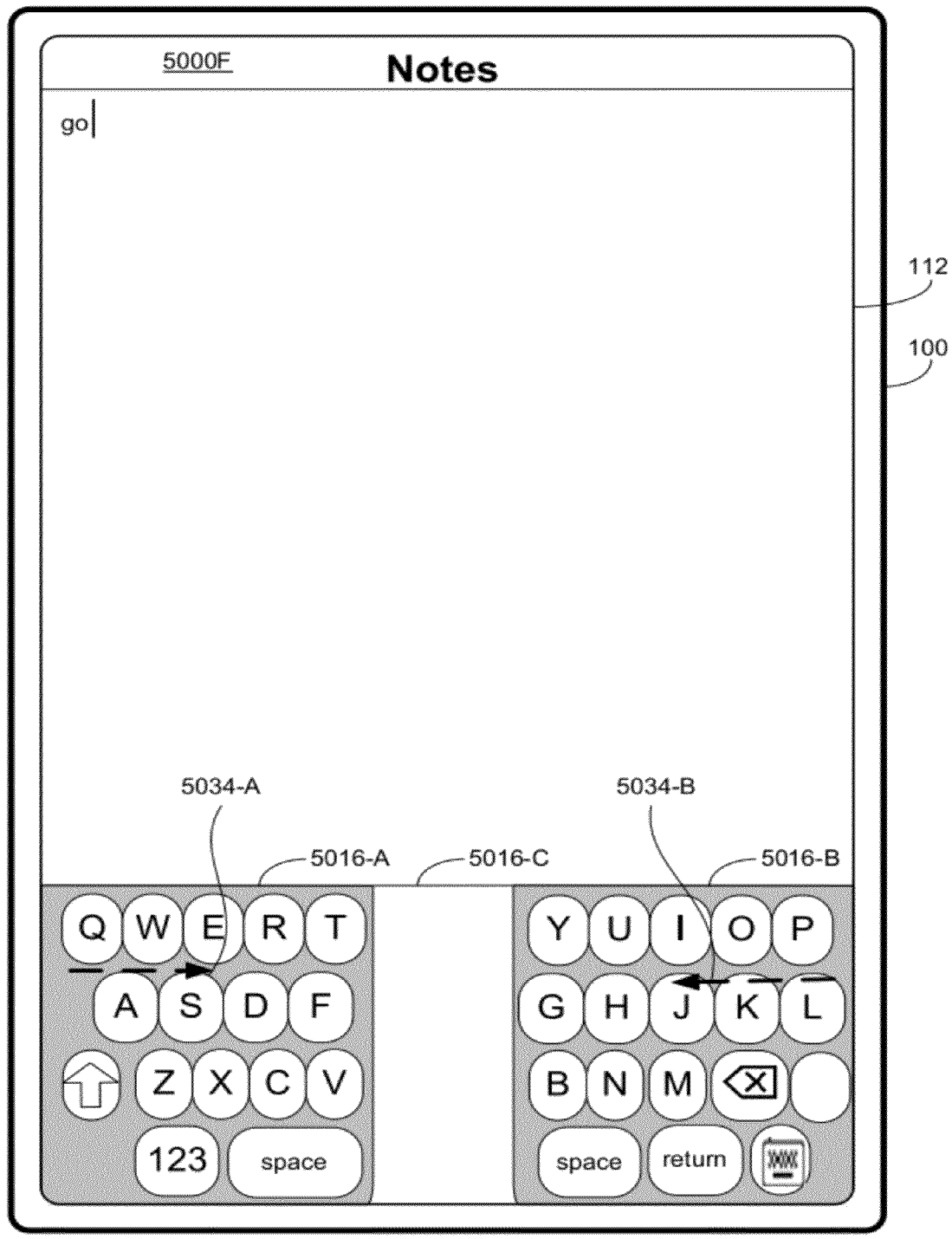
Figure 5G:
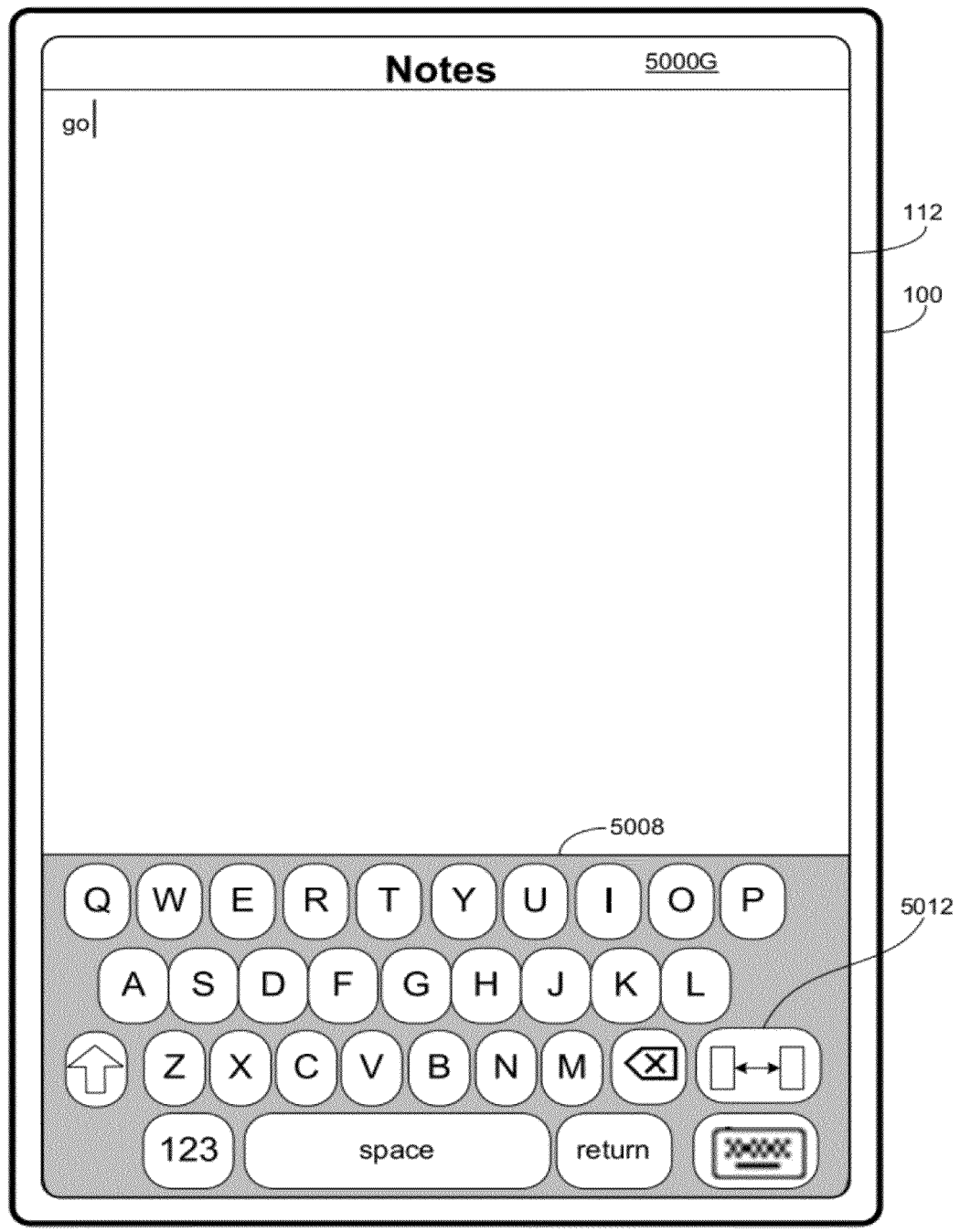
Figure 5H:
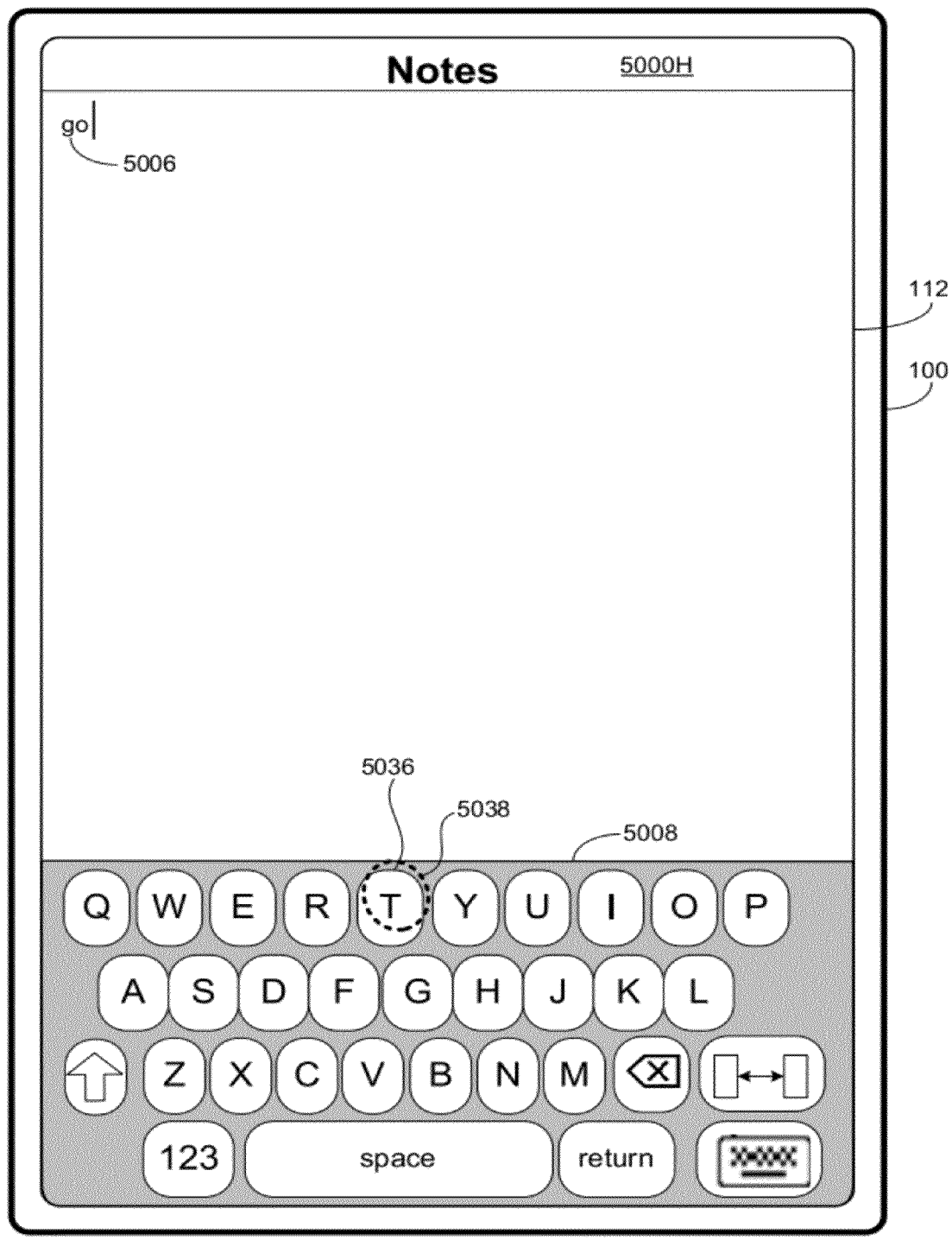
Figure 5I:
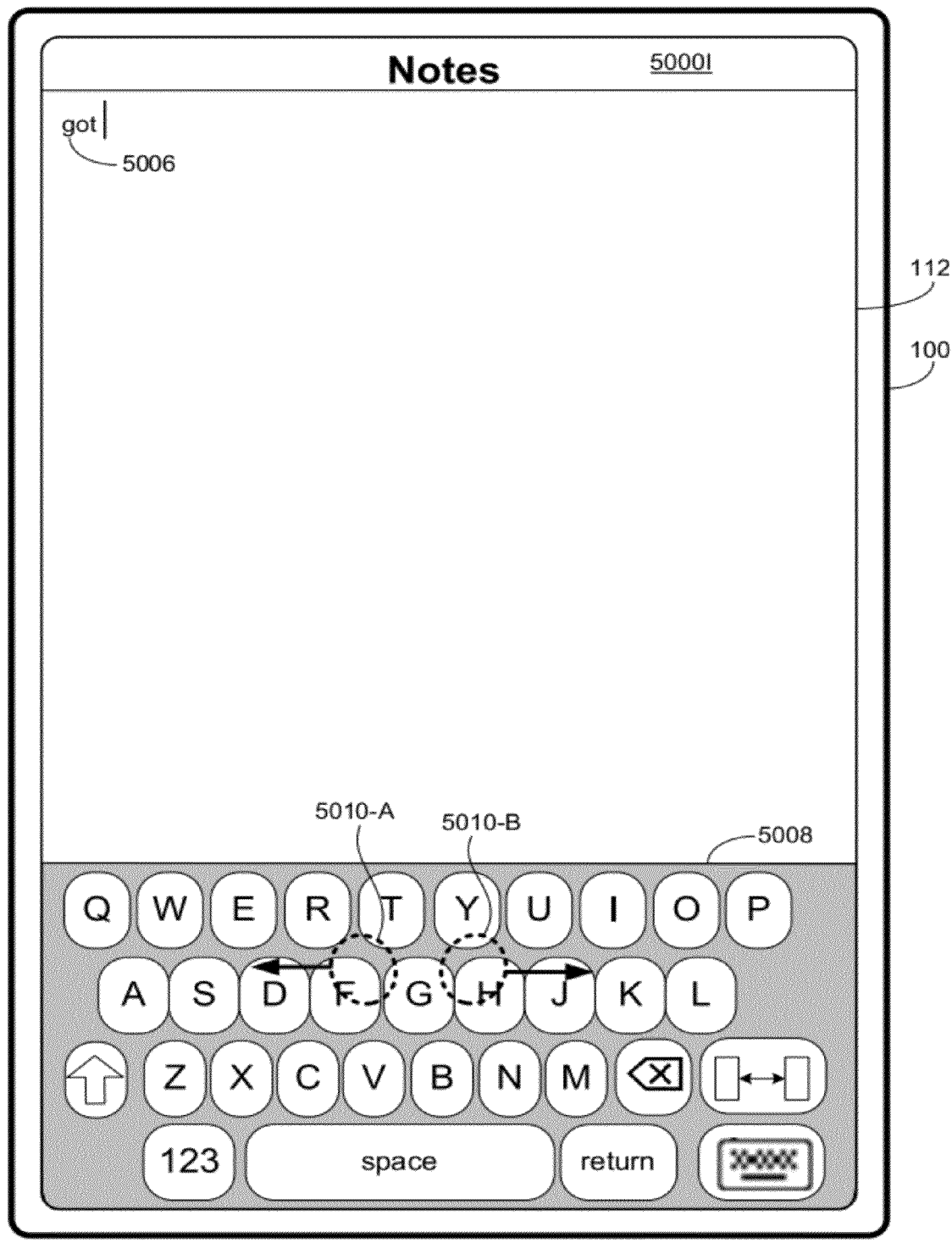
Figure 5J:
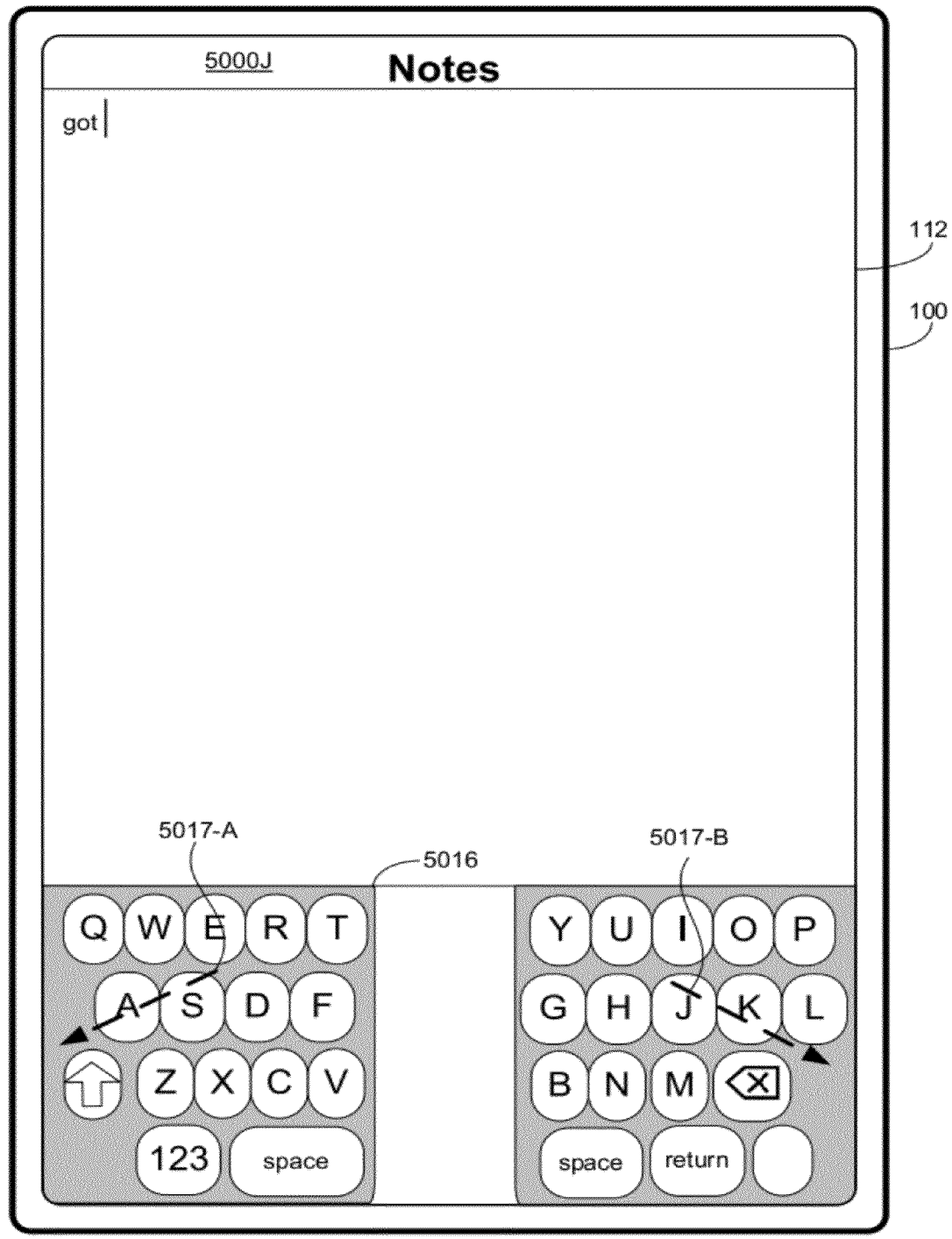
Figure 5K:
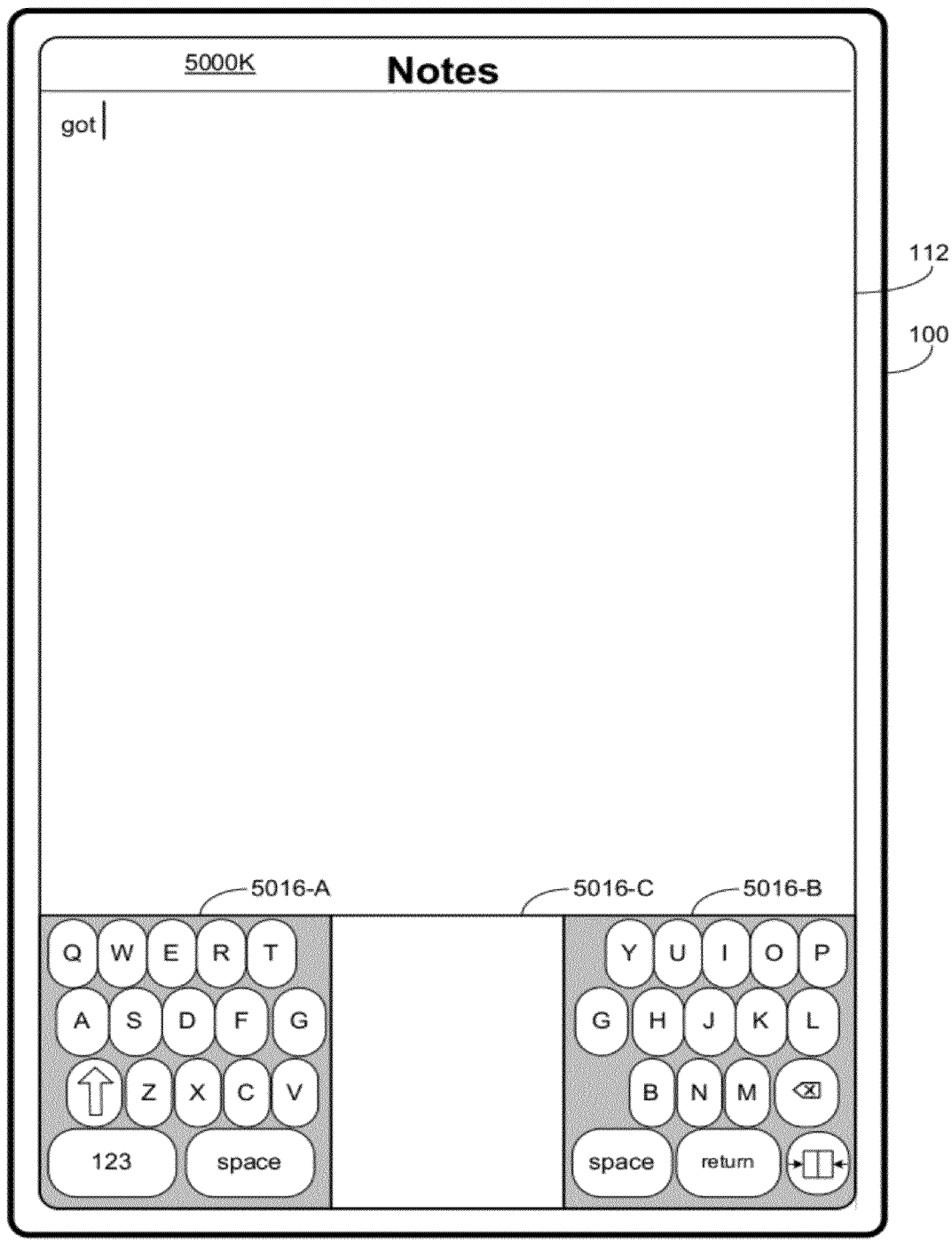
Figure 5L:
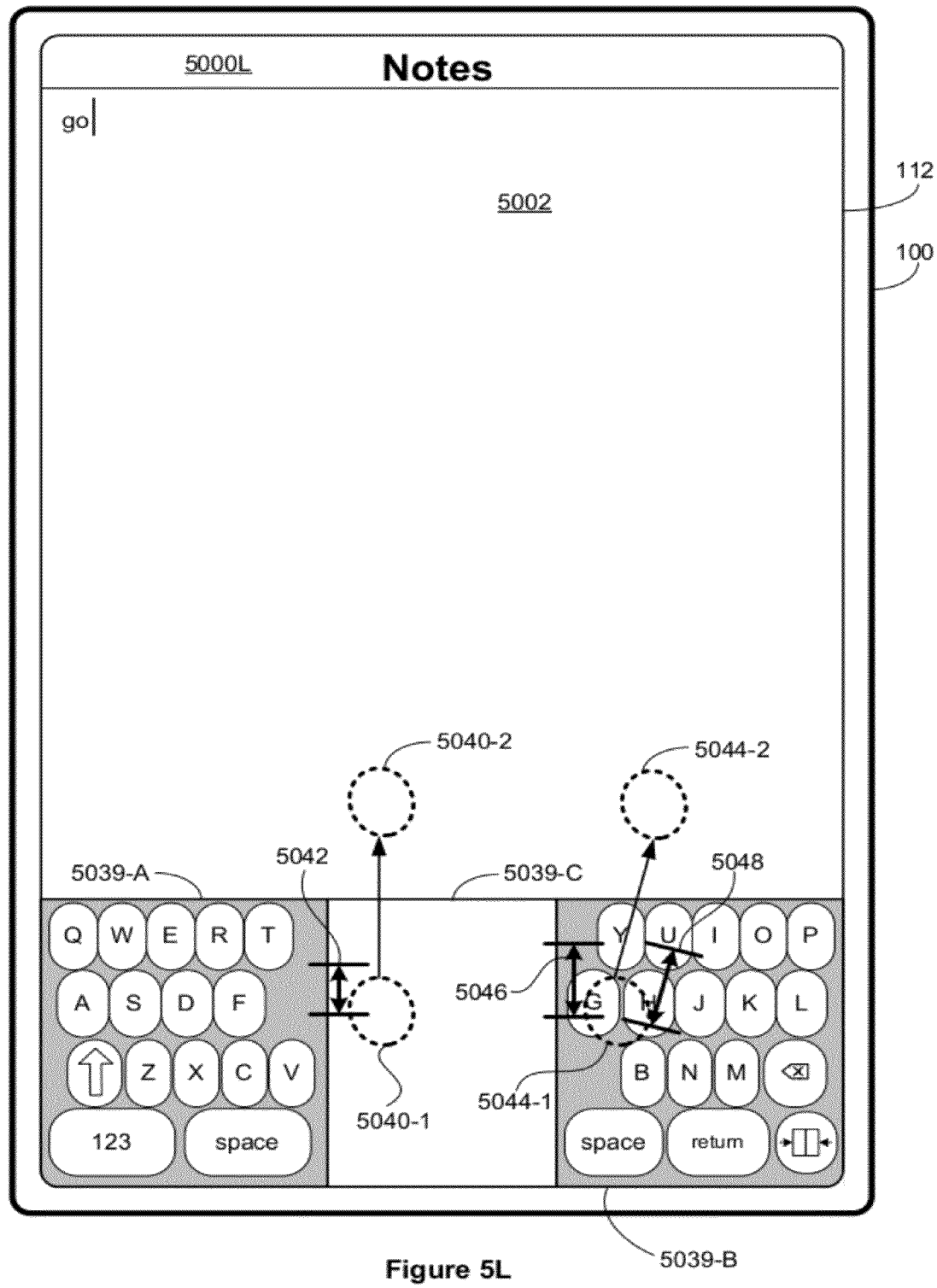
Figure 5M:
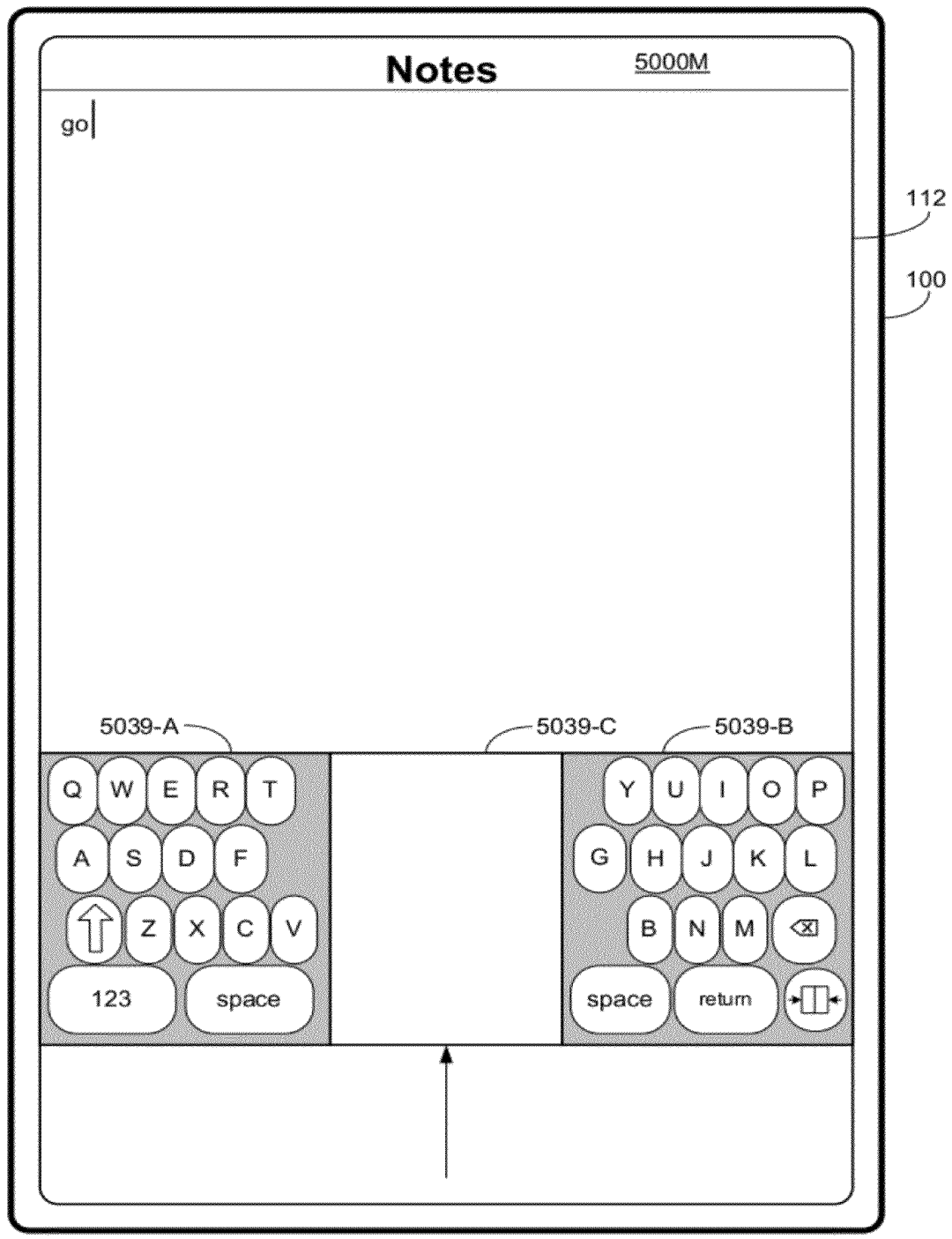
Figure 5N:
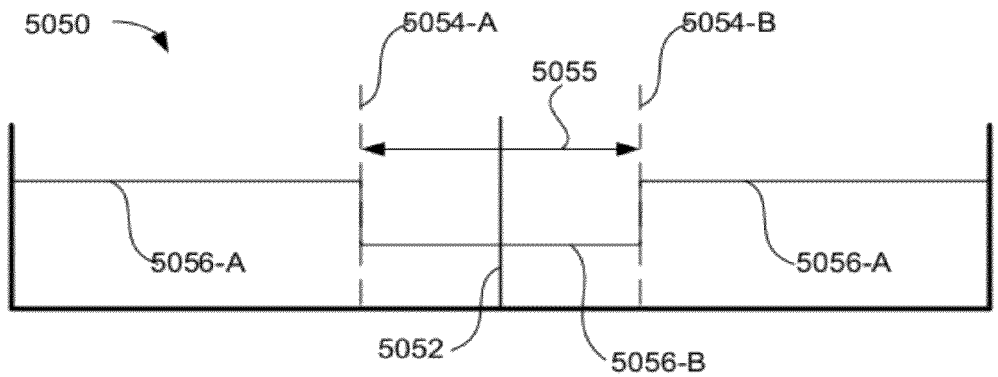
Figure 5N:
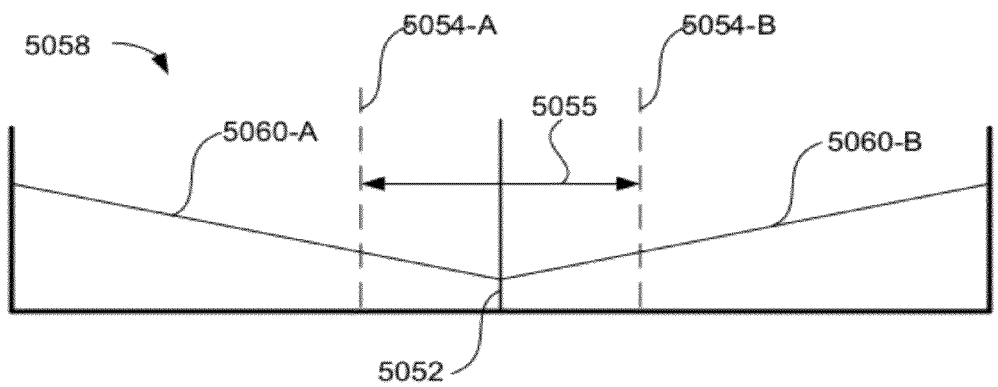

FIGS. 5A-5NNN illustrate exemplary user interfaces for manipulating soft keyboards in accordance with some embodiments. The user interfaces in these figures are used to illustrate the processes described below, including the processes in FIGS. 6A-6B, 7A-7B, 8A-8B, 9, 10A-10B, 11A-11D, 12A-12B, 13A-13B.

FIG. 5A depicts user interface (UI) 5000A displayed on touch-sensitive display 112 of a device (e.g., device 100). UI 5000A may be a user interface in an application (e.g., a notes application, a web browser application, etc.) on device 100. UI 5000A includes text entry area 5002. Cursor 5004 and input text 5006 are displayed in text entry area 5002.

Unsplit soft keyboard 5008 is displayed on display 112. The keys of unsplit soft keyboard 5008 are not split amongst two or more distinct keyboard portions. In some embodiments, unsplit soft keyboard 5008 includes keyboard split key 5012. In some embodiments, keyboard split key 5012 shows an icon or other graphical indicia (e.g., an icon or graphic showing two halves moving, as in splitting, apart) that keyboard split key 5012 may be used to switch to an integrated input area that includes a split soft keyboard.

FIG. 5A also depicts exemplary gestures that, if detected, activate splitting of unsplit soft keyboard 5008 in response. Gesture 5010 is a two-finger de-pinch gesture performed on unsplit soft keyboard 5008. Gesture 5010 includes finger contacts 5010-A and 5010-B moving apart from each other in directions 5011-A and 5011-B, respectively, on display 112. On the other hand, gesture 5014 is a tap gesture on keyboard split key 5012.

In response to detection of either gesture 5010 or 5014 on display 112, device 100 changes unsplit soft keyboard 5008 (FIG. 5A) into integrated input area 5016 (FIG. 5C). In some embodiments, an animation showing the transition from unsplit soft keyboard 5008 to integrated input area 5016 is displayed on display 112. For example, the transitional animation may show unsplit soft keyboard 5008 splitting into halves and center area 5016-C appearing between the halves, with the halves moving apart from each other in directions 5017-A and 5017-B. The halves become split keyboard portions 5016-A and 5016-B and the keys of unsplit soft keyboard 5008 are divided amongst the halves. In some embodiments, some keys are included in both left and right portions 5016-A and 5016-B of integrated input area 5016. FIG. 5B depicts user interface 5000B at an instant in the transitional animation from unsplit soft keyboard 5008 to integrated input area 5016. What was unsplit soft keyboard 5008 has transitioned into integrated input area 5016, with the keys of unsplit soft keyboard 5008 divided between two opposing portions. Upon completion of the transition animation, integrated input area 5016 is displayed, as shown in FIG. 5C.

FIG. 5C depicts user interface 5000C, with integrated input area 5016 displayed after completion of the transition animation. Integrated input area 5016 includes left split keyboard portion 5016-A and right split keyboard portion 5016-B, and center area 5016-C between split keyboard portions 5016-A and 5016-B. Split keyboard portions 5016-A and 5016-B and center area 5016-C form integrated input area 5016. In some embodiments, integrated input area 5016 includes keyboard unsplit key 5018, replacing keyboard split key 5012. In some embodiments, a character key is included in both split keyboard portions 5016-A and 5016-B. For example, "G" key 5019 is included in both portions 5016-A and 5016-B. In some embodiments, some keys in unsplit soft keyboard 5008 are not displayed in integrated input area 5016. For example, hide keyboard key 5009 (FIG. 5A) in unsplit soft keyboard 5008 is not displayed in integrated input area 5016.

In some embodiments, center area 5016-C displays duplicate cursor 5020 and duplicate input text 5022. Duplicate cursor 5020 and duplicate input text 5022 mirror cursor 5004 and at least a portion of input text 5006, respectively. The portion of input text 5006 that is visible in center area 5016-C as duplicate input text 5022 at any moment is typically the portion of input text 5006 that is in the immediate vicinity of cursor 5004. In some embodiments, duplicate cursor 5020 and duplicate input text 5006 are displayed at larger sizes than cursor 5004 and input text 5006, respectively. In some other embodiments, center area 5016 is empty, and text entry area 5002 is visible through center area 5016-C, as shown in FIG. 5K.

FIG. 5D depicts user interface 5000D, with gesture 5026 detected on display 112. Gesture 5026 is detected on "T" key 5024 in left split keyboard portion 5016-A. In response to detection of gesture 5026 on "T" key 5024, "T" key 5024 is activated and a "t" character is entered into input text 5006. Duplicate input text 5022 in center area 5016-C also shows the "t" character being entered, mirroring the entering of the "t" character into input text 5006.

FIG. 5E depicts user interface 5000E, showing gestures that, if detected, activate un-splitting of the split soft keyboard in integrated input area 5016 in response. Gesture 5028 is a two-finger pinch gesture performed on integrated input area 5016. Gesture 5028 includes finger contacts 5028-A and 5028-B moving toward each other in directions 5030-A and 5030-B, respectively, on display 112. On the other hand, gesture 5032 is a tap gesture on keyboard unsplit key 5018.

In response to detection of either gesture 5028 or 5032 on display 112, device 100 changes integrated input area 5016 into unsplit soft keyboard 5008. In some embodiments, an animation showing the transition from integrated input area 5016 to unsplit soft keyboard 5008 is displayed on display 112. For example, the transitional animation may show split keyboard portions 5016-A and 5016-B merging together and center area 5016-C reducing in size and eventually ceasing to be displayed. FIG. 5F depicts user interface 5000F at a point in the transitional animation. Integrated input area portions 5016-A and 5016-B are merging together in directions 5034-A and 5034-B and center area 5016-C continually reduces in size. Upon completion of the transition animation, unsplit soft keyboard 5008, including keyboard split key 5012, is displayed in UI 5000G, as shown in FIG. 5G.

FIG. 5H depicts user interface 5000H displayed on display 112. Tap gesture 5038 is detected at some time on "T" key 5036 in unsplit soft keyboard 5008. In response, "T" key 5036 is activated; a "t" character is entered into input text 5006 displayed in UI 5000I, as shown in FIG. 5I.

FIG. 5I also depicts gesture 5010 detected on display 112 at a time after the time of detection of gesture 5038. In some embodiments, whether integrated input area 5016 is displayed in place of unsplit soft keyboard 5008, in response to detection of gesture 5010 depends on the time when gesture 5038 is detected and the time when gesture 5010 is detected. If the time period between the time when gesture 5038 is detected and the time when gesture 5010 is detected exceeds a predefined period of time (e.g., 0.3, 0.5, or 1.0 seconds), then integrated input area 5016 is displayed in UI 5000K, as shown in FIG. 5K. In some embodiments, a transitional animation is displayed in UI 5000J, as shown in FIG. 5J. FIG. 5J is similar to FIG. 5B, and thus a detailed description of FIG. 5J is omitted for brevity. If the time period between the time when gesture 5038 is detected and the time when gesture 5010 is detected does not exceed the predefined period of time, then the display of unsplit soft keyboard 5008 is maintained. This use of a time threshold prevents accidental conversion of the unsplit keyboard 5008 into an integrated input area 5016 when the user is in the middle of typing using the unsplit keyboard.

FIG. 5L depicts user interface 5000L displayed on display 112. User interface 5000L may be a user interface in an application (e.g., a notes application, a web browser application, etc.) on device 100. User interface 5000L includes text entry area 5002 and integrated input area 5039. Integrated input area 5039 includes split keyboard portions 5039-A and 5039-B, and center area 5039-C. In some embodiments, integrated input area 5039 is integrated input area 5016, with duplicate input text and a duplicate cursor displayed in center area 5039-C.

In some embodiments, integrated input area 5039 may move to a different location on display 112 in response to a gesture (e.g., a dragging gesture). In FIG. 5L, two gestures are shown: gesture 5040 and gesture 5044. Gesture 5040 is a dragging gesture where the finger contact begins in center area 5039-C, as indicated by finger contact position 5040-1, and moves to position 5040-2. Gesture 5044 is a dragging gesture where the finger contact begins in split keyboard portion 5039-B, as indicated by finger contact position 5044-1, and moves to position 5044-2.

Whether integrated input area 5039 does move in response to detection of gesture 5040 or gesture 5044 depends on whether the magnitude of respective gesture 5040 or 5044, i.e., a distance the finger contact moves in the gesture, exceeds a respective predefined threshold. The amount of the threshold depends on whether the detected gesture begins in center area 5039 or in split keyboard portion 5039-A or 5039-B. For a gesture that starts in center area 5039-C, threshold 5042 is a predefined distance from the start of the gesture. For a gesture that starts in split keyboard portion 5039-B or 5039-A, threshold 5046 is a predefined distance from the start of the gesture. The distance for threshold 5046 is longer than the distance for threshold 5042. Thus, the integrated input area will start moving in accordance with the movement of the contact in gesture 5040 before the integrated input area will start moving in accordance with the movement of the contact in gesture 5044. The distance threshold is greater over the split keyboard portions of the integrated input area (as compared to the center portion of the integrated input area) to prevent accidental movement of the integrated input area when a user contact moves during typing with the split keyboard.

In some embodiments, a distance threshold is compared against the vertical distance component of the gesture. In some other embodiments, the distance threshold is compared against the complete gesture, including both the horizontal and vertical distance components; the threshold is compared against the absolute distance of the gesture. Thus, for example, alternative thresholds 5046 and 5048 are shown for gesture 5044. Threshold 5046 is compared to the vertical component of gesture 5044. Threshold 5048, on the other hand, is compared to the complete gesture 5044.

If either gesture 5040 or 5044 is detected, and the detected gesture exceeds a respective threshold in accordance with where the detected gesture began, then integrated input area 5039 moves vertically in accordance with the direction of the detected gesture in UI 5000M, as shown in FIG. 5M. Split keyboard portions 5039-A, 5039-B, and center area 5039-C move together as one integrated unit in a vertical direction. Movement of integrated input area 5039 is typically restricted to vertical—up or down—movement, which keeps the left and right split keyboard portions adjacent to the left and right sides of the display, respectively, when the integrated input area is moved. In turn, this keeps the keys in the left and right split keyboard portions easily reachable by the left and right thumbs, respectively, during two-thumb typing.

FIG. 5N illustrates two charts showing the amount of the threshold based on where on display 112 the gesture begins. Chart 5050 shows the amount of the threshold according to some embodiments. Chart 5050 has an x-axis being the position along the width of display 112 and the y-axis being the magnitude of the threshold, with the ends of the x-axis representing the left and right edges of display 112. Line 5052 is a line marking the center axis of display 112. Span 5055 between lines 5054-A and 5054-B represent the width of center area 5039-C. The areas outside of span 5055 represent the widths of split keyboard portions 5039-A and 5039-B. A first value is defined for threshold 5056-B, for gestures that begin in center area 5039-C. Threshold 5056-B is constant for the width of center area 5039-C. A second value is defined for threshold 5056-A, for gestures that begin in either split keyboard portion 5039-A or 5039-B. Threshold 5056-A is constant for the widths of split keyboard portions 5039-A or 5039-B.

Chart 5058 shows the amount of the threshold according to some alternative embodiments. Chart 5058 has an x-axis being the position along the width of display 112 and the y-axis being the magnitude of the threshold, with the ends of the x-axis representing the left and right edges of display 112. Span 5055 between lines 5054-A and 5054-B represents the width of center area 5039-C. The areas outside of span 5055 represent the widths of split keyboard portions 5039-A and 5039-B. Chart 5058 shows threshold amounts 5060-A and 5060-B defined to be a particular amount at center line 5052 and increasing linearly from that amount with the distance from center line 5052. Under either chart 5050 or 5058, the threshold within center area 5039-C is lower than the threshold in split keyboard portion 5039-A or 5039-B. In center area 5039-C, the distance threshold is lower because there is less opportunity for confusing a dragging gesture (for moving integrated input area 5039) with a key activation gesture (for entering a character).

Figure 5O:
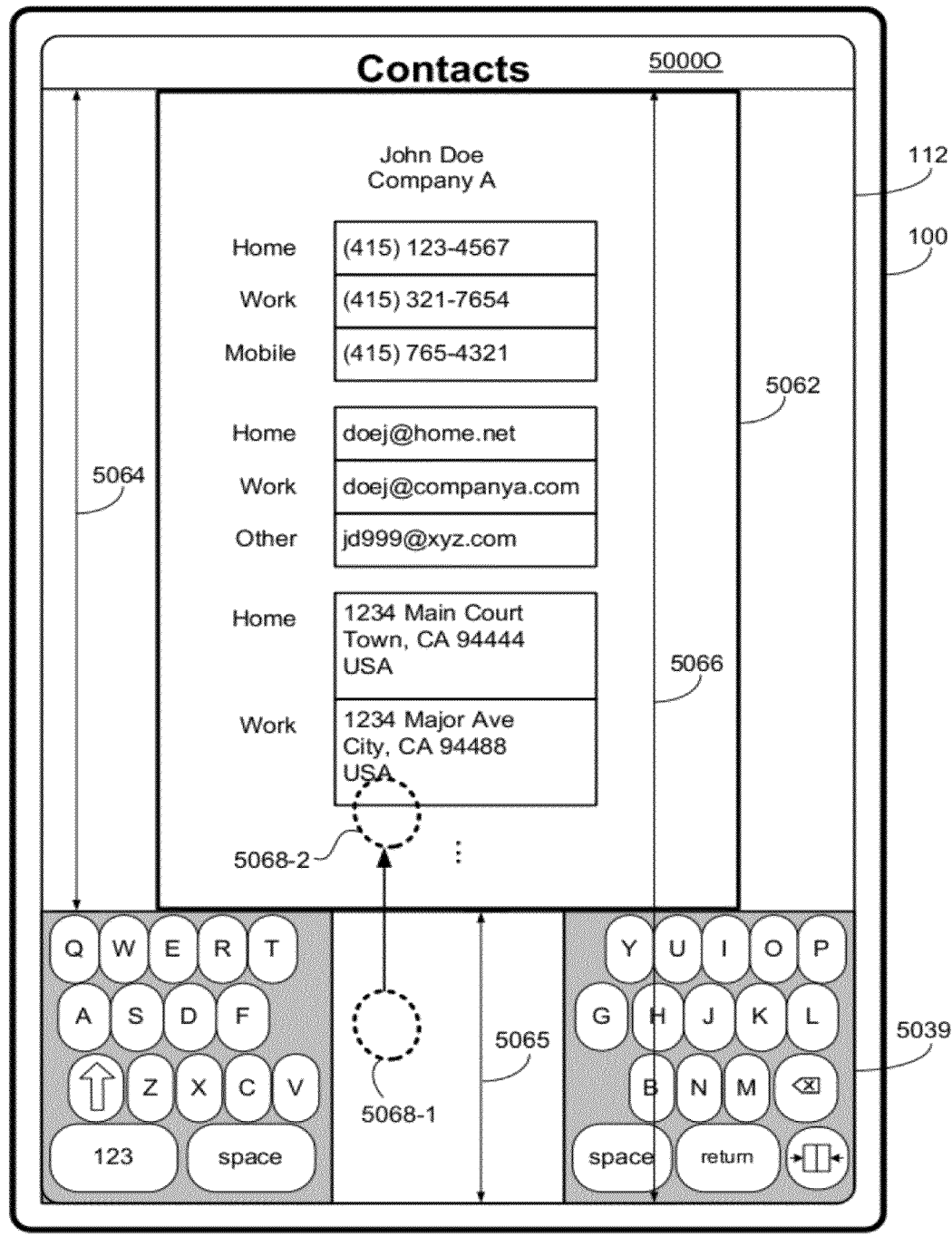

FIG. 5O depicts UI 5000O. UI 5000O includes application content area 5062, with height 5064, displayed on display 112. UI 5000O also includes integrated input area 5039, with height 5065, docked at the bottom on display 112. The sum of height 5064 and height 5065 is equal (or substantially equal, e.g., within 10 pixels) to height 5066 of display 112. Gesture 5068 is detected on display 112. Gesture 5068 includes a finger contact moving on display 112 from position 5068-1 to position 5068-2.

Figure 5P:
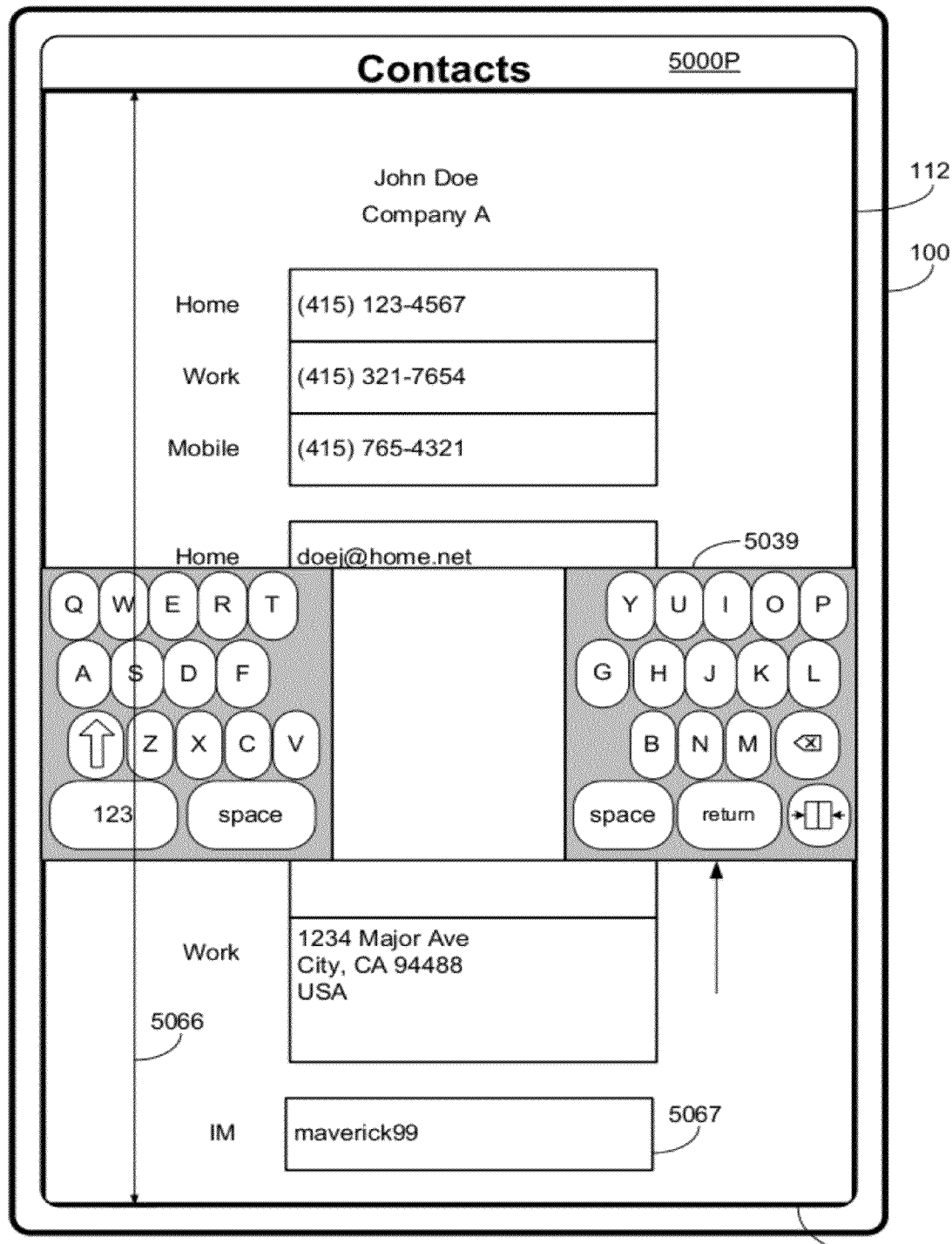

In response to detecting gesture 5068, integrated input area 5039 is undocked and moves vertically in accordance with the direction of gesture 5068 in UI 5000P, as shown in FIG. 5P. Integrated input area 5039 is displayed as an overlay over application content area 5062 in FIG. 5P. Also in response to detecting gesture 5068, application content area 5062 increases in size to occupy height 5066. As a result of the increase in size, content in application content area 5062 that was previously not visible in UI 5000O absent scrolling may become visible in UI 5000P. For example, instant messaging (IM) field 5067 is visible in UI 5000P without scrolling. Thus, when an input area with a keyboard is "undocked" from the bottom of the display, more display area is used to display the application content area and the input area "floats" over the application content area.

Figure 5Q:
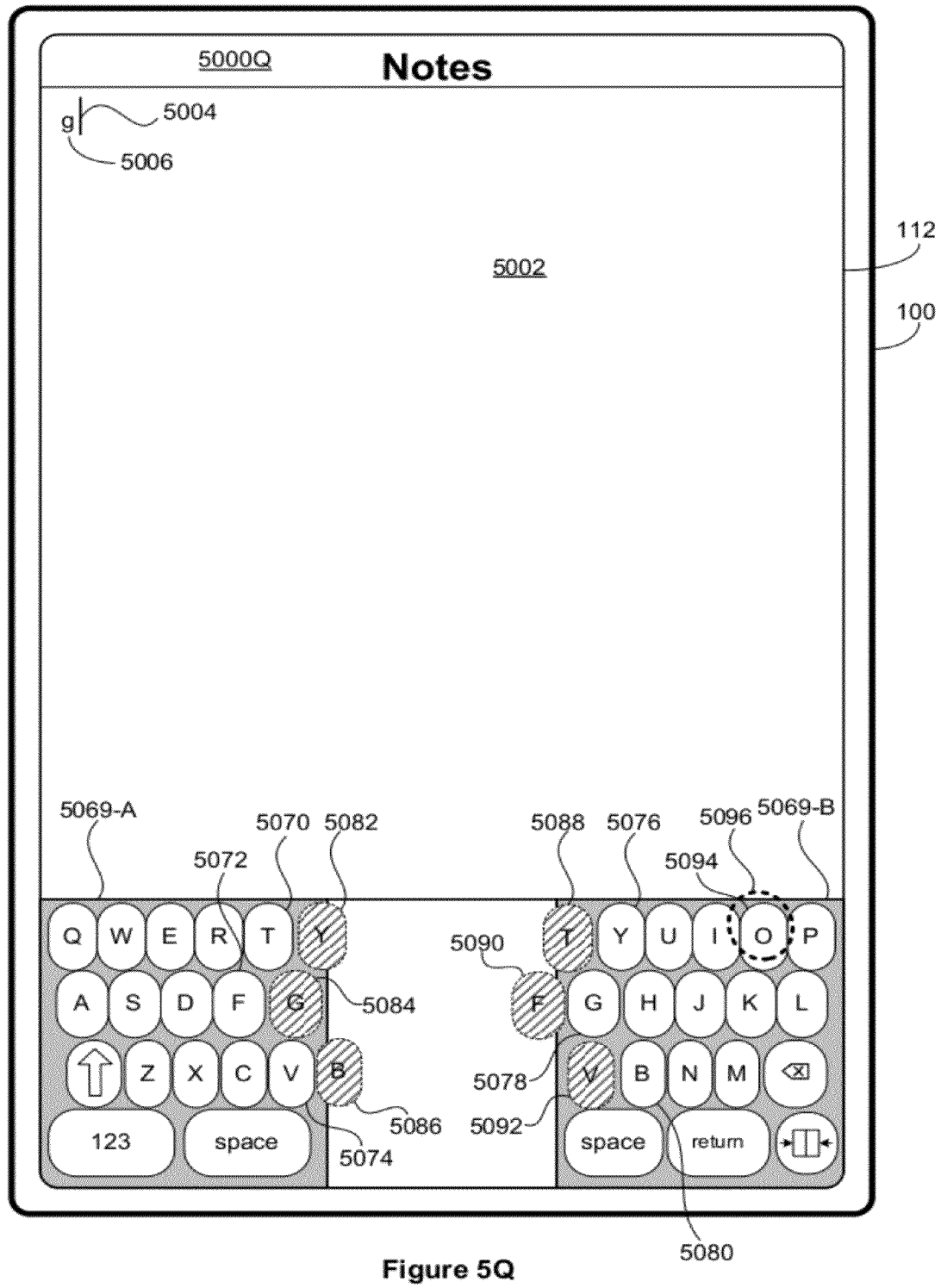

FIG. 5Q depicts UI 5000Q displayed on display 112. UI 5000Q includes text entry area 5002 and split soft keyboard 5069. In some embodiments, split soft keyboard 5069 is part of integrated input area 5016 or 5039. Cursor 5004 and input text 5006 are displayed in text entry area 5002. Split keyboard 5069 includes left split keyboard portion 5069-A and right split keyboard portion 5069-B. In left split keyboard portion 5069-A, the rightmost letter keys include "T" key 5070, "F" key 5072, and "V" key 5074. In right split keyboard portion 5039-B, the leftmost letter keys include "Y" key 5076, "G" key 5078, and "B" key 5080.

To the right of "T" key 5070, "F" key 5072, and "V" key 5074 in left split keyboard portion 5069-A are undisplayed key activation areas 5082, 5084, and 5086, respectively. Activation area 5082 corresponds to "Y" key 5076. Activation area 5084 corresponds to "G" key 5078. Activation area 5086 corresponds to "B" key 5080. The undisplayed key activation areas are typically the same size as or slightly larger (e.g., up to 10% larger) than the corresponding key. The diagonal lines in activation areas 5082, 5084, and 5086 in the figures are used to indicate that these activation areas are not displayed to the user, whereas the corresponding keys are displayed.

To the left of "Y" key 5076, "G" key 5078, and "B" key 5080 are undisplayed key activation areas 5088, 5090, and 5092, respectively. Activation area 5088 corresponds to "T" key 5070. Activation area 5090 corresponds to "F" key 5072. Activation area 5092 corresponds to "V" key 5074. The undisplayed key activation areas are typically the same size as or slightly larger (e.g., up to 10% larger) than the corresponding key. The diagonal lines in activation areas 5088, 5090, and 5092 in the figures are used to indicate that these activation areas are not displayed to the user, whereas the corresponding keys are displayed.

FIG. 5Q also shows gesture 5096 (e.g., a tap gesture) detected on "O" key 5094 in right split keyboard portion 5069-B. In response to detection of gesture 5096, a character "o" is entered into input text 5006 in UI 5000R, as shown in FIG. 5R.

Figure 5R:
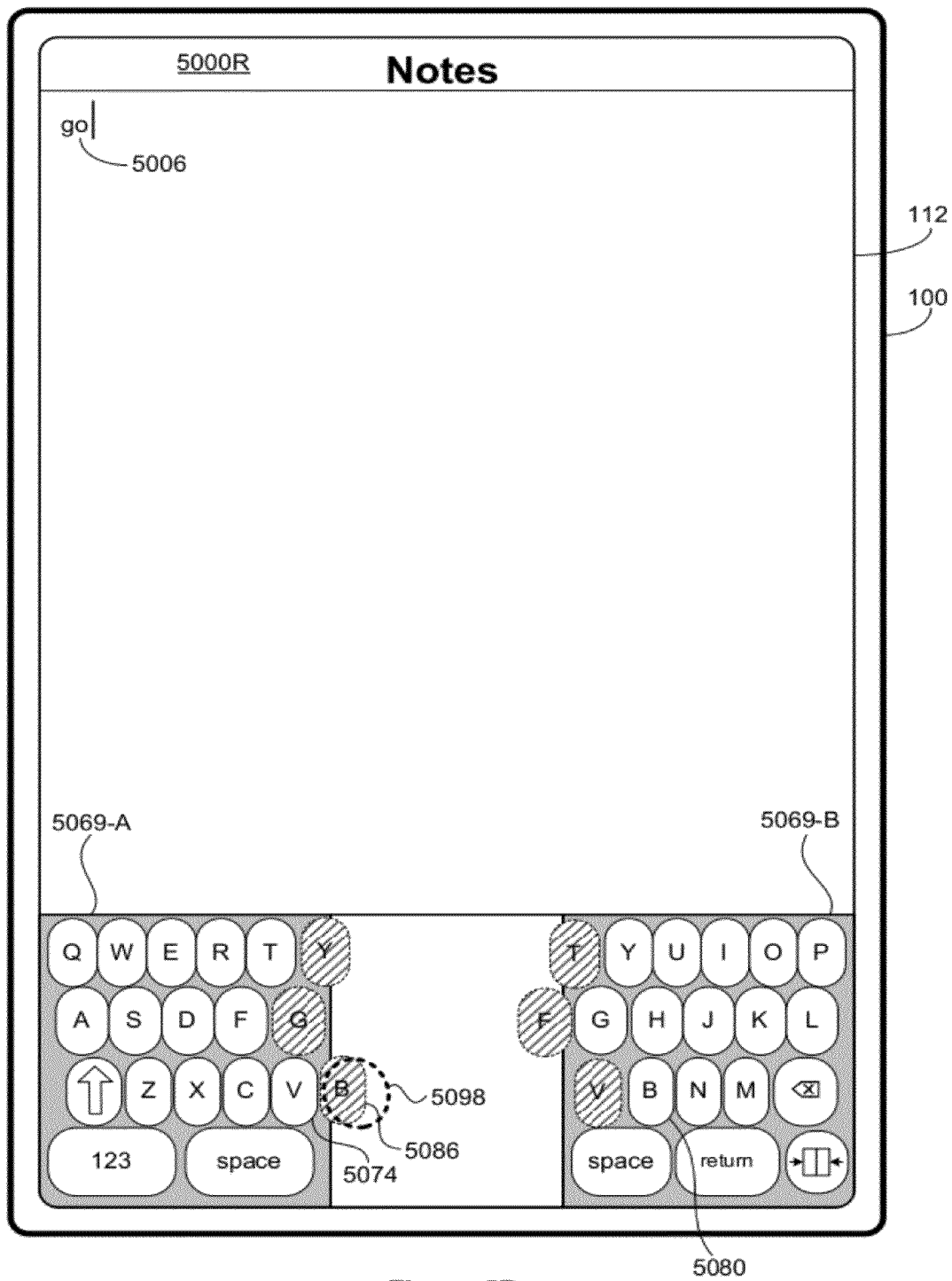
Figure 5S:
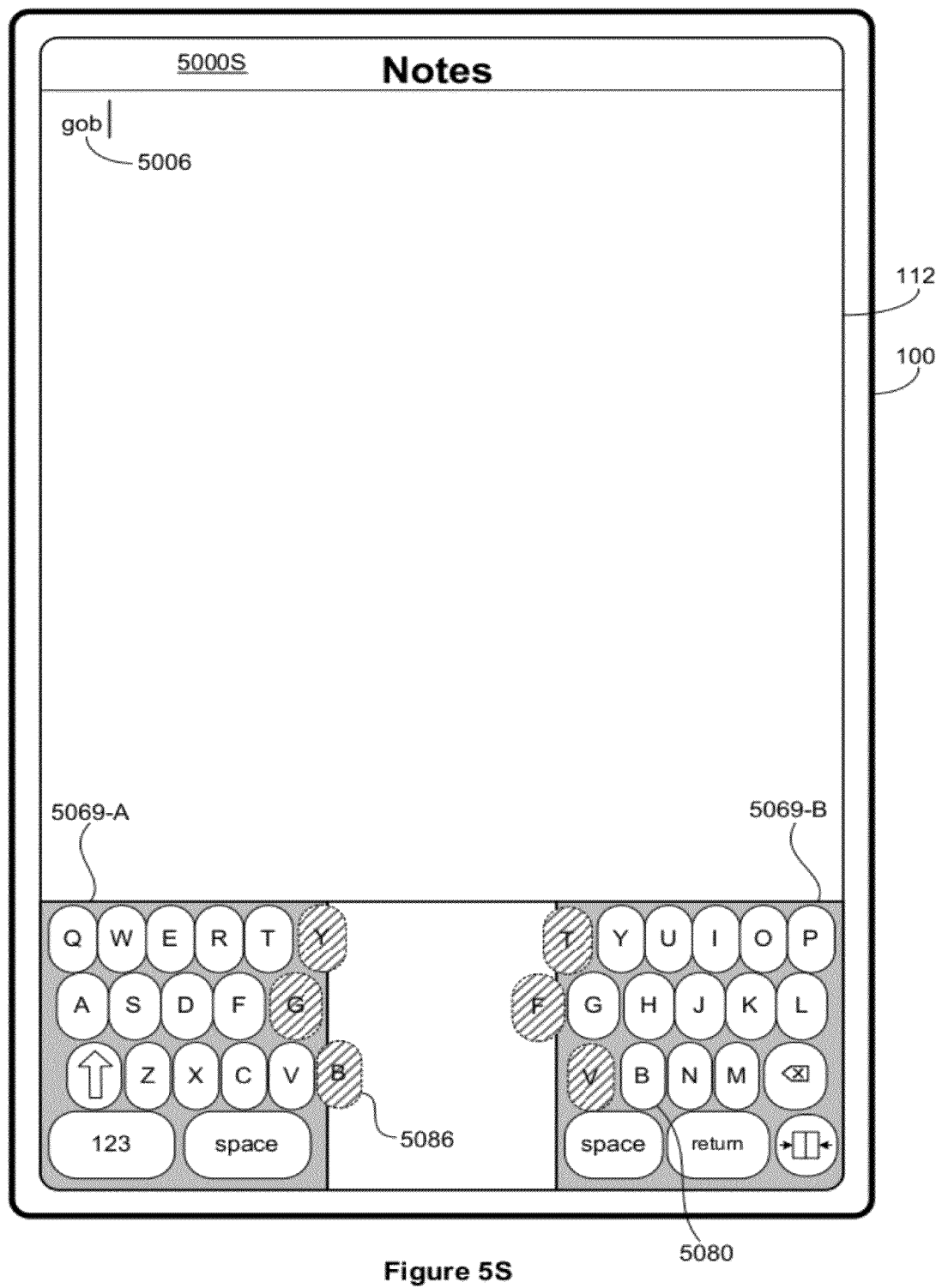

FIG. 5R also shows gesture 5098 detected on key activation area 5086 following detection of gesture 5096. In some embodiments, in response to detection of gesture 5098, a character "b" is entered into input text 5006 in UI 5000S, as shown in FIG. 5S, as key activation area 5086 corresponds to "B" key 5080.

In some other embodiments, a character "b" is entered into input text 5006 in response to detection of gesture 5098 if the time period between the time of detection for gesture 5096 and the time of detection for gesture 5098 is less than a predefined period of time. If the time period exceeds the predefined period, entering of the character "b" is foregone; gesture 5098 is ignored.

Figure 5T:
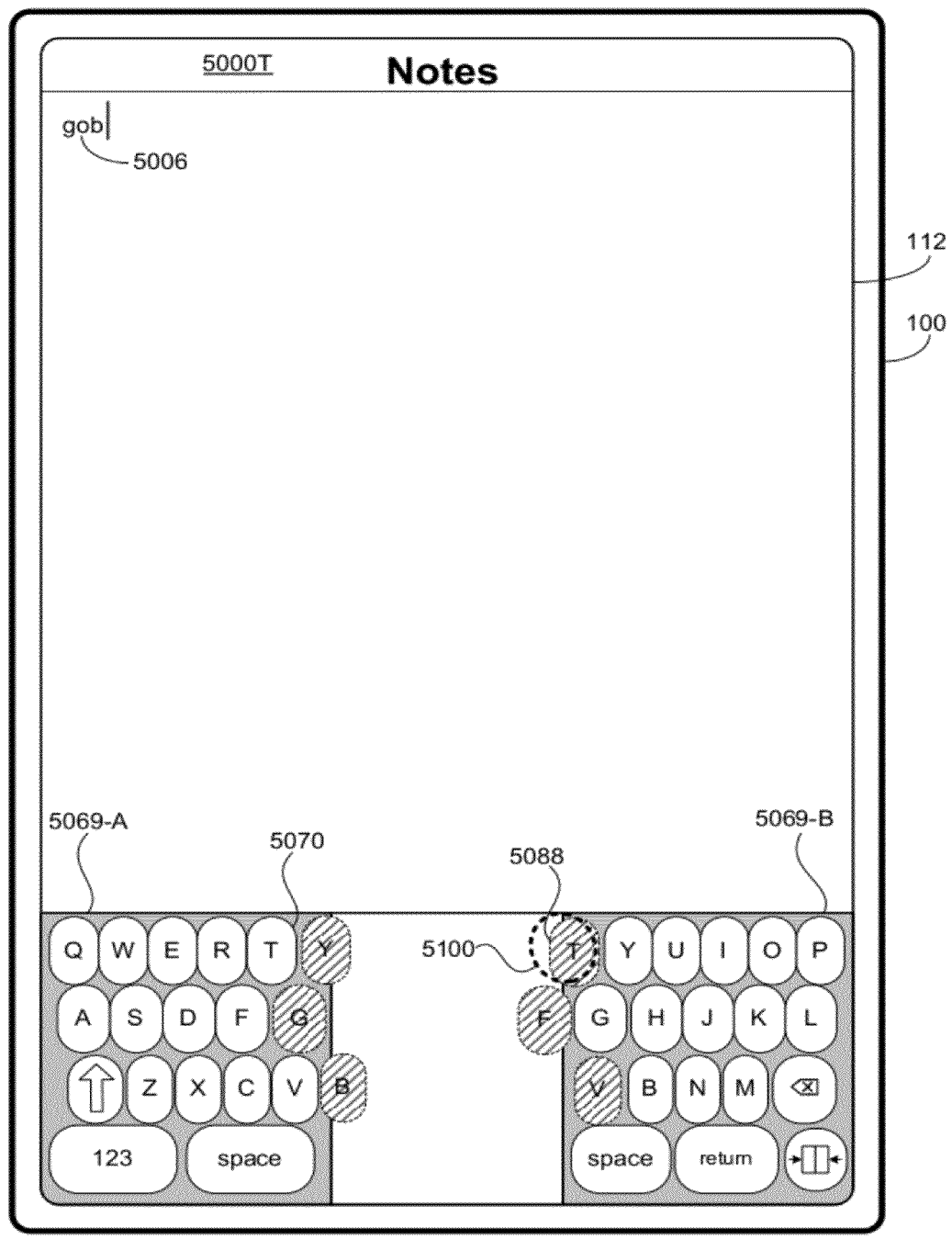
Figure 5U:
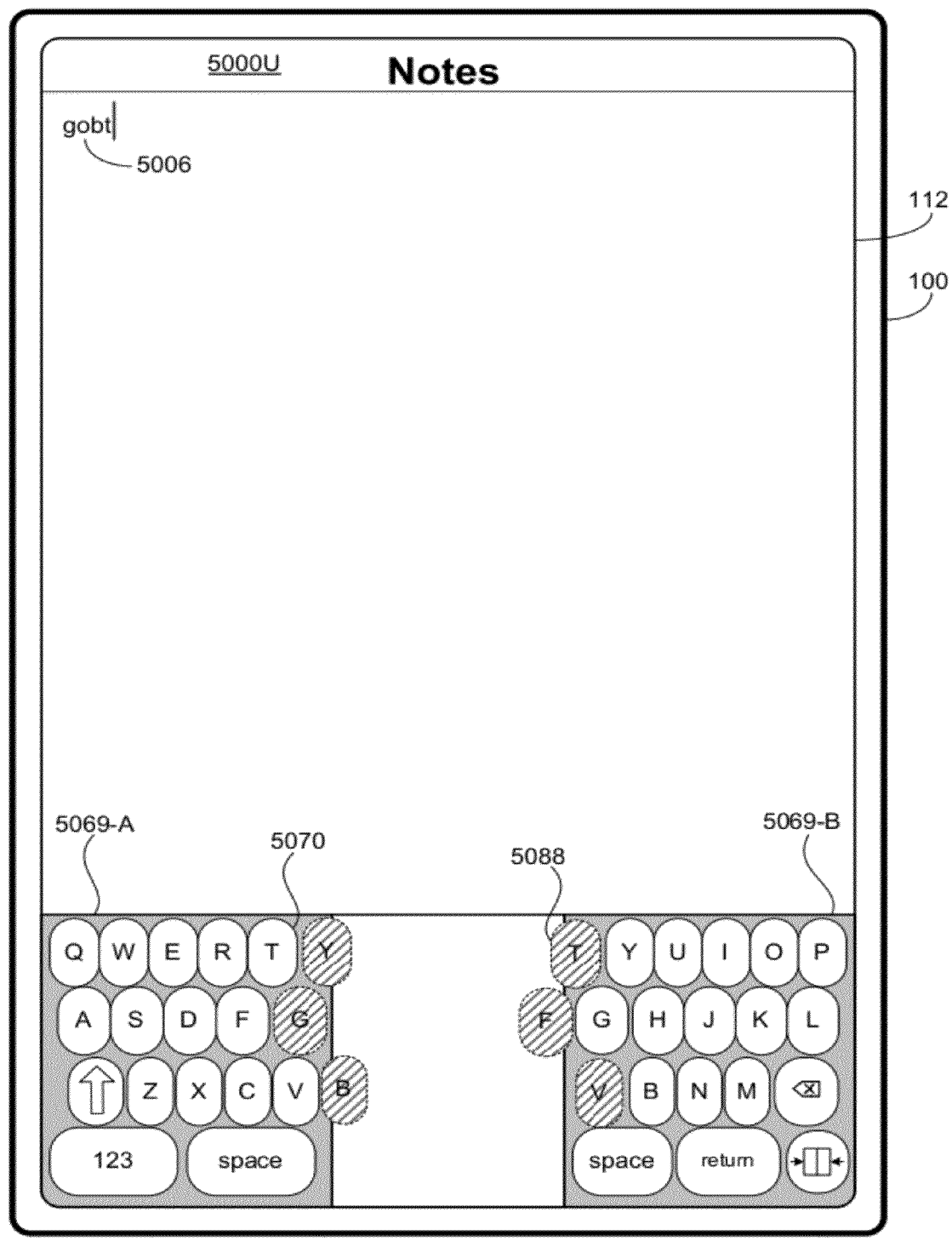

FIG. 5T shows UI 5000T, with gesture 5100 detected on key activation area 5088. In response to detection of gesture 5100, a character "t" is entered into input text 5006 in UI 5000U, as shown in FIG. 5U, as key activation area 5088 corresponds to "T" key 5070.

Figure 5V:
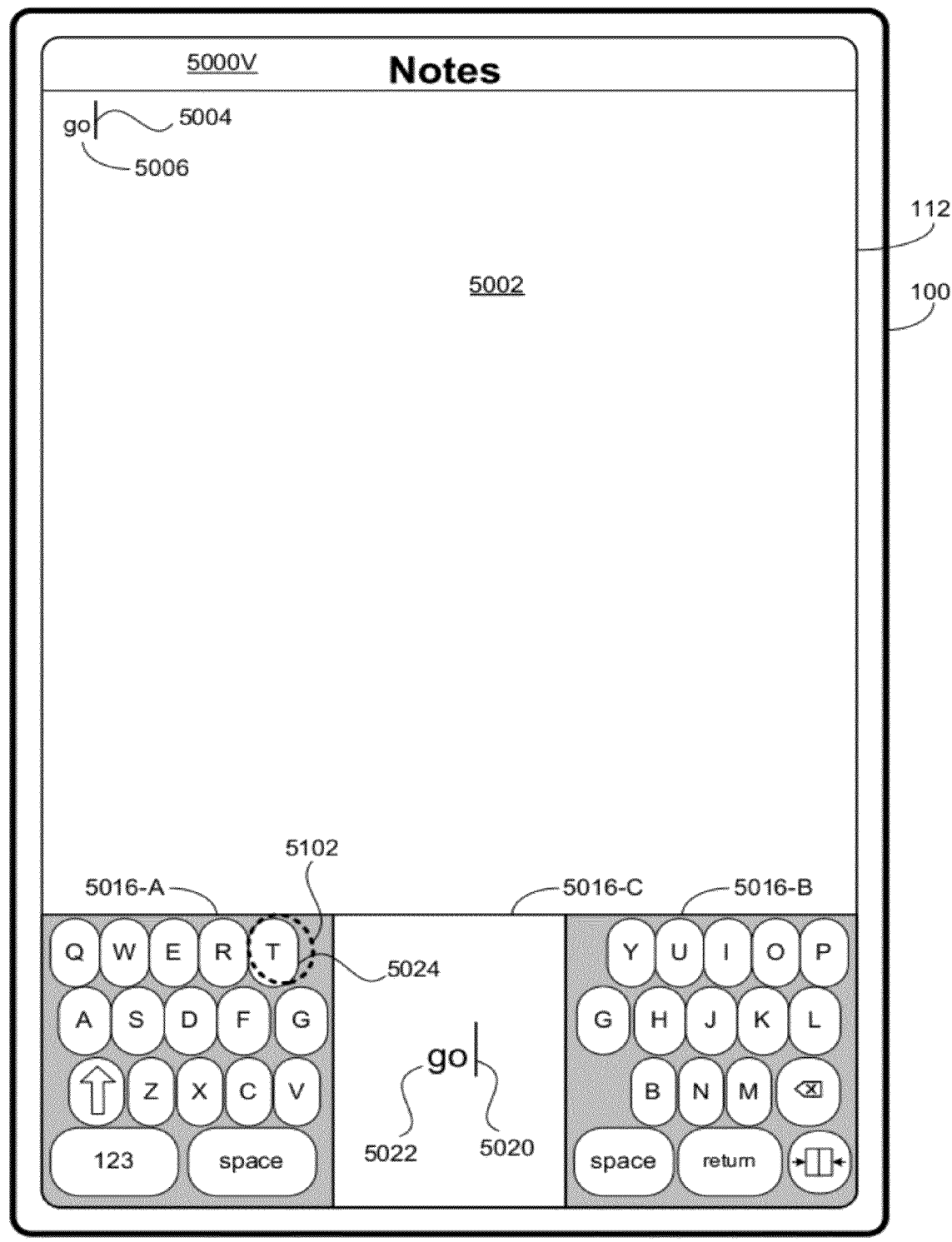

FIG. 5V depicts UI 5000V. UI 5000V includes text entry area 5002 and integrated input area 5016. Integrated input area 5016 includes split keyboard portions 5016-A (the left portion) and 5016-B (the right portion) and center area 5016-C. Cursor 5004 and input text 5006 are also displayed in text entry area 5002. Cursor 5004 and input text 5006 are mirrored in center area 5016-C as duplicate cursor 5020 and duplicate input text 5022, respectively. In some embodiments, duplicate cursor 5020 and duplicate input text 5022 are displayed at larger sizes than cursor 5004 and input text 5006, respectively.

Figure 5W:
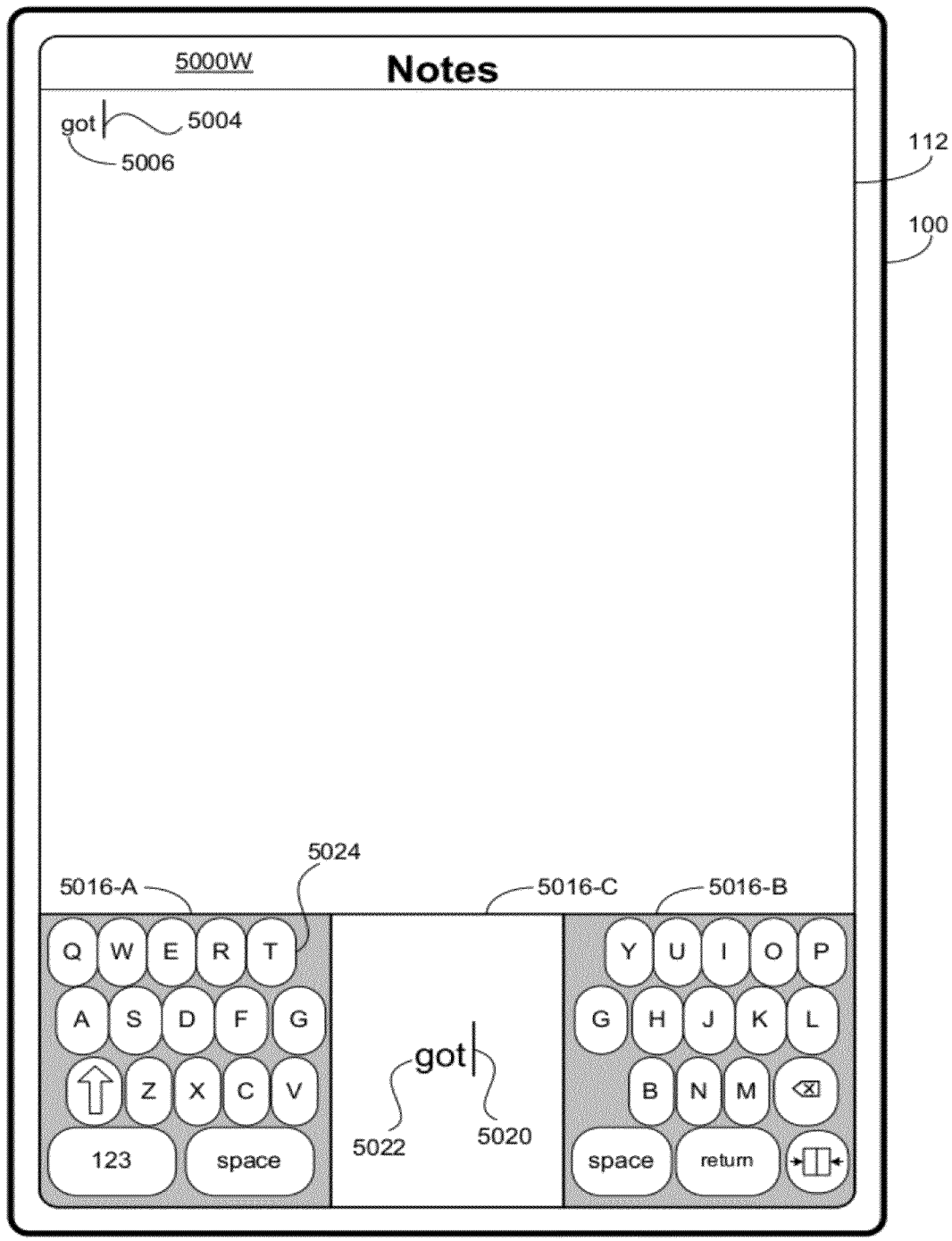

FIG. 5V also shows gesture 5102 (e.g., a tap gesture) detected on "T" key 5024 in left split keyboard portion 5016-A. In response to detection of gesture 5102, a character "t" is entered into input text 5006 in UI 5000W, as shown in FIG. 5W. Input text 5006, including the newly entered character "t," is mirrored in center area 5016-C, as duplicate input text 5022 also shows the newly entered letter "t."

Figure 5X:
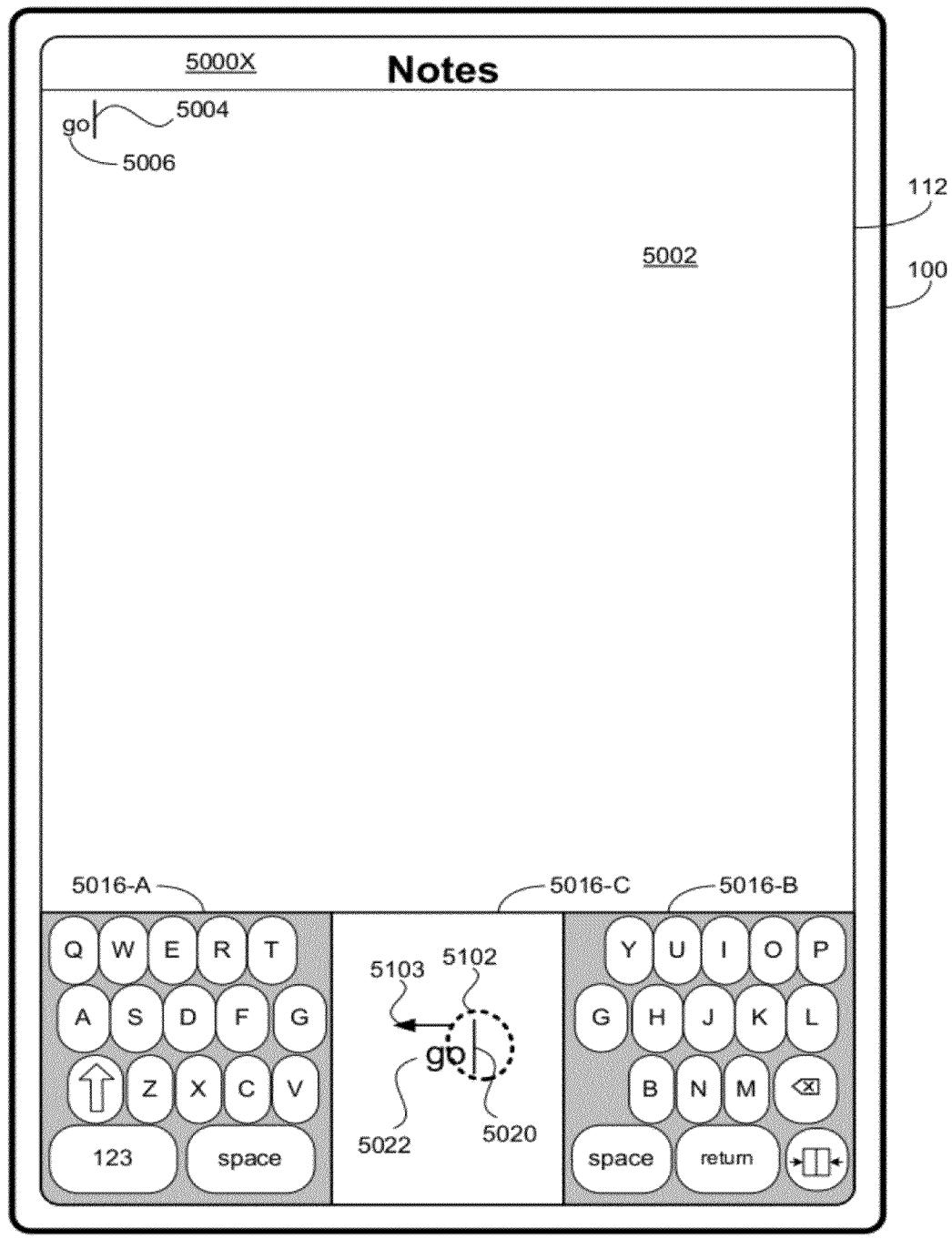
Figure 5Y:
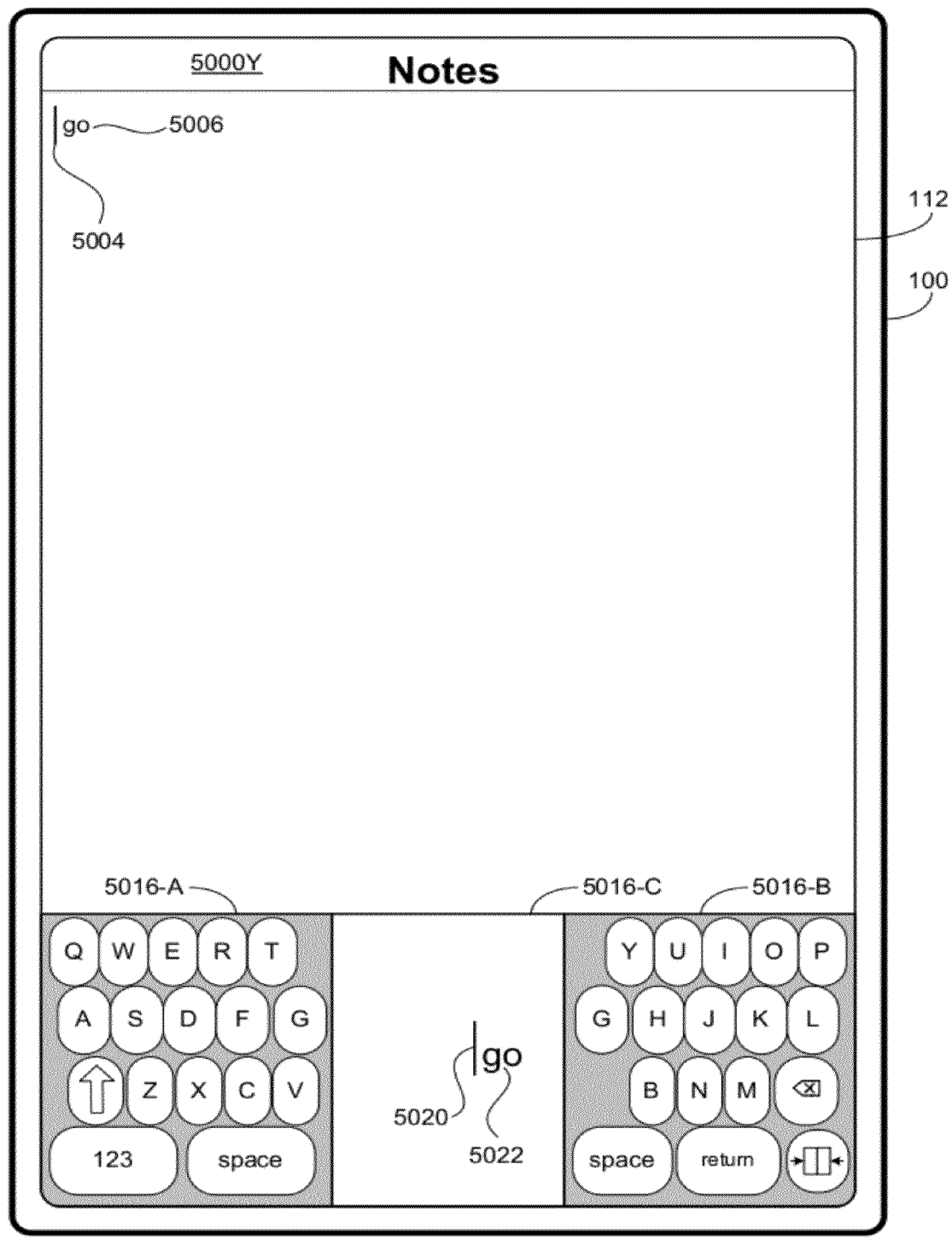

FIG. 5X shows UI 5000X, with gesture 5102 detected on duplicate cursor 5020 in center area 5016-C, while duplicate cursor 5020 is located at the end of duplicate input text 5022 (mirroring cursor 5004 being located at the end of input text 5006). Gesture 5102 is a dragging gesture, with the finger contact moving in direction 5103. In response to detection of gesture 5102 on duplicate cursor 5020, cursor 5004 is moved to a different position in input text 5006 in accordance with direction 5103 in UI 5000Y, as shown in FIG. 5Y. The result of the movement of cursor 5004 is mirrored in center area 5016-C, as duplicate input text 5022 is moved so that duplicate cursor 5020 is in the same position relative to duplicate input text 5022 as cursor 5004 is relative to input text 5006. In some embodiments, duplicate cursor 5020 remains stationary within center area 5016-C, and its position relative to duplicate input text 5022 changes by advancing or retreating duplicate input text 5022, as shown in FIG. 5Y.

Figure 5Z:
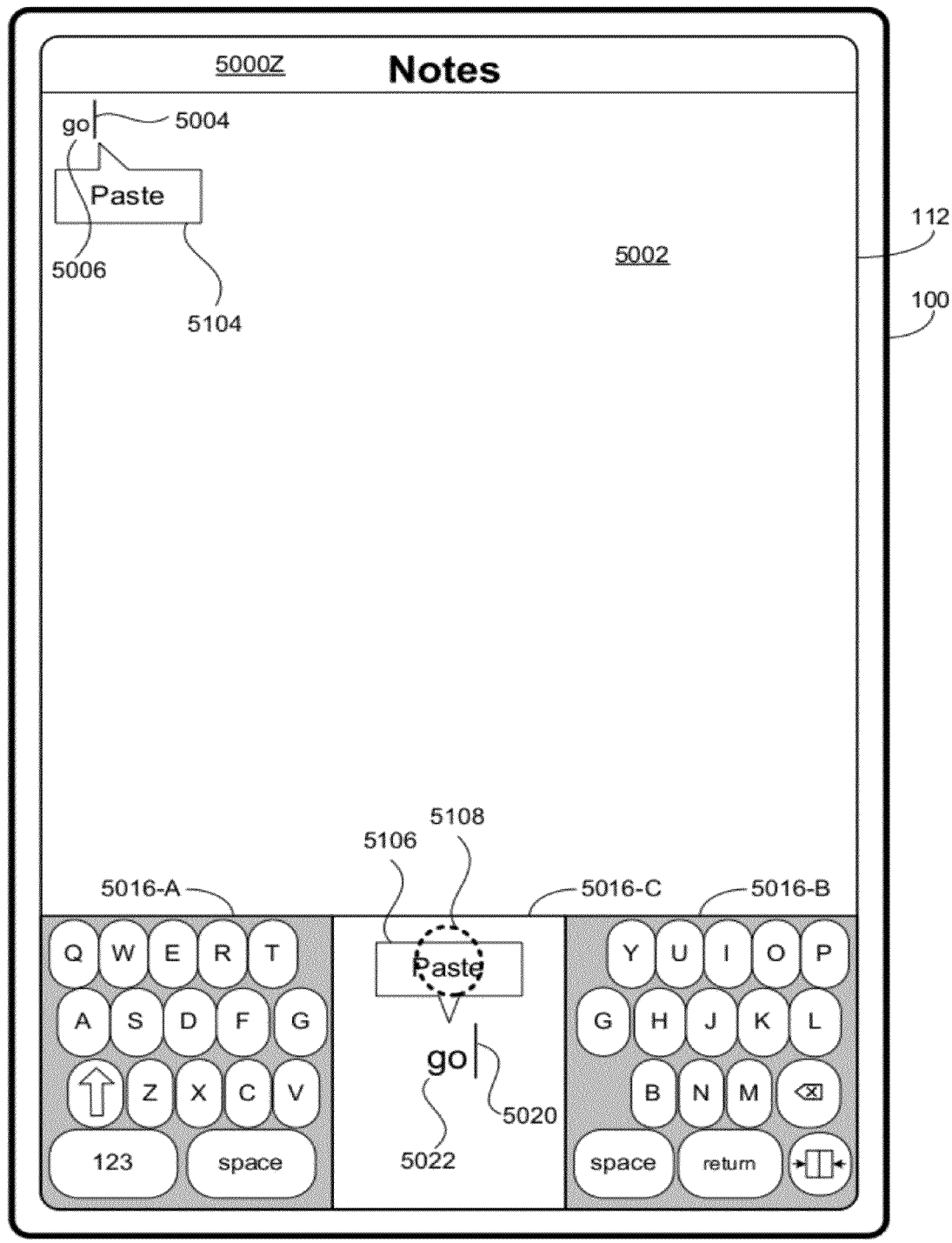
Figure 5A:
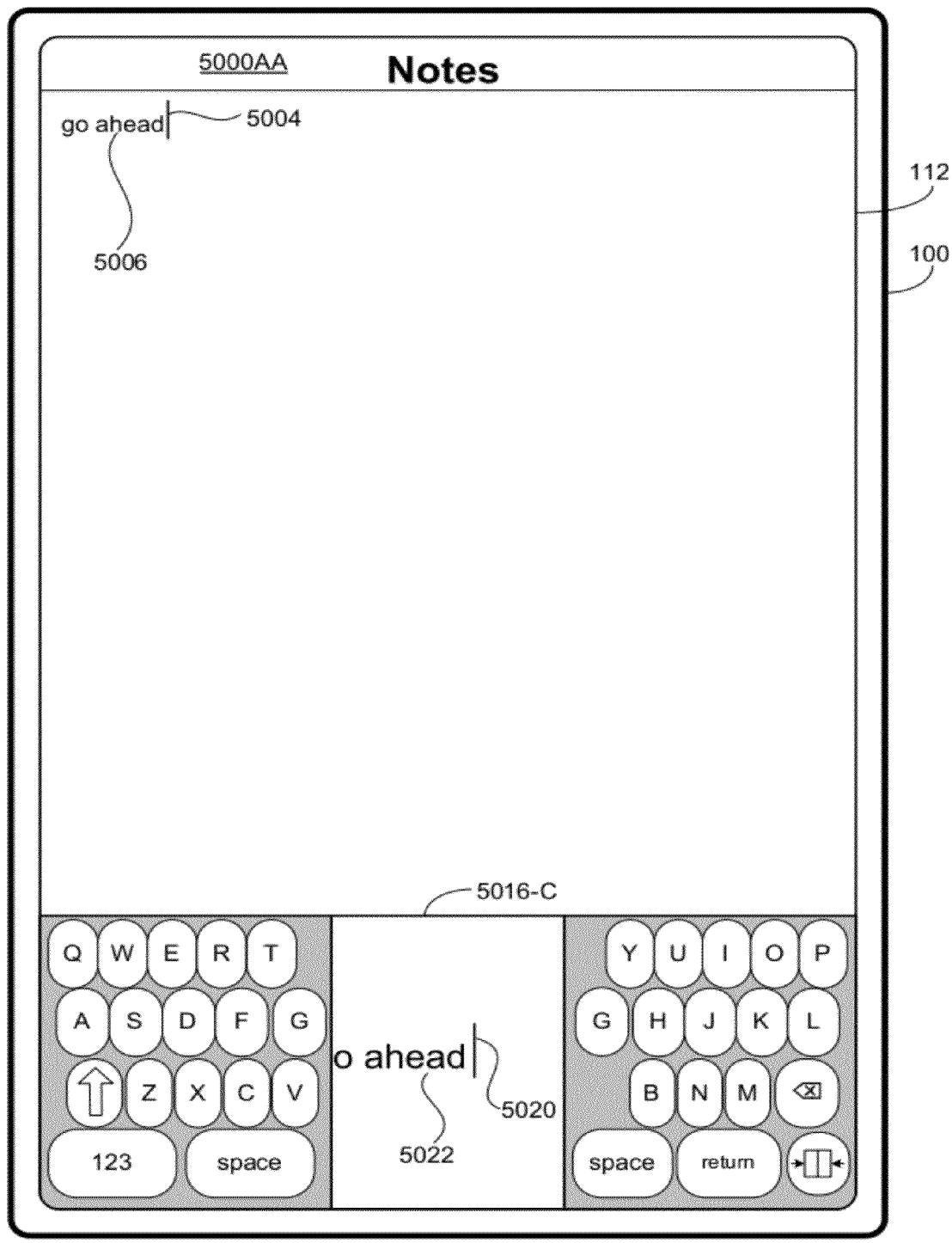
Figure 5B:
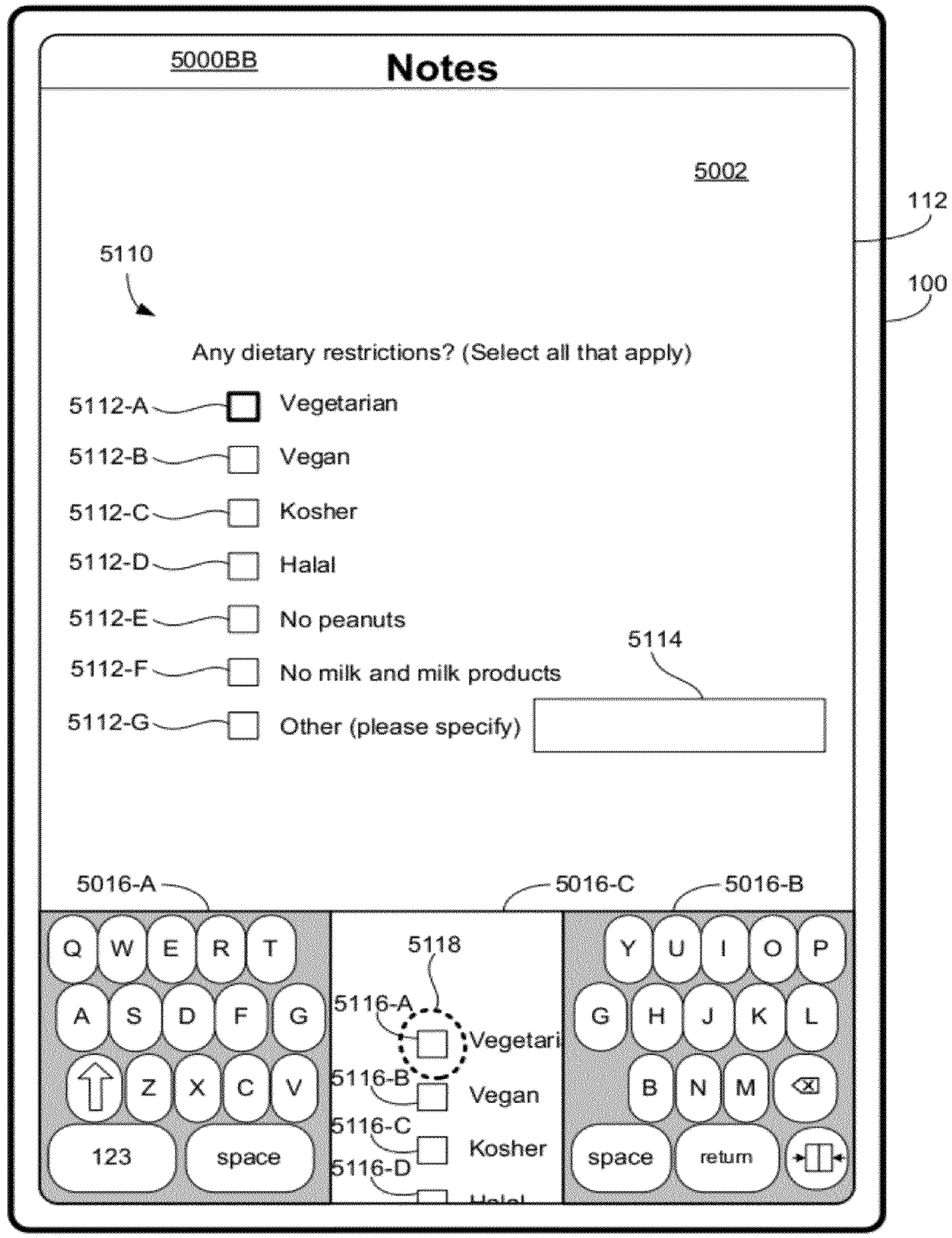
Figure 5D:
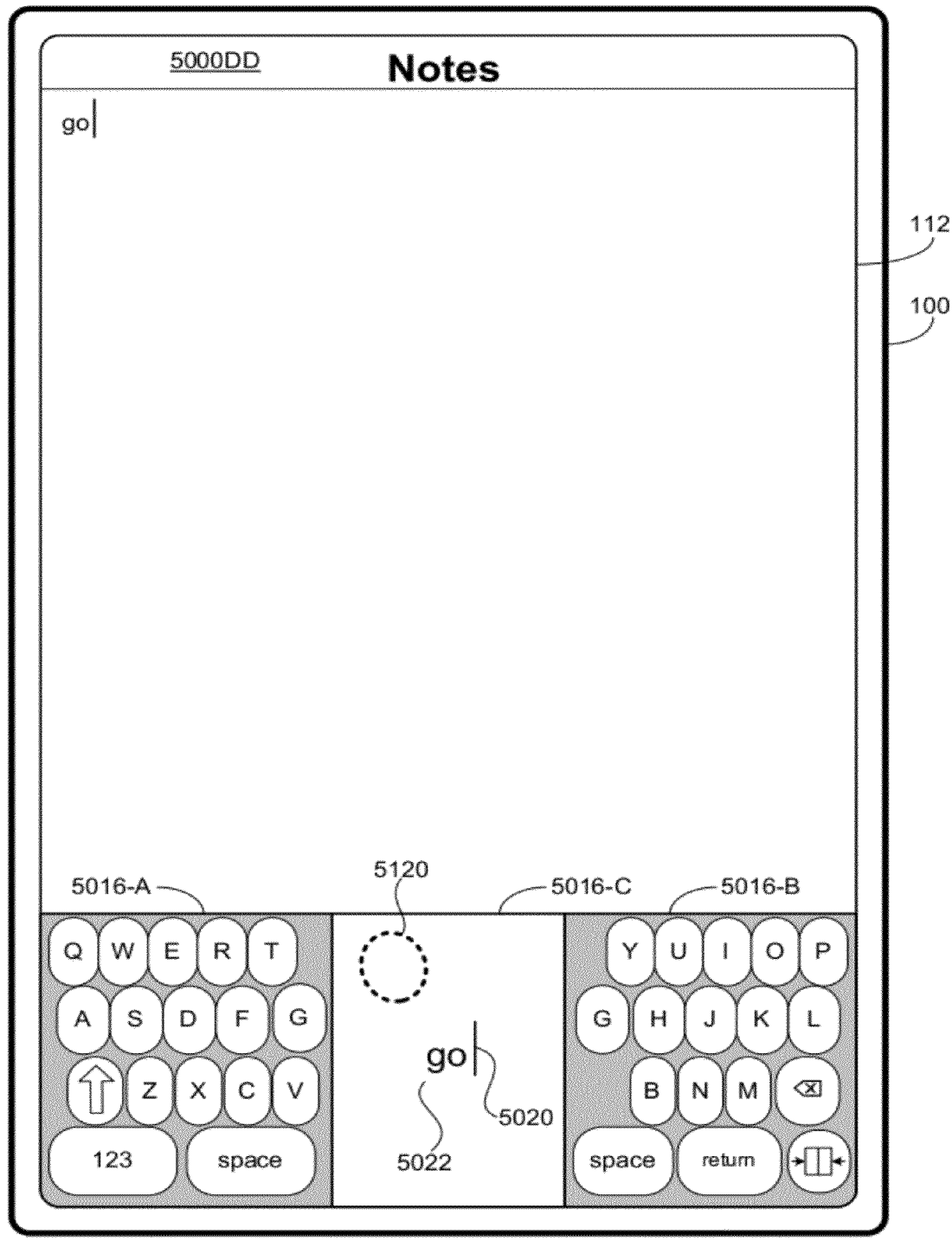
Figure 5E:
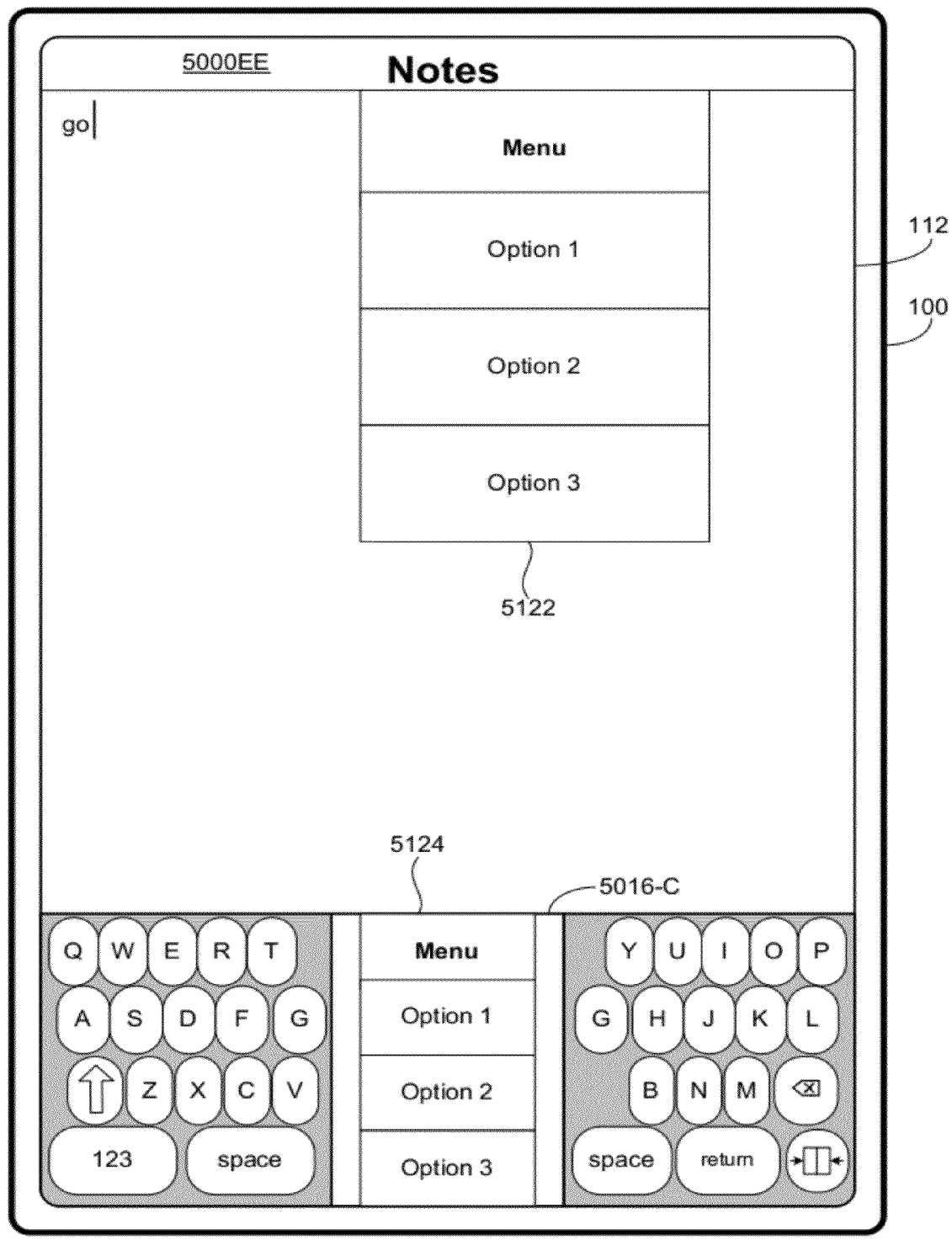
Figure 5F:
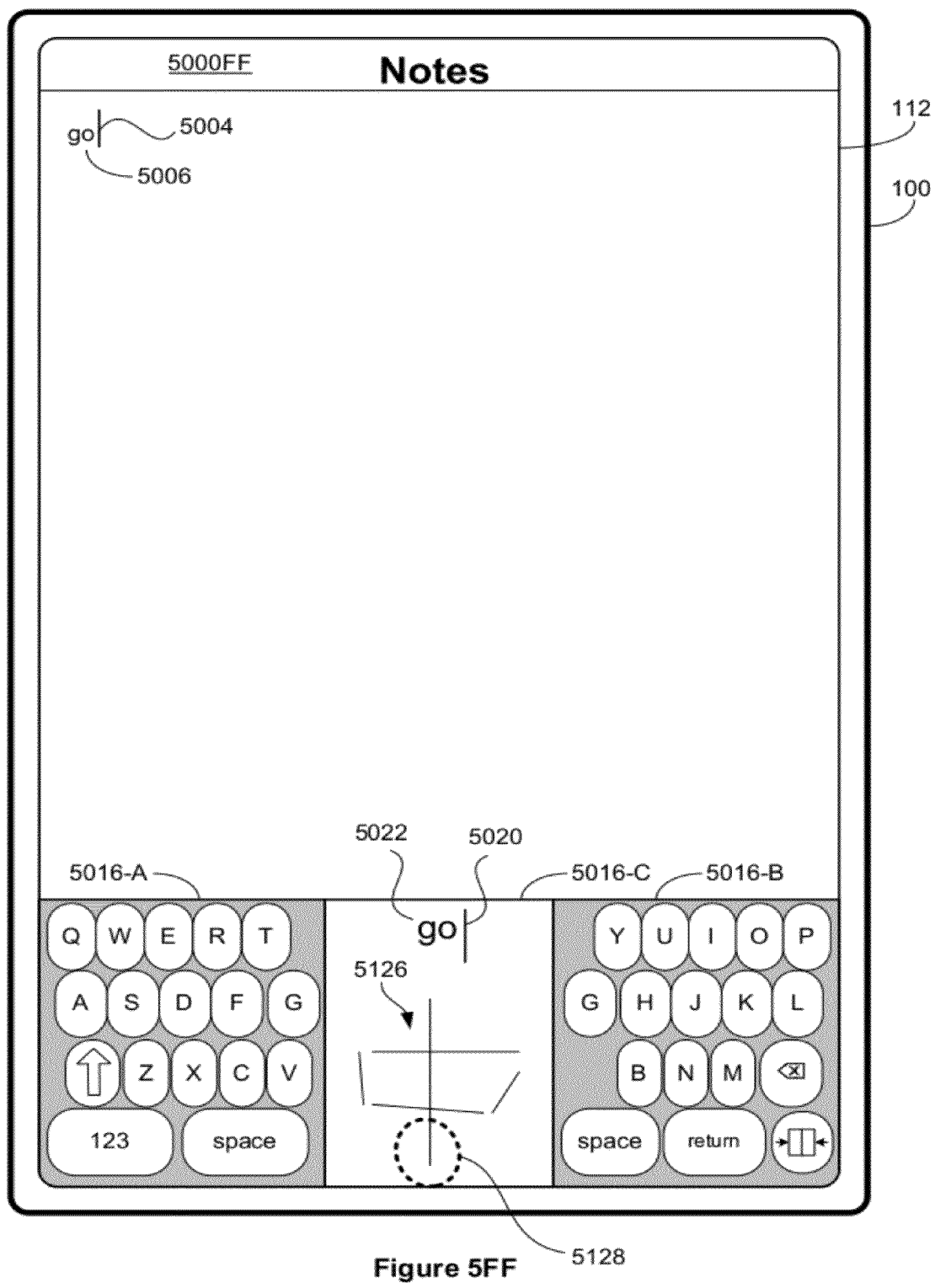
Figure 5G:
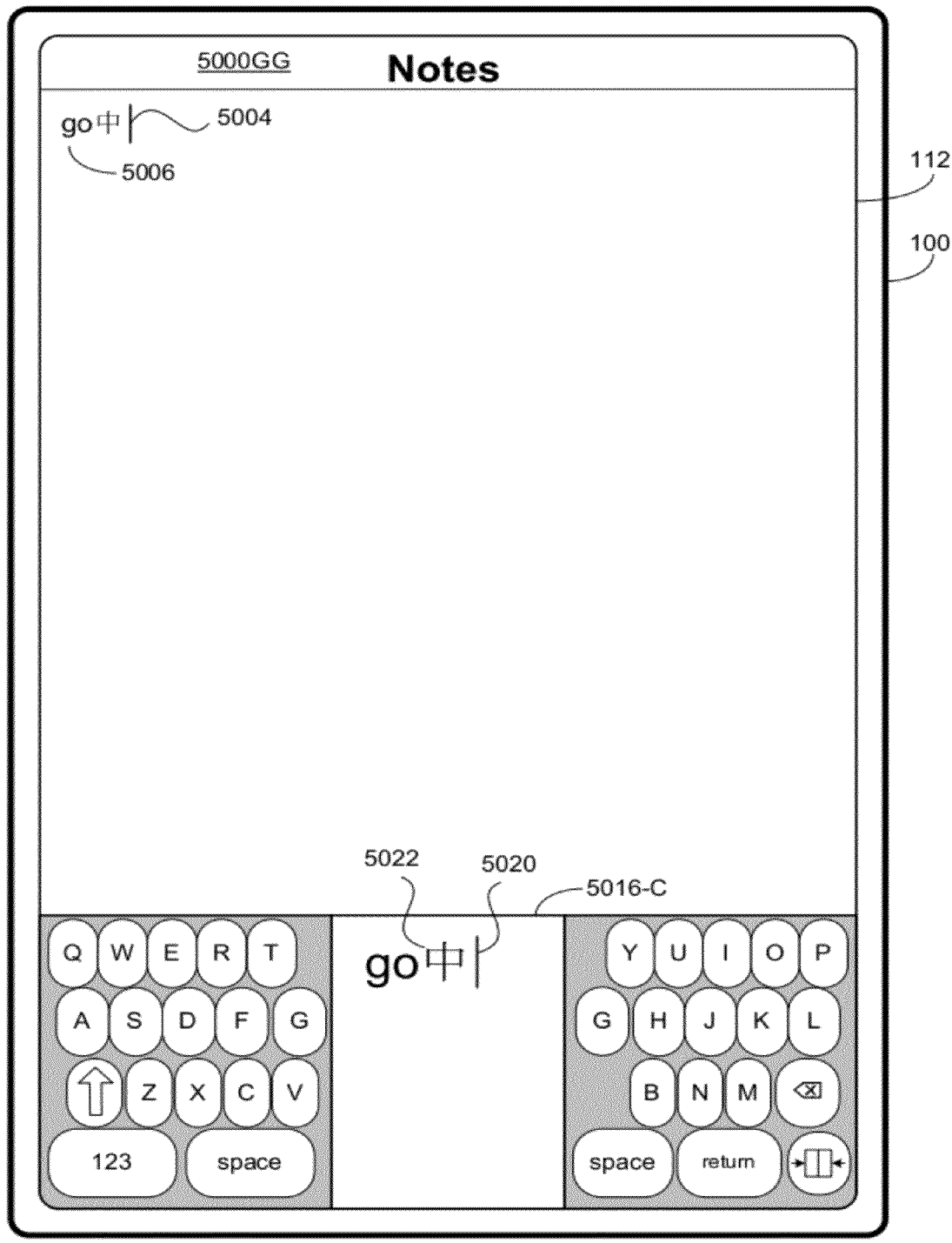
Figure 5H:
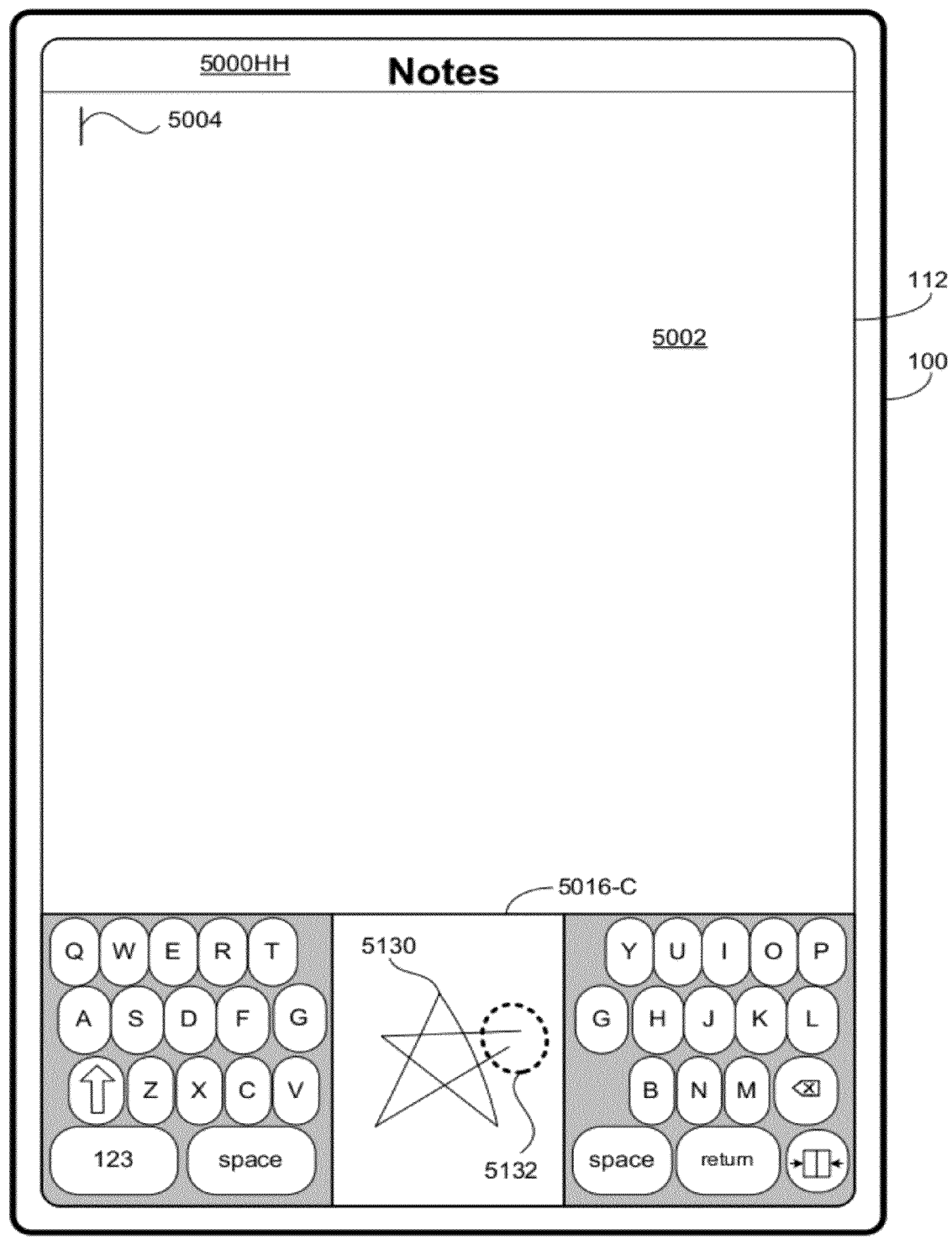
Figure 5I:
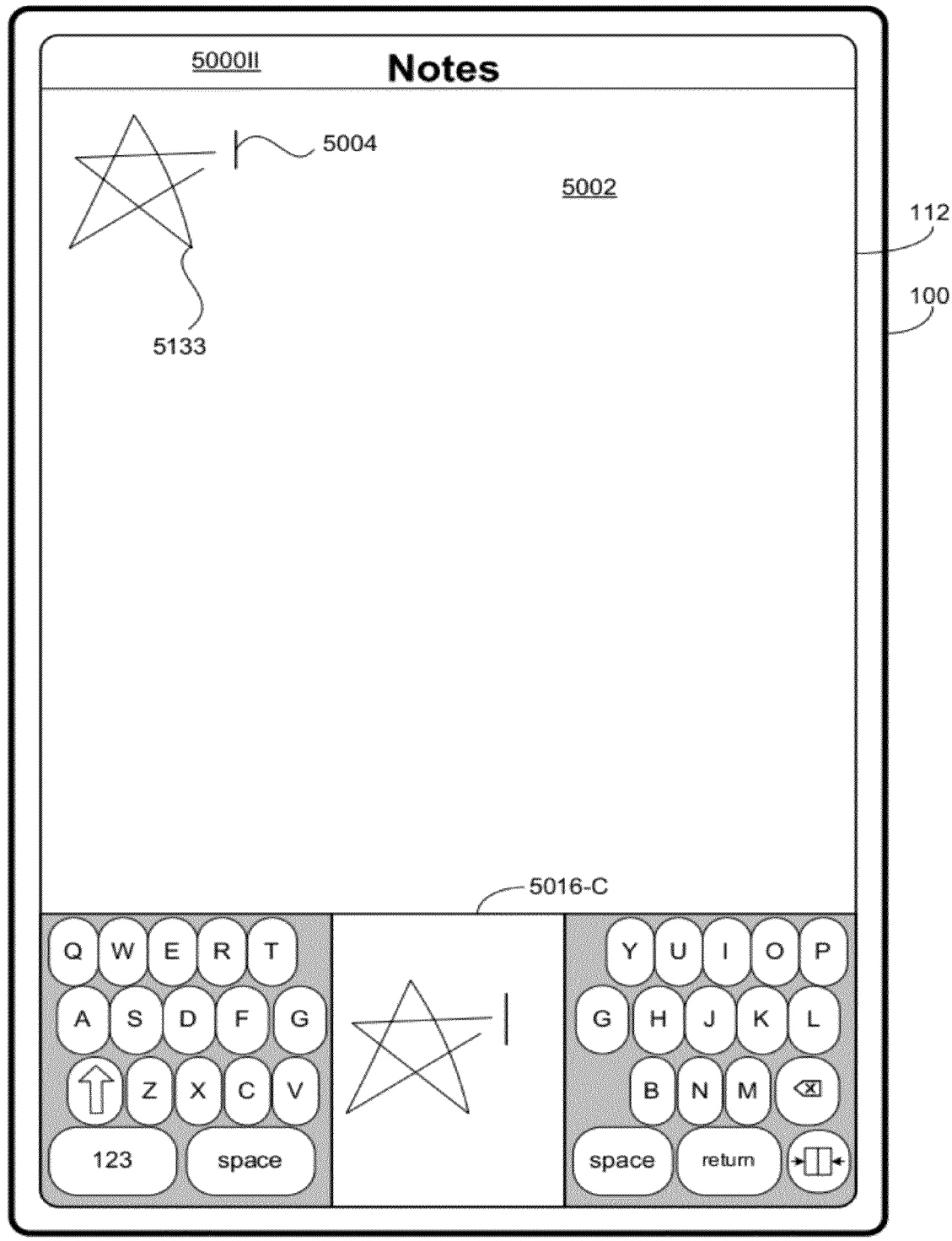
Figure 5J:
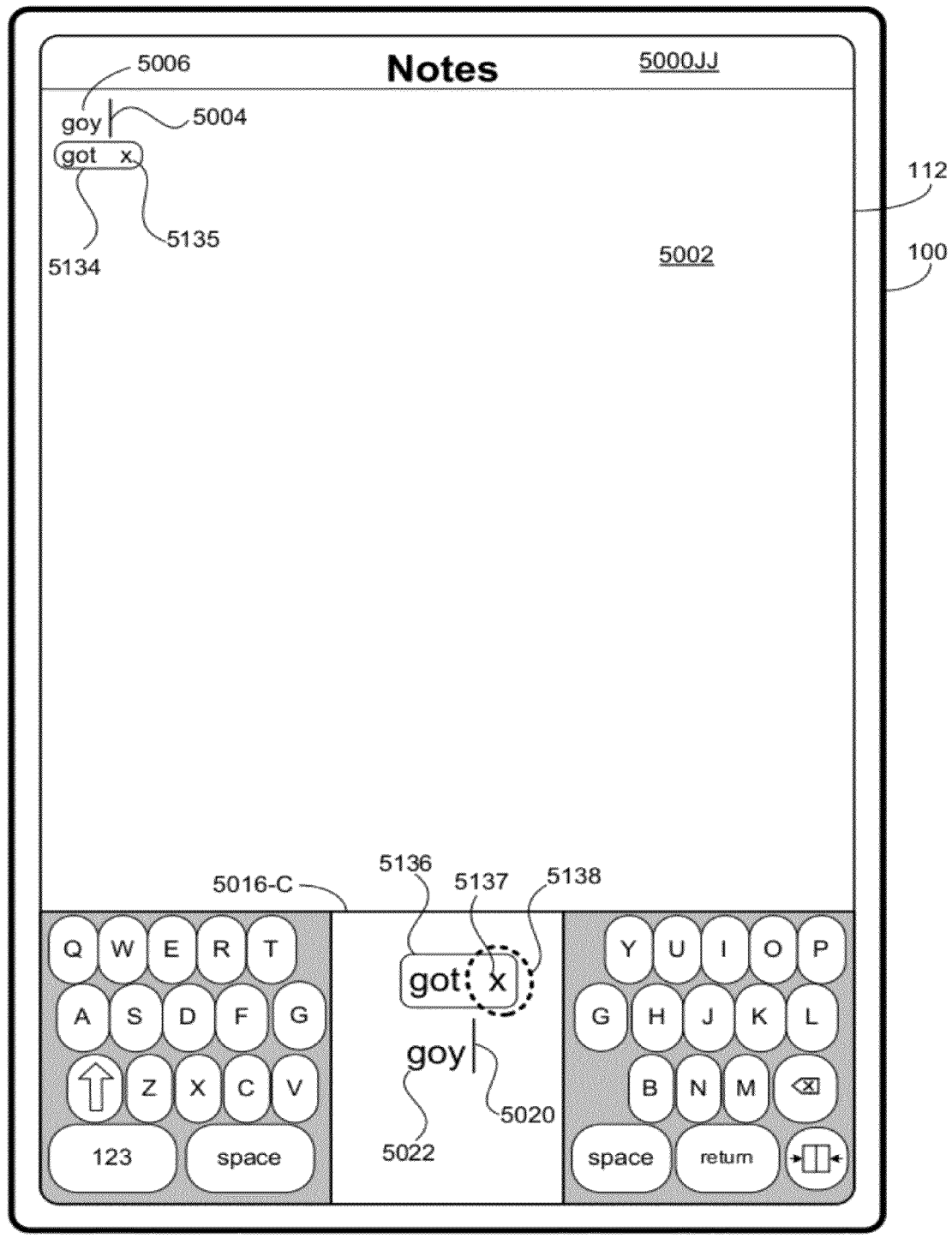
Figure 5K:
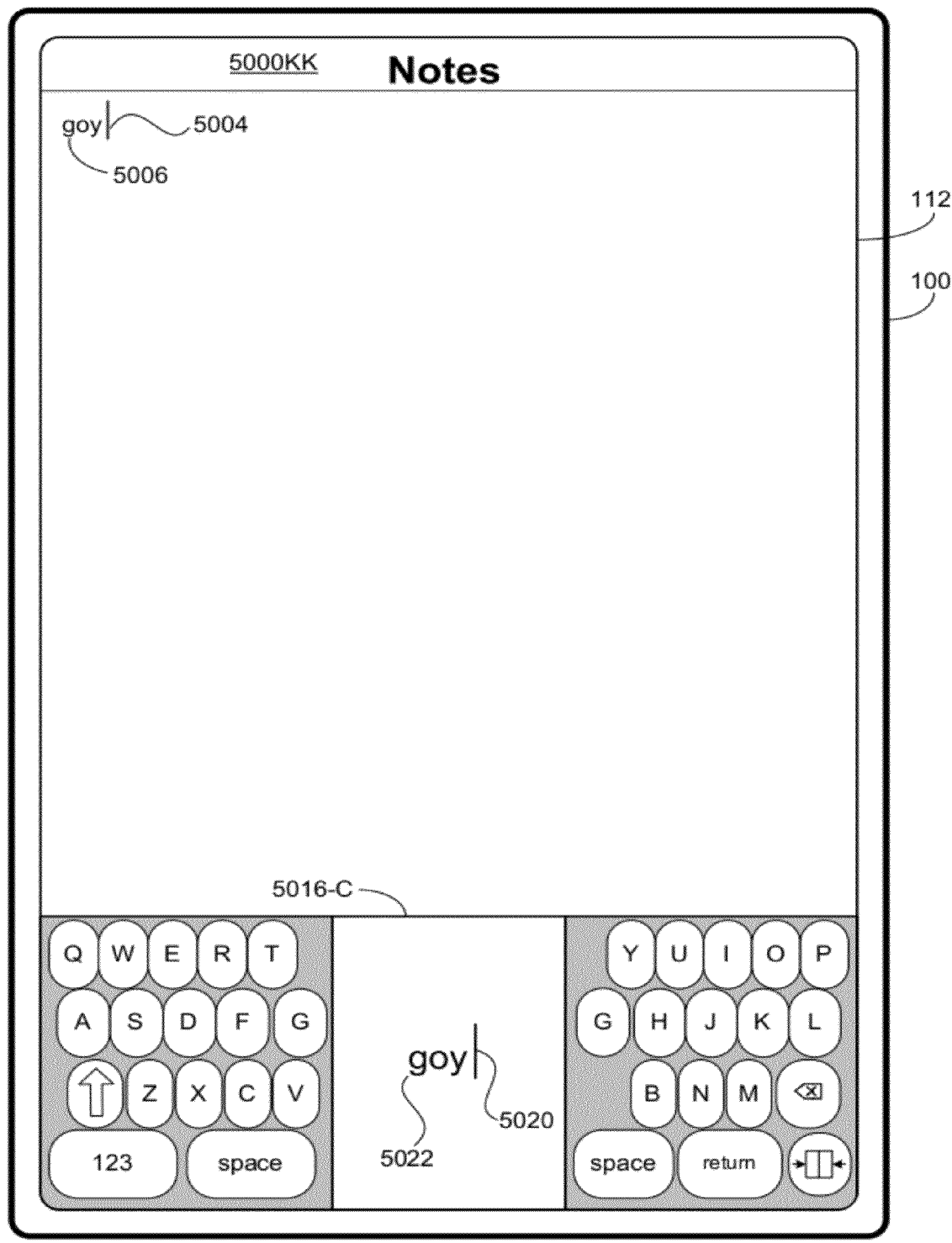
Figure 5L:
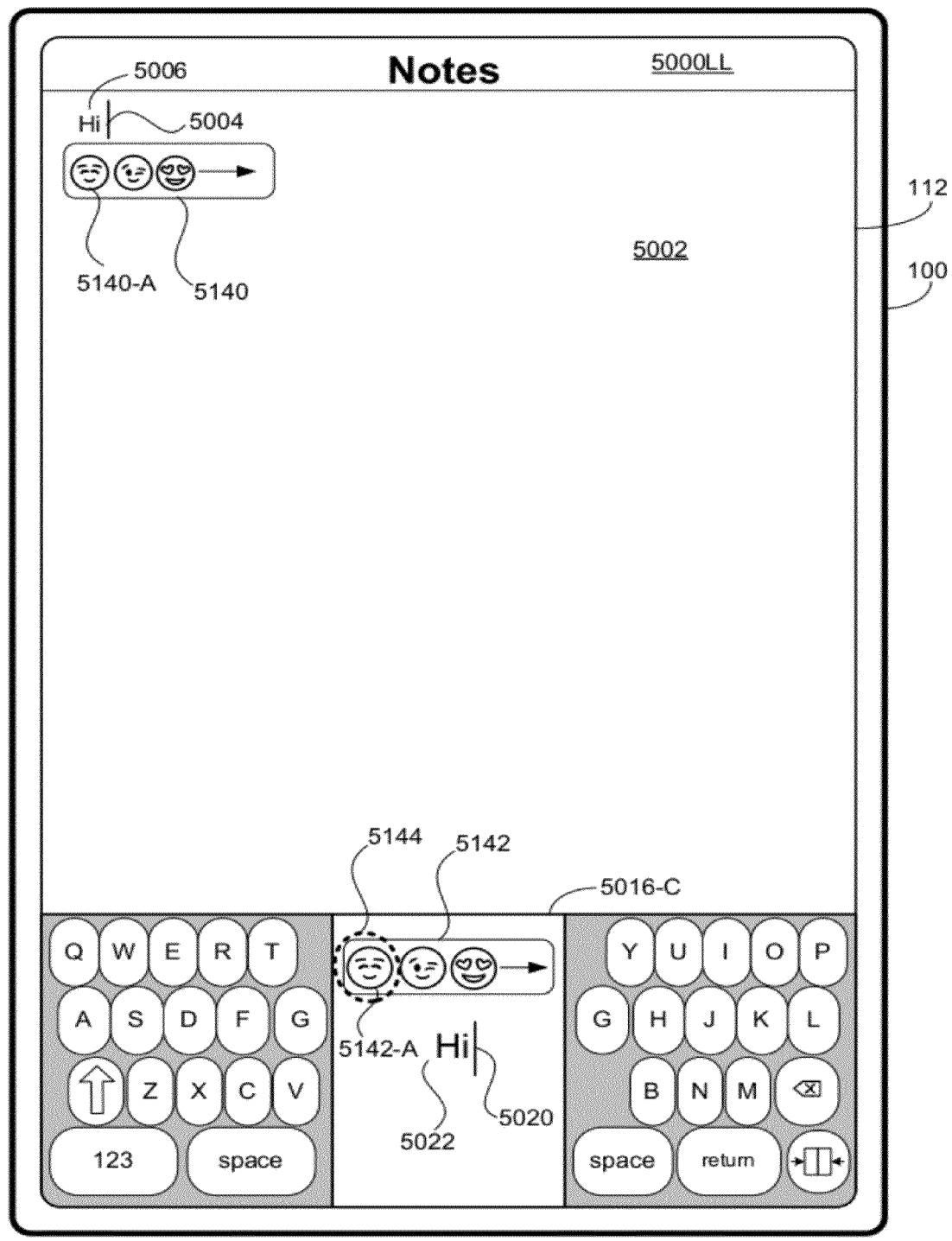
Figure 5M:
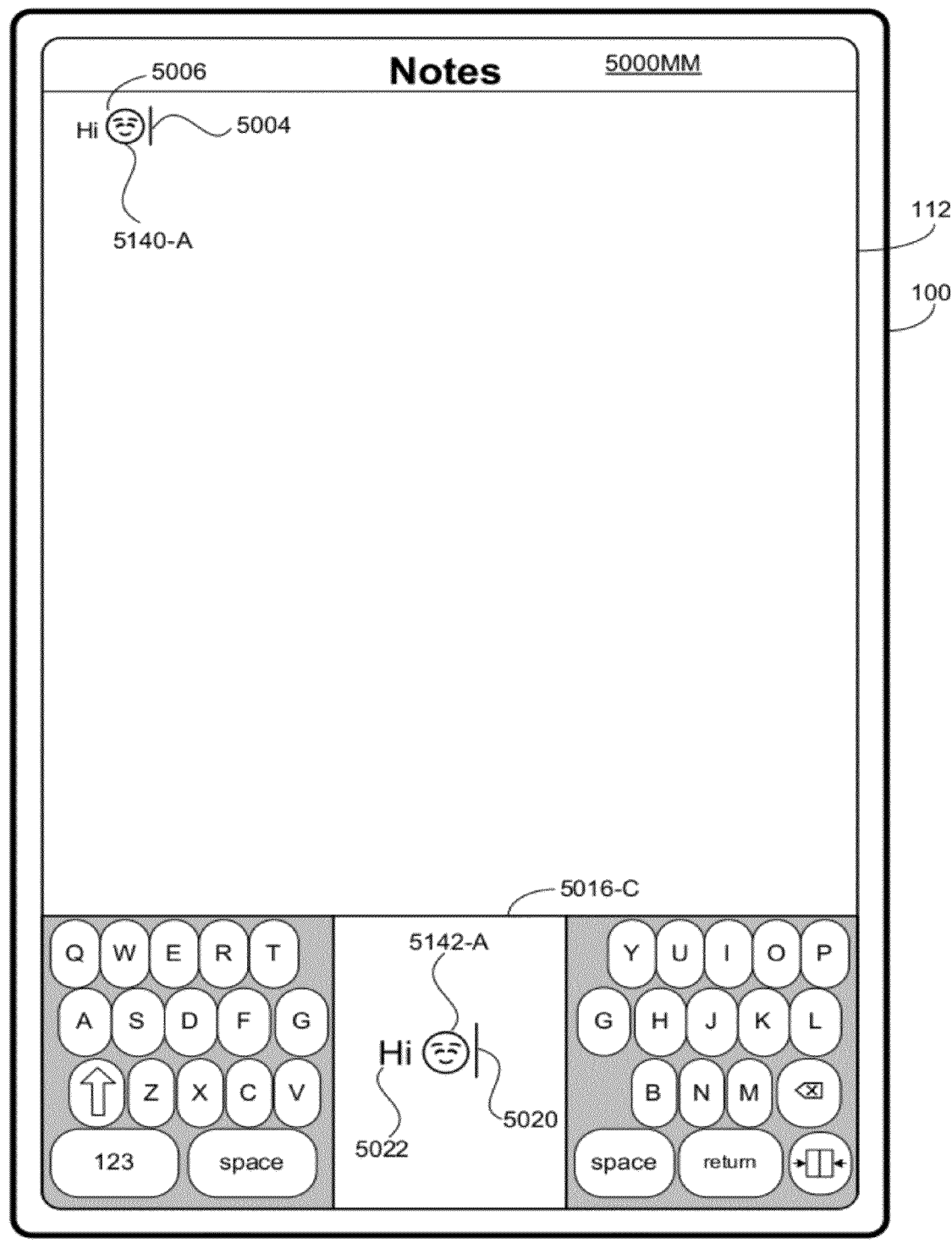
Figure 5N:
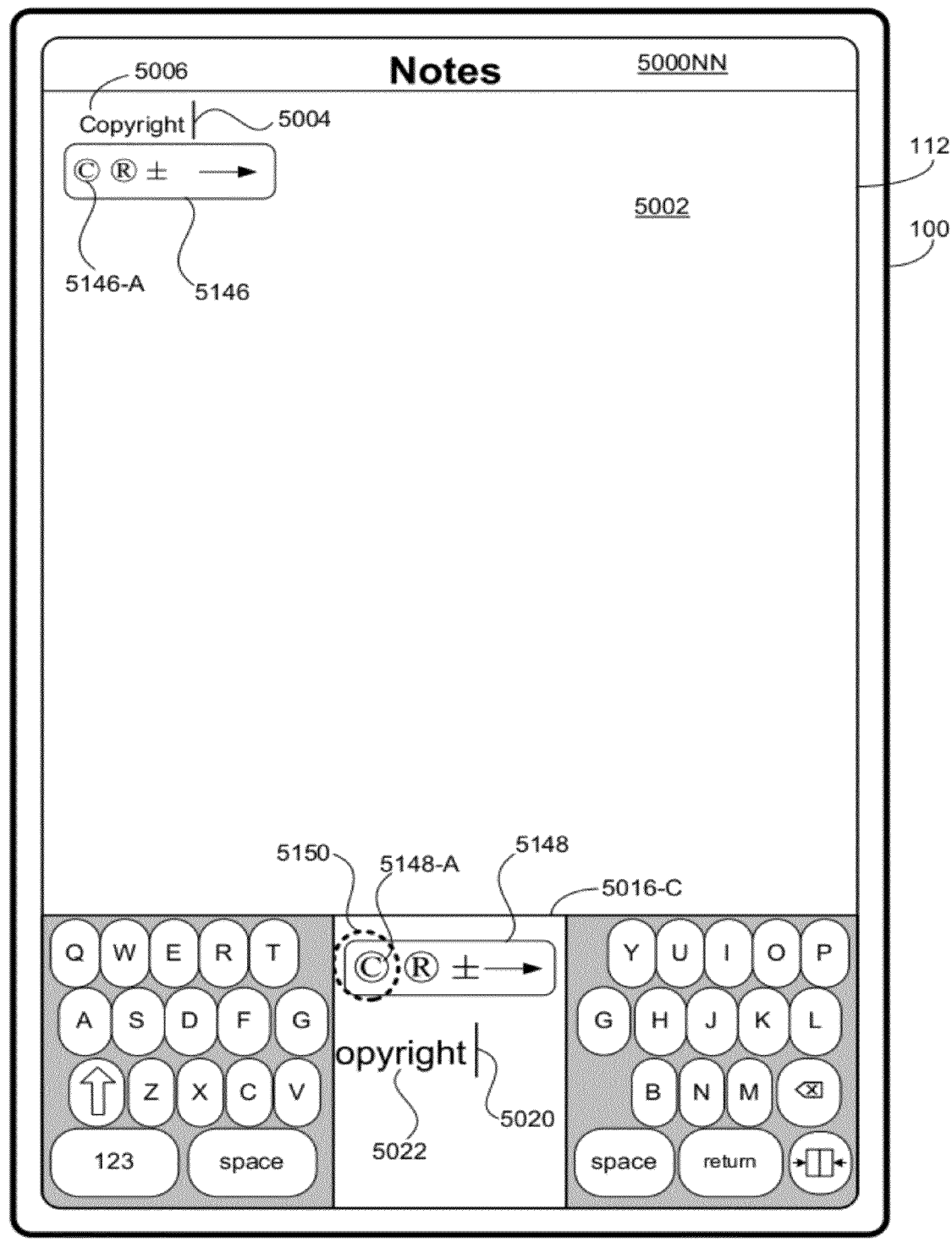
Figure 5O:
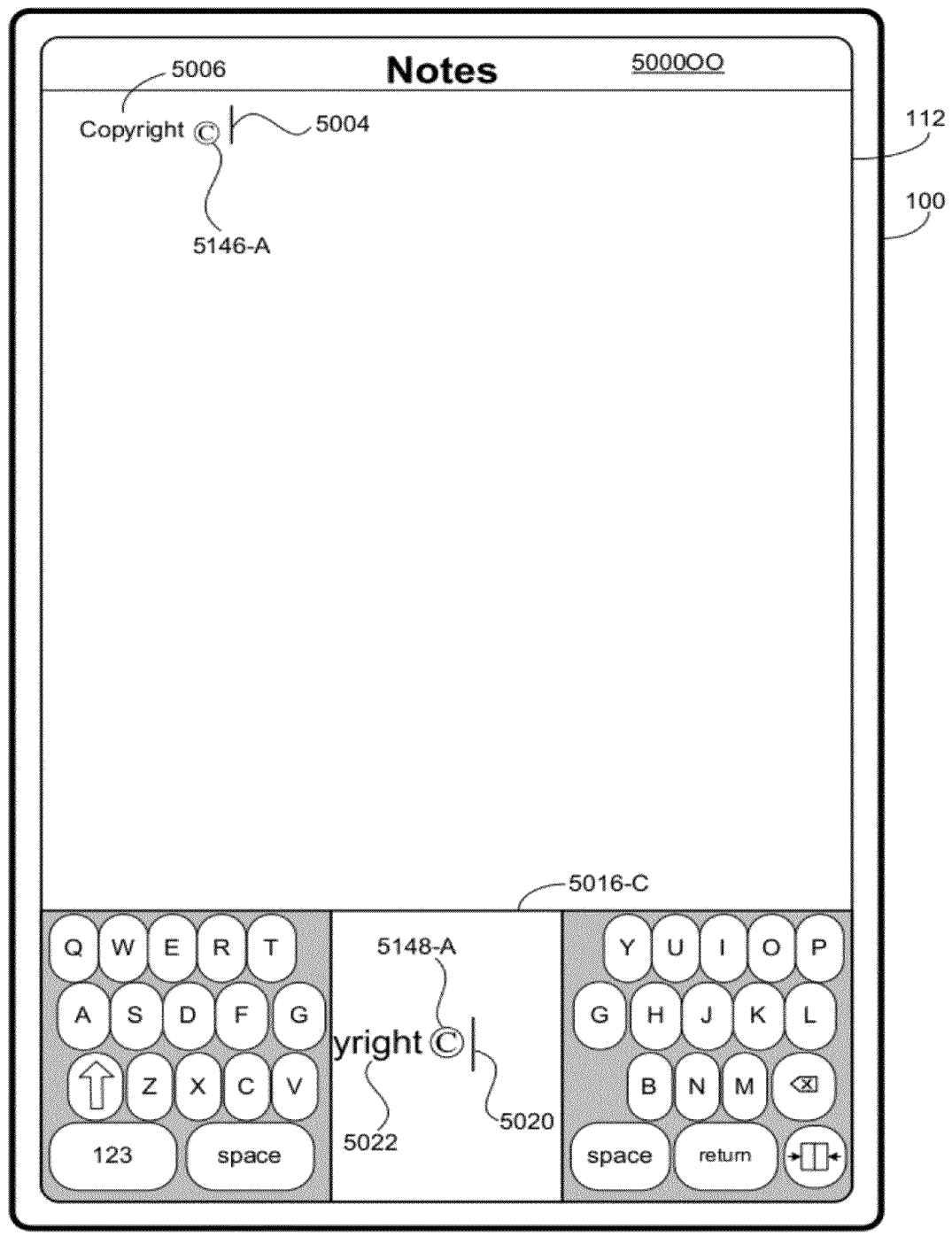
Figure 5P:
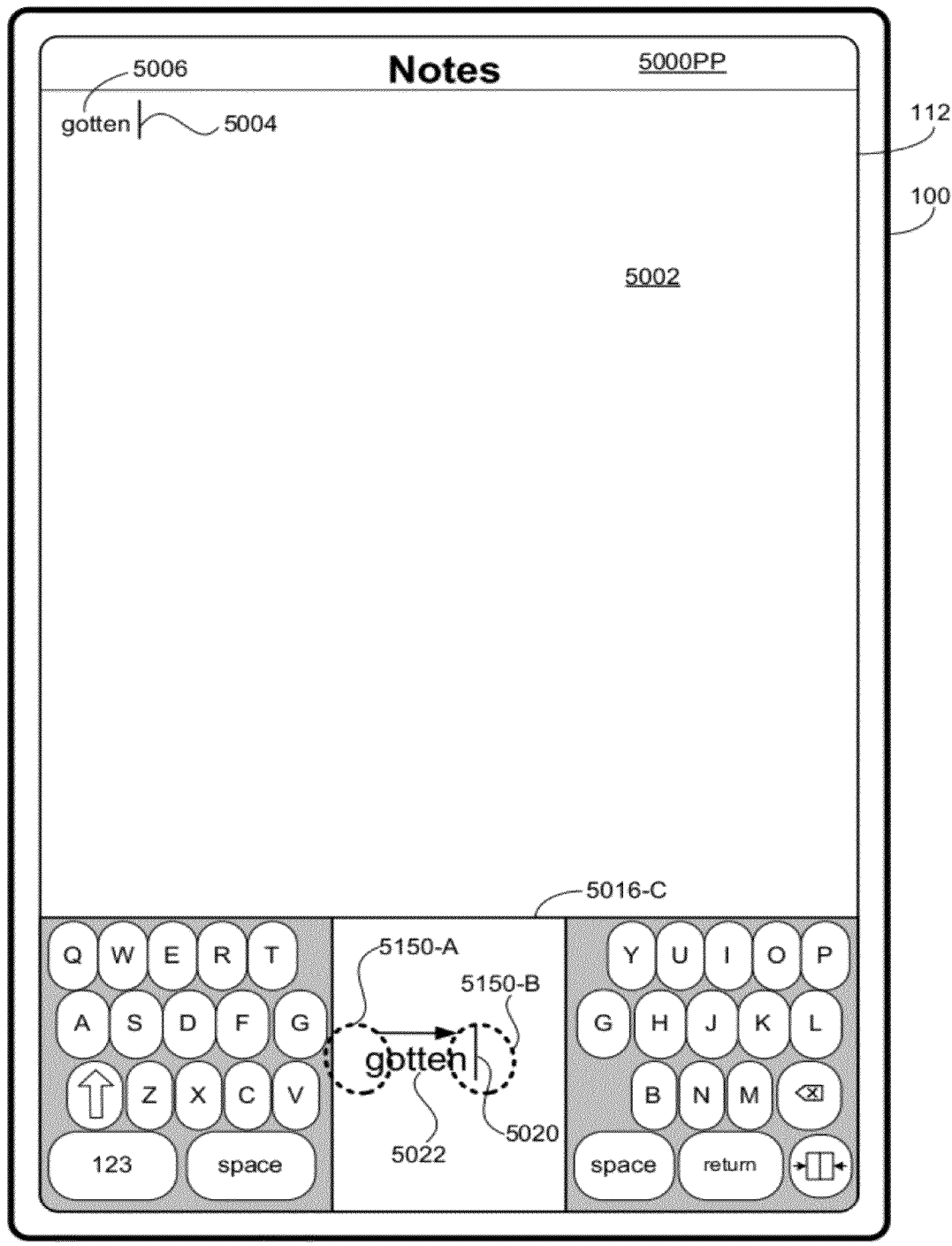
Figure 5Q:
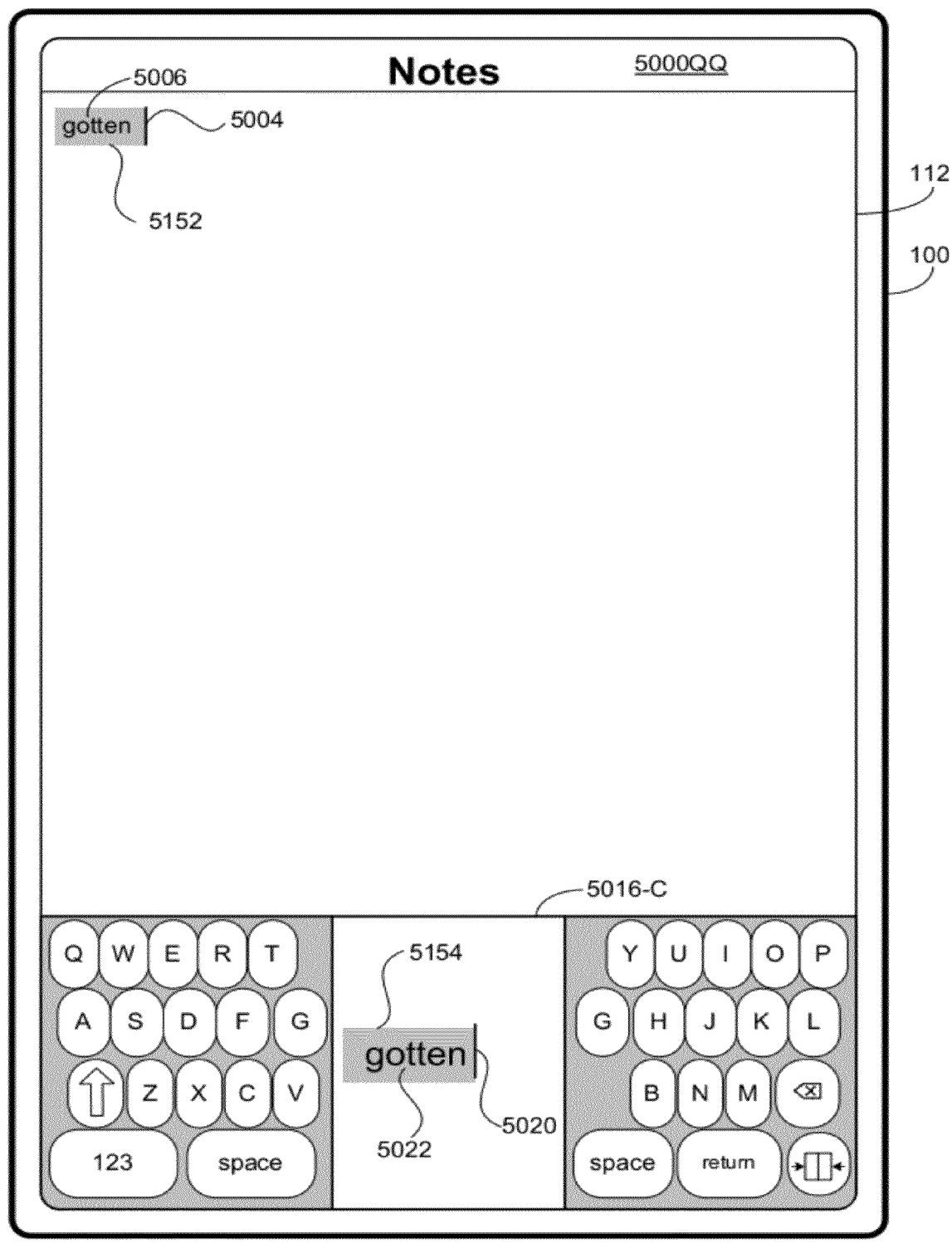
Figure 5R:
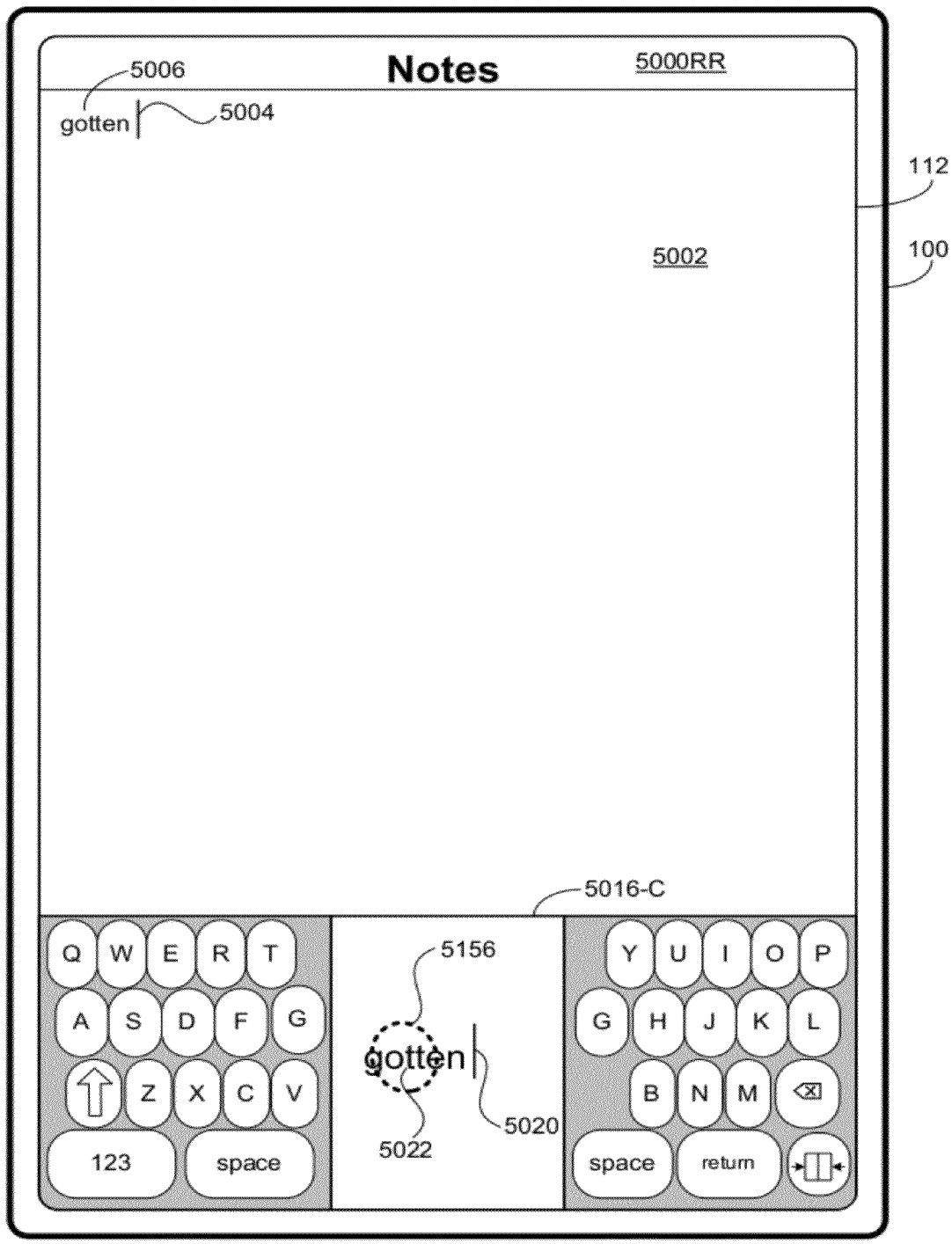
Figure 5S:
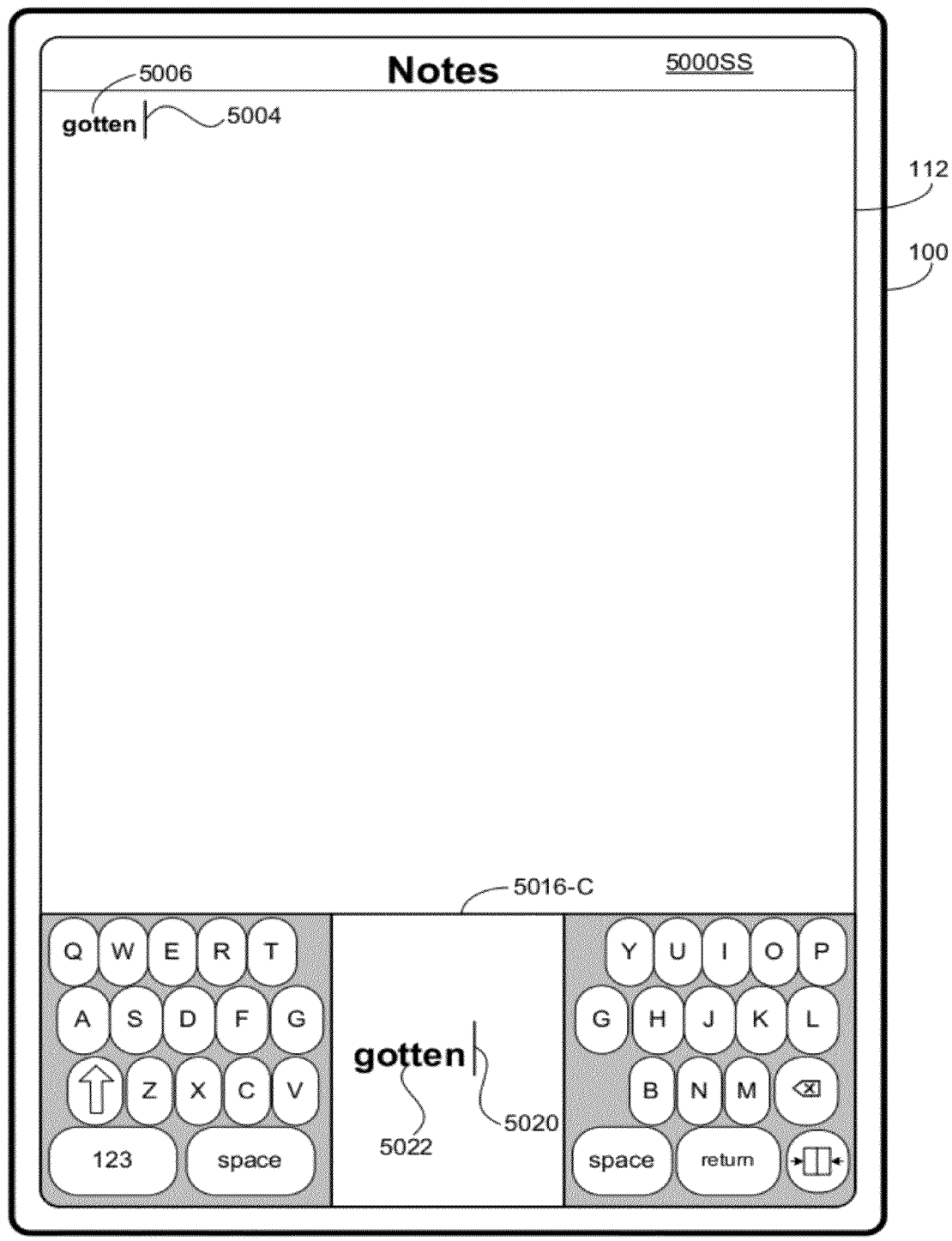
Figure 5T:
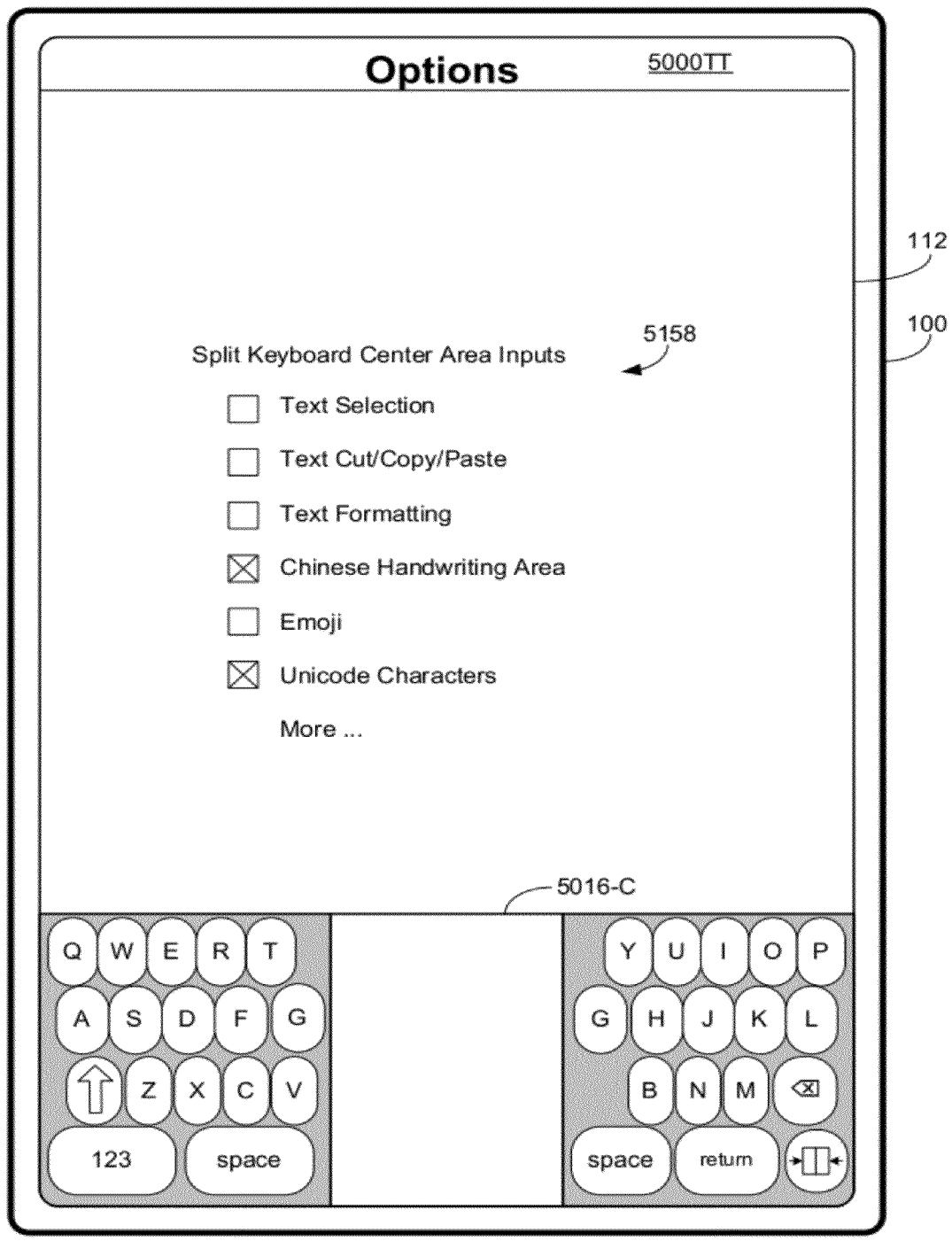
Figure 5U:
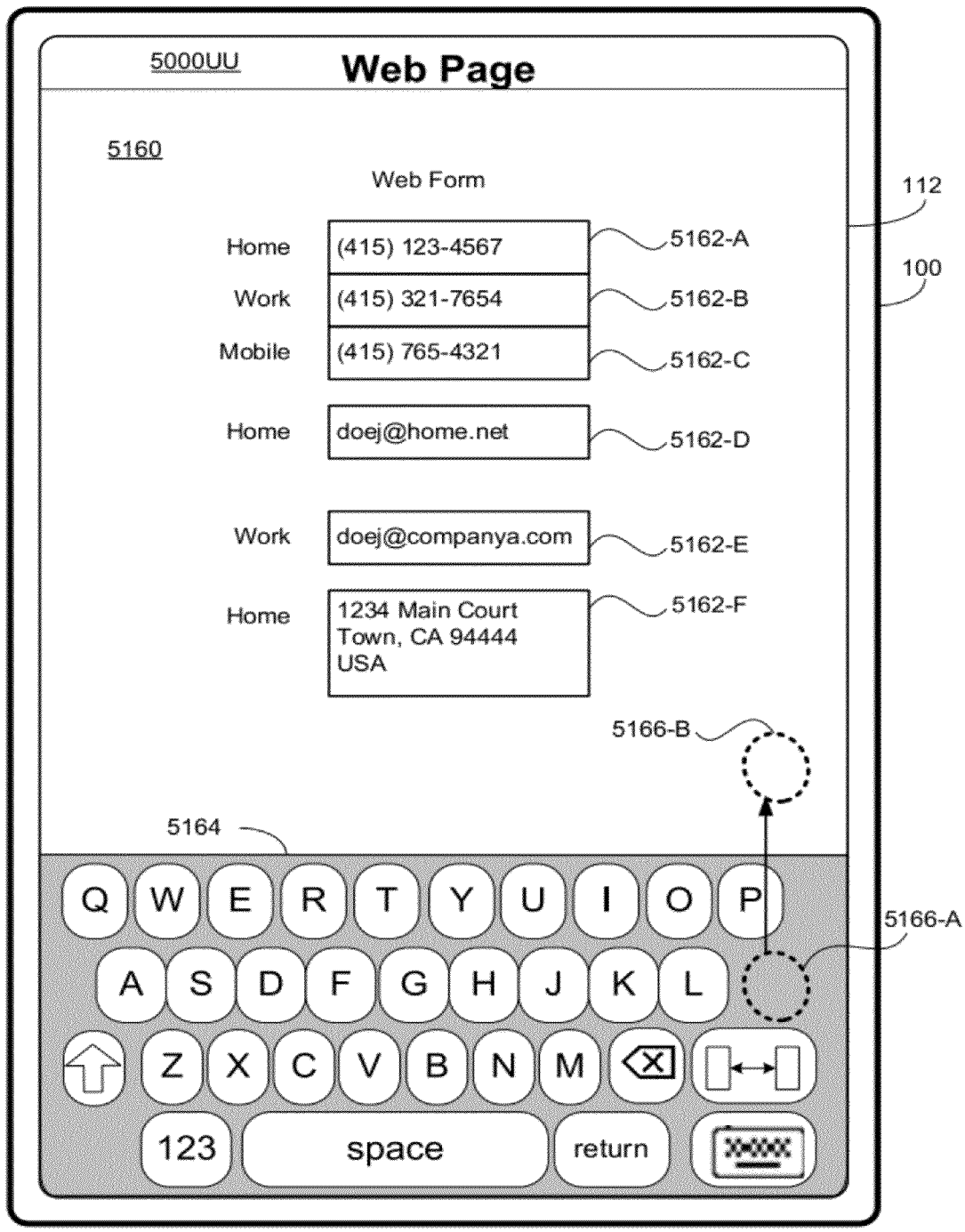
Figure 5V:
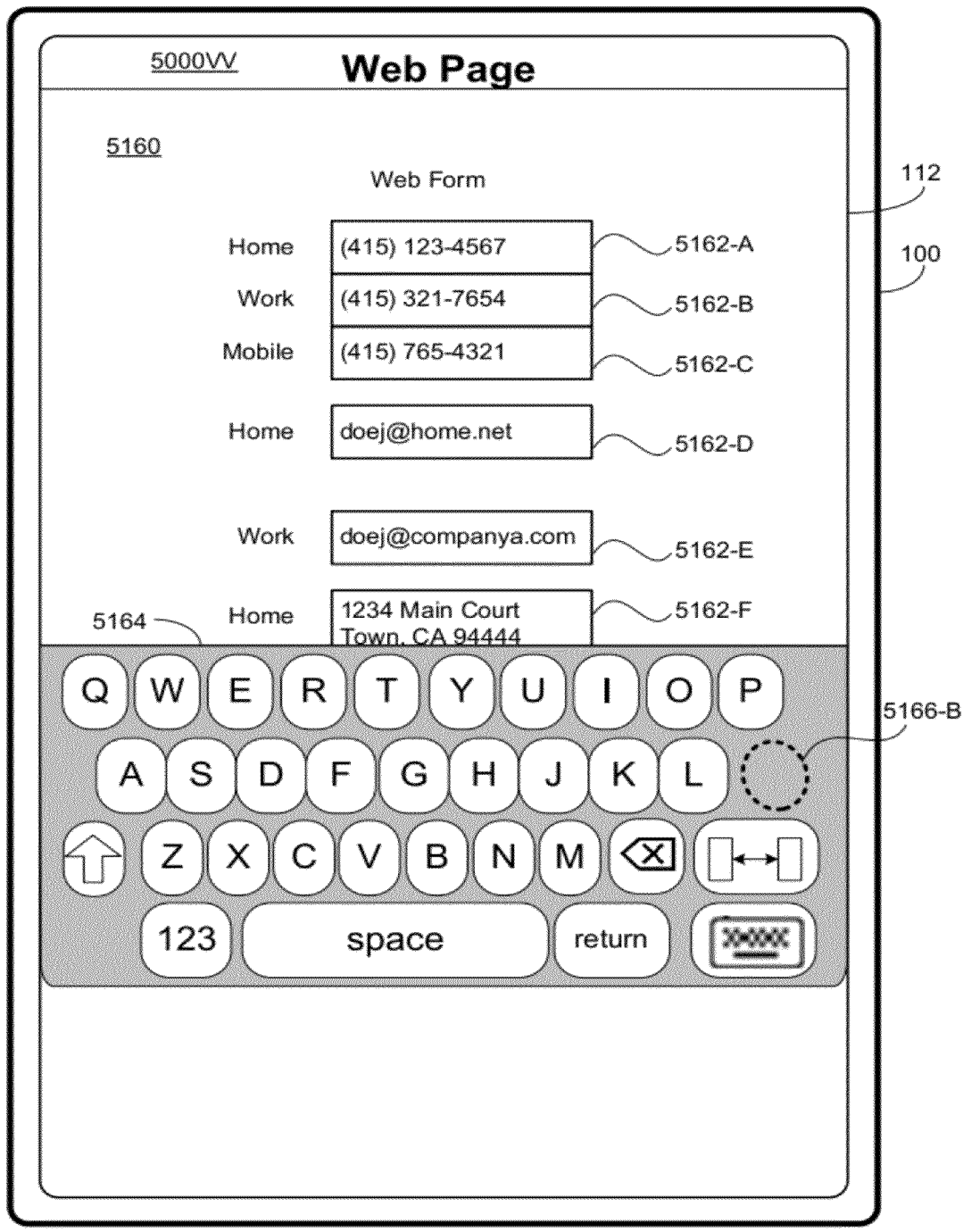
Figure 5W:
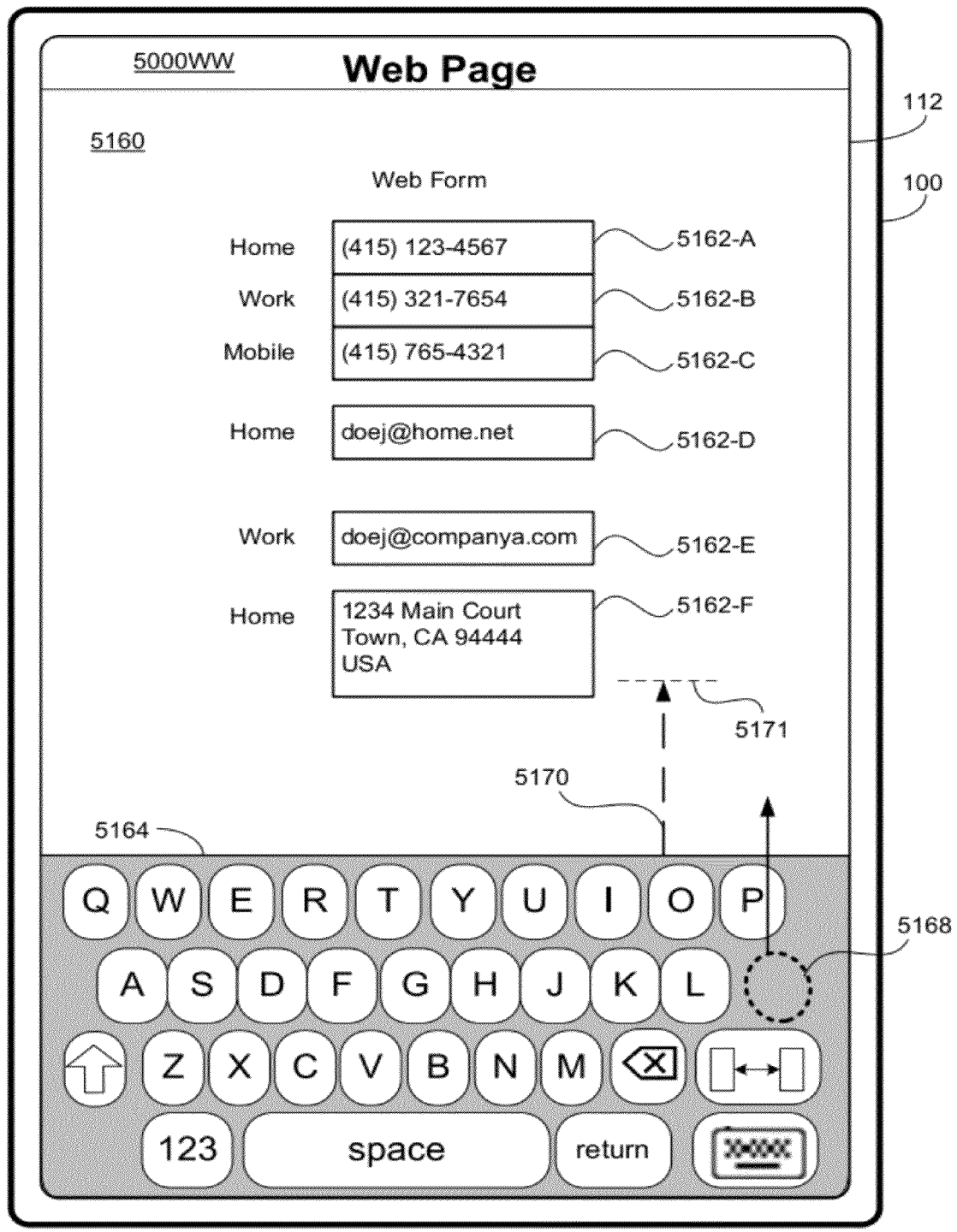
Figure 5X:
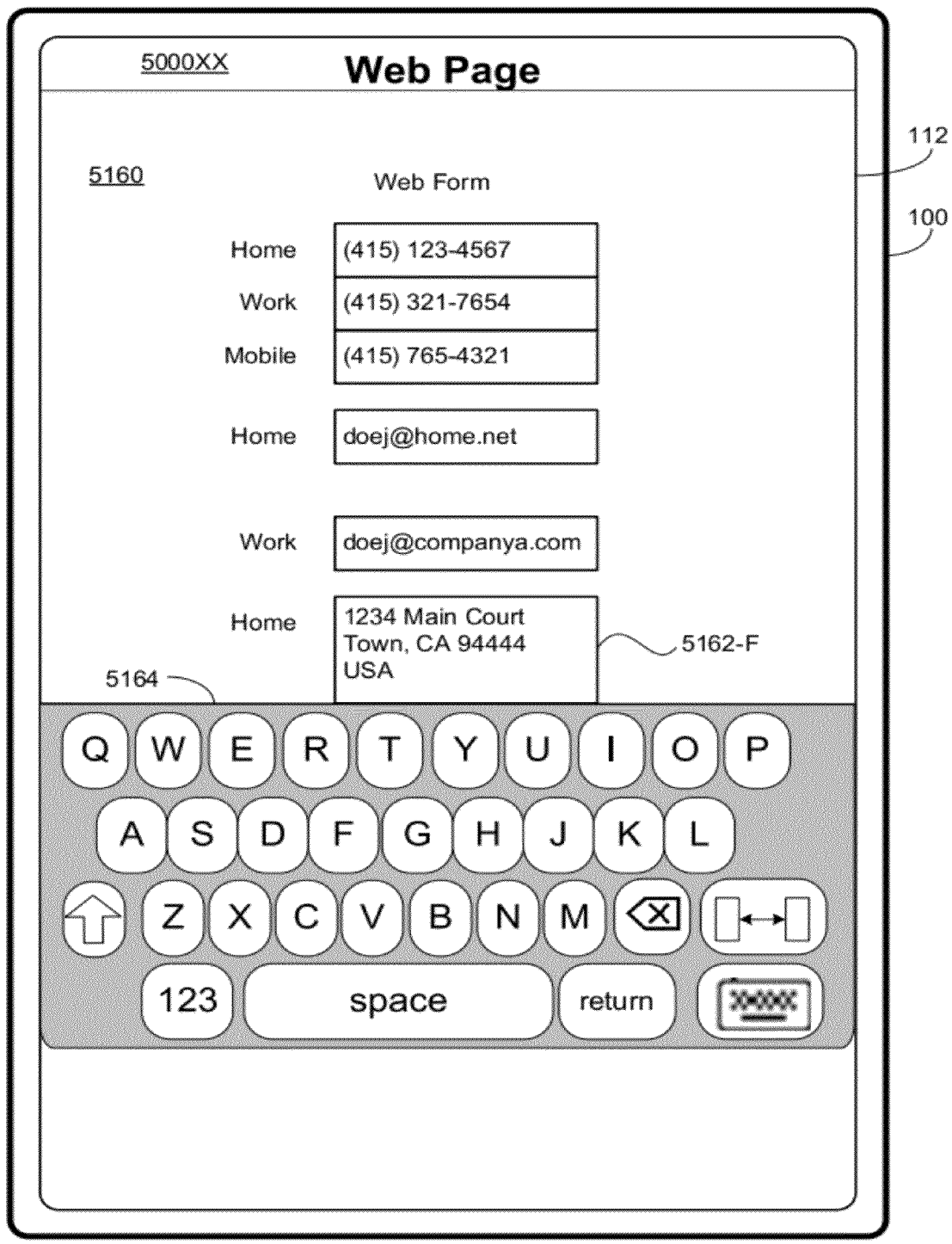
Figure 5Y:
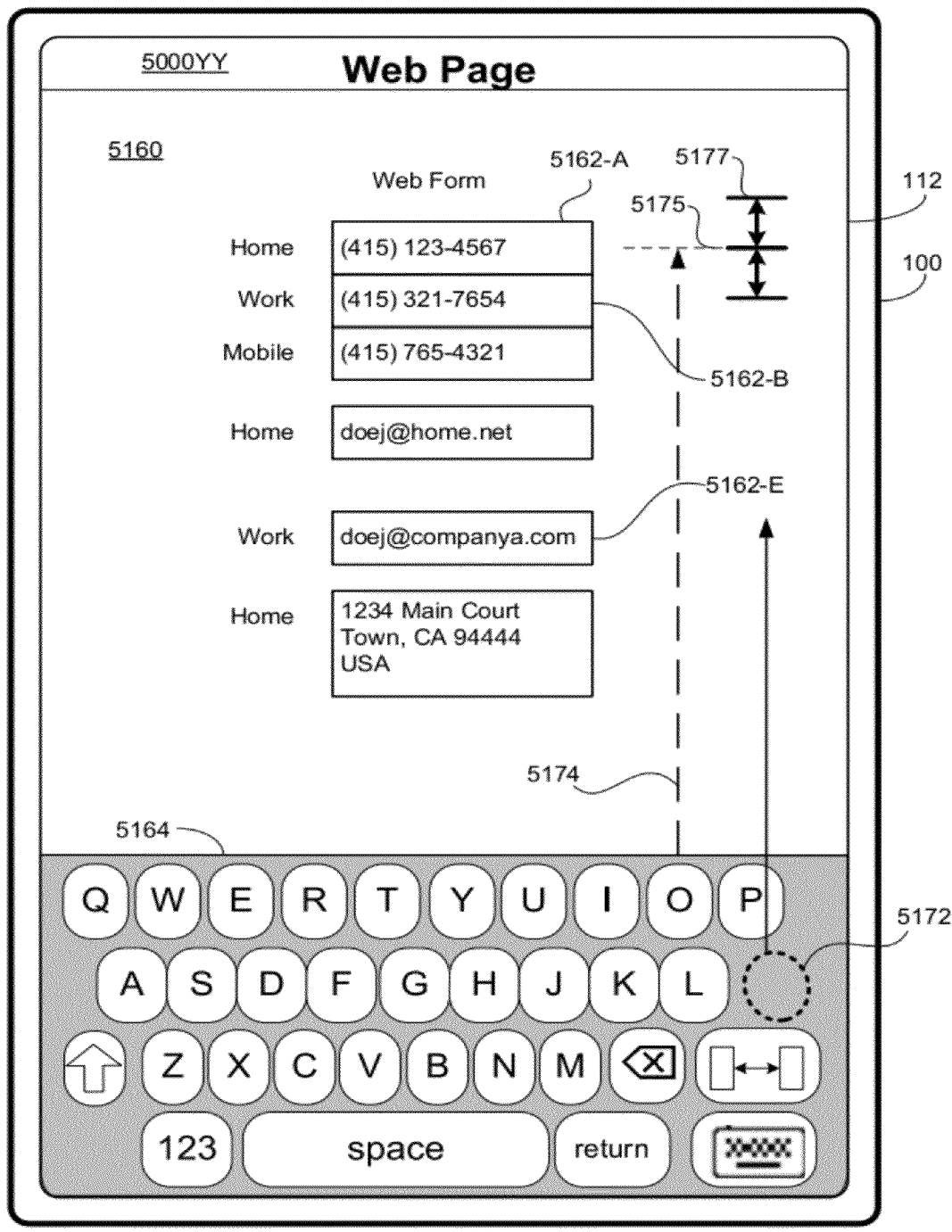
Figure 5Z:
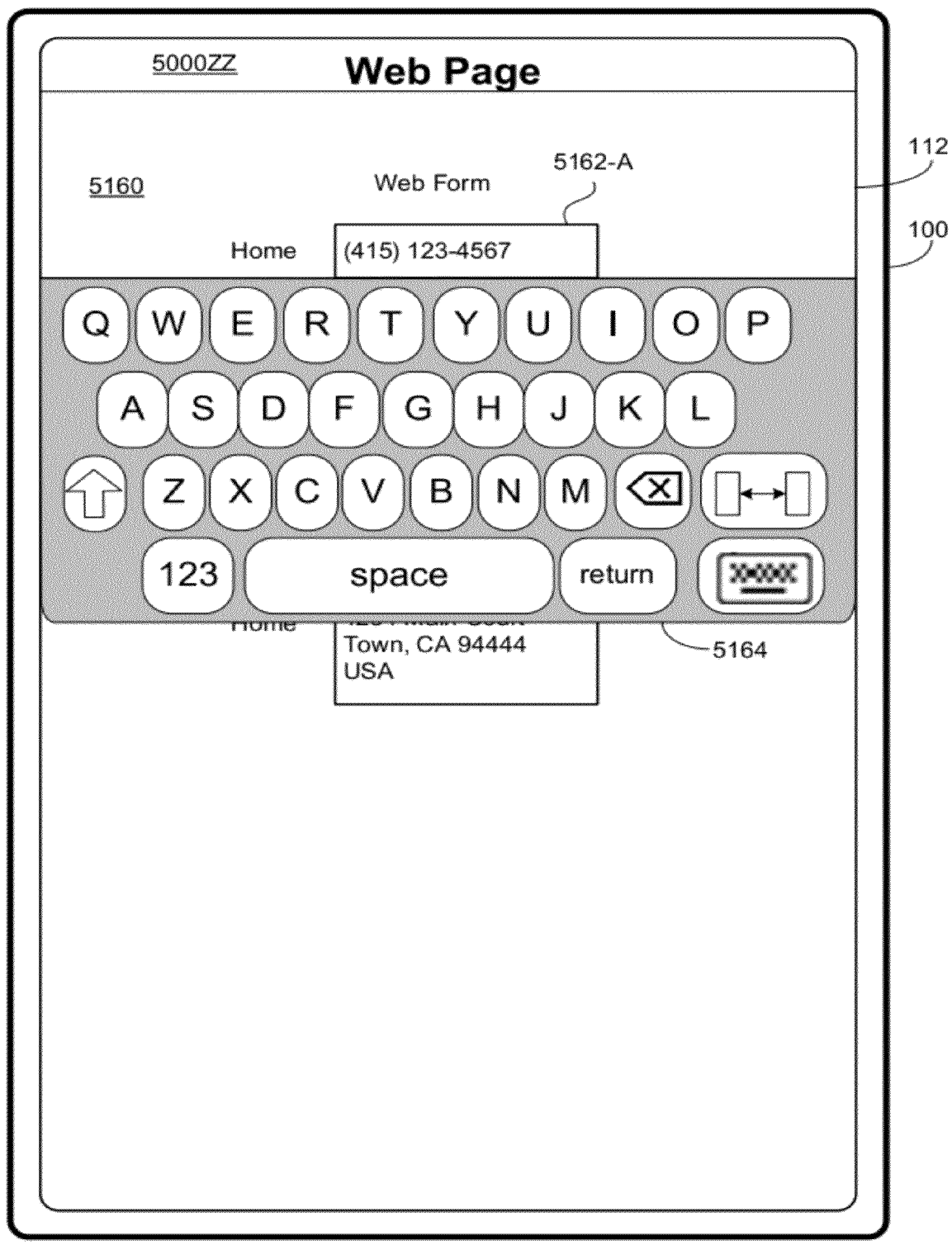

FIG. 5Z depicts UI 5000Z. Editing control object 5104, corresponding to a text editing operation, is displayed in UI 5000Z near input text 5006. Editing control object 5104 corresponds to a text pasting operation to be performed on input text 5006 if activated. Duplicate editing control object 5106, corresponding to editing control object 5104, is displayed in center area 5016-C near duplicate input text 5022. Gesture 5108 (e.g., a tap gesture) is detected on duplicate editing control object 5106.

In response to detection of gesture 5108 on duplicate editing control object 5106, the text pasting operation corresponding to editing control object 5104 is activated in UI 5000AA, as shown in FIG. 5AA. Text "ahead" is pasted into input text 5006. The text pasting is mirrored in center area 5016-C, as duplicate text 5022 is updated to also include the pasted text "ahead."

FIG. 5BB depicts UI 5000BB. UI 5000BB includes form 5110 displayed in text entry area 5002. Form 5110 includes one or more text entry fields 5114 and one or more checkboxes 5112, each respective checkbox 5112 associated with an option in form 5110. For example, checkbox 5112-A in form 5110 is associated with the "Vegetarian" option. Duplicate checkboxes 5116 and the corresponding options mirror checkboxes 5112 and the corresponding options and are displayed in center area 5016-C. For example, duplicate checkbox 5116-A corresponds to checkbox 5112-A, duplicate checkbox 5116-B corresponds to checkbox 5112-B, and so on forth. In some embodiments, duplicate checkboxes 5116 and the corresponding options are displayed at larger sizes than their corresponding checkboxes 5112. Gesture 5118 (e.g., a tap gesture) is detected on duplicate checkbox 5116-A, which is unselected (i.e., not checked), as is checkbox 5112-A.

In response to detection of gesture 5118 on duplicate checkbox 5116-A, checkbox 5112-A is selected in UI 5000CC, as shown in FIG. 5CC. Duplicate checkbox 5116-A is also selected, mirroring the selection of checkbox 5112-A.

FIG. 5DD depicts UI 5000DD. UI 5000DD shows gesture 5120 detected in center area 5016-C, away from duplicate cursor 5020 and duplicate input text 5022. In some embodiments, gesture 5120 is a double tap gesture or a finger contact held in place. In response to detection of gesture 5120 in center area 5016-C, pop-up menu 5122 is displayed in UI 5000EE, as shown in FIG. 5EE. Duplicate menu 5124 is displayed in center area 5016-C. Selection of an option in duplicate menu 5124 has the same effect as selecting the corresponding option in pop-up menu 5122. In other embodiments (not shown), in response to detection of gesture 5120, menu 5124 is displayed in center area 5016-C, without concurrently displaying 5122; in other words, a pop-up menu is just displayed in the center area 5016-C.

FIG. 5FF depicts UI 5000FF. UI 5000FF includes handwriting 5126 made using one or more finger strokes 5128 made within center area 5016-C. Handwriting 5126 is recognized to resemble a Chinese character, and one or more candidate characters (not shown) may be displayed in center area 5016-C. In response to selection of a candidate character, the selected candidate character is entered into input text 5006 in UI 5000GG, as shown in FIG. 5GG. In UI 5000GG, the character "中" is entered into input text 5006. In some embodiments, duplicate input text 5022 also shows the character "中" being entered.

FIG. 5HH depicts UI 5000HH. UI 5000HH includes cursor 5004 in text entry area 5002 and drawing 5130, made using one or more finger strokes 5132, in center area 5016-C. After completion of drawing 5130, drawing 5133 corresponding to drawing 5130 is entered into text entry area 5002 in UI 5000II, as shown in FIG. 5II.

FIG. 5JJ depicts UI 5000JJ. UI 5000JJ includes input text 5006 and cursor 5004 displayed in text entry area 5002. Suggested word 5134 for input text 5006 is displayed. Duplicate suggested word 5136, corresponding to suggested word 5134, is displayed in center area 5016-C near duplicate input text 5022. Gesture 5138 (e.g., a tap gesture) is detected on X-icon 5137 (which corresponds to X-icon 5135 accompanying suggested word 5134) accompanying duplicate suggested word 5136.

In response to detection of gesture 5138 on X-icon 5137, suggested word 5134 is rejected, and input text 506 remains as is in UI 5000KK, as shown in FIG. 5KK.

FIG. 5LL depicts UI 5000LL. UI 5000LL includes input text 5006 and cursor 5004 displayed in text entry area 5002. One or more emoticons 5140 available for entry into input text 5006 are displayed. Duplicate emoticons 5142, corresponding to emoticons 5140, are displayed in center area 5016-C near duplicate input text 5022. Gesture 5144 (e.g., a tap gesture) is detected on duplicate emoticon 5142-A, which corresponds to emoticon 5140-A.

In response to detection of gesture 5144 on duplicate emoticon 5142-A, emoticon 5140-A is entered into input text 5006 in UI 5000MM, as shown in FIG. 5MM. The changed text input 5006 is mirrored in center area 5016-C, as duplicate emoticon 5142-A is entered into duplicate input text 5022. In other embodiments (not shown), emoticons 5142 are displayed in center area 5016-C, without concurrently displaying emoticons 5140; in other words, the emoticons available for input are just displayed in the center area 5016-C.

FIG. 5NN depicts UI 5000NN, which includes input text 5006 and cursor 5004 displayed in text entry area 5002. One or more Unicode characters 5146 available for entry into input text 5006 are displayed. Duplicate Unicode characters 5148, corresponding to Unicode characters 5146, are displayed in center area 5016-C near duplicate input text 5022. Gesture 5149 (e.g., a tap gesture) is detected on duplicate Unicode character 5148-A, which corresponds to Unicode character 5146-A.

In response to detection of gesture 5149 on duplicate Unicode character 5148-A, Unicode character 5146-A is entered into input text 5006 in UI 5000OO, as shown in FIG. 5OO. The changed text input 5006 is mirrored in center area 5016-C, as duplicate input text 5022 also includes duplicate Unicode character 5148-A. In other embodiments (not shown), Unicode characters 5148 are displayed in center area 5016-C, without concurrently displaying Unicode characters 5146; in other words, the Unicode characters available for input are just displayed in the center area 5016-C.

FIG. 5PP depicts UI 5000PP, which includes input text 5006 and cursor 5004 displayed in text entry area 5002. Cursor 5004 and at least a portion of input text 5006 are mirrored in center area 5016-C as duplicate cursor 5020 and duplicate input text 5022, respectively. Gesture 5150 is detected in center area 5016-C. Gesture 5150 includes a finger contact moving from position 5150-A to position 5150-B, going over duplicate input text 5022.

In response to detection of gesture 5150 over duplicate input text 5022, duplicate input text 5022 is displayed with shading 5154 (or other highlighting), indicating that duplicate input text 5022 is selected. The corresponding text in input text 5006 is displayed with shading 5152 (or other highlighting) as well.

FIG. 5RR depicts UI 5000RR, which includes input text 5006 and cursor 5004 displayed in text entry area 5002. Cursor 5004 and input text 5006 is mirrored in center area 5016-C as duplicate cursor 5020 and duplicate input text 5022, respectively. Gesture 5156 (e.g., a double tap gesture, a triple tap gesture, or a tap and hold gesture) is detected in center area 5016-C on duplicate input text 5022. Gesture 5156 is associated with a text formatting operation (e.g., making text bold, underling text, italicizing text, etc.).

In response to detection of gesture 5156 on duplicate input text 5022, the formatting of input text 5006 is changed in UI 5000SS, as shown in FIG. 5SS. Input text 5006 is changed to bold text. Duplicate input text 5022 is also changed to bold text to mirror the change in the formatting of input text 5006.

FIG. 5TT depicts UI 5000TT. Displayed in UI 5000TT is a menu 5158 of input options for center area 5016-C. Menu 5158 includes options for allowable user inputs in center area 5016-C, such as gestures associated with text formatting operations, gestures associated with text editing operations, Chinese character handwriting, drawing, emoticons, and so forth. A user may select, in menu 5158, inputs that they want enabled or disabled in center area 5016-C.

FIG. 5UU depicts UI 5000UU. UI 5000UU includes application content area 5160 (e.g., a content area in a web browser, content area in a word processing application, etc.). Displayed in application content area 5160 are one or more text entry areas 5162 (e.g., text fields in an online form). For example, application content area 5160 includes text entry areas 5162-A thru 5162-F that are a part of an online form. Soft keyboard 5164 is also displayed. While soft keyboard 5164 is shown as an unsplit soft keyboard, in some embodiments, the input area is a split soft keyboard or an integrated input area that includes a split keyboard, such as integrated input area 5016 or 5039.

Gesture 5166 is detected on display 112. Gesture 5166 is a dragging gesture that includes a finger contact starting at position 5166-A and moving to position 5166-B. In response to detection of gesture 5166, soft keyboard 5164 moves vertically in accordance with the direction of gesture 5166 and final position 5166-B in UI 5000VV, as shown in FIG. 5VV. After drag gesture 5166, soft keyboard 5164 may partially obscure a text entry area 5162. For example, in UI 5000VV, soft keyboard 5164 partially obscures text entry area 5162-F.

FIG. 5UU depicts UI 5000WW. In UI 5000WW, gesture 5168 is detected. Gesture 5168 is a flick gesture in a vertical direction starting from a location on soft keyboard 5164. In response to detection of gesture 5168, movement trajectory 5170, including movement inertia, is imparted to soft keyboard 5164 in accordance with gesture 5168. For example, a short trajectory is imparted in response to a small flicking gesture, and a long trajectory is imparted in response to a large flicking gesture. Movement trajectory 5170 has termination point 5171.

Soft keyboard 5164 moves with inertia in accordance with movement trajectory 5170 in UI 5000XX, as shown in FIG. 5XX, and comes to rest at a position adjacent to and below text entry area 5162-F. As soft keyboard 5164 stops just below text entry area 5162-F, none of text entry area 5162-F is obscured by soft keyboard 5164. Even though trajectory 5170 and the associated movement inertia would otherwise carry soft keyboard 5164 to termination point 5171, which is above the bottom of text entry area 5162-F (FIG. 5WW), trajectory 5170 is adjusted so that soft keyboard 5164 stops just below text entry area 5162-F.

FIG. 5YY depicts UI 5000YY. In UI 5000YY, gesture 5172 is detected. Gesture 5172 is a flicking gesture in a vertical direction starting from a location on soft keyboard 5164, and is a larger flicking gesture than gesture 5168. In response to detection of gesture 5172, movement trajectory 5174, including movement inertia, is imparted onto soft keyboard 5164 in accordance with gesture 5172. Movement trajectory 5174 is larger than movement trajectory 5170 and has termination point 5175.

Soft keyboard 5164 moves with inertia in accordance with movement trajectory 5174 in UI 5000ZZ, as shown in FIG. 5ZZ, and comes to rest at a position adjacent to and below text entry area 5162-A. As soft keyboard stops just below text entry area 5162-A, none of text entry area 5162-A is obscured by soft keyboard 5164. Even though trajectory 5174 and the associated inertia would otherwise carry soft keyboard 5164 to termination point 5175, which is above the bottom of text entry area 5162-A (FIG. 5YY), trajectory 5174 is adjusted so that soft keyboard 5164 stops just below text entry area 5162-A.

In some embodiments, when the keyboard is "thrown" or "flung," the keyboard bounces off the top or bottom of the display by some amount (e.g., an amount corresponding to a top or bottom toolbar height, respectively) if there is some appreciable velocity component of the touch at the time the touch lifts off. Conversely, when the keyboard is dragged to the edge of the display and released with no or very little velocity, the keyboard "docks" flush with the edge of the display (not shown).

FIG. 5AAA depicts UI 5000AAA displayed on display 112. UI 5000AAA includes text entry area 5002, with cursor 5004 and input text 5006 displayed in text entry area 5002. Integrated input area 5039 is also displayed in UI 5000AAA. Integrated input area 5039 includes split keyboard portions 5039-A (the left portion) and 5039-B (the right portion) and center area 5039-C.

Gesture 5176 is detected on display 112. In some embodiments, gesture 5176 is a two-thumb tap gesture, with one thumb on location 5176-A over split keyboard portion 5039-A and the other thumb on location 5176-B over split keyboard portion 5039-B.

In response to detection of gesture 5176, device 100 enters a reconfiguration mode for integrated input area 5039 in UI 5000BBB (FIG. 5BBB). While device 100 is in the reconfiguration mode, gesture 5178 is detected on display 112. Gesture 5178 includes a left thumb contact moving toward the left edge of display 112. In response to detection of gesture 5178, split keyboard portion 5039-A reduces in size (e.g., in width, height, or both width and height) in UI 5000CCC, as shown in FIG. 5CCC, and the keys in split keyboard portion 5039-A rescale in accordance with the size reduction of split keyboard portion 5039-A. In some embodiments, center area 5039-C increases in size and split keyboard portion 5039-B maintains the same size in response. In some other embodiments, both center area 5039-C and split keyboard portion 5039-B increases in size in response.

FIG. 5DDD depicts UI 5000DDD, which shows gesture 5180 detected on display 112 while in the reconfiguration mode. Gesture 5180 includes a left thumb contact moving away from the left edge of display 112. In response to detection of gesture 5180, split keyboard portion 5039-A increases in size (e.g., in width, height, or both width and height) in UI 5000EEE, as shown in FIG. 5EEE, and the keys in split keyboard portion 5039-A rescale in accordance with the size increase of split keyboard portion 5039-A. In some embodiments, center area 5039-C decreases in size and split keyboard portion 5039-B maintains the same size in response. In some other embodiments, both center area 5039-C and split keyboard portion 5039-B decreases in size in response.

FIG. 5FFF depicts UI 5000FFF, which shows gesture 5182 detected on display 112 while in the reconfiguration mode. Gesture 5182 includes a right thumb contact moving toward the right edge of display 112. In response to detection of gesture 5182, split keyboard portion 5039-B reduces in size (e.g., in width, height, or both width and height) in UI 5000GGG, as shown in FIG. 5GGG, and the keys in split keyboard portion 5039-B rescale in accordance with the size reduction of split keyboard portion 5039-B. In some embodiments, center area 5039-C increases in size and split keyboard portion 5039-A maintains the same size in response. In some other embodiments, both center area 5039-C and split keyboard portion 5039-A increases in size in response.

FIG. 5HHH depicts UI 5000HHH, which shows gesture 5184 detected on display 112 while in the reconfiguration mode. Gesture 5184 includes a right thumb contact moving away from the right edge of display 112. In response to detection of gesture 5184, split keyboard portion 5039-B increases in size (e.g., in width, height, or both width and height) in UI 5000III, as shown in FIG. 5III, and the keys in split keyboard portion 5039-B rescale in accordance with the size reduction of split keyboard portion 5039-B. In some embodiments, center area 5039-C decreases in size and split keyboard portion 5039-A maintains the same size in response. In some other embodiments, both center area 5039-C and split keyboard portion 5039-A decreases in size in response.

FIG. 5JJJ depicts UI 5000JJJ, which shows gesture 5186 being detected on display 112 while in the reconfiguration mode, in some other embodiments. Gesture 5186 includes a left thumb contact moving toward the left edge of display 112. In response to detection of gesture 5186, both split keyboard portions 5039-A and 5039-B reduce in size (e.g., in width, height, or both width and height) in UI 5000KKK, as shown in FIG. 5KKK, and the keys in split keyboard portions 5039-A and 5039-B rescale in accordance with the size reduction of split keyboard portions 5039-A and 5039-B, respectively. Center area 5039-C also increases in size as a result.

FIG. 5LLL depicts UI 5000LLL, which shows gesture 5188 being detected on display 112 while in the reconfiguration mode, in some other embodiments. Gesture 5188 includes a left thumb contact moving away from the left edge of display 112. In response to detection of gesture 5188, both split keyboard portions 5039-A and 5039-B increase in size (e.g., in width, height, or both width and height) in UI 5000MMM, as shown in FIG. 5MMM, and the keys in split keyboard portions 5039-A and 5039-B rescale in accordance with the size increase of split keyboard portions 5039-A and 5039-B, respectively. Center area 5039-C also decreases in size as a result.

FIG. 5NNN depicts UI 5000NNN, where gesture 5190 is detected on display 112. In some embodiments, gesture 5190 is a two-thumb tap gesture, with one thumb on location 5190-A over split keyboard portion 5039-A and the other thumb on location 5190-B over split keyboard portion 5039-B. In response to detection of gesture 5190, device 100 exits the reconfiguration mode for integrated input area 5039.

It should be appreciated that, while the details of FIGS. 5A and 5NNN were described in the context of display 112 in portrait orientation, the details of FIGS. 5A-5NNN also apply in an analogous manner to a display (e.g., display 112) in landscape orientation.

Figure 6A:
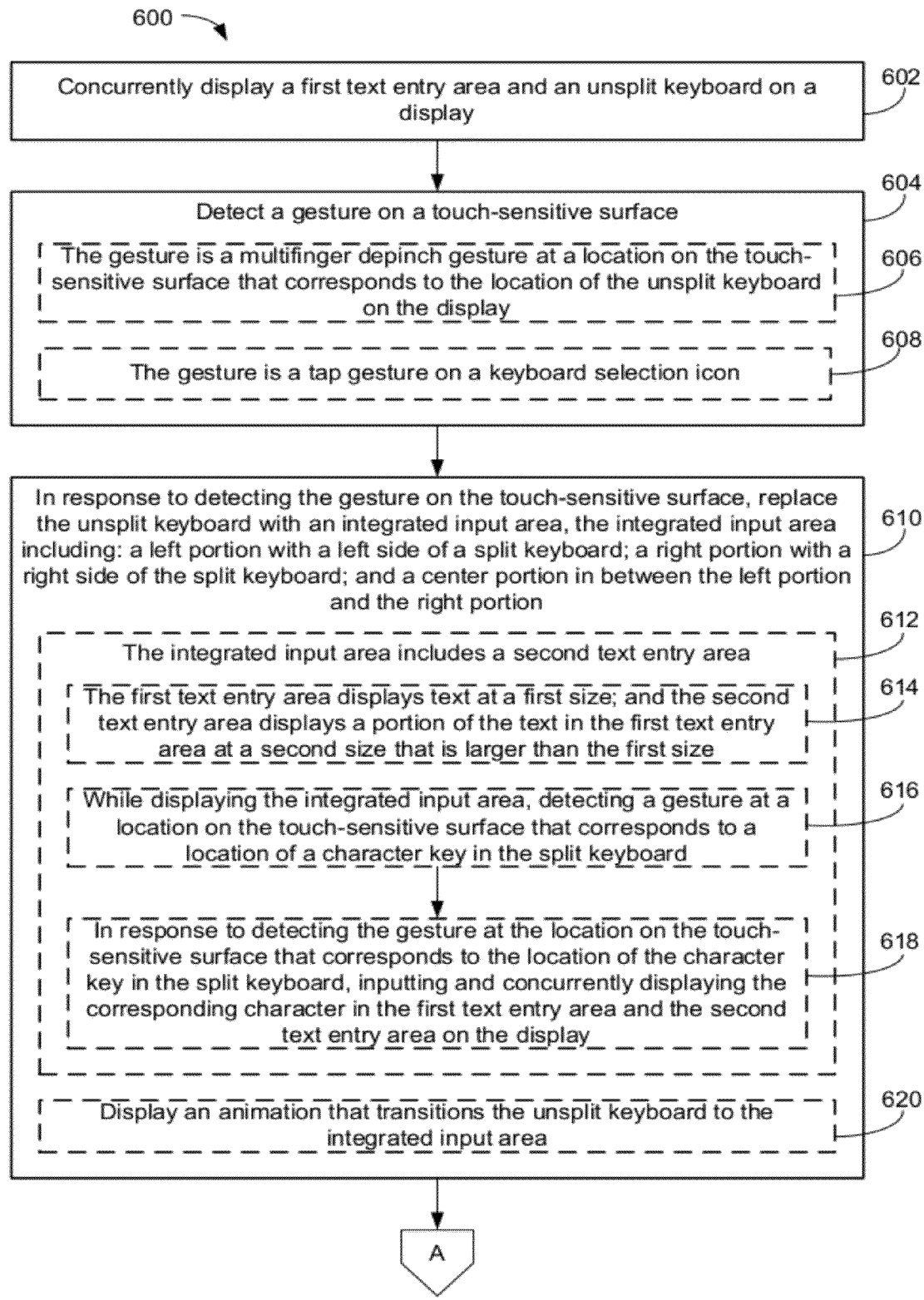
FIGS. 6A-6B are flow diagrams illustrating a method of replacing an unsplit keyboard with an integrated input area in accordance with some embodiments.
Figure 6B:
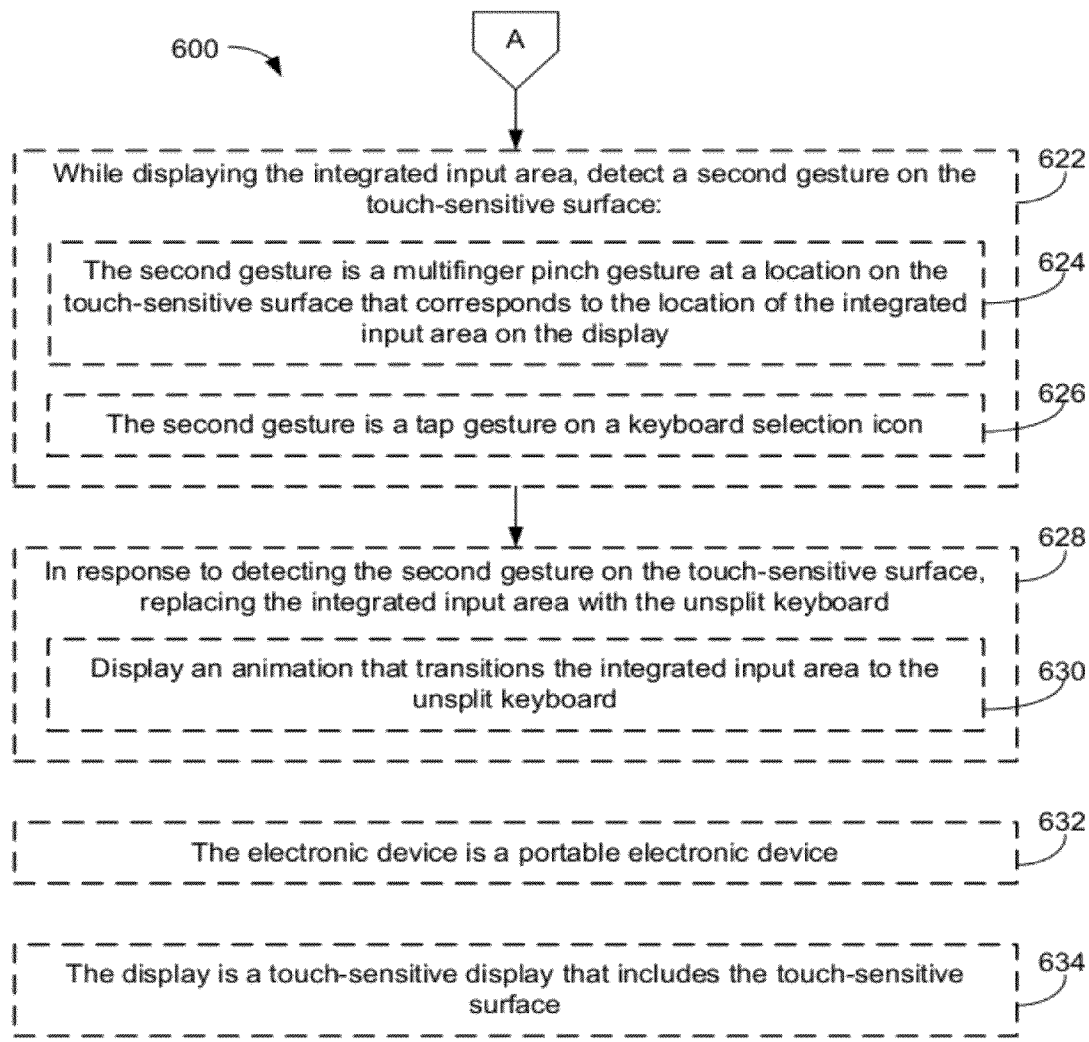

FIGS. 6A-6B are flow diagrams illustrating a method 600 of replacing an unsplit keyboard with an integrated input area in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to replace an unsplit keyboard with an integrated input area for text entry. The method is particularly useful when a user is typing with a tablet computer and wants to change from using an unsplit keyboard (e.g., for ten-finger typing when the tablet computer is resting on a solid surface) to using an integrated input area with a split keyboard (e.g., for two-thumb typing when the tablet computer is being held by the user's remaining eight fingers) or vice versa. The method reduces the cognitive burden on a user when manipulating soft keyboards, thereby creating a more efficient human-machine interface. For battery-operated electronic devices, enabling a user to manipulate a soft keyboard faster and more efficiently conserves power and increases the time between battery charges.

The device concurrently displays (602) a first text entry area (e.g., in an application content area) and an unsplit keyboard (e.g. a single, unitary, or merged keyboard that includes character keys from the left and right sides of a split keyboard) on the display. FIG. 5A, for example, shows text entry area 5002 and unsplit soft keyboard 5008 being displayed concurrently on display 112.

The device detects (604) a gesture on the touch-sensitive surface. For example, in FIG. 5A, gesture 5010 or 5014 is detected on display 112, which is a touch screen.

In some embodiments, the gesture is (606) a multifinger (i.e., more than one finger) depinch gesture at a location on the touch-sensitive surface that corresponds to the location of the unsplit keyboard on the display. For example, in FIG. 5A, gesture 5010 is a two-finger depinch gesture on unsplit soft keyboard 5008. In some embodiments, the two-finger depinch gesture requires symmetric horizontal movement (or movement within a predetermined angle of horizontal, such as 5°, 10°, 15° or 20°) on the touch-sensitive surface. Requiring symmetric horizontal movement helps filter out anchored depinch gestures where only one touch moves, non-horizontal depinch gestures, and other gestures that may not be intended to replace the unsplit keyboard with an integrated input area.

In some embodiments, the gesture is (608) a tap gesture on a keyboard selection icon (e.g., a finger tap gesture on an icon that toggles between the unsplit keyboard, the integrated input area, and possibly other types of keyboard input areas; a finger tap gesture on an icon that activates replacement of the unsplit keyboard with the integrated input area). For example, in FIG. 5A, gesture 5014 is a tap gesture on keyboard split key 5012, which shows an icon of two halves moving apart in a split.

In response to detecting the gesture on the touch-sensitive surface, the device replaces (610) the unsplit keyboard with an integrated input area. The integrated input area includes a left portion with a left side of a split keyboard, a right portion with a right side of the split keyboard, and a center portion in between the left portion and the right portion. For example, in FIGS. 5A-5C, in response to detection of gesture 5010, unsplit soft keyboard 5008 is replaced with integrated input area 5016. Integrated input area 5016 includes left split keyboard portion 5016-A, right split keyboard portion 5016-B, and center area 5016-C situated between the left and right portions 5016-A, 5016-B.

In some embodiments, the width of the integrated input area is the same (or substantially the same, e.g., 90% or 95%) as the width of the display. This width makes the left side of the split keyboard more accessible to the left thumb of a user. Similarly, this width makes the right side of the split keyboard more accessible to the right thumb of a user.

In some embodiments, the integrated input area is visually distinguished from other user interface elements in the display, for example by providing the left portion, center portion, and right portion of the integrated input area with a common distinct shading, background color or pattern, and/or by providing a distinctive border around the left portion, center portion, and right portion of the integrated input area.

In some embodiments, the integrated input area includes a second text entry area (612). The second text entry area typically displays a duplicate portion of the first text entry area, such as an area near the cursor in first text entry area. For example, the second text entry area may contain a duplicate of the cursor/insertion point in the first text entry area and one or more words from the most recent text entered by the user adjacent to the cursor/insertion point. For example, integrated input area 5016 includes center area 5016-C. Center area 5016-C displays duplicate input text 5022, making center area 5016-C a second text entry area to the first text entry area 5002.

In some embodiment, the first text entry area displays (614) text at a first size, and the second text entry area displays a portion of the text in the first text entry area at a second size that is larger than the first size. For example, in FIG. 5C, duplicate text input 5022 is displayed in center area 5016-C at a larger size than input text 5006 in text entry area 5002.

In some embodiments, while displaying the integrated input area, the device detects (616) a gesture (e.g., a tap gesture 5026 on the "T" key 5024, FIG. 5D) at a location on the touch-sensitive surface that corresponds to a location of a character key in the split keyboard. In response to detecting the gesture at the location on the touch-sensitive surface that corresponds to the location of the character key in the split keyboard, the device inputs and concurrently displays (618) the corresponding character in the first text entry area and the second text entry area on the display. For example, in FIG. 5D, in response to detection of gesture 5026, a character "t" is entered into input text 5006 and duplicate input text 5022.

In some embodiments, replacing the unsplit keyboard with the integrated input area includes displaying (620) an animation that transitions the unsplit keyboard to the integrated input area. For example, FIG. 5B shows an instant in a transition animation from unsplit soft keyboard 5008 to integrated input area 5016.

In some embodiments, the transition for each character key is a linear interpolation between two states, the unsplit (or merged) state and the split state. In some embodiments, at least one character key is duplicated during the transition so that the left portion of the split keyboard and the right portion of the split keyboard contain at least one common character key (e.g., the "g" keys 5019-A and 5019-B in FIG. 5C). In some embodiments, some keys in the unsplit keyboard are not displayed in the split keyboard (e.g., hide keyboard key 5009 in the unsplit keyboard (FIG. 5A) is not displayed in the split keyboard (FIG. 5C)). In some embodiments, during the animated transition to the integrated input area, keys that are not displayed in the split keyboard appear to be pushed off-screen as they fade to zero opacity during the transition.

In some embodiments, while displaying the integrated input area, the device detects (622) a second gesture on the touch-sensitive surface (e.g., a gesture 5028 or 5032 on display 112, FIG. 5E).

In some embodiments, the second gesture is (624) a multifinger (i.e., more than one finger) pinch gesture at a location on the touch-sensitive surface that corresponds to the location of the integrated input area on the display. For example, in FIG. 5E, gesture 5028 is a two-finger pinch gesture on display 112. In some embodiments, the two-finger pinch gesture requires symmetric horizontal movement (or movement within a predetermined angle of horizontal, such as 5°, 10°, 15° or 20°) on the touch-sensitive surface. Requiring symmetric horizontal movement helps filter out anchored pinch gestures where only one touch moves, non-horizontal pinch gestures, and other gestures that may not be intended to replace the integrated input area with the unsplit keyboard.

In some embodiments, the second gesture is (626) a tap gesture on a keyboard selection icon (e.g., a finger tap gesture on an icon that toggles between the unsplit keyboard, the integrated input area, and possibly other types of keyboard input areas; a finger tap gesture on an icon that activates replacement of the unsplit keyboard with the integrated input area). For example, in FIG. 5E, gesture 5032 is a tap gesture on keyboard unsplit key 5018, which shows an icon of two halves merging together.

In response to detecting the second gesture on the touch-sensitive surface, the device replaces (628) the integrated input area with the unsplit keyboard. For example, in FIGS. 5E-5G, in response to gesture 5028 or 5032, integrated input area 5016 is replaced with unsplit keyboard 5008.

In some embodiments, replacing the integrated input area with the unsplit keyboard includes displaying (630) an animation that transitions the integrated input area to the unsplit keyboard. For example, FIG. 5F shows an instant in a transition animation from integrated input area 5016 to unsplit soft keyboard 5008.

In some embodiments, the electronic device is (632) a portable electronic device (e.g., a tablet computer such as the iPad® device from Apple Inc. of Cupertino, Calif.). For example, device 100 or 300 may be a portable tablet computer.

In some embodiments, the display is (634) a touch-sensitive display that includes the touch-sensitive surface. For example, display 112 is a touch screen.

Details in method 600 apply to the methods described below, and are omitted for brevity.

Figure 7A:
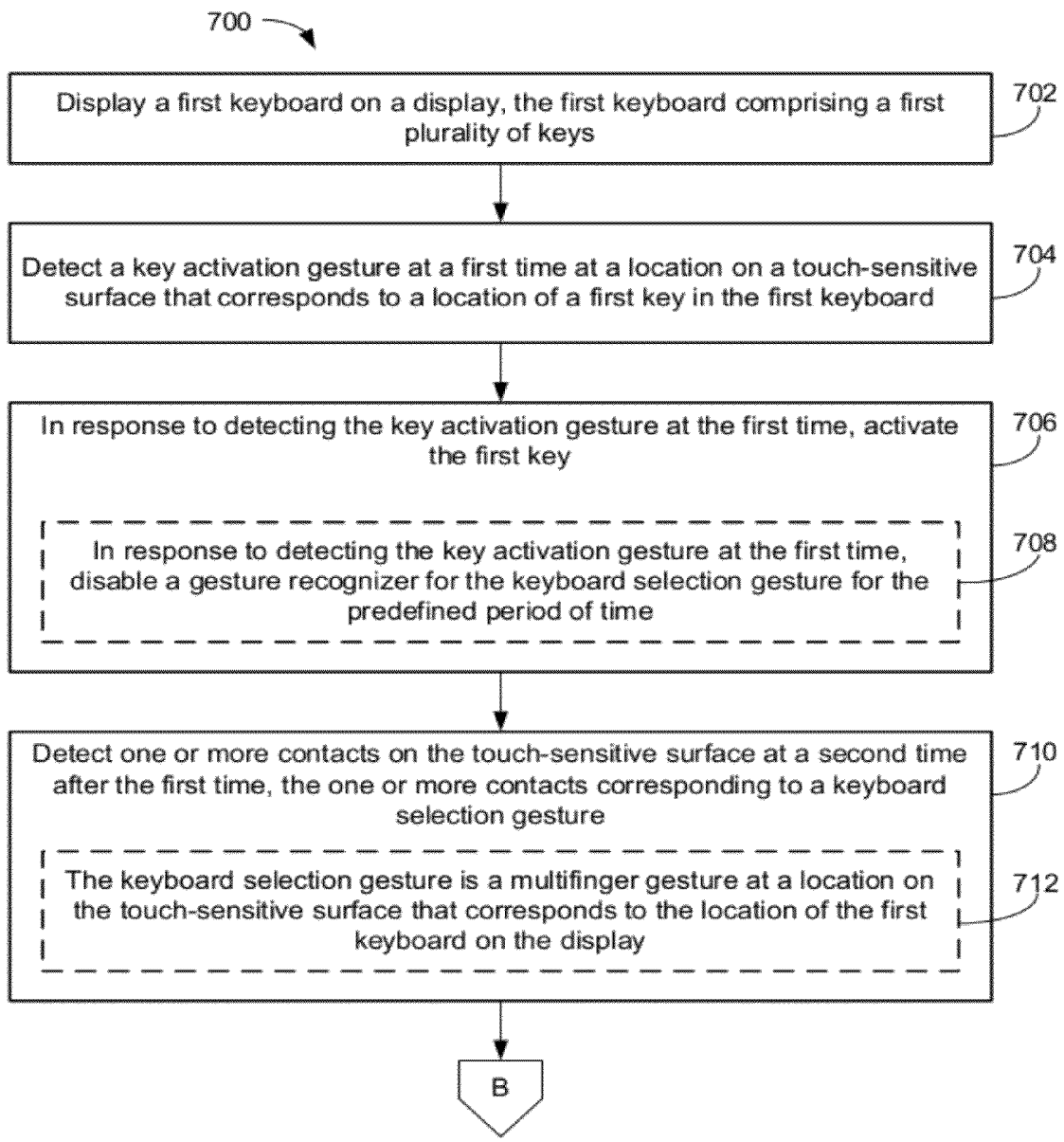
FIGS. 7A-7B are flow diagrams illustrating a method of responding to a keyboard selection gesture in accordance with some embodiments.
Figure 7B:
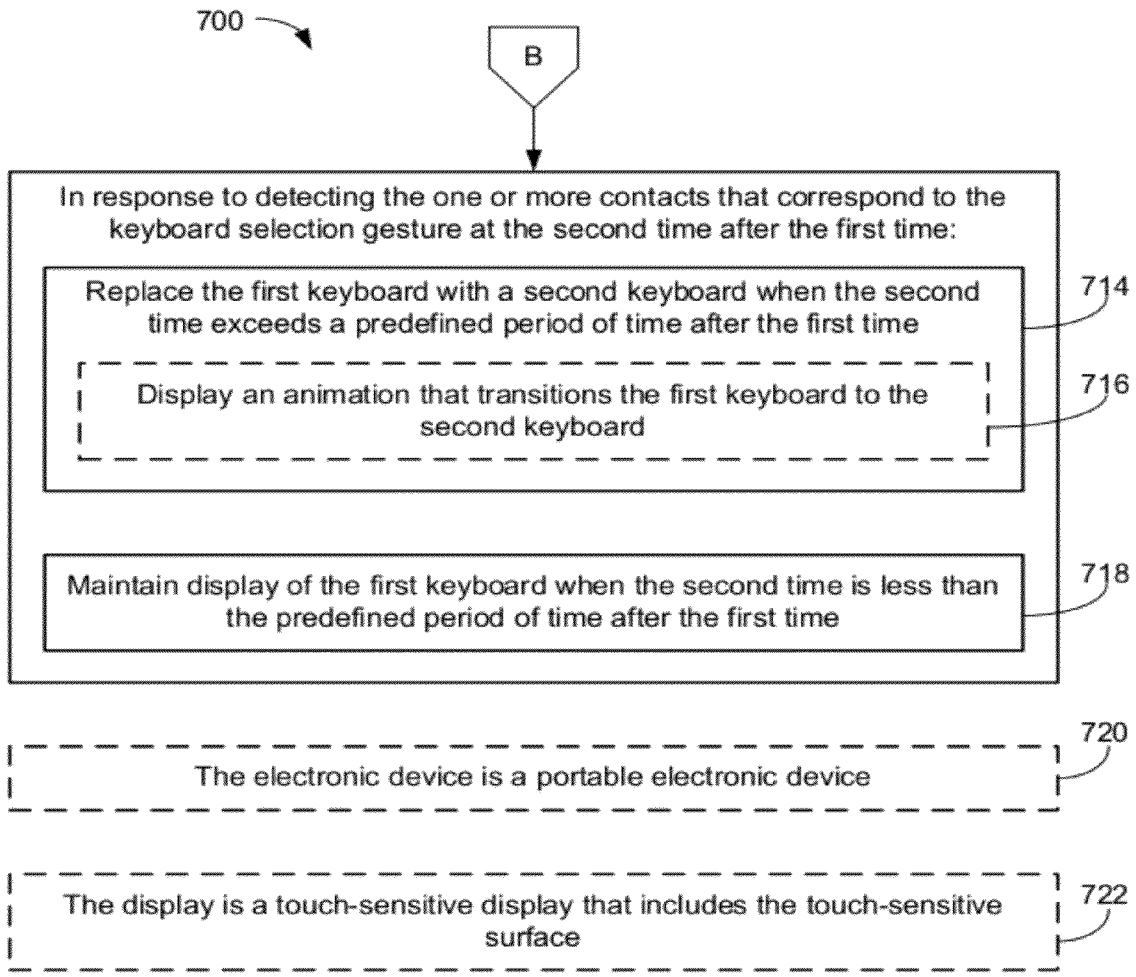

FIGS. 7A-7B are flow diagrams illustrating a method 700 of responding to a keyboard selection gesture in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides a way to prevent accidentally changing soft keyboards while typing (e.g., from an unsplit keyboard to an integrated input area with a split keyboard, or vice versa). The method reduces the cognitive burden on a user when manipulating and using soft keyboards, thereby creating a more efficient human-machine interface. For battery-operated electronic devices, enabling a user to manipulate and use soft keyboards faster and more efficiently conserves power and increases the time between battery charges.

The device displays (702) a first keyboard on the display, the first keyboard comprising a first plurality of keys (e.g. a split keyboard or, conversely, a single, unitary, or merged keyboard that includes character keys from the left and right portions of the split keyboard). For example, in FIG. 5H, unsplit keyboard 5008 is displayed. Unsplit keyboard 5008 includes a plurality of letter keys, an example of which is "T" key 5036.

The device detects (704) a key activation gesture at a first time at a location on the touch-sensitive surface that corresponds to a location of a first key in the first keyboard (e.g., a tap gesture 5038 on the "T" key 5036, FIG. 5H).

In response to detecting the key activation gesture at the first time, the device activates (706) the first key (e.g., entering a character that corresponds to the first key or performing an action that corresponds to the first key). For example, in FIGS. 5H-5I, in response to gesture 5038 on "T" key 536, a character "t" is entered into input text 5006.

In some embodiments, in response to detecting the key activation gesture at the first time, the device disables (708) a gesture recognizer for the keyboard selection gesture for the predefined period of time. For example, in FIG. 5H, in response to detection of gesture 5038, the device disables a gesture recognizer for the keyboard selection gesture for the predefined period of time.

The device detects (710) one or more contacts on the touch-sensitive surface at a second time after the first time, the one or more contacts corresponding to a keyboard selection gesture. For example, in FIG. 5I, gesture 5010, which includes two contacts, is detected.

In some embodiments, the keyboard selection gesture is (712) a multifinger gesture at a location on the touch-sensitive surface that corresponds to the location of the first keyboard on the display. For example, in FIG. 5I, gesture 5010 is a two-finger depinch gesture on unsplit soft keyboard 5008.

In response to detecting the one or more contacts that correspond to the keyboard selection gesture at the second time after the first time, the device replaces (714) the first keyboard with a second keyboard when the second time exceeds a predefined period of time after the first time.

In some embodiments, replacing the first keyboard with the second keyboard includes displaying (716) an animation that transitions the first keyboard to the second keyboard. For example, FIG. 5J shows an instant in a transition animation from unsplit soft keyboard 5008 to integrated input area 5016.

In some embodiments, although the contacts that correspond to a keyboard selection gesture are detected on the touch-sensitive surface, the keyboard selection gesture is not recognized because the gesture recognizers for the keyboard selection gesture are disabled for a predefined period of time after a key activation gesture is detected.

In response to detecting the one or more contacts that correspond to the keyboard selection gesture at the second time after the first time, the device maintains (718) display of the first keyboard when the second time is less than the predefined period of time after the first time.

For example, in response to detecting a multifinger pinch gesture to select a merged keyboard when a split keyboard is currently displayed, the split keyboard is replaced by the merged keyboard if more than a predefined period of time (e.g., 0.3, 0.4, 0.5, 0.6 seconds or some other reasonable period of time) has elapsed since a key in the split keyboard was activated. But the split keyboard remains displayed if less than the predefined period of time has elapsed since a key in the split keyboard was activated, thereby preventing accidentally changing the keyboard when the user is actively typing. Conversely, in response to detecting a multifinger depinch gesture to select a split keyboard when a merged keyboard is currently displayed, the merged keyboard is replaced by the split keyboard if more than the predefined period of time has elapsed since a key in the merged keyboard was activated. But the merged keyboard remains displayed if less than the predefined period of time has elapsed since a key in the merged keyboard was activated.

As an example, in FIGS. 5H-5I, if the time period from gesture 5038 to gesture 5010 exceeds the predefined period of time, then unsplit soft keyboard 5008 is replaced with split soft keyboard area 5016, as shown in FIG. 5K. If the time period from gesture 5038 to gesture 5010 does not exceeds the predefined period of time, then unsplit soft keyboard 5008 remains displayed.

In some embodiments, the electronic device is (720) a portable electronic device (e.g., a tablet computer). For example, device 100 or 300 may be a portable tablet computer.

In some embodiments, the display is (722) a touch-sensitive display that includes the touch-sensitive surface. For example, display 112 is a touch screen.

Figure 8A:
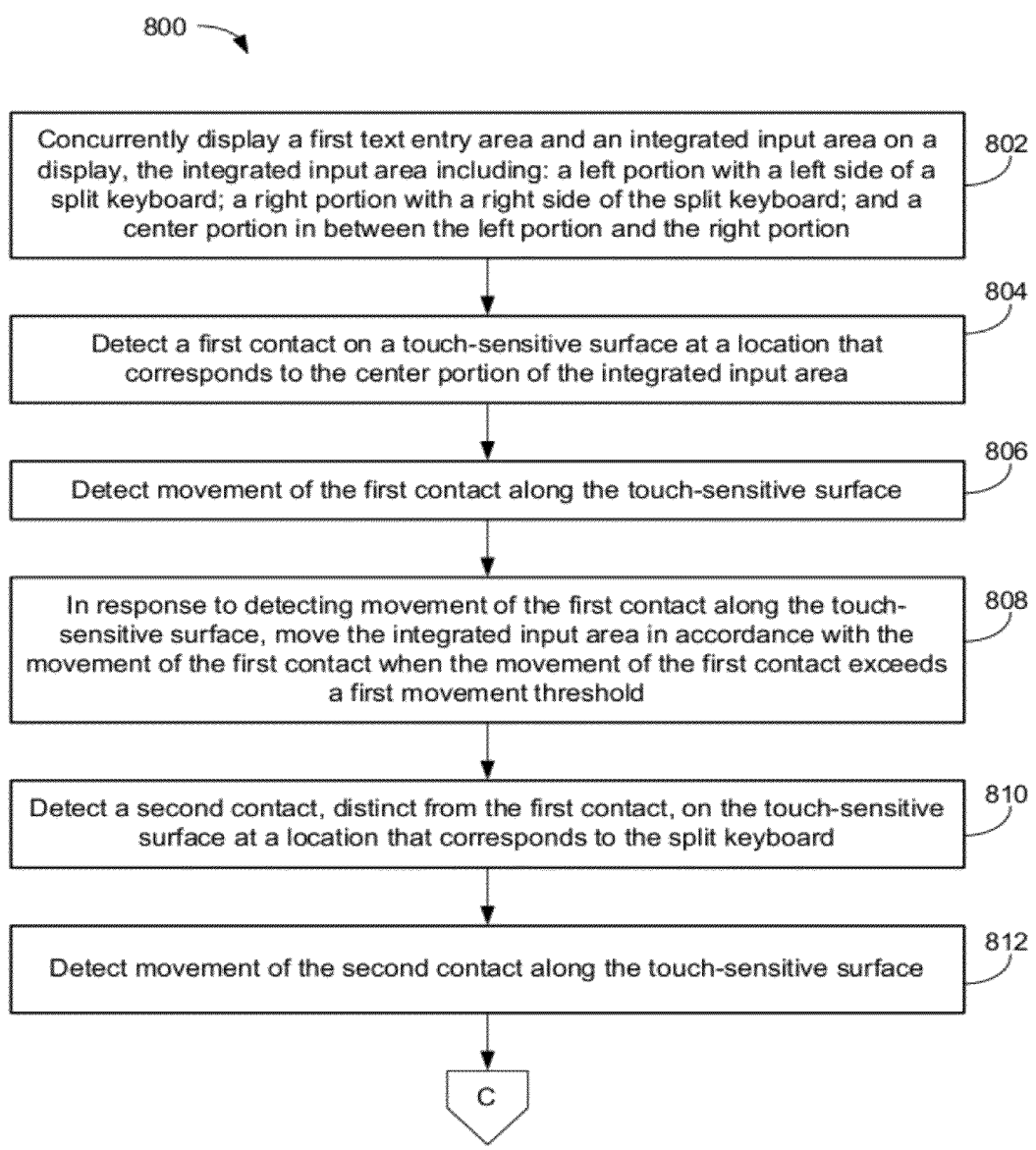
FIGS. 8A-8B are flow diagrams illustrating a method of moving an integrated input area in accordance with some embodiments.
Figure 8B:
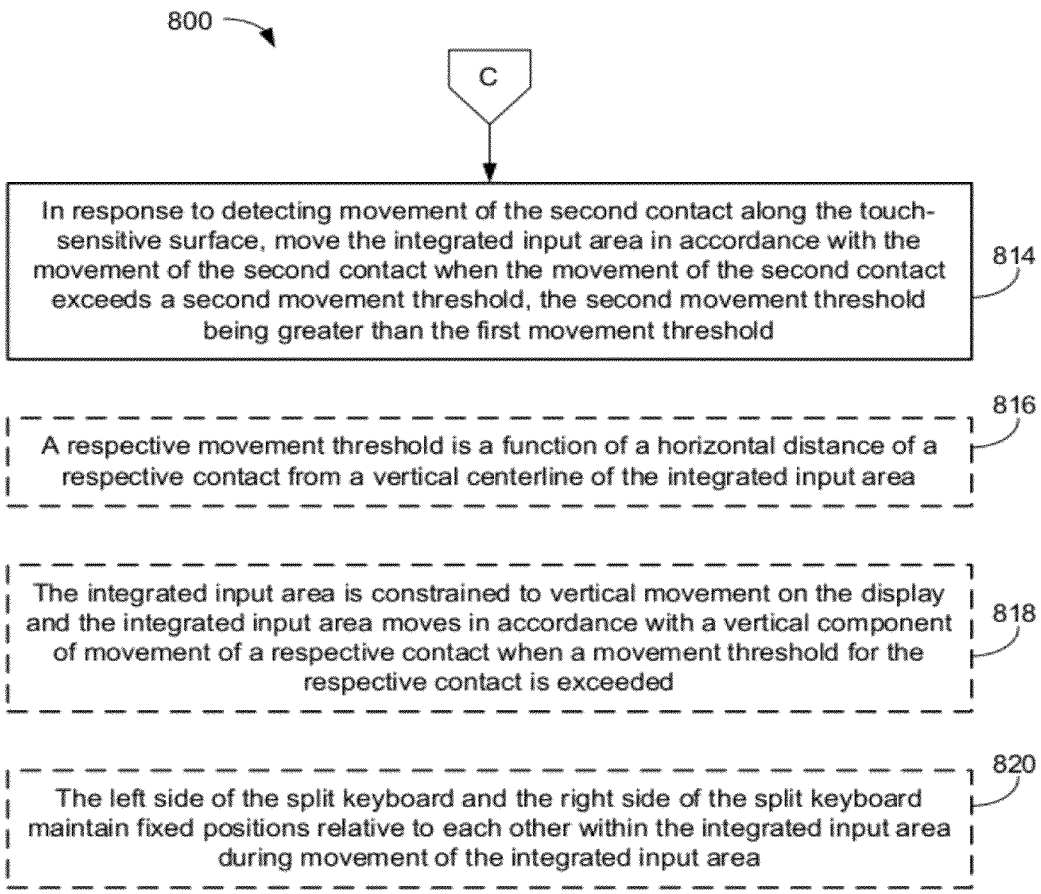

FIGS. 8A-8B are flow diagrams illustrating a method 800 of moving an integrated input area in accordance with some embodiments. The method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides a way to prevent accidental movement of an integrated input area when a user contact moves during typing with the split keyboard. The method reduces the cognitive burden on a user when repositioning and using an integrated input area that includes a split keyboard, thereby creating a more efficient human-machine interface. For battery-operated electronic devices, enabling a user to reposition and use a soft keyboard faster and more efficiently conserves power and increases the time between battery charges.

The device concurrently displays (802) a first text entry area and an integrated input area on the display, the integrated input area including: a left portion with a left side of a split keyboard, a right portion with a right side of the split keyboard, and a center portion in between the left portion and the right portion. For example, in FIG. 5L, text entry area 5002 and integrated input area 5039 are displayed on display 112. Integrated input area 5039 includes left split keyboard portion 5039-A, right split keyboard portion 5039-B, and center area 5039-C between left and right split keyboard portions 5039-A and 5039-B.

The device detects (804) a first contact on the touch-sensitive surface at a location that corresponds to the center portion of the integrated input area. For example, in FIG. 5L, a finger contact corresponding to gesture 5040 is detected at position 5040-1 in center area 5039-C.

The device detects (806) movement of the first contact along the touch-sensitive surface. For example, in FIG. 5L, the finger contact in gesture 5040 moves from position 5040-1 to position 5040-2.

In response to detecting movement of the first contact along the touch-sensitive surface, the device moves (808) the integrated input area in accordance with the movement of the first contact when the movement of the first contact exceeds a first movement threshold. For example, in FIGS. 5L-5M, when the movement of gesture 5040 exceeds threshold 5042, then integrated input area 5039 moves in accordance with the movement gesture 5040.

The device detects (810) a second contact, distinct from the first contact, on the touch-sensitive surface at a location that corresponds to the split keyboard. For example, in FIG. 5L, a finger contact corresponding to gesture 5044 is detected at position 5044-1 in right split keyboard portion 5039-B.

The device detects (812) movement of the second contact along the touch-sensitive surface. For example, in FIG. 5L, the finger contact in gesture 5044 moves from position 5044-1 to position 5044-2.

In response to detecting movement of the second contact along the touch-sensitive surface, the device moves (814) the integrated input area in accordance with the movement of the second contact when the movement of the second contact exceeds a second movement threshold, the second movement threshold being greater than the first movement threshold. For example, in FIGS. 5L-5M, when the movement of gesture 5044 exceeds threshold distance 5046 (or threshold distance 5048, depending on the implementation), then integrated input area 5039 moves in accordance with the movement gesture 5044.

In some embodiments, a respective movement threshold is a function of a horizontal distance of a respective contact from a vertical centerline of the integrated input area (816). For example, in FIG. 5N, charts 5050 and 5058 show the threshold distance as a function of distance from the centerline of integrated input area 5039. In some embodiments, the movement threshold increases as the horizontal distance of the contact from the vertical centerline increases. For example, in FIG. 5L, threshold distance 5046 in right soft keyboard portion 5039-B is greater than threshold distance 5042 in center area 5039-C. As another example. chart 5058 in FIG. 5N shows the threshold distance varying linearly with distance from a centerline of integrated input area 5039.

In some embodiments, the integrated input area is constrained to vertical movement on the display (e.g., when the width of the integrated input area is the same (or substantially the same, e.g., 90% or 95%) as the width of the display) and the integrated input area moves in accordance with a vertical component of movement of a respective contact when a movement threshold for the respective contact is exceeded (818). For example, in FIG. 5L-5M, even with gesture 5044 having an angular movement (and thus having a horizontal component and a vertical component), movement of integrated input area 5039 is constrained to vertical movement. The horizontal movement of gesture 5044 is ignored.

In some embodiments, the left side of the split keyboard and the right side of the split keyboard maintain fixed positions relative to each other within the integrated input area during movement of the integrated input area (820). For example, in FIGS. 5L-5M, left and right split keyboard portions 5039-A and 5039-B remain in fixed positions relative to each other during the movement.

Figure 9:
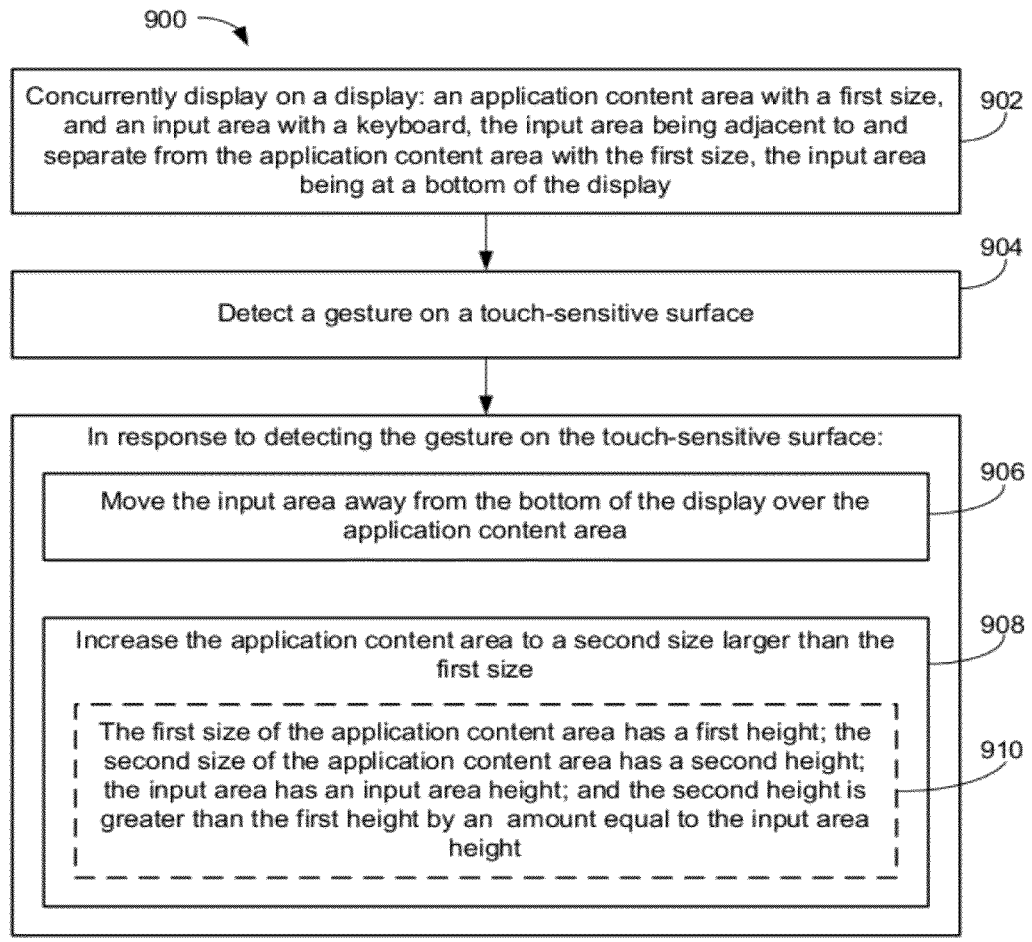
FIG. 9 is a flow diagram illustrating a method of moving an input area and adjusting the size of an application content area in accordance with some embodiments.

FIG. 9 is a flow diagram illustrating a method 900 of moving an input area and adjusting the size of an application content area in accordance with some embodiments. The method 900 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides a way to increase the size of an application content area (e.g., an application view or window) when an input area with a keyboard is moved from the bottom of a display. The method is particularly useful when a user is typing with a tablet computer with a limited display area because it allows for more of an application to be viewed, thereby creating a more efficient human-machine interface. For battery-operated electronic devices, enabling a user to manipulate a soft keyboard and see more of an application lets the user work faster, which conserves power and increases the time between battery charges.

The device concurrently displays (902) on the display an application content area with a first size and an input area with a keyboard (e.g., a split keyboard or a merged keyboard), with the input area being adjacent to and separate from the application content area with the first size and the input area being at a bottom of the display. For example, in FIG. 5O, application content area 5062 with height 5064 and integrated input area 5039 with height 5065 are displayed. Integrated input area 5039 is docked at the bottom of display 112 and is adjacent to and separate from application content area 5062.

The device detects (904) a gesture on the touch-sensitive surface (e.g., an upward flick or drag gesture at a location on the touch-sensitive surface that corresponds to the input area at the bottom of the display). For example, in FIG. 5O, gesture 5068, which is a dragging gesture, is detected on display 112.

In response to detecting the gesture on the touch-sensitive surface, the device moves (906) the input area away from the bottom of the display over the application content area, and increases (908) the application content area to a second size larger than the first size. For example, in FIG. 5P, in response to detection of gesture 5068, integrated input area 5039 moves away from the bottom of display 112 and over application content area 5062. Additionally, application content area 5062 (FIG. 5P) increases in size to a size with height 5066, which is larger than the size of the application content area with height 5064 (FIG. 5O).

In some embodiments, the first size of the application content area has a first height, the second size of the application content area has a second height, the input area has an input area height, and the second height is greater than the first height by an amount equal to (or substantially equal to (e.g., up to 5% or 10% difference)) the input area height (910). For example, in FIG. 5O, application content area 5062 has height 5064, and integrated input area 5039 has height 5065. In FIG. 5P, application content area 5062 has height 5066, which is the sum of height 5064 and height 5065.

In other words, when the keyboard is "anchored" at the bottom of the screen, an application treats the keyboard as being an area with non-zero height that cannot be used to display the application content area. Thus, the application reduces the size of its application content area accordingly. But, when the keyboard is moved away from the bottom of the screen (becomes "unanchored" from the bottom of the display), the application treats the keyboard as being an area with zero height (even though the actual displayed height of the input area is non-zero) and so the application increases its content display area to use more of the display (e.g., to use all or substantially all of the display area). When unanchored, the keyboard floats over the application content area. The keyboard moves vertically in response to detecting an upward finger gesture. The keyboard may move with inertia if the velocity upon liftoff of the finger is above a predefined threshold.

Figure 10A:
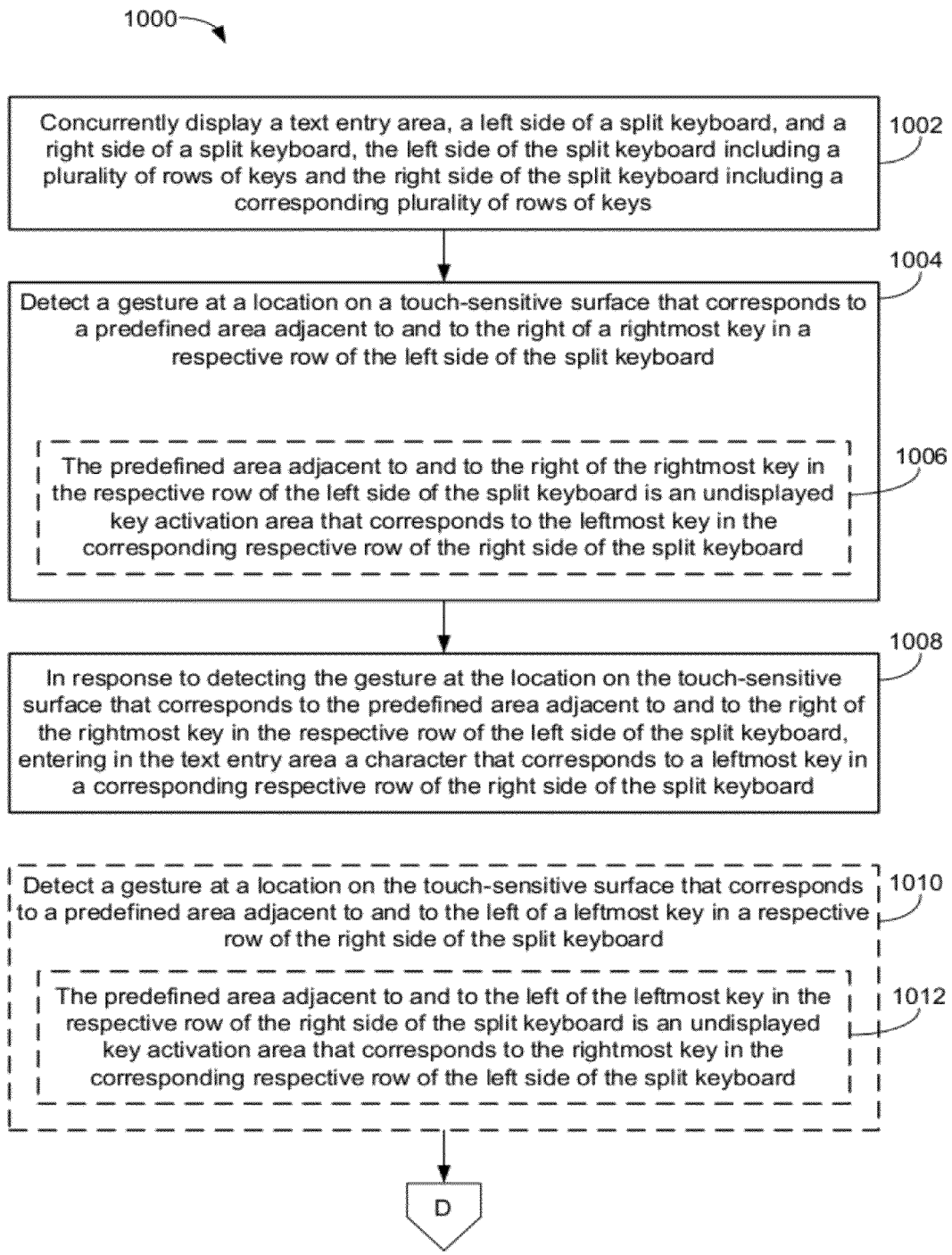
FIGS. 10A-10B are flow diagrams illustrating a method of entering characters with a split soft keyboard in accordance with some embodiments.
Figure 10B:
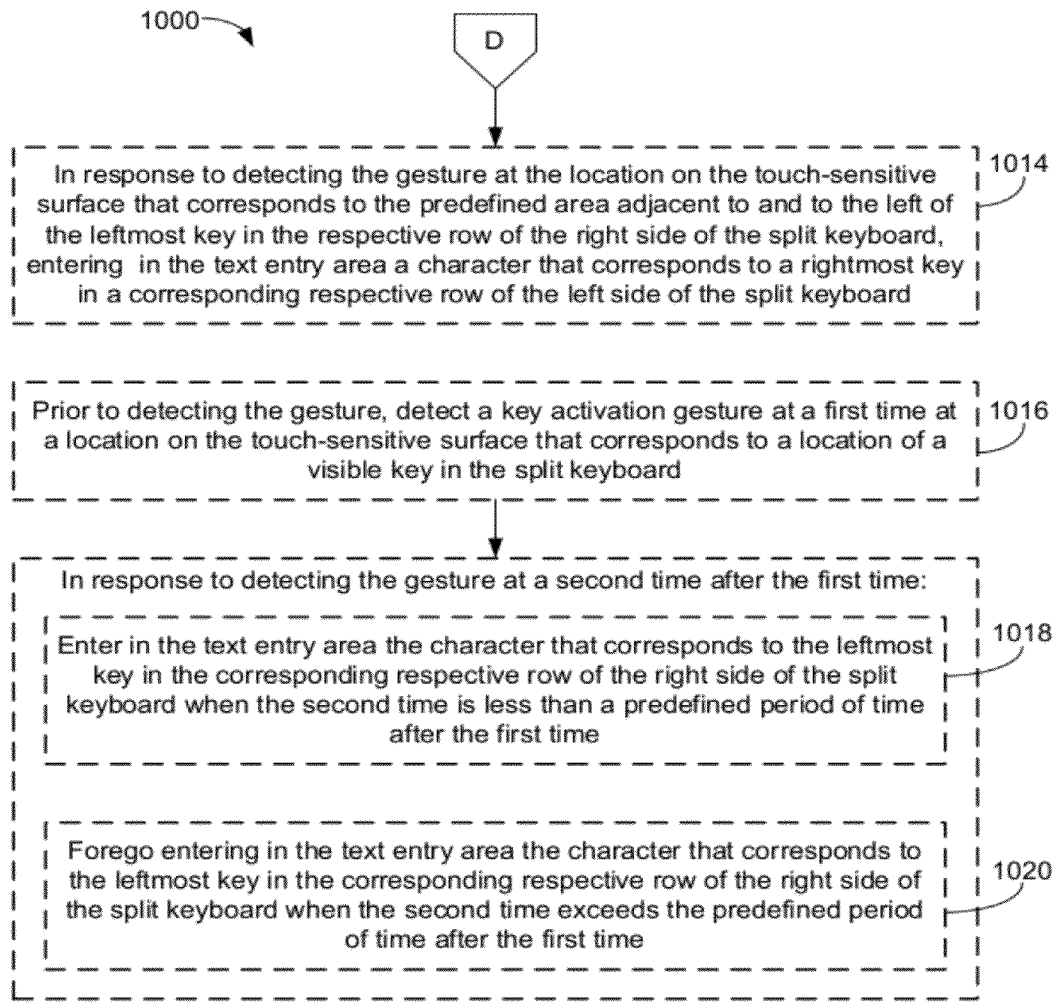
Figure 11A:
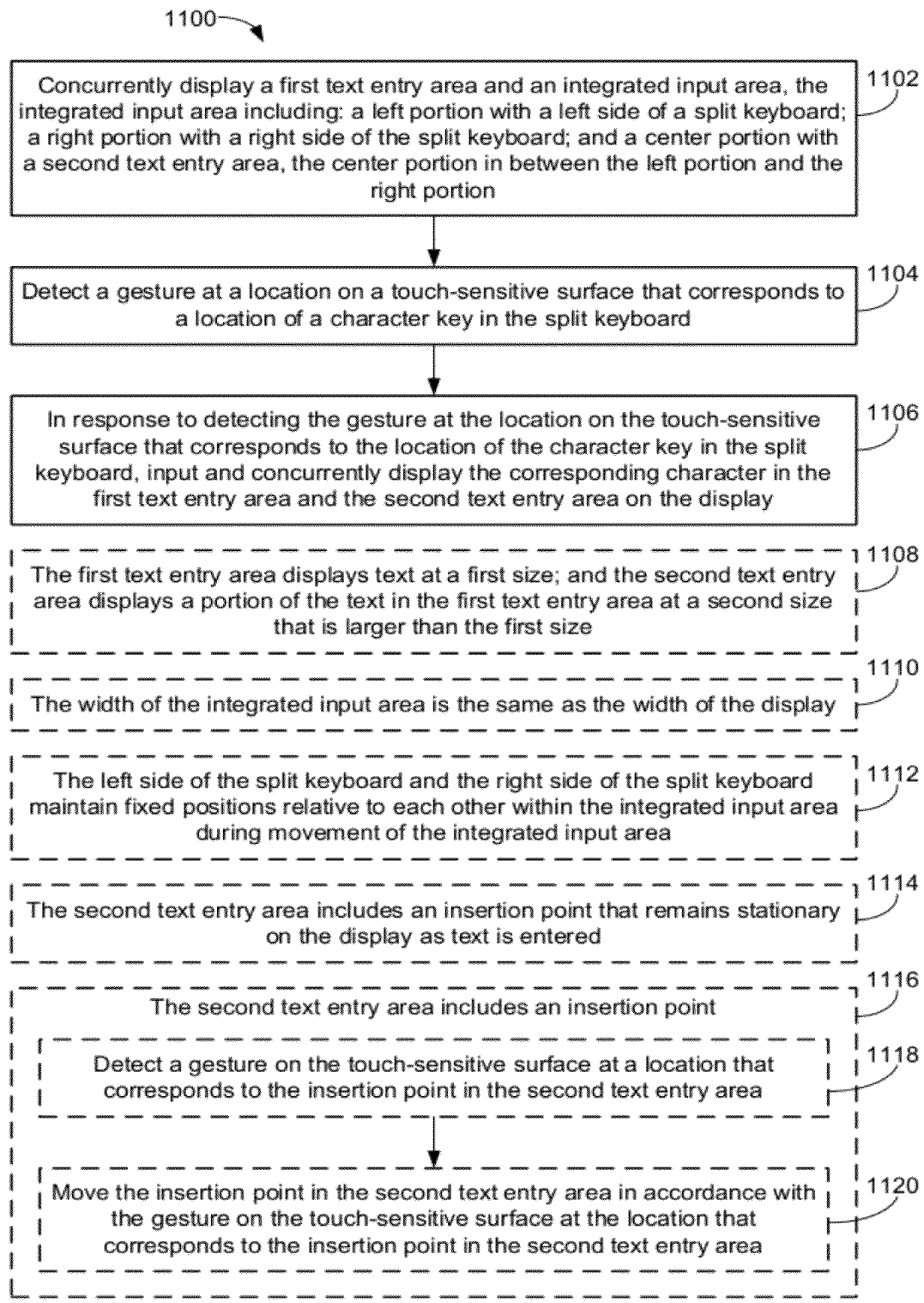
FIGS. 11A-11D are flow diagrams illustrating a method of using a center portion of an integrated input area in accordance with some embodiments.
Figure 11B:
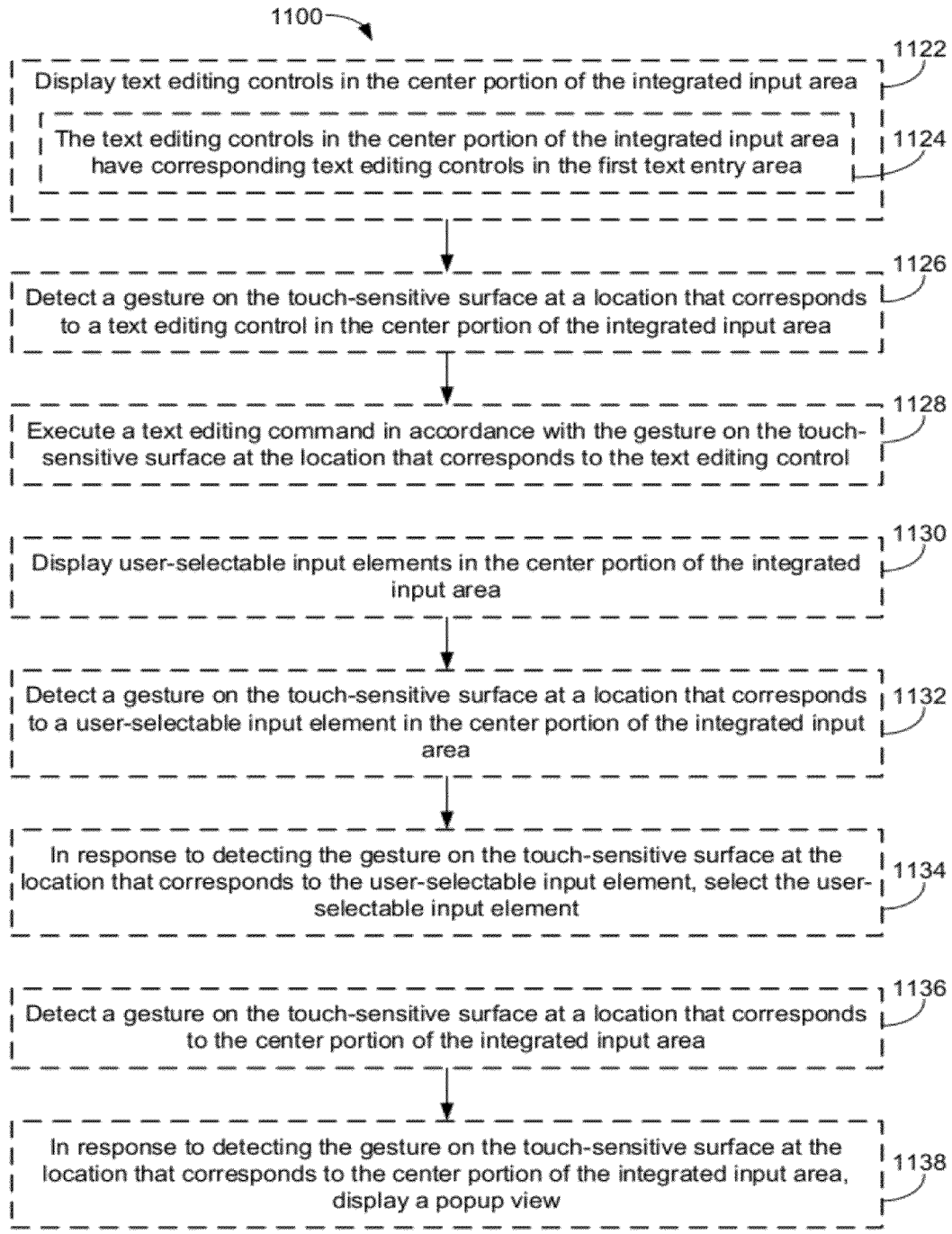
Figure 11C:
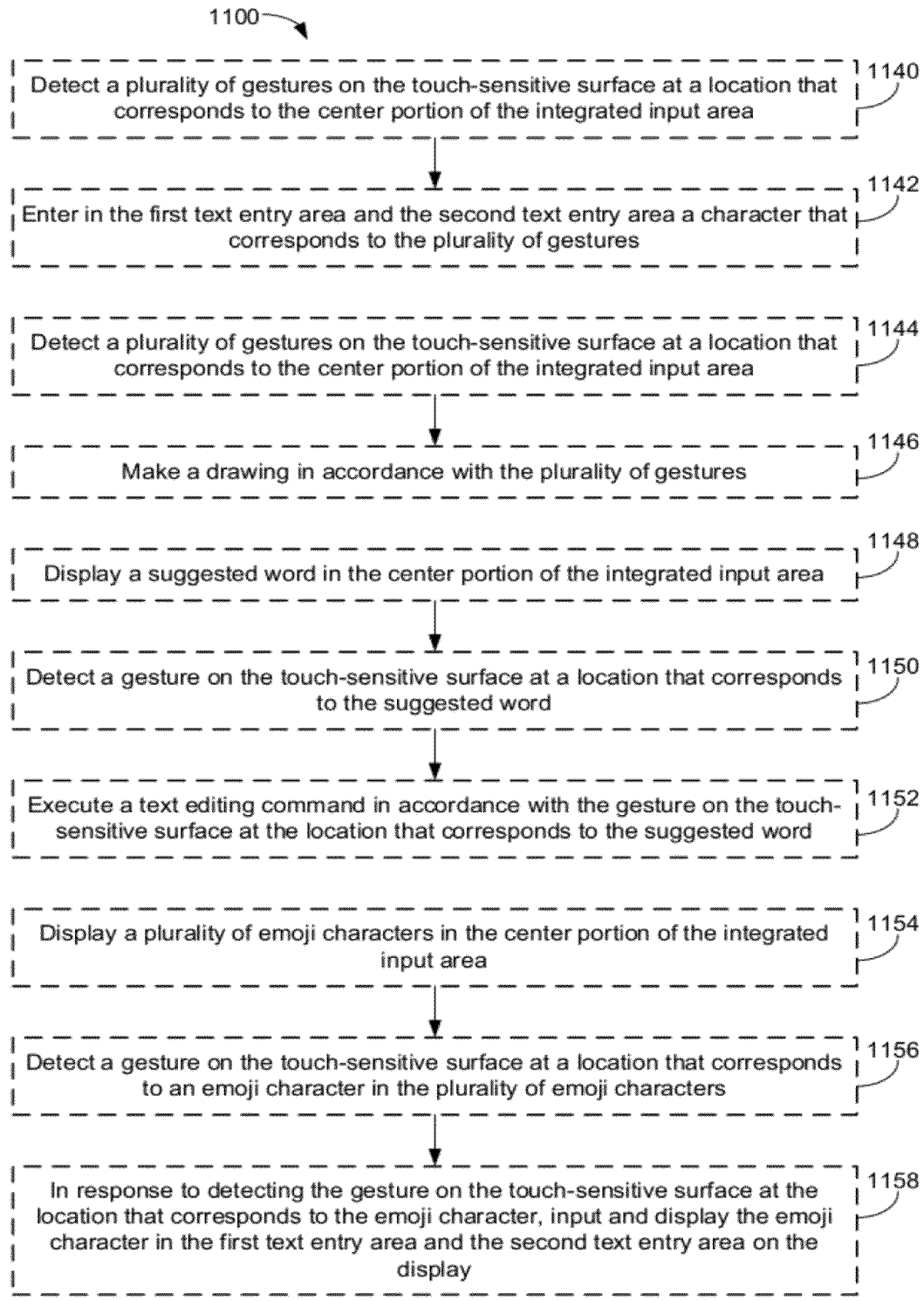
Figure 11D:
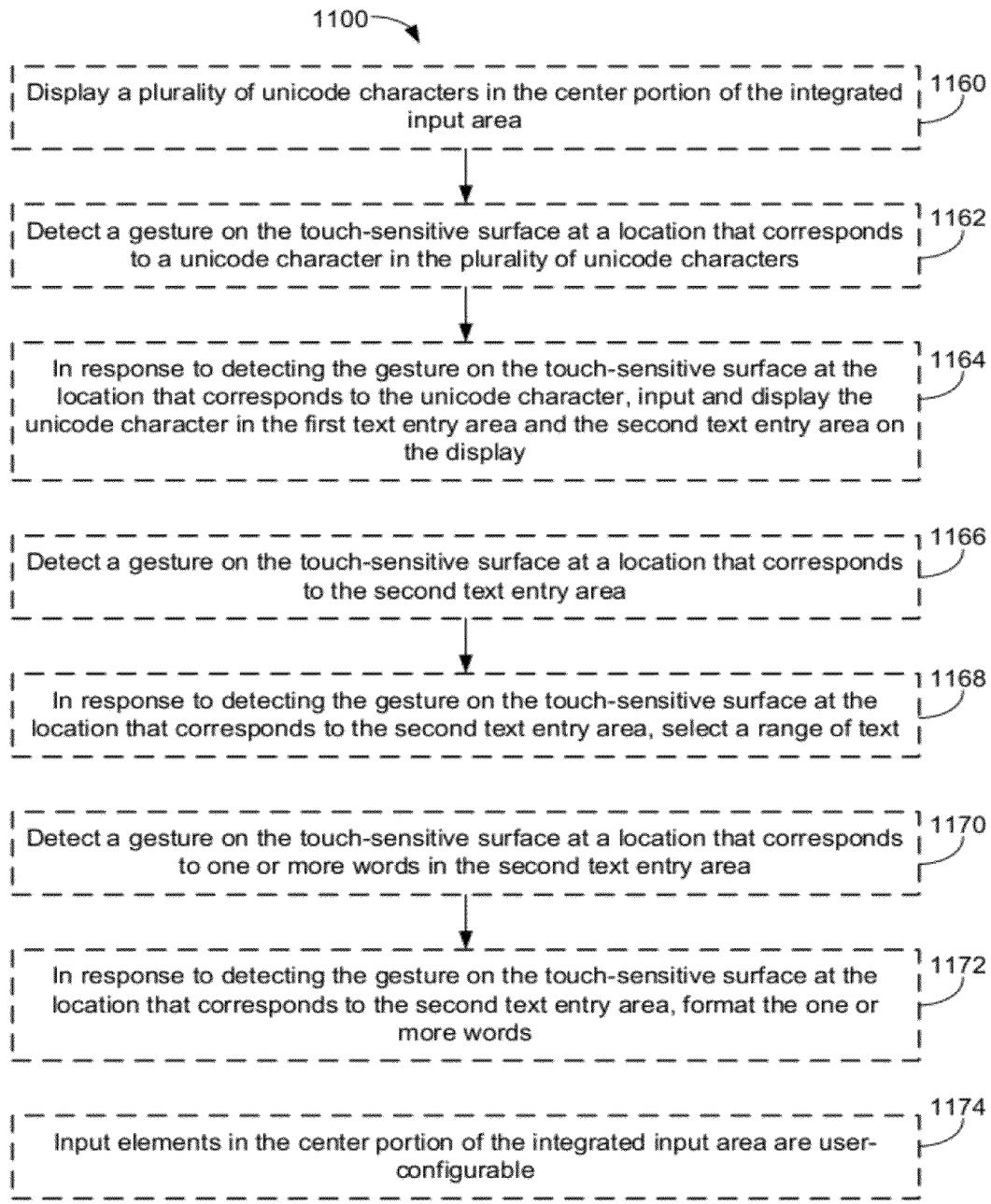

FIGS. 10A-10B are flow diagrams illustrating a method 1000 of entering characters with a split soft keyboard in accordance with some embodiments. The method 1000 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 1000 makes two-thumb typing with a split keyboard (e.g., on a tablet computer that is being held by the user's remaining eight fingers) faster and more efficient by letting a user easily activate certain keys on the right side of a split keyboard with a left thumb (and conversely, letting a user easily activate certain keys on the left side of a split keyboard with a right thumb), thereby creating a more efficient human-machine interface. For battery-operated electronic devices, enabling a two-thumb typist to enter characters in a split soft keyboard faster and more efficiently conserves power and increases the time between battery charges.

The device concurrently displays (1002) a text entry area, a left side of a split keyboard, and a right side of a split keyboard, with the left side of the split keyboard including a plurality of rows of keys and the right side of the split keyboard including a corresponding plurality of rows of keys. A row of keys on the left side of the split keyboard and a row of keys on the right side of the keyboard are corresponding if the rows belong in the same row in the unsplit keyboard corresponding to the split keyboard.

For example, in FIG. 5Q, text entry area 5002 and split soft keyboard 5069 are displayed. Split soft keyboard 5069 includes left split keyboard portion 5069-A and right split keyboard portion 5069-B. Split soft keyboard 5069 includes letter keys arranged in accordance with the QWERTY layout. In left portion 5069-A, the top row of letter keys includes "Q," "W," "E," "R," and "T" keys. The middle row of letter keys includes "A," "S," "D," and "F" keys. The lower row of letter keys includes "Z," "X," "C," and "V" keys. In right portion 5069-B, the top row of letter keys include "Y," "U," "I," "O," and "P" keys. The middle row of letter keys includes "G," "H," "J," "K," and "L" keys. The lower row of letter keys includes "B," "N," and "M" keys. The row with "Q," "W," "E," "R," and "T" keys on left portion 5069-A and the row with "Y," "U," "I," "O," and "P" keys on right portion 5069-B are corresponding because these rows belong to the same top row in an unsplit QWERTY keyboard. Similarly, the row with "A," "S," "D," and "F" keys correspond to the row with "G," "H," "J," "K," and "L" keys, and the row with "Z," "X," "C," and "V" keys correspond to the row with "B," "N," and "M" keys. On the other hand, the row with "Q," "W," "E," "R," and "T" keys on left portion 5069-A does not correspond to the row with "G," "H," "J," "K," and "L" keys or to the row with "B," "N," and "M" keys in right portion 5069-B because they do not belong to the same row in an unsplit QWERTY keyboard.

The device (1004) detects a gesture at a location on the touch-sensitive surface that corresponds to a predefined area adjacent to and to the right of a rightmost key in a respective row of the left side of the split keyboard. For example, in FIG. 5R, gesture 5098 is detected on predefined key activation area 5086, which is to the right of "V" key 5074 in the lower row of letter keys in left split keyboard portion 5069-A.

In some embodiments, the predefined area adjacent to and to the right of the rightmost key in the respective row of the left side of the split keyboard is an undisplayed key activation area that corresponds to the leftmost key in the corresponding respective row of the right side of the split keyboard (1006). For example, in FIG. 5Q, key activation areas 5082, 5084, 5086, which are adjacent to and to right of keys 5070, 5072, and 5074, respectively, correspond to keys 5076, 5078, and 5080, respectively.

In response to detecting the gesture at the location on the touch-sensitive surface that corresponds to the predefined area adjacent to and to the right of the rightmost key in the respective row of the left side of the split keyboard, the device enters (1008) in the text entry area a character that corresponds to a leftmost key in a corresponding respective row of the right side of the split keyboard. For example, in FIGS. 5R-5S, in response to detection of gesture 5098, a character "b" is entered into input text 5006, as key activation area 5086 corresponds to "B" key 5080 in right split keyboard portion 5069-B; "B" key 5080 is the leftmost key in the corresponding row in right split keyboard portion 5069-B.

If the leftmost key in the corresponding respective row of the right side of the split keyboard is a duplicate of the rightmost key in the respective row of the left side of the split keyboard, then the key adjacent to and to the right of the leftmost key in the corresponding respective row of the right side of the split keyboard is entered instead. For example, returning to the lower rows of letter keys in left and right split keyboard portions 5069-A and 5069-B in FIG. 5Q, if undisplayed key activation area 5092 corresponding to "V" key 5074 is instead a displayed duplicate "V" key, then in response to detection of a gesture on key activation area 5086 to the right of the rightmost "V" key 5074 in the lower row in left portion 5069-A, a character "b" (corresponding to "B" key 5080) is entered instead of a character "v" corresponding to the duplicate "V" key.

In some embodiments, the device detects (1010) a gesture at a location on the touch-sensitive surface that corresponds to a predefined area adjacent to and to the left of a leftmost key in a respective row of the right side of the split keyboard. For example, in FIG. 5T, gesture 5100 is detected on predefined key activation area 5088, which is to the left of the rightmost "Y" key in the top row of letter keys in right split keyboard portion 5069-B.

In some embodiments, the predefined area adjacent to and to the left of the leftmost key in the respective row of the right side of the split keyboard is an undisplayed key activation area that corresponds to the rightmost key in the corresponding respective row of the left side of the split keyboard (1012). For example, in FIG. 5Q, key activation areas 5088, 5090, and 5092, which are adjacent to and to left of keys 5076, 5078, and 5080, respectively, correspond to keys 5070, 5072, and 5074, respectively.

In response to detecting the gesture at the location on the touch-sensitive surface that corresponds to the predefined area adjacent to and to the left of the leftmost key in the respective row of the right side of the split keyboard, the device enters (1014) in the text entry area a character that corresponds to a rightmost key in a corresponding respective row of the left side of the split keyboard. For example, in FIGS. 5T-5U, in response to detection of gesture 5100, a character "t" is entered into input text 5006, as key activation area 5088 corresponds to "T" key 5070 in left split keyboard portion 5069-A; "T" key 5070 is the rightmost key in the corresponding row in left split keyboard portion 5069-B.

If the rightmost key in the corresponding respective row of the left side of the split keyboard is a duplicate of the leftmost key in the respective row of the right side of the split keyboard, then the key adjacent to and to the left of the rightmost key in the corresponding respective row of the left side of the split keyboard is entered instead. For example, in the middle rows of letter keys in left and right split keyboard portions 5069-A and 5069-B in FIG. 5Q, if undisplayed key activation area 5084 corresponding to "G" key 5078 is instead a displayed duplicate "G" key, then in response to detection of a gesture on key activation area 5090 to the left of the leftmost "G" key 5078 in the middle row in right portion 5069-B, a character "f" (corresponding to "F" key 5072) is entered instead of a character "g" corresponding to the duplicate "G" key.

In some embodiments, prior to detecting the gesture, the device detects (1016) a key activation gesture at a first time at a location on the touch-sensitive surface that corresponds to a location of a visible key in the split keyboard. For example, in FIGS. 5Q-5R, prior to detection of gesture 5098, gesture 5096 is detected on "O" key 5094. A character "o" is entered into input text 5006 in response to detection of gesture 5096.

In response to detecting the gesture at a second time after the first time, the device enters (1018) in the text entry area the character that corresponds to the leftmost key in the corresponding respective row of the right side of the split keyboard when the second time is less than a predefined period of time after the first time, but the device foregoes (1020) entering in the text entry area the character that corresponds to the leftmost key in the corresponding respective row of the right side of the split keyboard when the second time exceeds the predefined period of time after the first time. In some embodiments, the undisplayed keys areas are only activatable when the user is actively typing, as determined by detecting activation of visible keys in the split keyboard within a predefined period of time (e.g., 0.5, 1.0, or 2.0 seconds or some other reasonable period of time) of detecting the gesture in the undisplayed key area. When the gesture in the undisplayed key area is detected after the predefined period of time has elapsed since detecting activation of a visible key, the character corresponding to the undisplayed key is not entered. This prevents accidental text entry of characters that correspond to the undisplayed key areas when the user is not actively typing.

For example, if the time period between when gesture 5096 is detected and when gesture 5098 is detected is less than a predefined period of time, then a character "b" is entered in response to gesture 5098. On the other hand, if the time period between when gesture 5096 is detected and when gesture 5098 is detected is more than the predefined period of time, then the character "b" is not entered in response to gesture 5098.

FIGS. 11A-11D are flow diagrams illustrating a method 1100 of using a center portion of an integrated input area in accordance with some embodiments. The method 1100 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides a way to use the center portion of an integrated input area to make character entry faster and more efficient. The method is particularly useful when a user is performing two-thumb typing with a tablet computer. The method makes additional character entry functions readily accessible to the user's thumbs, thereby creating a more efficient human-machine interface. For battery-operated electronic devices, enabling a user to perform character entry faster and more efficiently conserves power and increases the time between battery charges.

The device concurrently displays (1102) a first text entry area and an integrated input area, the integrated input area including a left portion with a left side of a split keyboard, a right portion with a right side of the split keyboard, and a center portion with a second text entry area, the center portion in between the left portion and the right portion. For example, in FIG. 5V, text entry area 5002 and integrated input area 5016 are displayed on display 112. Integrated input area 5016 includes left split keyboard portion 5016-A, right split keyboard portion 5016-B, and center area 5016-C between left and right portions 5016-A and 5016-B. Center area 5016-C serves as a second text entry area, as duplicate cursor 5020 and duplicate input text 5022 are displayed in center area 5016-C.

The device detects (1104) a gesture at a location on the touch-sensitive surface that corresponds to a location of a character key in the split keyboard (e.g., a tap gesture 5102 on "T" key 5024 key on left portion 5016-A, FIG. 5V).

In response to detecting the gesture at the location on the touch-sensitive surface that corresponds to the location of the character key in the split keyboard, the device inputs and concurrently displays (1106) the corresponding character in the first text entry area and the second text entry area on the display. In FIG. 5W, in response to detection of gesture 5102 on "T" key 5024, a character "t" is entered into input text 5006 and concurrently displayed. A character "t" is also entered into duplicate input text 5022 and concurrently displayed in center area 5016-C. Having a second text entry area in the center portion of the integrated input area that shows a portion of the text being entered in the first text entry area makes text input faster, more efficient, and less stressful by reducing the amount of eye movement when a user is thumb typing with the split keyboard.

In some embodiments, the first text entry area displays text at a first size, and the second text entry area displays a portion of the text in the first text entry area at a second size that is larger than the first size (1108). For example, in FIG. 5V, duplicate text input 5022 is displayed in center area 5016-C at a larger size than input text 5006 in text entry area 5002.

In some embodiments, the width of the integrated input area is the same (or substantially the same, e.g., 90% or 95%) as the width of the display (1110). Integrated input area 5016 in FIG. 5V, for example, has a width that spans the width of display 112.

In some embodiments, the left side of the split keyboard and the right side of the split keyboard maintain fixed positions relative to each other within the integrated input area during movement of the integrated input area (1112). Having the left and right portions maintain fixed positions relative to each other keeps the left and right portions at relative positions on the display that are more familiar to the use, and thus less cognitive readjustment is needed on the part of the user to maintain typing efficiency.

For example, FIG. 5M shows integrated input area 5039 moving in response to detection of a gesture (e.g., gesture 5040). Within integrated input area 5039, left portion 5039-A and right portion 5039-B maintain fixed positions relative to each other during the movement. Integrated input areas 5039 and 5016 are similar, and thus when integrated input area 5016 moves, left and right portions 5016-A and 5016-B maintain fixed positions relative to each other.

In some embodiments, the second text entry area includes an insertion point that remains stationary on the display as text is entered (1114). A stationary insertion point in the second text entry area provides a stable focal point for the user that helps reduce lateral eye movement. For example, in FIG. 5X-5Y, duplicate cursor 5020 is stationary within center area 5016-C; when the position of duplicate 5020 relative to duplicate input text 5022 changes, duplicate input text 5022 is displayed as advancing or retreating relative to duplicate cursor 5020.

In some embodiments, the second text entry area includes an insertion point (1116). The device detects (1118) a gesture on the touch-sensitive surface at a location that corresponds to the insertion point in the second text entry area, and moves (1120) the insertion point in the second text entry area in accordance with the gesture on the touch-sensitive surface at the location that corresponds to the insertion point in the second text entry area. The insertion point in the first text entry area is also moved in accordance with the gesture on the touch-sensitive surface at the location that corresponds to the insertion point in the second text entry area. For example, a leftward swipe moves the insertion point to the beginning of a word, while a rightward swipe moves the insertion point to the end of a word. Adjusting the insertion point via gestures in the second text entry area has the advantage of requiring the user to move their thumb only a small distance from where they are typing (versus the alternative of reaching to the first text entry area (or a menu bar at the top of the display) each time an adjustment is needed.

For example, in FIG. 5X-5Y, gesture 5102, moving in direction 5103, is detected on duplicate cursor 5020 in center area 5016-C. In response to detection of gesture 5102, duplicate cursor 5020 changes position relative to duplicate input text 5022 within center area 5016-C in accordance with gesture 5102 (and cursor 5004 does the same relative to input text 5006).

In some embodiments, the device displays (1122) text editing controls (e.g., icons, or graphical or user interface objects for selecting, cutting, copying, and/or pasting text) in the center portion of the integrated input area. In some embodiments, the text editing controls in the center portion of the integrated input area have corresponding text editing controls in the first text entry area (1124). For example, the text editing controls in the center portion may be duplicates of text editing controls in the first text entry area. For example, in FIG. 5Z, text editing control 5104, corresponding to text editing control 5106, is displayed in text entry area 5002. In some embodiments, the device detects (1126) a gesture on the touch-sensitive surface at a location that corresponds to a text editing control in the center portion of the integrated input area, and executes (1128) a text editing command in accordance with the gesture on the touch-sensitive surface at the location that corresponds to the text editing control. Editing the text via gestures in the center portion of the integrated input area has the advantage of requiring the user to move their thumb only a small distance from where they are typing (versus the alternative of reaching to the first text entry area (or a menu bar at the top of the display) each time an edit function is needed.

For example, in FIG. 5Z-5AA, text editing control 5106 corresponding to a paste operation is displayed in center area 5016-C. Gesture 5108 on text editing control 5106 is detected in center area 516-C. In response to detection of gesture 5108, a paste operation is executed; text "ahead" is pasted into duplicate text 5022 and input text 5006.

In some embodiments, the device displays (1130) user-selectable input elements (e.g., radio buttons, check boxes, pick lists, time pickers, and/or date pickers) in the center portion of the integrated input area, detects (1132) a gesture on the touch-sensitive surface at a location that corresponds to a user-selectable input element in the center portion of the integrated input area, and, in response to detecting the gesture on the touch-sensitive surface at the location that corresponds to the user-selectable input element, selects (1134) the user-selectable input element. Selecting radio buttons, check boxes, items in pick lists, times and dates via gestures in the center portion of the integrated input area has the advantage of requiring the user to move their thumb only a small distance from where they are typing each time a selection is needed.

For example, in FIG. 5BB-5CC, form 5110 is displayed in text entry area 5002. Form 5110 includes checkboxes 5112, each respective checkbox corresponding to an option in the form. At least some of checkboxes 5112 are displayed in center area 5016-C as duplicate checkboxes 5116. Gesture 5118 is detected on duplicate checkbox 5116-A in center area 5016-C. In response to detection of gesture 5118, checkbox 5116-A is selected.

In some embodiments, the device detects (1136) a gesture on the touch-sensitive surface at a location that corresponds to the center portion of the integrated input area (e.g., a tap gesture on an icon to activate a popup menu or a predefined multifinger gesture within the center portion), and, in response to detecting the gesture on the touch-sensitive surface at the location that corresponds to the center portion of the integrated input area, displays (1138) a popup view. Accessing a popup view (e.g., a window or menu in an application) via a gesture in the center portion of the integrated input area has the advantage of requiring the user to move their thumb only a small distance from where they are typing (versus the alternative of reaching to the first text entry area (or a menu bar at the top of the display) each time a popup view is needed.

For example, in FIGS. 5DD-5EE, gesture 5120 is detected in center area 5016-C. In response to detection of gesture 5120, popup menu 5124 is displayed. In some embodiments, popup menu 5122, corresponding to popup menu 5124, is displayed in text entry area 5002.

In some embodiments, the device detects (1140) a plurality of gestures on the touch-sensitive surface at a location that corresponds to the center portion of the integrated input area (e.g., a series of finger strokes and taps that correspond to Chinese, Japanese, Korean, or other characters), and enters (1142) in the first text entry area and the second text entry area a character that corresponds to the plurality of gestures. Exemplary characters include alphabetic characters, numeric characters, symbols, punctuation characters, Arabic script characters, Cyrillic characters, Greek characters, emoji symbols, emoticon symbols, Asian characters such as sinographs, Japanese Kanji, katakana, or hiragana, etc., Devanagari characters, Perso-Arabic characters, Gurmukhi characters, and Hebrew characters. Drawing characters via gestures in the center portion of the integrated input area has the advantage of requiring the user to move their finger only a small distance from where they are typing.

For example, in FIGS. 5FF-5GG, one or more gestures 5128 corresponding to handwriting 5126 are detected in center area 5016-C. Character "中" corresponding to handwriting 5126 is entered into input text 5006 and duplicate input text 5022.

In some embodiments, the device detects (1144) a plurality of gestures on the touch-sensitive surface at a location that corresponds to the center portion of the integrated input area (e.g., a series of finger strokes and taps that correspond to a simple drawing), and makes (1146) a drawing in accordance with the plurality of gestures. Drawing via gestures in the center portion of the integrated input area has the advantage of requiring the user to move their finger only a small distance from where they are typing.

For example, in FIGS. 5HH-5II, one or more gestures 5132 corresponding to drawing 5130 are detected in center area 5016-C. Drawing 5133, corresponding to drawing 5130 is entered into input text 5006.

In some embodiments, the device displays (1148) a suggested word in the center portion of the integrated input area (e.g., a word automatically suggested to complete or correct a series of characters displayed in the first text entry area and the second text entry area), detects (1150) a gesture on the touch-sensitive surface at a location that corresponds to the suggested word, and executes (1152) a text editing command in accordance with the gesture on the touch-sensitive surface at the location that corresponds to the suggested word. In some embodiments, tapping the suggested word accepts and inputs the suggested word. In some embodiments, tapping the suggested word (or an X icon) rejects and terminates display of the suggested word. Editing the text via gestures in the center portion of the integrated input area has the advantage of requiring the user to move their thumb only a small distance from where they are typing (versus the alternative of reaching to the first text entry area (or a menu bar at the top of the display) each time an edit function is needed.

For example, in FIGS. 5JJ-5KK, suggested word 5134 is displayed in text entry area 5002, and duplicate suggested word 5136, corresponding to suggested word 5134, is displayed in center area 5016-C. Suggested word 5136 is displayed with X icon 5137. Gesture 5138 is detected on X icon 5137 associated with suggested word 5136. In response to detection of gesture 5138, suggested word 5136 is rejected and display of suggested word 5136 and suggested word 5134 are terminated.

In some embodiments, the device displays (1154) a plurality of emoji characters in the center portion of the integrated input area, detects (1156) a gesture on the touch-sensitive surface at a location that corresponds to an emoji character in the plurality of emoji characters (e.g., a tap gesture on the emoji character), and, in response to detecting the gesture on the touch-sensitive surface at the location that corresponds to the emoji character, inputs and displays (1158) the emoji character in the first text entry area and the second text entry area on the display. Entering emoji characters via gestures in the center portion of the integrated input area has the advantage of requiring the user to move their thumb only a small distance from where they are typing (versus the alternative of reaching to the first text entry area (or a menu bar at the top of the display) each time an emoji character is needed.

For example, in FIGS. 5LL-5MM, emoji characters 5140, including emoji character 5140-A, are displayed in text entry area 5002. Duplicate emoji characters 5142 are displayed in center area 5016-C. Duplicate emoji character 5142-A is a duplicate of emoji character 5140-A. Gesture 5144 is detected on duplicate emoji character 5142-A. In response to detection of gesture 5144, emoji character 5140-A is entered into input text 5006 and displayed, and duplicate emoji character 5142-A is entered into duplicate input text 5022 and displayed.

In some embodiments, the device displays (1160) a plurality of unicode characters in the center portion of the integrated input area, detects (1162) a gesture on the touch-sensitive surface at a location that corresponds to a unicode character in the plurality of unicode characters (e.g., a tap gesture on the unicode character), and, in response to detecting the gesture on the touch-sensitive surface at the location that corresponds to the unicode character, inputs and displays (1164) the unicode character in the first text entry area and the second text entry area on the display. Entering unicode characters via gestures in the center portion of the integrated input area has the advantage of requiring the user to move their thumb only a small distance from where they are typing (versus the alternative of reaching to the first text entry area (or a menu bar at the top of the display) each time a unicode character is needed.

For example, in FIGS. 5NN-5OO, unicode characters 5146, including unicode character 5146-A, are displayed in text entry area 5002. Duplicate unicode characters 5148 are displayed in center area 5016-C. Duplicate unicode character 5148-A is a duplicate of unicode character 5146-A. Gesture 5149 is detected on duplicate unicode character 5148-A. In response to detection of gesture 5149, unicode character 5146-A is entered into input text 5006 and displayed, and duplicate unicode character 5148-A is entered into duplicate input text 5022 and displayed.

In some embodiments, the device detects (1166) a gesture on the touch-sensitive surface at a location that corresponds to the second text entry area (e.g., a tap and drag gesture over text in the second text entry area), and, in response to detecting the gesture on the touch-sensitive surface at the location that corresponds to the second text entry area, selects (1168) a range of text. Selecting text via gestures in the center portion of the integrated input area has the advantage of requiring the user to move their thumb only a small distance from where they are typing.

For example, in FIGS. 5PP-5QQ, gesture 5150 is detected over duplicate input text 5022 in center area 5016-C. Gesture 5150 includes a tap and drag gesture from position 5150-A to position 5150-B. In response to gesture 5150, duplicate input text 5022 is selected, as indicated by highlighting 5154.

In some embodiments, the device detects (1170) a gesture on the touch-sensitive surface at a location that corresponds to one or more words in the second text entry area (e.g., a swipe or double-tap gesture on a word in the second text entry area), and, in response to detecting the gesture on the touch-sensitive surface at the location that corresponds to the second text entry area, formats (1172) the one or more words. Formatting text via gestures in the center portion of the integrated input area has the advantage of requiring the user to move their thumb only a small distance from where they are typing.

For example, in FIGS. 5RR-5SS, gesture 5156 is detected on word "gotten" in duplicate input text 5022, in center area 5016-C. In response to detection of gesture 5156, the word "gotten" in duplicate input text 5022 and the corresponding word in input text 5006 are formatted as bold text.

In some embodiments, input elements in the center portion of the integrated input area are user-configurable (e.g., via a tool bar or settings menu) (1174). The various features described above with respect to the center portion (e.g., character handwriting, drawing, selecting user selectable elements, text editing operations, etc.) may be selectively enabled by a user. For example, in FIG. 5TT, an options page showing 5158 showing the available input elements for center area 5016-C is displayed. Options page 5158 includes input element options for center area 5016-C and corresponding checkboxes for enabling or disabling those options.

Figure 12A:
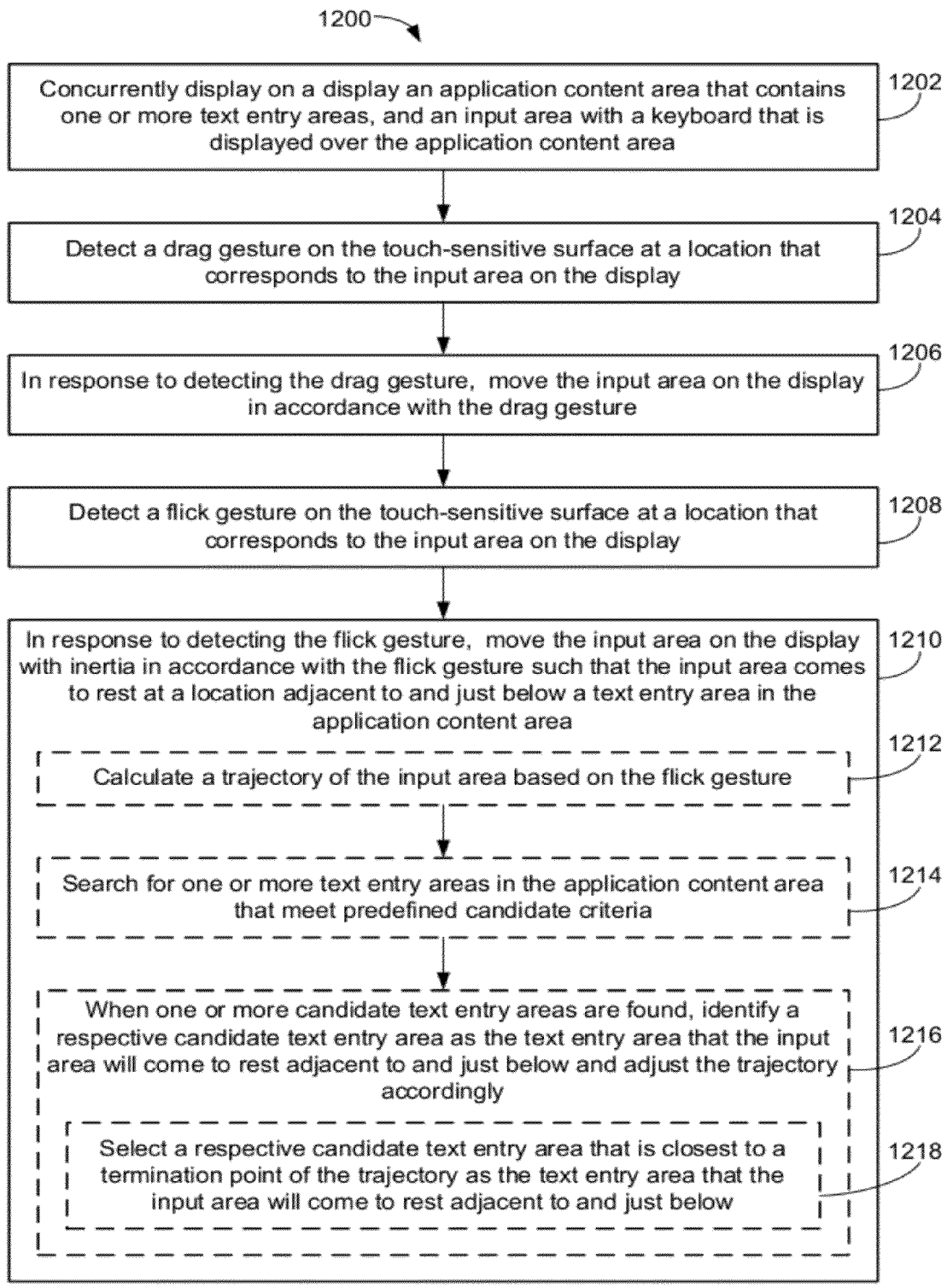
FIGS. 12A-12B are flow diagrams illustrating a method of moving an input area that includes a keyboard over an application content area in accordance with some embodiments.
Figure 12B:
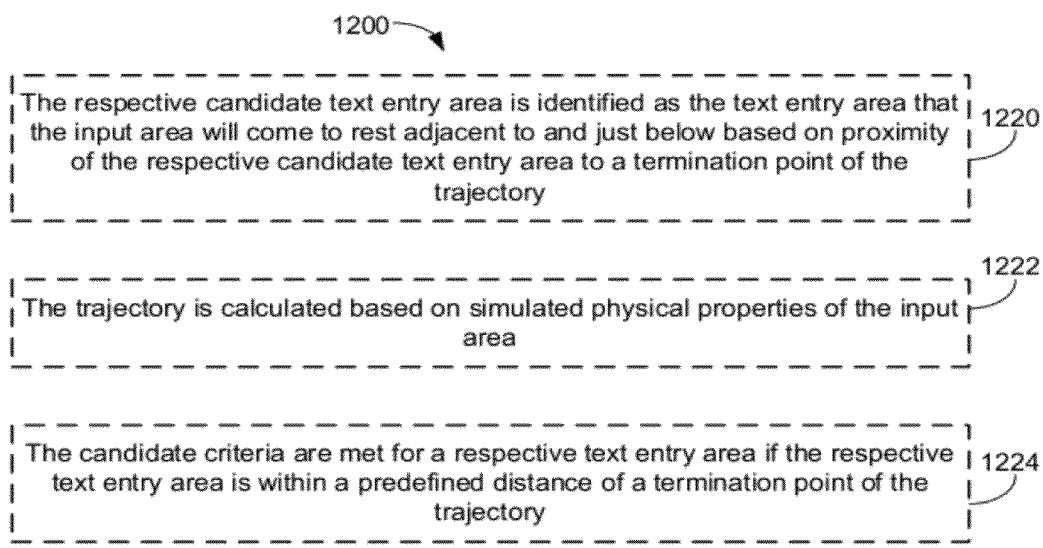

FIGS. 12A-12B are flow diagrams illustrating a method 1200 of moving an input area that includes a keyboard over an application content area in accordance with some embodiments. The method 1200 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, the method 1200 provides a way to use an imprecise flick gesture to precisely and automatically place a soft keyboard just below a text entry area in an application. The method reduces the cognitive burden on a user when positioning and using a soft keyboard, thereby creating a more efficient human-machine interface. For battery-operated electronic devices, enabling a user to manipulate a soft keyboard faster and more efficiently conserves power and increases the time between battery charges.

The device concurrently displays (1202) on the display an application content area that includes one or more text entry areas and an input area with a keyboard (e.g., a merged keyboard or an integrated input area with a split keyboard) that is displayed over the application content area. FIG. 5UU, for example, shows application content area 5160 displayed on display 112. Text entry areas 5162 are displayed in application content area 5160. Soft keyboard 5164 is also displayed on display 112.

The device detects (1204) a drag gesture on the touch-sensitive surface at a location that corresponds to the input area on the display. For example, in FIG. 5UU, drag gesture 5166 is detected on display 112. Drag gesture 5166 starts from position 5166-1, which is located in soft keyboard 5164.

The device, in response to detecting the drag gesture, moves (1206) the input area on the display in accordance with the drag gesture. In response to detection of drag gesture 5166, soft keyboard 5164 is moved in accordance with drag gesture 5166, as shown in FIG. 5VV.

The device detects (1208) a flick gesture on the touch-sensitive surface at a location that corresponds to the input area on the display. For example, in FIG. 5WW, gesture 5168 is detected on display 112. Gesture 5168 starts from a location corresponding to soft keyboard 5164.

The device, in response to detecting the flick gesture, moves (1210) the input area on the display with inertia in accordance with the flick gesture such that the input area comes to rest at a location adjacent to and just below a text entry area in the application content area.

In other words, when a drag gesture is applied to the input area, the input area tracks (follows) the movement of the finger making the drag gesture. When lift-off of the finger making the drag gesture is detected, the movement of the input area stops. In contrast, when a flick gesture is applied to the input area, the input area is 'thrown' in the direction of the flick gesture with some simulated inertia and friction, so the input area does not stop at a location that corresponds to where lift-off of the finger making the flick gesture occurred. Instead, the input area continues to move in the direction of the flick gesture, gradually slows down, and comes to rest at a location adjacent to and just below a text entry area in the application. Thus, an imprecise flick gesture results in automatic, precise placement of a keyboard just below a text entry area in an application, whereas a more precise drag gesture enables a user to manually position the text entry area.

For example, in FIGS. 5WW-5XX, in response to gesture 5168, soft keyboard 5164 moves with trajectory 5170, including movement inertia, in accordance with gesture 5168. Soft keyboard 5164 comes to rest adjacent to and below text entry area 5162-F; soft keyboard 5164 docks just below text entry area 5162-F.

In some embodiments, moving the input area on the display with inertia in accordance with the flick gesture includes calculating (1212) a trajectory of the input area based on the flick gesture, searching (1214) for one or more text entry areas in the application content area that meet predefined candidate criteria, and, when one or more candidate text entry areas are found, identifying (1216) a respective candidate text entry area as the text entry area that the input area will come to rest adjacent to and just below and adjusting the trajectory accordingly. For example, in FIGS. 5WW-5XX, trajectory 5170 with termination point 5171 is calculated based on gesture 5168. One or more text entry areas 5162 in application content area 5160 that meet predefined criteria (e.g., within a predefined distance from termination point 5171) are searched. Among candidates text entry areas that are found, one (e.g., 5162-F) is selected as the text entry area under which soft keyboard 5164 will come to rest. Trajectory 5170 is adjusted so that soft keyboard 5164 comes to rest under text entry area 5162-F.

As another example, in FIGS. 5YY-5ZZ, trajectory 5174 with termination point 5175 is calculated based on flick gesture 5172. One or more text entry areas 5162 in application content area 5160 that meet predefined criteria (e.g., within a predefined distance from termination point 5175) are searched. Among candidates text entry areas that are found, one (e.g., 5162-A) is selected as the text entry area under which soft keyboard 5164 will come to rest. Trajectory 5174 is adjusted so that soft keyboard 5164 comes to rest under text entry area 5162-A.

In some embodiments, identifying one of the candidate text entry areas as the text entry area that the input area will come to rest adjacent to and just below includes selecting (1218) a respective candidate text entry area that is closest to a termination point of the trajectory as the text entry area that the input area will come to rest adjacent to and just below. For example, in FIG. 5YY, text entry area 5162-A is selected as the text entry area under which soft keyboard 5164 come to rest; text entry area 5162-A is closest to termination point 5175. In 5ZZ, soft keyboard 5164 comes to rest adjacent to and under text entry area 5162-A.

In some embodiments, the respective candidate text entry area is identified as the text entry area that the input area will come to rest adjacent to and just below based on proximity of the respective candidate text entry area to a termination point of the trajectory (1220). For example, in FIG. 5YY-5ZZ, text entry area 5162-A is selected as the text entry area under which soft keyboard 5164 comes to rest based on the fact that it is the closest among text entry areas 5162 to termination point 5175.

In some embodiments, the trajectory is calculated based on simulated physical properties of the input area (1222). For example, one or more simulated physical properties are associated with application content area 5160. Examples of simulated physical properties include properties that affect the motion of an object, such as density, friction coefficient, and so forth. Values for the properties are predefined. A trajectory (e.g., trajectory 5170) is calculated based on the properties and the corresponding gesture (e.g., gesture 5168).

In some embodiments, the candidate criteria are met for a respective text entry area if the respective text entry area is within a predefined distance of a termination point of the trajectory (1224). For example, in FIG. 5YY, text entry areas that are within a predefined distance (e.g., distance 5177) from termination point 5175 are identified as candidate text entry areas under which soft keyboard 5164 may come to rest in accordance with trajectory 5175. Text entry areas 5162-A and 5162-B are within distance 5177 and are thus identified as candidate text entry areas.

Figure 13A:
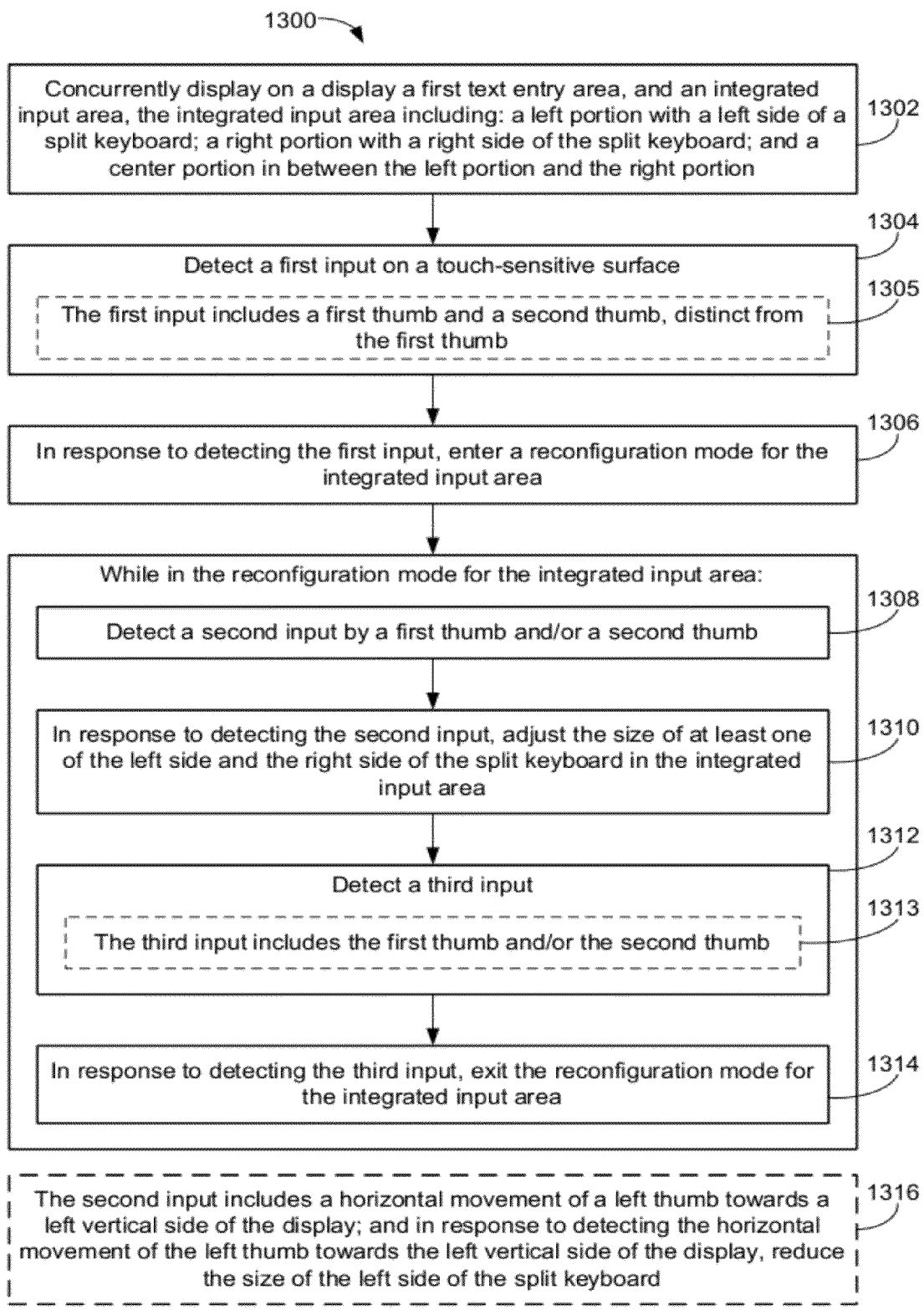

FIGS. 13A-13B are flow diagrams illustrating a method 1300 of reconfiguring an integrated input area in accordance with some embodiments. The method 1300 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1300 may be combined and/or the order of some operations may be changed.

As described below, the method 1300 provides an intuitive way to reconfigure the sizes and positions of the left side and right side of a soft split keyboard in an integrated input area. The method is particularly useful when a user is performing two-thumb typing with a tablet computer (e.g., when the tablet computer is being held by the user's remaining eight fingers). The method makes it fast and easy for a user to customize a split keyboard in an integrated input area to the size of the user's thumbs, thereby creating a more efficient human-machine interface. For battery-operated electronic devices, using a split keyboard that is customized to the size of the user's thumbs enables the user to perform character entry faster and more efficiently, thereby conserving power and increasing the time between battery charges.

The device concurrently displays (1302) on the display a first text entry area, and an integrated input area, the integrated input area including a left portion with a left side of a split keyboard, a right portion with a right side of the split keyboard, and a center portion in between the left portion and the right portion. For example, in FIG. 5AAA, text entry area 5002 and integrated input area 5039 are displayed. Integrated input area 5039 includes left split keyboard portion 5039-A, right soft keyboard portion 5039-B, and center area 5039-C between left and right portions 5039-A and 5039-B.

The device detects (1304) a first input on the touch-sensitive surface. In some embodiments, the first input is by a first thumb and a second thumb, distinct from the first thumb, on the touch-sensitive surface (1305) (e.g., a single tap gesture by the first thumb concurrent with a single tap gesture by the second thumb; a double tap gesture by the first thumb concurrent with a double tap gesture by the second thumb; or a swipe gesture by the first thumb concurrent with a swipe gesture by the second thumb). In some embodiments, the first input is detected at a location on the touch-sensitive surface that corresponds to the location of the integrated input area on the display. For example, returning to FIG. 5AA, gesture 5176 is detected in split soft keyboard 5039. Gesture 5176 includes concurrent thumb contacts 5176-A and 5176-B on display 112.

In response to detecting the first input, the device enters (1306) a reconfiguration mode for the integrated input area. In response to detection of gesture 5176 (FIG. 5AAA), for example, device 100 enters a reconfiguration mode for integrated input area 5039. While in reconfiguration mode, device 100 is receptive to one or more gestures for resizing portions of the split keyboard in integrated input area 5039. One advantage of having a distinct reconfiguration mode for the integrated input area is that this prevents the split keyboard from being accidentally reconfigured when the user is thumb typing.

While in the reconfiguration mode for the integrated input area, the device detects (1308) a second input by the first thumb and/or the second thumb. In response to detecting the second input, the device adjusts (1310) the size of at least one of the left side and the right side of the split keyboard in the integrated input area.

While in the reconfiguration mode for the integrated input area, the device detects (1312) a third input. In some embodiments, the third input is by the first thumb and/or the second thumb (e.g., a single tap gesture by the first thumb concurrent with a single tap gesture by the second thumb; a double tap gesture by the first thumb concurrent with a double tap gesture by the second thumb; or a swipe gesture by the first thumb concurrent with a swipe gesture by the second thumb). In response to detecting the third input, the device exits (1314) the reconfiguration mode for the integrated input area. In some embodiments, the third input is detected at a location on the touch-sensitive surface that corresponds to the location of the integrated input area on the display.

For example, FIGS. 5BBB thru 5MMM shows various gestures detected while in reconfiguration mode and the resulting change to integrated input area 5039 in response to the respective detected gesture. To take just one of these examples, FIG. 5LLL shows gesture 5188 being detected. Gesture 5188 includes a left thumb moving away from the left edge of display 112. In response to detection of gesture 5188, left portion 5039-A and right portion 5039-B increase in size, as shown in FIG. 5MMM. FIG. 5NNN shows gesture 5190 detected on display 112. In response to gesture 5190, device 100 exits the reconfiguration mode, and split keyboard portions 5039-A and 5039-B maintain their new sizes.

In some embodiments, the second input includes a horizontal movement of a left thumb towards a left vertical side of the display, and in response to detecting the horizontal movement of the left thumb towards the left vertical side of the display, the device reduces (1316) the size of the left side of the split keyboard. In some embodiments, movement by one thumb adjusts the size of the corresponding side of the split keyboard. For example in FIGS. 5BBB-5CCC, gesture 5178 is detected on display 112. Gesture 5178 includes a left thumb moving horizontally toward the left vertical side of display 112. In response to detection of gesture 5178, left split keyboard portion 5039-A reduces in size.

In some embodiments, the second input includes a horizontal movement of a left thumb away from a left vertical side of the display, and in response to detecting the horizontal movement of the left thumb away from the left vertical side of the display, the device increases (1318) the size of the left side of the split keyboard. For example in FIGS. 5DDD-5EEE, gesture 5180 is detected on display 112. Gesture 5180 includes a left thumb moving horizontally away from the left vertical side of display 112. In response to detection of gesture 5180, left split keyboard portion 5039-A increases in size.

Analogously, in some embodiments, movement by the right thumb toward the right vertical side of the display and away from the right vertical side of the display decreases and increases, respectively, the size of the right side of the split keyboard, as shown in FIGS. 5FFF-5III.

In some embodiments, the second input includes a horizontal movement of the first thumb towards a vertical side of the display closest to the first thumb (e.g., moving the left thumb towards the left vertical side of the display or moving the right thumb towards the right vertical side of the display), and in response to detecting the horizontal movement of the first thumb towards the vertical side of the display closest to the first thumb, the device reduces the size of the left side and the right side of the split keyboard (1320). In some embodiments, movement by just one thumb concurrently reduces the size of both the left side and the right side of the split keyboard. For example, in FIGS. 5JJJ-5KKK, gesture 5186 is detected on display 112. Gesture 5186 includes a left thumb moving toward the left vertical side of display 112. In response to detection of gesture 5186, left split keyboard portion 5039-A and right split keyboard portion 5039-B are concurrently reduced in size.

In some embodiments, the left edge of the left side of the split keyboard maintains its position (which is typically near the left vertical side of the display) as the left side of the split keyboard is reduced. Thus, the right edge of the left side of the split keyboard moves closer to the left vertical side of the display as the left side of the split keyboard is reduced. This makes it easier for the left thumb to reach the keys near the right edge of the left side of the split keyboard and eliminates the need for the user to reposition the left edge of the left side of the keyboard after the left side of the keyboard is reduced. Similarly, in some embodiments, the right edge of the right side of the split keyboard maintains its position (which is typically near the right vertical side of the display) as the right side of the split keyboard is reduced. Thus, the left edge of the right side of the split keyboard moves closer to the right vertical side of the display as the right side of the split keyboard is reduced. This makes it easier for the right thumb to reach the keys near the left edge of the right side of the split keyboard and eliminates the need for the user to reposition the right edge of the right side of the keyboard after the right side of the keyboard is reduced.

In some embodiments, the second input includes a horizontal movement of the first thumb away from a vertical side of the display closest to the first thumb (e.g., moving the left thumb away from the left vertical side of the display or moving the right thumb away from the right vertical side of the display), and in response to detecting the horizontal movement of the first thumb away from the vertical side of the display closest to the first thumb, the device increases (1322) the size of the left side and the right side of the split keyboard. In some embodiments, movement by just one thumb concurrently increases the size of both the left side and the right side of the split keyboard. For example, in FIGS. 5LLL-5MMM, gesture 5188 is detected on display 112. Gesture 5188 includes a left thumb moving away from the left vertical side of display 112. In response to detection of gesture 5188, left split keyboard portion 5039-A and right split keyboard portion 5039-B increase in size.

Figure 14:
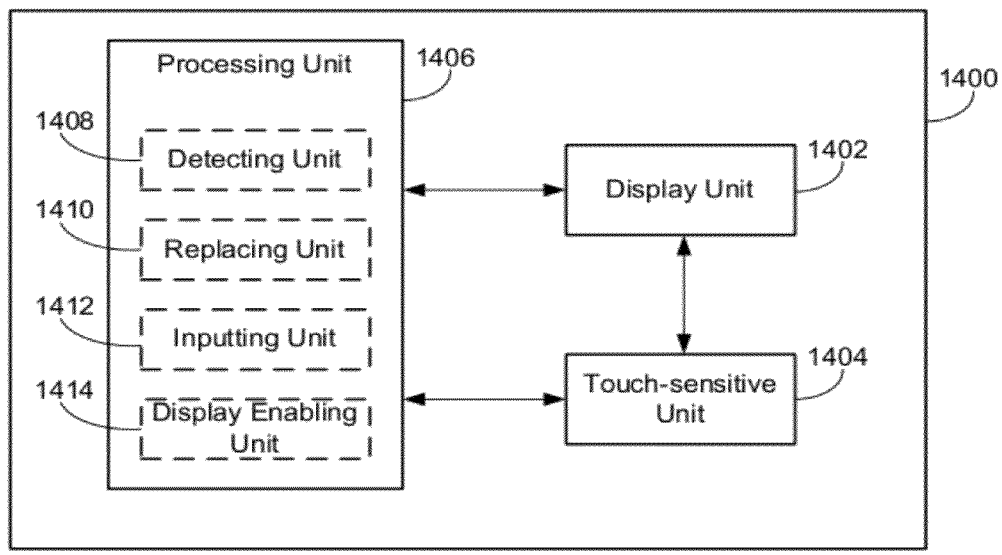
FIG. 14 is a functional block diagram of an electronic device in accordance with some embodiments.

In accordance with some embodiments, FIG. 14 shows a functional block diagram of an electronic device 1400 configured in accordance with the principles of the invention as described above. The functional blocks of the device may be implemented by hardware, software, or a combination of hardware and software to carry out the principles of the invention. It is understood by persons of skill in the art that the functional blocks described in FIG. 14 may be combined or separated into sub-blocks to implement the principles of the invention as described above. Therefore, the description herein may support any possible combination or separation or further definition of the functional blocks described herein.

As shown in FIG. 14, an electronic device 1400 includes a display unit 1402 configured to concurrently display a first text entry area and an unsplit keyboard, a touch-sensitive surface unit 1404 configured to receive user gestures, and a processing unit 1406 coupled to the display unit 1402 and the touch-sensitive surface unit 1404. In some embodiments, the processing unit 1406 includes a detecting unit 1408, a replacing unit 1410, an inputting unit 1412, and a display enabling unit 1414.

The processing unit 1406 is configured to detect a gesture on the touch-sensitive surface unit 1404 (e.g., with the detecting unit 1408), and, in response to detecting the gesture on the touch-sensitive surface unit 1404, replace the unsplit keyboard with an integrated input area (e.g., with the replacing unit 1410). The integrated input area includes a left portion with a left side of a split keyboard, a right portion with a right side of the split keyboard, and a center portion in between the left portion and the right portion.

In some embodiments, the integrated input area includes a second text entry area.

In some embodiments, the first text entry area is a text entry area that displays text at a first size, and the second text entry area is a text entry area that displays a portion of the text in the first text entry area at a second size that is larger than the first size.

In some embodiments, the processing unit 1406 is configured to: while displaying the integrated input area, detect a gesture at a location on the touch-sensitive surface unit 1404 that corresponds to a location of a character key in the split keyboard (e.g., with the detecting unit 1408); and, in response to detecting the gesture at the location on the touch-sensitive surface unit 1404 that corresponds to the location of the character key in the split keyboard, input and enable concurrent display of the corresponding character in the first text entry area and the second text entry area on the display unit 1402 (e.g., with the inputting unit 1412 and the display enabling unit 1414).

In some embodiments, the electronic device 1400 is a portable electronic device.

In some embodiments, the display unit 1402 is a touch-sensitive display unit that includes a touch-sensitive surface unit 1404.

In some embodiments, the gesture is a multifinger depinch gesture at a location on the touch-sensitive surface unit 1404 that corresponds to the location of the unsplit keyboard on the display unit 1402.

In some embodiments, the gesture is a tap gesture on a keyboard selection icon.

In some embodiments, replacing the unsplit keyboard with the integrated input area includes enabling display of an animation that transitions the unsplit keyboard to the integrated input area.

In some embodiments, the processing unit 1406 is configured to: while displaying the integrated input area, detect a second gesture on the touch-sensitive surface unit 1404 (e.g., with the detecting unit 1408); and, in response to detecting the second gesture on the touch-sensitive surface unit 1404, replace the integrated input area with the unsplit keyboard (e.g., with the replacing unit 1410).

In some embodiments, the second gesture is a multifinger pinch gesture at a location on the touch-sensitive surface unit 1404 that corresponds to the location of the integrated input area on the display unit 1402.

In some embodiments, the second gesture is a tap gesture on a keyboard selection icon.

In some embodiments, replacing the integrated input area with the unsplit keyboard includes enabling display of an animation that transitions the integrated input area to the unsplit keyboard.

Figure 15:
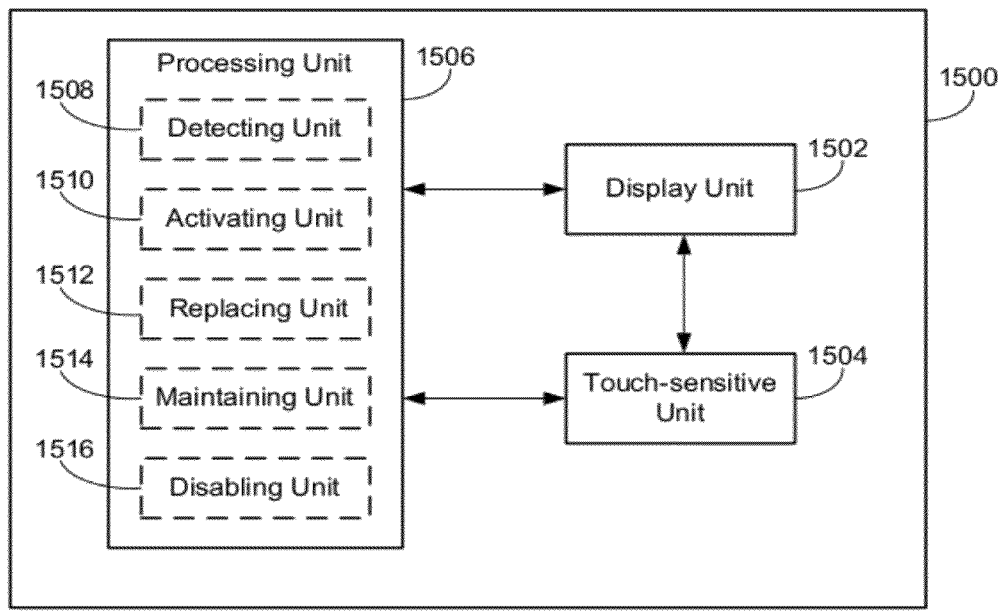
FIG. 15 is a functional block diagram of an electronic device in accordance with some embodiments.

In accordance with some embodiments, FIG. 15 shows a functional block diagram of an electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, an electronic device 1500 includes a display unit 1502 configured to display a first keyboard, the first keyboard including a first plurality of keys; a touch-sensitive surface unit 1504 configured to receive user gestures; and a processing unit 1506 coupled to the display unit 1502 and the touch-sensitive surface unit 1504. In some embodiments, the processing unit 1506 includes a detecting unit 1508, an activating unit 1510, a replacing unit 1512, a maintaining unit 1514, and a disabling unit 1516.

The processing unit 1506 is configured to detect a key activation gesture at a first time at a location on the touch-sensitive surface unit 1504 that corresponds to a location of a first key in the first keyboard (e.g., with the detecting unit 1508); in response to detecting the key activation gesture at the first time, activate the first key (e.g., with the activating unit 1510); detect one or more contacts on the touch-sensitive surface unit 1504 at a second time after the first time, the one or more contacts corresponding to a keyboard selection gesture (e.g., with the detecting unit 1508); and in response to detecting the one or more contacts that correspond to the keyboard selection gesture at the second time after the first time: replace the first keyboard with a second keyboard on the display unit 1502 when the second time exceeds a predefined period of time after the first time (e.g., with the replacing unit 1512); and maintain display of the first keyboard on the display unit 1502 when the second time is less than the predefined period of time after the first time (e.g., with the maintaining unit 1514).

In some embodiments, the processing unit 1506 is configured to: in response to detecting the key activation gesture at the first time, disable a gesture recognizer for the keyboard selection gesture for the predefined period of time (e.g., with the disabling unit 1516).

In some embodiments, the electronic device 1500 is a portable electronic device.

In some embodiments, the display unit 1502 is a touch-sensitive display unit that includes the touch-sensitive surface unit 1504.

In some embodiments, the keyboard selection gesture is a multifinger gesture at a location on the touch-sensitive surface unit 1504 that corresponds to the location of the first keyboard on the display unit 1502.

In some embodiments, replacing the first keyboard with the second keyboard includes enabling display of an animation that transitions the first keyboard to the second keyboard.

Figure 16:
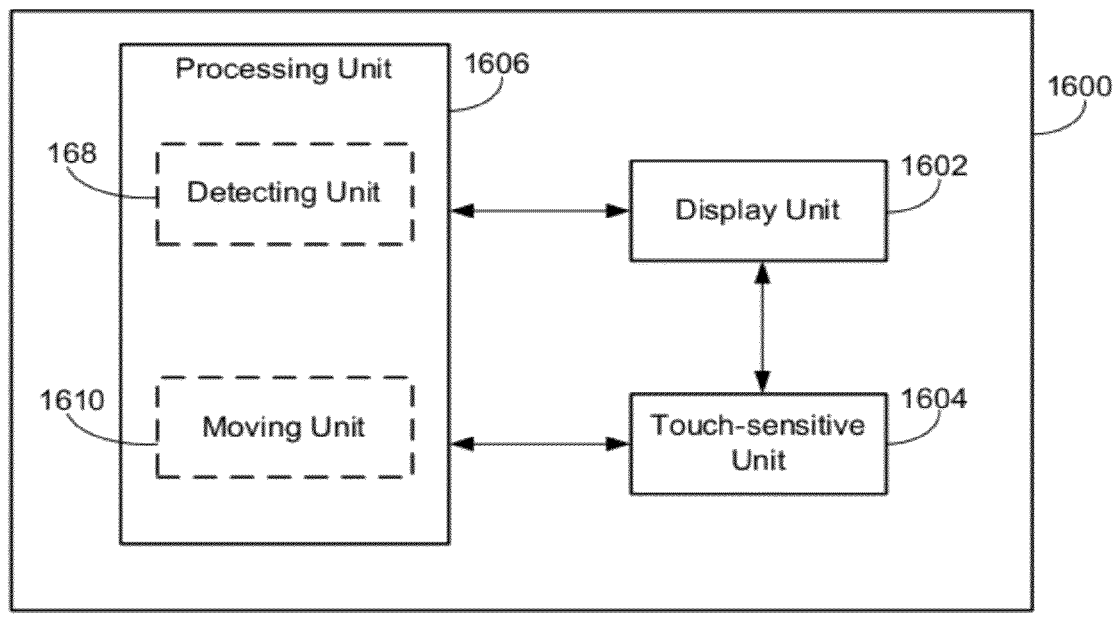
FIG. 16 is a functional block diagram of an electronic device in accordance with some embodiments.

In accordance with some embodiments, FIG. 16 shows a functional block diagram of an electronic device 1600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 16 may be combined or separated into sub-blocks to implement the principles of the invention as described above. Therefore, the description herein may support any possible combination or separation or further definition of the functional blocks described herein.

As shown in FIG. 16, an electronic device 1600 includes a display unit 1602 configured to concurrently display a first text entry area and an integrated input area, the integrated input area including a left portion with a left side of a split keyboard, a right portion with a right side of the split keyboard, and a center portion in between the left portion and the right portion; a touch-sensitive surface unit 1604 configured to receive user contacts and movements of the user contacts; and a processing unit 1606 coupled to the display unit 1602 and the touch-sensitive surface unit 1604. In some embodiments, the processing unit 1606 includes a detecting unit 1608, and a moving unit 1610.

The processing unit 1606 is configured to detect a first contact on the touch-sensitive surface unit 1604 at a location that corresponds to the center portion of the integrated input area (e.g., with the detecting unit 1608); detect movement of the first contact along the touch-sensitive surface unit 1604 (e.g., with the detecting unit 1608); in response to detecting the movement of the first contact along the touch-sensitive surface unit 1604, move the integrated input area on the display unit 1602 in accordance with the movement of the first contact when the movement of the first contact exceeds a first movement threshold (e.g., with the moving unit 1610); detect a second contact, distinct from the first contact, on the touch-sensitive surface unit 1604 at a location that corresponds to the split keyboard (e.g., with the detecting unit 1608); detect movement of the second contact along the touch-sensitive surface unit 1604 (e.g., with the detecting unit 1608); and, in response to detecting the movement of the second contact along the touch-sensitive surface unit 1604, move the integrated input area on the display unit 1602 in accordance with the movement of the second contact when the movement of the second contact exceeds a second movement threshold, the second movement threshold being greater than the first movement threshold (e.g., with the moving unit 1610).

In some embodiments, a respective movement threshold is a function of a horizontal distance of a respective contact from a vertical centerline of the integrated input area.

In some embodiments, the integrated input area is constrained to vertical movement on the display unit 1602 and the integrated input area moves in accordance with a vertical component of movement of a respective contact when a movement threshold for the respective contact is exceeded.

In some embodiments, the left side of the split keyboard and the right side of the split keyboard maintain fixed positions relative to each other within the integrated input area during movement of the integrated input area.

Figure 17:
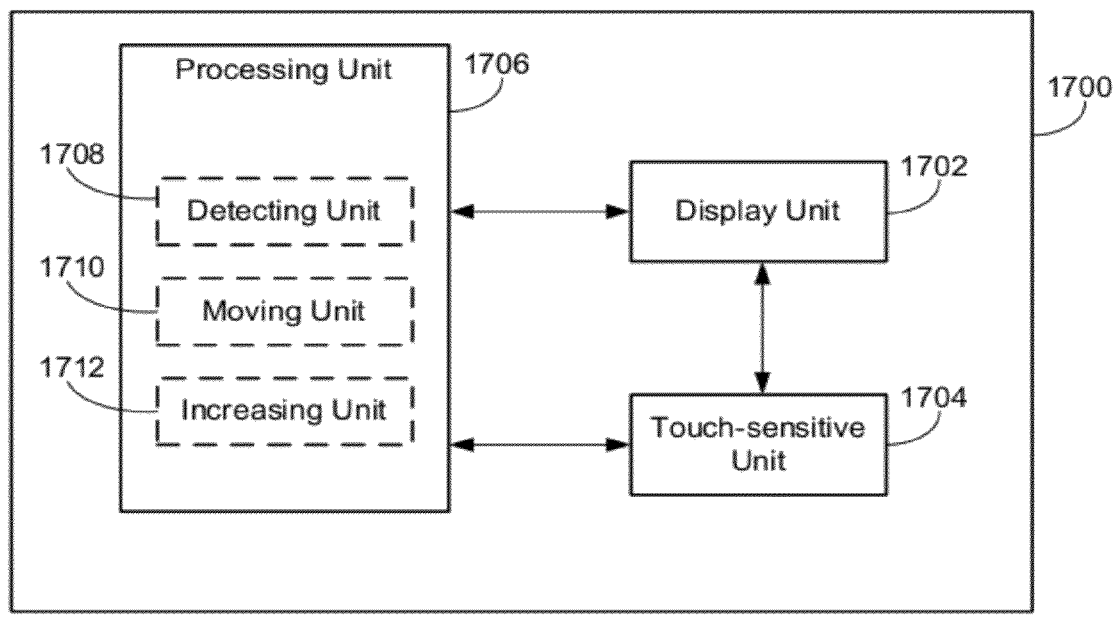
FIG. 17 is a functional block diagram of an electronic device in accordance with some embodiments.

In accordance with some embodiments, FIG. 17 shows a functional block diagram of an electronic device 1700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 17 may be combined or separated into sub-blocks to implement the principles of the invention as described above. Therefore, the description herein may support any possible combination or separation or further definition of the functional blocks described herein.

As shown in FIG. 17, an electronic device 1700 includes a display unit 1702 configured to concurrently display an application content area with a first size, and an input area with a keyboard, the input area being adjacent to and separate from the application content area with the first size, the input area being at a bottom of the display unit 1702; a touch-sensitive surface unit 1704 configured to receive user gestures; and a processing unit 1706 coupled to the display unit 1702 and the touch-sensitive surface unit 1704. In some embodiments, the processing unit 1706 includes a detecting unit 1708, a moving unit 1710, and an increasing unit 1712.

The processing unit 1706 is configured to detect a gesture on the touch-sensitive surface unit 1704 (e.g., with the detecting unit 1708); and, in response to detecting the gesture on the touch-sensitive surface unit 1704: move the input area away from the bottom of the display unit 1702 over the application content area (e.g., with the moving unit 1710), and increase a size of the application content area to a second size larger than the first size (e.g., with the increasing unit 1712).

In some embodiments, the first size of the application content area has a first height, the second size of the application content area has a second height, the input area has an input area height, and the second height is greater than the first height by an amount equal to the input area height.

Figure 18:
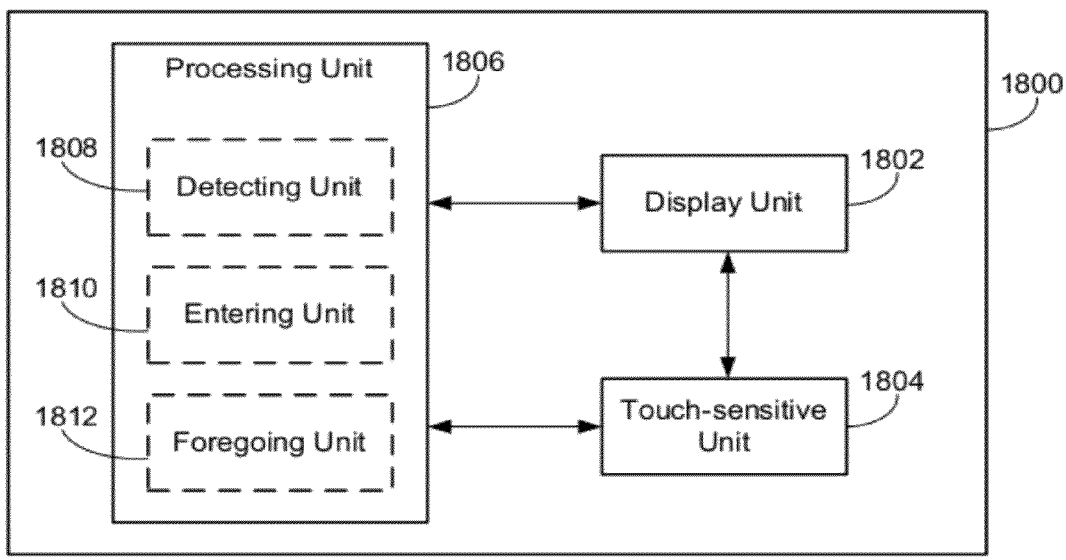
FIG. 18 is a functional block diagram of an electronic device in accordance with some embodiments.

In accordance with some embodiments, FIG. 18 shows a functional block diagram of an electronic device 1800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 18 may be combined or separated into sub-blocks to implement the principles of the invention as described above. Therefore, the description herein may support any possible combination or separation or further definition of the functional blocks described herein.

As shown in FIG. 18, an electronic device 1800 includes a display unit 1802 configured to concurrently display a text entry area, a left side of a split keyboard, and a right side of a split keyboard, the left side of the split keyboard including a plurality of rows of keys and the right side of the split keyboard including a corresponding plurality of rows of keys; a touch-sensitive surface unit 1804 configured to receive user gestures; and a processing unit 1806 coupled to the display unit 1802 and the touch-sensitive surface unit 1804. In some embodiments, the processing unit 1806 includes a detecting unit 1808, an entering unit 1810, and a foregoing unit 1812.

The processing unit 1806 is configured to detect a gesture at a location on the touch-sensitive surface unit 1804 that corresponds to a predefined area adjacent to and to the right of a rightmost key in a respective row of the left side of the split keyboard (e.g., with the detecting unit 1808); and, in response to detecting the gesture at the location on the touch-sensitive surface unit 1804 that corresponds to the predefined area adjacent to and to the right of the rightmost key in the respective row of the left side of the split keyboard, enter in the text entry area a character that corresponds to a leftmost key in a corresponding respective row of the right side of the split keyboard (e.g., with the entering unit 1810).

In some embodiments, the predefined area adjacent to and to the right of the rightmost key in the respective row of the left side of the split keyboard is an undisplayed key activation area that corresponds to the leftmost key in the corresponding respective row of the right side of the split keyboard.

In some embodiments, the processing unit 1806 is configured to detect a gesture at a location on the touch-sensitive surface unit 1804 that corresponds to a predefined area adjacent to and to the left of a leftmost key in a respective row of the right side of the split keyboard (e.g., with the detecting unit 1808); and, in response to detecting the gesture at the location on the touch-sensitive surface unit 1804 that corresponds to the predefined area adjacent to and to the left of the leftmost key in the respective row of the right side of the split keyboard, enter in the text entry area a character that corresponds to a rightmost key in a corresponding respective row of the left side of the split keyboard (e.g., with the entering unit 1810).

In some embodiments, the predefined area adjacent to and to the left of the leftmost key in the respective row of the right side of the split keyboard is an undisplayed key activation area that corresponds to the rightmost key in the corresponding respective row of the left side of the split keyboard.

In some embodiments, the processing unit 1806 is configured to: prior to detecting the gesture, detect a key activation gesture at a first time at a location on the touch-sensitive surface unit 1804 that corresponds to a location of a visible key in the split keyboard (e.g., with the detecting unit 1808); and, in response to detecting the gesture at a second time after the first time: enter in the text entry area the character that corresponds to the leftmost key in the corresponding respective row of the right side of the split keyboard when the second time is less than a predefined period of time after the first time (e.g., with the entering unit 1810); and forego entering in the text entry area the character that corresponds to the leftmost key in the corresponding respective row of the right side of the split keyboard when the second time exceeds the predefined period of time after the first time (e.g., with the foregoing unit 1812).

Figure 19:
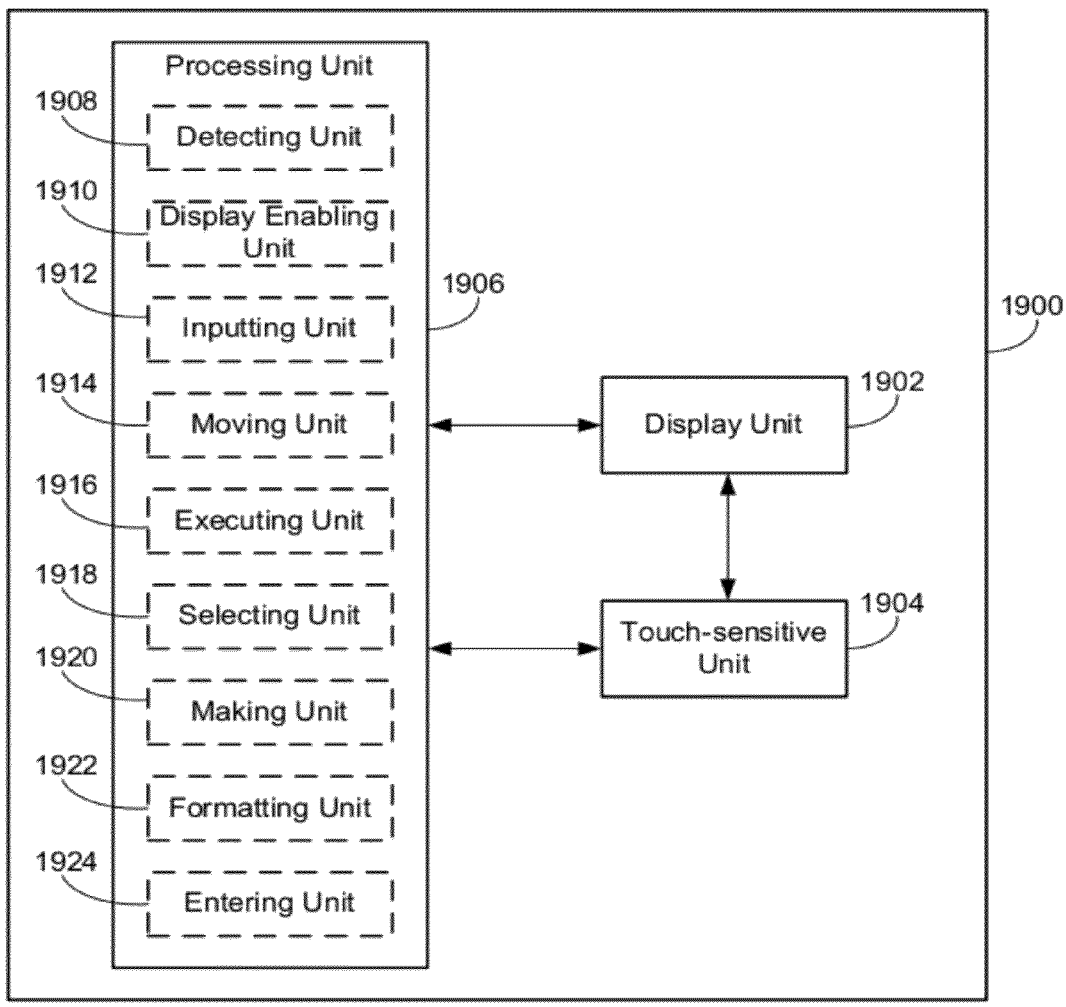
FIG. 19 is a functional block diagram of an electronic device in accordance with some embodiments.

In accordance with some embodiments, FIG. 19 shows a functional block diagram of an electronic device 1900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 19 may be combined or separated into sub-blocks to implement the principles of the invention as described above. Therefore, the description herein may support any possible combination or separation or further definition of the functional blocks described herein.

As shown in FIG. 19, an electronic device 1900 includes a display unit 1902 configured to concurrently display a first text entry area and an integrated input area, the integrated input area including a left portion with a left side of a split keyboard, a right portion with a right side of the split keyboard, and a center portion with a second text entry area, the center portion in between the left portion and the right portion; a touch-sensitive surface unit 1904 configured to receive user gestures; and a processing unit 1906 coupled to the display unit 1902 and the touch-sensitive surface unit 1904. In some embodiments, the processing unit 1906 includes a detecting unit 1908, a display enabling unit 1910, an inputting unit 1912, moving unit 1914, an executing unit 1916, a selecting unit 1918, a making unit 1920, a formatting unit 1922, and an entering unit 1924.

The processing unit 1906 is configured to: detect a gesture at a location on the touch-sensitive surface unit 1904 that corresponds to a location of a character key in the split keyboard (e.g., with the detecting unit 1908); and, in response to detecting the gesture at the location on the touch-sensitive surface unit 1904 that corresponds to the location of the character key in the split keyboard, input and enable concurrent display of the corresponding character in the first text entry area and the second text entry area on the display unit 1902 (e.g., with the inputting unit 1912 and the display enabling unit 1910).

In some embodiments, the first text entry area displays text at a first size, and the second text entry area displays a portion of the text in the first text entry area at a second size that is larger than the first size.

In some embodiments, the width of the integrated input area is the same as the width of the display unit 1902.

In some embodiments, the left side of the split keyboard and the right side of the split keyboard maintain fixed positions relative to each other within the integrated input area during movement of the integrated input area.

In some embodiments, the second text entry area includes an insertion point that remains stationary on the display unit 1902 as text is entered.

In some embodiments, the second text entry area includes an insertion point, wherein the processing unit 1906 is configured to: detect a gesture on the touch-sensitive surface unit 1904 at a location that corresponds to the insertion point in the second text entry area (e.g., with the detecting unit 1908); and, move the insertion point in the second text entry area in accordance with the gesture on the touch-sensitive surface unit 1904 at the location that corresponds to the insertion point in the second text entry area (e.g., with the moving unit 1914).

In some embodiments, the processing unit 1906 is configured to: enable display of text editing controls in the center portion of the integrated input area (e.g., with the display enabling unit 1910); detect a gesture on the touch-sensitive surface unit 1904 at a location that corresponds to a text editing control in the center portion of the integrated input area (e.g., with the detecting unit 1908); and, execute a text editing command in accordance with the gesture on the touch-sensitive surface unit 1904 at the location that corresponds to the text editing control (e.g., with the executing unit 1916).

In some embodiments, the text editing controls in the center portion of the integrated input area have corresponding text editing controls in the first text entry area.

In some embodiments, the processing unit 1906 is configured to: enable display of user-selectable input elements in the center portion of the integrated input area (e.g., with the display enabling unit 1910); detect a gesture on the touch-sensitive surface unit 1904 at a location that corresponds to a user-selectable input element in the center portion of the integrated input area (e.g., with the detecting unit 1908); and, in response to detecting the gesture on the touch-sensitive surface unit 1904 at the location that corresponds to the user-selectable input element, select the user-selectable input element (e.g., with the selecting unit 1918).

In some embodiments, the processing unit 1906 is configured to: detect a gesture on the touch-sensitive surface unit 1904 at a location that corresponds to the center portion of the integrated input area (e.g., with the detecting unit 1908); and, in response to detecting the gesture on the touch-sensitive surface unit 1904 at the location that corresponds to the center portion of the integrated input area, enable display of a popup view (e.g., with the display enabling unit 1910).

In some embodiments, the processing unit 1906 is configured to: detect a plurality of gestures on the touch-sensitive surface unit 1904 at a location that corresponds to the center portion of the integrated input area (e.g., with the detecting unit 1908); and, enter in the first text entry area and the second text entry area a character that corresponds to the plurality of gestures (e.g., with the entering unit 1924).

In some embodiments, the processing unit 1906 is configured to: detect a plurality of gestures on the touch-sensitive surface unit 1904 at a location that corresponds to the center portion of the integrated input area (e.g., with the detecting unit 1908); and, make a drawing in accordance with the plurality of gestures (e.g., with the making unit 1920).

In some embodiments, the processing unit 1906 is configured to: enable display of a suggested word in the center portion of the integrated input area (e.g., with the display enabling unit 1910); detect a gesture on the touch-sensitive surface unit 1904 at a location that corresponds to the suggested word (e.g., with the detecting unit 1908); and, execute a text editing command in accordance with the gesture on the touch-sensitive surface unit 1904 at the location that corresponds to the suggested word (e.g., with the executing unit 1916).

In some embodiments, the processing unit 1906 is configured to: enable display of a plurality of emoji characters in the center portion of the integrated input area (e.g., with the display enabling unit 1910); detect a gesture on the touch-sensitive surface unit 1904 at a location that corresponds to an emoji character in the plurality of emoji characters (e.g., with the detecting unit 1908); and, in response to detecting the gesture on the touch-sensitive surface unit 1904 at the location that corresponds to the emoji character, input and enable display of the emoji character in the first text entry area and the second text entry area on the display unit 1902 (e.g., with the inputting unit 1912 and the display enabling unit 1910).

In some embodiments, the processing unit 1906 is configured to: enable display of a plurality of unicode characters in the center portion of the integrated input area (e.g., with the display enabling unit 1910); detect a gesture on the touch-sensitive surface unit 1904 at a location that corresponds to a unicode character in the plurality of unicode characters (e.g., with the detecting unit 1908); and, in response to detecting the gesture on the touch-sensitive surface unit 1904 at the location that corresponds to the unicode character, input and enable display of the unicode character in the first text entry area and the second text entry area on the display unit 1902 (e.g., with the inputting unit 1912 and the display enabling unit 1910).

In some embodiments, the processing unit 1906 is configured to: detect a gesture on the touch-sensitive surface unit 1904 at a location that corresponds to the second text entry area (e.g., with the detecting unit 1908); and, in response to detecting the gesture on the touch-sensitive surface unit 1904 at the location that corresponds to the second text entry area, select a range of text (e.g., with the select unit 1918).

In some embodiments, the processing unit 1906 is configured to: detect a gesture on the touch-sensitive surface unit 1904 at a location that corresponds to one or more words in the second text entry area (e.g., with the detecting unit 1908); and, in response to detecting the gesture on the touch-sensitive surface unit 1904 at the location that corresponds to the second text entry area, format the one or more words (e.g., with the formatting unit 1922).

In some embodiments, input elements in the center portion of the integrated input area are user-configurable.

Figure 20:
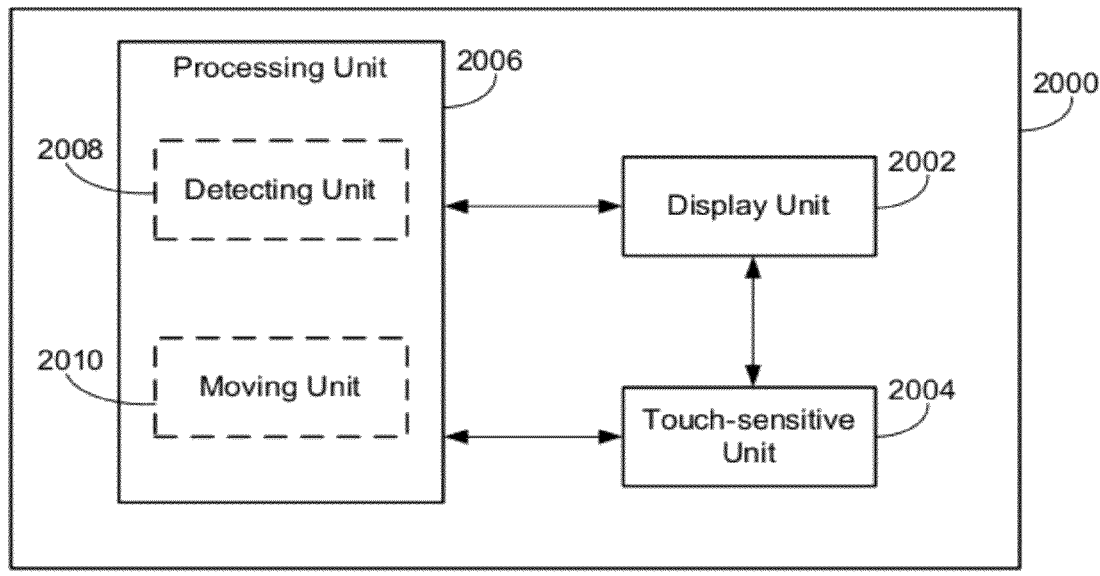
FIG. 20 is a functional block diagram of an electronic device in accordance with some embodiments.

In accordance with some embodiments, FIG. 20 shows a functional block diagram of an electronic device 2000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 20 may be combined or separated into sub-blocks to implement the principles of the invention as described above. Therefore, the description herein may support any possible combination or separation or further definition of the functional blocks described herein.

As shown in FIG. 20, an electronic device 2000 includes a display unit 2002 configured to concurrently display an application content area that includes one or more text entry areas, and an input area with a keyboard that is displayed over the application content area; a touch-sensitive surface unit 2004 configured to receive user gestures; and a processing unit 2006 coupled to the display unit 2002 and the touch-sensitive surface unit 2004. In some embodiments, the processing unit 2006 includes a detecting unit 2008, and a moving unit 2010.

The processing unit 2006 is configured to: detect a drag gesture on the touch-sensitive surface unit 2004 at a location that corresponds to the input area on the display unit 2002 (e.g., with the detecting unit 2008); in response to detecting the drag gesture, move the input area on the display unit 2002 in accordance with the drag gesture (e.g., with the moving unit 2010); detect a flick gesture on the touch-sensitive surface unit 2004 at a location that corresponds to the input area on the display unit 2002 (e.g., with the detecting unit 2008); and, in response to detecting the flick gesture, move the input area on the display unit 2002 with inertia in accordance with the flick gesture such that the input area comes to rest at a location adjacent to and just below a text entry area in the application content area (e.g., with the moving unit 2010).

In some embodiments, moving the input area on the display unit 2002 with inertia in accordance with the flick gesture includes: calculating a trajectory of the input area based on the flick gesture; searching for one or more text entry areas in the application content area that meet predefined candidate criteria; and, when one or more candidate text entry areas are found, identifying a respective candidate text entry area as the text entry area that the input area will come to rest adjacent to and just below and adjusting the trajectory accordingly.

In some embodiments, the respective candidate text entry area is identified as the text entry area that the input area will come to rest adjacent to and just below based on proximity of the respective candidate text entry area to a termination point of the trajectory.

In some embodiments, the trajectory is calculated based on simulated physical properties of the input area.

In some embodiments, the candidate criteria are met for a respective text entry area if the respective text entry area is within a predefined distance of a termination point of the trajectory.

In some embodiments, identifying one of the candidate text entry areas as the text entry area that the input area will come to rest adjacent to and just below includes selecting a respective candidate text entry area that is closest to a termination point of the trajectory as the text entry area that the input area will come to rest adjacent to and just below.

Figure 21:
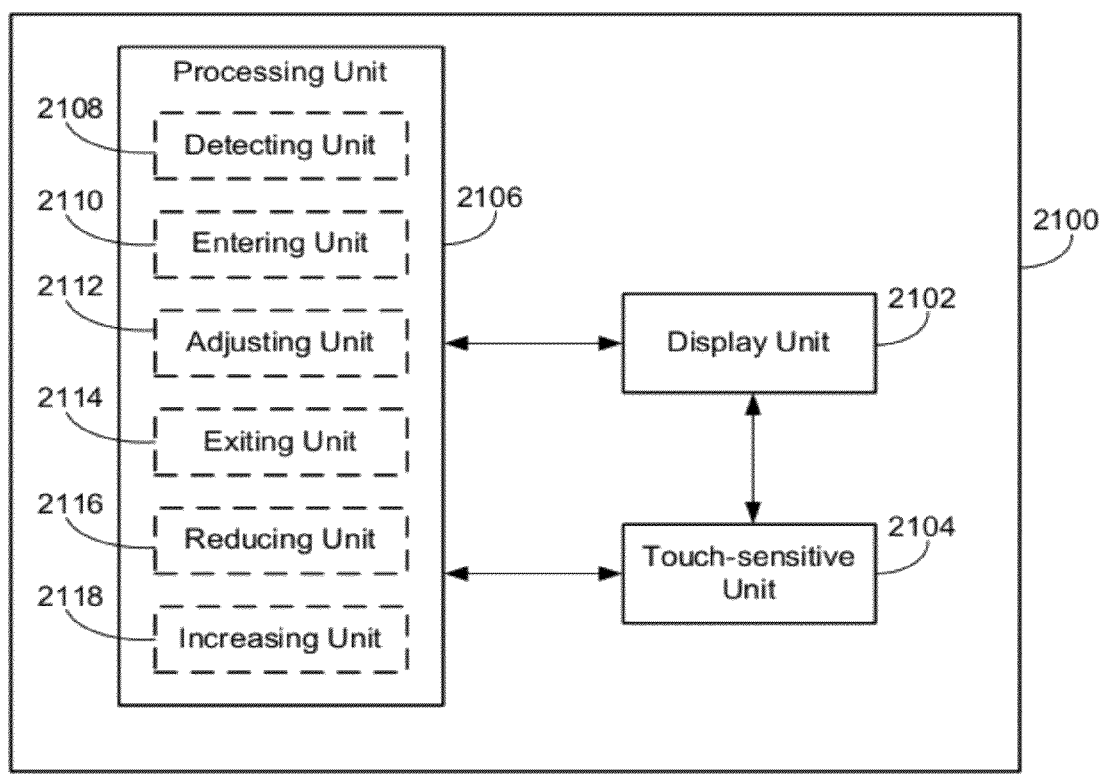
FIG. 21 is a functional block diagram of an electronic device in accordance with some embodiments.

In accordance with some embodiments, FIG. 21 shows a functional block diagram of an electronic device 2100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 21 may be combined or separated into sub-blocks to implement the principles of the invention as described above. Therefore, the description herein may support any possible combination or separation or further definition of the functional blocks described herein.

As shown in FIG. 21, an electronic device 2100 includes a display unit 2102 configured to concurrently display a first text entry area, and an integrated input area, the integrated input area including: a left portion with a left side of a split keyboard, a right portion with a right side of the split keyboard, and a center portion in between the left portion and the right portion; a touch-sensitive surface unit 2104 configured to receive user inputs; a processing unit 2106 coupled to the display unit 2102 and the touch-sensitive surface unit 2104. In some embodiments, the processing unit 2106 includes a detecting unit 2108, an entering unit 2110, an adjusting unit 2112, an exiting unit 2114, a reducing unit 2116, and an increasing unit 2118.

The processing unit 2106 is configured to: detect a first input on the touch-sensitive surface unit 2104 (e.g., with the detecting unit 2108); in response to detecting the first input, enter a reconfiguration mode for the integrated input area (e.g., with the entering unit 2110); while in the reconfiguration mode for the integrated input area: detect a second input by a first thumb and/or a second thumb (e.g., with the detecting unit 2108); in response to detecting the second input, adjust the size of at least one of the left side and the right side of the split keyboard in the integrated input area (e.g., with the adjusting unit 2112); and detect a third input (e.g., with the detecting unit 2108); and, in response to detecting the third input, exit the reconfiguration mode for the integrated input area (e.g., with the exiting unit 2114).

In some embodiments, the first input includes a first thumb and a second thumb, distinct from the first thumb.

In some embodiments, the third input includes the first thumb and/or the second thumb.

In some embodiments, the second input includes a horizontal movement of a left thumb towards a left vertical side of the display unit 2102; and the processing unit 2106 is configured to, in response to detecting the horizontal movement of the left thumb towards the left vertical side of the display unit 2102, reduce the size of the left side of the split keyboard (e.g., with the reducing unit 2116).

In some embodiments, the second input includes a horizontal movement of a left thumb away from a left vertical side of the display unit 2102; and the processing unit 2106 is configured to, in response to detecting the horizontal movement of the left thumb away from the left vertical side of the display unit 2102, increase the size of the left side of the split keyboard (e.g., with the increasing unit 2118).

In some embodiments, the second input includes a horizontal movement of the first thumb towards a vertical side of the display unit 2102 closest to the first thumb; and the processing unit 2106 is configured to, in response to detecting the horizontal movement of the first thumb towards the vertical side of the display unit 2102 closest to the first thumb, reduce the size of the left side and the right side of the split keyboard (e.g., with the reducing unit 2116).

In some embodiments, the second input includes a horizontal movement of the first thumb away from a vertical side of the display unit 2102 closest to the first thumb; and the processing unit 2106 is configured to, in response to detecting the horizontal movement of the first thumb away from the vertical side of the display unit 2102 closest to the first thumb, increase the size of the left side and the right side of the split keyboard (e.g., with the increasing unit 2118).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

Figure 1B:
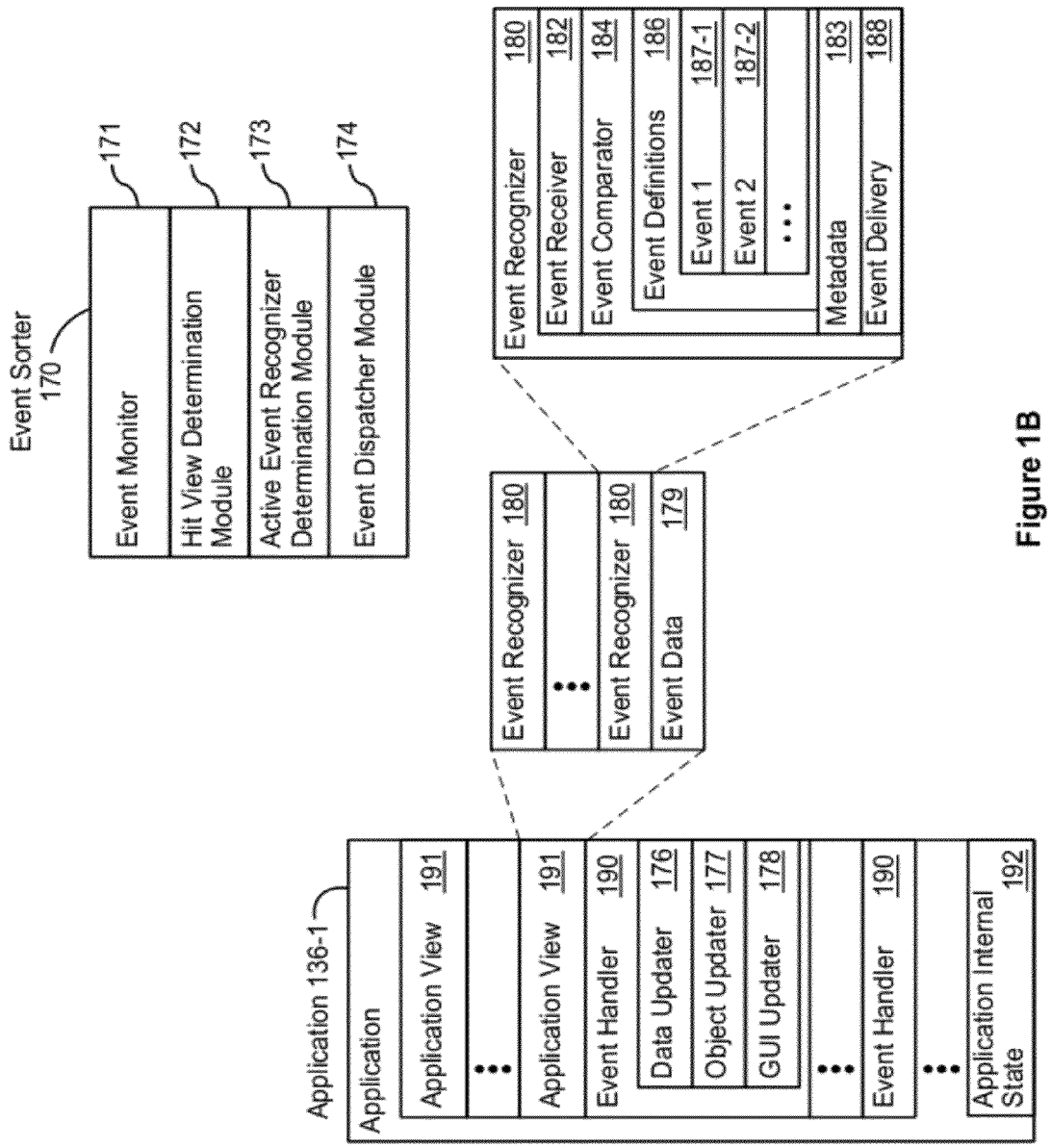
FIG. 1B is a block diagram illustrating exemplary components for event handling in accordance with some embodiments.

The operations described above with reference to FIGS. 6A-6B, 7A-7B, 8A-8B, 9, 10A-10B, 11A-11D, 12A-12B, and 13A-13B may be implemented by components depicted in FIGS. 1A-1B. For example, detection operation 604, and replacing operation 610 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   concurrently displaying
      a text entry area,
      a left side of a split keyboard, and
      a right side of a split keyboard,
      the left side of the split keyboard including a plurality of rows of keys and the right side of the split keyboard including a corresponding plurality of rows of keys;
   detecting a gesture at a location on the touch-sensitive surface that corresponds to a predefined area adjacent to and to the right of a rightmost key in a respective row of the left side of the split keyboard; and,
   in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

2. The device of claim 1, wherein the predefined area adjacent to and to the right of the rightmost key in the respective row of the left side of the split keyboard is an undisplayed key activation area that corresponds to the leftmost key in the corresponding respective row of the right side of the split keyboard.

3. The device of claim 1, including instructions for:
detecting a gesture at a location on the touch-sensitive surface that corresponds to a predefined area adjacent to and to the left of a leftmost key in a respective row of the right side of the split keyboard; and,
in response to detecting the gesture at the location on the touch-sensitive surface that corresponds to the predefined area adjacent to and to the left of the leftmost key in the respective row of the right side of the split keyboard, entering in the text entry area a character that corresponds to a rightmost key in a corresponding respective row of the left side of the split keyboard.

4. The device of claim 3, wherein the predefined area adjacent to and to the left of the leftmost key in the respective row of the right side of the split keyboard is an undisplayed key activation area that corresponds to the rightmost key in the corresponding respective row of the left side of the split keyboard.

5. The device of claim 1, including instructions for:
prior to detecting the gesture, detecting a key activation gesture at a first time at a location on the touch-sensitive surface that corresponds to a location of a visible key in the split keyboard; and,
in response to detecting the gesture at a second time after the first time:
entering in the text entry area the character that corresponds to the leftmost key in the corresponding respective row of the right side of the split keyboard when the second time is less than a predefined period of time after the first time; and
foregoing entering in the text entry area the character that corresponds to the leftmost key in the corresponding respective row of the right side of the split keyboard when the second time exceeds the predefined period of time after the first time.

6. A method, comprising:
at an electronic device with a display and a touch-sensitive surface:
concurrently displaying
a text entry area,
a left side of a split keyboard, and
a right side of a split keyboard,
the left side of the split keyboard including a plurality of rows of keys and the right side of the split keyboard including a corresponding plurality of rows of keys;
detecting a gesture at a location on the touch-sensitive surface that corresponds to a predefined area adjacent to and to the right of a rightmost key in a respective row of the left side of the split keyboard; and,
in response to detecting the gesture at the location on the touch-sensitive surface that corresponds to the predefined area adjacent to and to the right of the rightmost key in the respective row of the left side of the split keyboard, entering in the text entry area a character that corresponds to a leftmost key in a corresponding respective row of the right side of the split keyboard.

7. The method of claim 6, wherein the predefined area adjacent to and to the right of the rightmost key in the respective row of the left side of the split keyboard is an undisplayed key activation area that corresponds to the leftmost key in the corresponding respective row of the right side of the split keyboard.

8. The method of claim 6, including:
detecting a gesture at a location on the touch-sensitive surface that corresponds to a predefined area adjacent to and to the left of a leftmost key in a respective row of the right side of the split keyboard; and,
in response to detecting the gesture at the location on the touch-sensitive surface that corresponds to the predefined area adjacent to and to the left of the leftmost key in the respective row of the right side of the split keyboard, entering in the text entry area a character that corresponds to a rightmost key in a corresponding respective row of the left side of the split keyboard.

9. The method of claim 8, wherein the predefined area adjacent to and to the left of the leftmost key in the respective row of the right side of the split keyboard is an undisplayed key activation area that corresponds to the rightmost key in the corresponding respective row of the left side of the split keyboard.

10. The method of claim 6, including:
prior to detecting the gesture, detecting a key activation gesture at a first time at a location on the touch-sensitive surface that corresponds to a location of a visible key in the split keyboard; and,
in response to detecting the gesture at a second time after the first time:
entering in the text entry area the character that corresponds to the leftmost key in the corresponding respective row of the right side of the split keyboard when the second time is less than a predefined period of time after the first time; and
foregoing entering in the text entry area the character that corresponds to the leftmost key in the corresponding respective row of the right side of the split keyboard when the second time exceeds the predefined period of time after the first time.

11. A graphical user interface on an electronic device with a display, a touch-sensitive surface, a memory, and one or more processors to execute one or more programs stored in the memory, the graphical user interface comprising:
concurrently displayed:
a text entry area,
a left side of a split keyboard, and
a right side of a split keyboard, the left side of the split keyboard including a plurality of rows of keys and the right side of the split keyboard including a corresponding plurality of rows of keys;
wherein:
a gesture is detected at a location on the touch-sensitive surface that corresponds to a predefined area adjacent to and to the right of a rightmost key in a respective row of the left side of the split keyboard; and,
in response to detecting the gesture at the location on the touch-sensitive surface that corresponds to the predefined area adjacent to and to the right of the rightmost key in the respective row of the left side of the split keyboard, a character that corresponds to a leftmost key in a corresponding respective row of the right side of the split keyboard is entered in the text entry area.

12. The graphical user interface of claim 11, wherein the predefined area adjacent to and to the right of the rightmost key in the respective row of the left side of the split keyboard is an undisplayed key activation area that corresponds to the leftmost key in the corresponding respective row of the right side of the split keyboard.

13. The graphical user interface of claim 11, wherein:
in response to detecting a gesture at a location on the touch-sensitive surface that corresponds to a predefined area adjacent to and to the left of a leftmost key in a respective row of the right side of the split keyboard, a character that corresponds to a rightmost key in a corresponding respective row of the left side of the split keyboard is entered in the text entry area.

14. The graphical user interface of claim 13, wherein the predefined area adjacent to and to the left of the leftmost key in the respective row of the right side of the split keyboard is an undisplayed key activation area that corresponds to the rightmost key in the corresponding respective row of the left side of the split keyboard.

15. The graphical user interface of claim 11, wherein:
prior to detecting the gesture, a key activation gesture is detected at a first time at a location on the touch-sensitive surface that corresponds to a location of a visible key in the split keyboard; and,
in response to detecting the gesture at a second time after the first time:
the character that corresponds to the leftmost key in the corresponding respective row of the right side of the split keyboard is entered in the text entry area when the second time is less than a predefined period of time after the first time; and
entering in the text entry area the character that corresponds to the leftmost key in the corresponding respective row of the right side of the split keyboard is foregone when the second time exceeds the predefined period of time after the first time.

16. A non-transitory computer readable storage medium storing one or more programs, the one or more programs comprising instructions, which when executed by an electronic device with a display and a touch-sensitive surface, cause the device to:
concurrently display
a text entry area,
a left side of a split keyboard, and
a right side of a split keyboard,
the left side of the split keyboard including a plurality of rows of keys and the right side of the split keyboard including a corresponding plurality of rows of keys;
detect a gesture at a location on the touch-sensitive surface that corresponds to a predefined area adjacent to and to the right of a rightmost key in a respective row of the left side of the split keyboard; and,
in response to detecting the gesture at the location on the touch-sensitive surface that corresponds to the predefined area adjacent to and to the right of the rightmost key in the respective row of the left side of the split keyboard, enter in the text entry area a character that corresponds to a leftmost key in a corresponding respective row of the right side of the split keyboard.

17. The computer readable storage medium of claim 16, wherein the predefined area adjacent to and to the right of the rightmost key in the respective row of the left side of the split keyboard is an undisplayed key activation area that corresponds to the leftmost key in the corresponding respective row of the right side of the split keyboard.

18. The computer readable storage medium of claim 16, including instructions which, when executed by the electronic device, cause the device to:
detect a gesture at a location on the touch-sensitive surface that corresponds to a predefined area adjacent to and to the left of a leftmost key in a respective row of the right side of the split keyboard; and,
in response to detecting the gesture at the location on the touch-sensitive surface that corresponds to the predefined area adjacent to and to the left of the leftmost key in the respective row of the right side of the split keyboard, enter in the text entry area a character that corresponds to a rightmost key in a corresponding respective row of the left side of the split keyboard.

19. The computer readable storage medium of claim 18, wherein the predefined area adjacent to and to the left of the leftmost key in the respective row of the right side of the split keyboard is an undisplayed key activation area that corresponds to the rightmost key in the corresponding respective row of the left side of the split keyboard.

20. The computer readable storage medium of claim 16, including instructions which, when executed by the electronic device, cause the device to:
prior to detecting the gesture, detect a key activation gesture at a first time at a location on the touch-sensitive surface that corresponds to a location of a visible key in the split keyboard; and,
in response to detecting the gesture at a second time after the first time:
enter in the text entry area the character that corresponds to the leftmost key in the corresponding respective row of the right side of the split keyboard when the second time is less than a predefined period of time after the first time; and
forego entering in the text entry area the character that corresponds to the leftmost key in the corresponding respective row of the right side of the split keyboard when the second time exceeds the predefined period of time after the first time.

* * * * *